US012809866B2

(12) United States Patent
Veselova et al.

(10) Patent No.: US 12,809,866 B2
(45) Date of Patent: Nov. 24, 2026

(54) GENERATING A PAGE IO PIPELINE FOR OPTIMIZED DATABASE QUERY EXECUTION

(71) Applicant: Ocient Holdings LLC, Chicago, IL (US)

(72) Inventors: Anna Veselova, Chicago, IL (US); Pieter Charles Jas Svenson, Seattle, WA (US); Greg R. Dhuse, Chicago, IL (US); Benjamin Daniel Rabe, Sandy, UT (US); Richard Wang, Ellicott City, MD (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 19/349,276

(22) Filed: Oct. 3, 2025

(65) Prior Publication Data

US 2026/0037511 A1 Feb. 5, 2026

Related U.S. Application Data

(63) Continuation of application No. 18/364,761, filed on Aug. 3, 2023, now Pat. No. 12,455,882.

(60) Provisional application No. 63/516,219, filed on Jul. 28, 2023.

(51) Int. Cl.

| | |
|---|---|
| ***G06F 16/2453*** | (2019.01) |
| ***G06F 16/22*** | (2019.01) |
| ***G06F 16/2455*** | (2019.01) |

(52) U.S. Cl.

CPC .... *G06F 16/24542* (2019.01); *G06F 16/2272* (2019.01); *G06F 16/24532* (2019.01); *G06F 16/2456* (2019.01); *G06F 16/24568* (2019.01)

(58) Field of Classification Search

None

See application file for complete search history.

(56) References Cited

U.S. PATENT DOCUMENTS

| | | | | |
|---|---|---|---|---|
| 2016/0034530 A1* | 2/2016 | Nguyen ............ | G06F 16/24542 707/719 |
| 2024/0070151 A1* | 2/2024 | Khalyknazarov ..... | G06F 16/252 |

* cited by examiner

*Primary Examiner* — Irene Baker

(74) *Attorney, Agent, or Firm* — Garlick & Markison; Patricia M. Healy

(57) ABSTRACT

A query and results sub-system of a database system includes a first processing module operable to receive an initial query including a plurality of sets of code terms regarding a dataset stored as a plurality of pages. A first page includes a first set of row-oriented data. The first processing module is operable to identify a set of input/output (IO) code terms to produce an optimized set of IO code terms, and for at least a portion of the first page: determine a first IO pipeline element operable to format at least a portion of the first set of row-oriented data into a first set of column-oriented data, determine remaining IO pipeline elements operable to execute the optimized set of IO code terms on the at least the portion of the first page, and optimize the first set of IO pipeline elements to produce a first IO pipeline.

18 Claims, 107 Drawing Sheets database system 10 computing device 18 computing device 18 computing device 18 node 37 node 37 node 37 node 37 data set query processing system 2502 query execution module 2504 database system 10 database system 10 query execution module 2504 database system 10 database system 10 query processing system 2510 query processing system 2510 database system 10 database system 10 record processing and storage system 2505

2505 record processing and storage system 2505

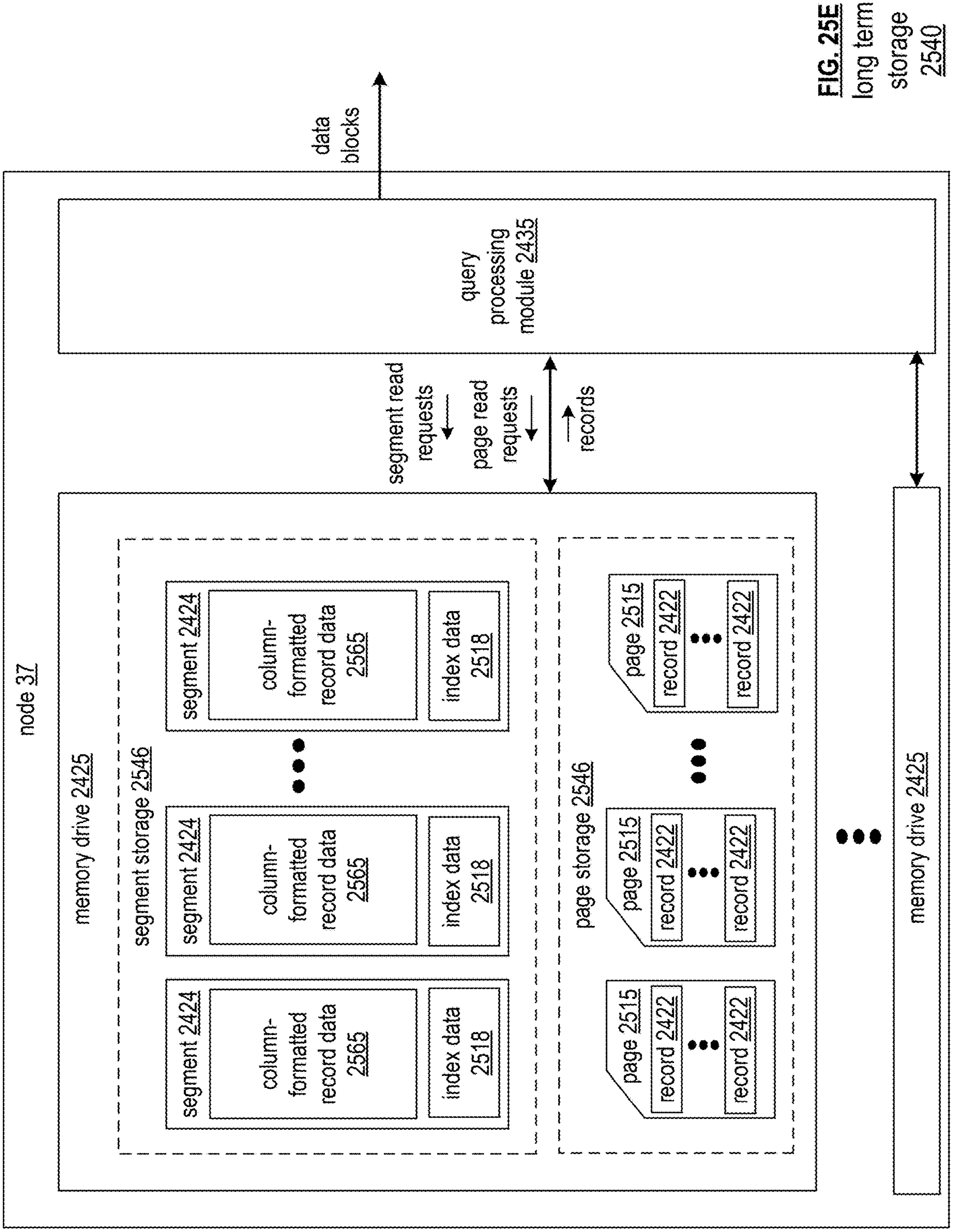
FIG. 25E long term storage 2540 segment generator 2617 database system 10 database system 10 database system 10 database system 10

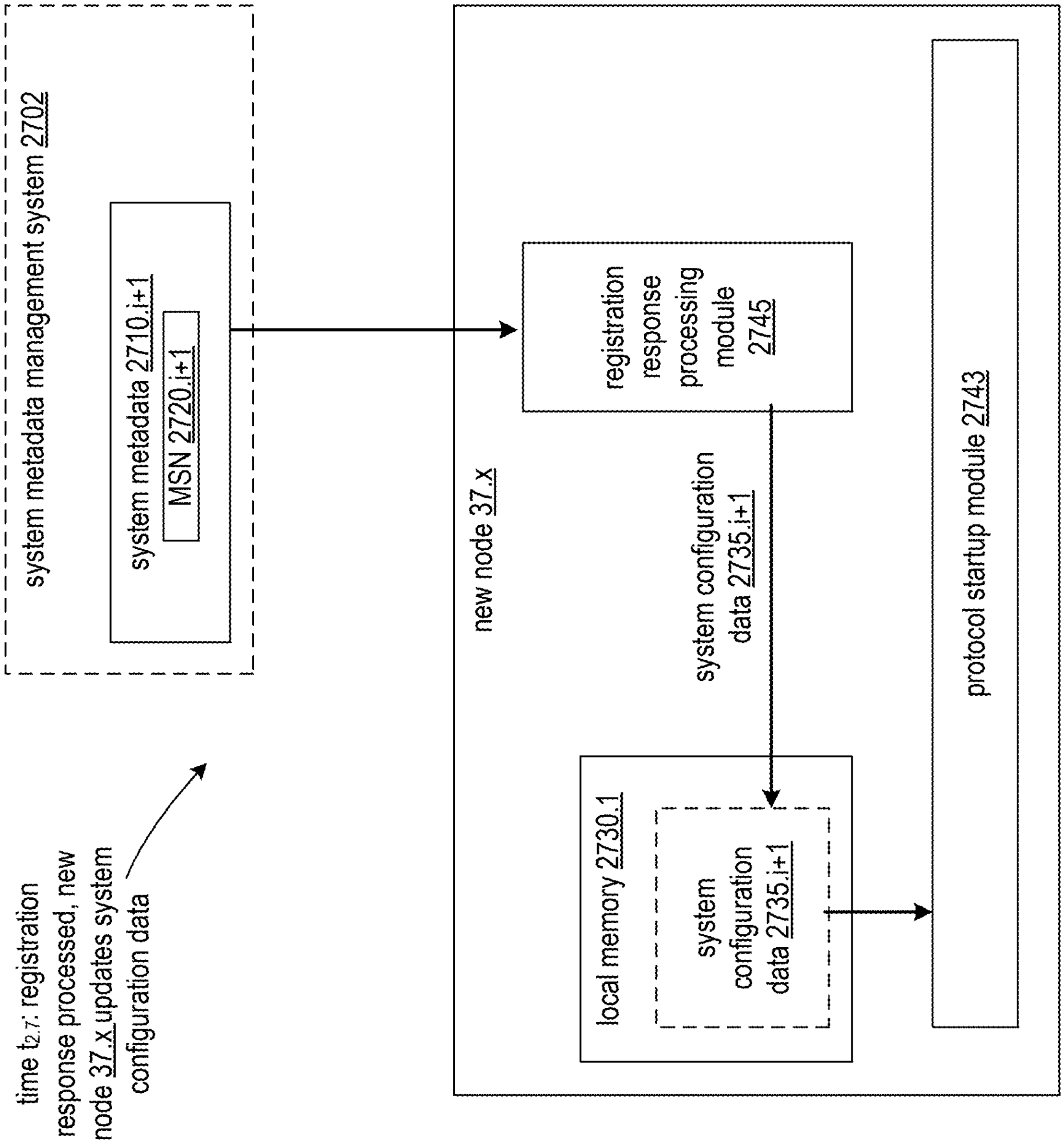
system metadata management system 2702
system metadata 2710.i+1
MSN 2720.i+1
time $t_{2.7}$: registration response processed, new node 37.x updates system configuration data
new node 37.x
registration response processing module 2745
system configuration data 2735.i+1
local memory 2730.1
system configuration data 2735.i+1
protocol startup module 2743 database system 10 database system 10 database system 10 database system 10 database system 10 database system 10 query execution module 2504 database system 10 query execution module 2504 database system 10 database system 10 task execution node 3922 task execution node 3922 node 37-1 node 37-2 node 37-1 node 37-1 query execution module 2504 query execution module 2504 query execution module 2504 database system 10 database system 10 database system 10 segment update module 3220 database system 10 database system 10 database system 10 database system 10 database system 10 database system 10 database system 10 database system 10

GENERATING A PAGE IO PIPELINE FOR OPTIMIZED DATABASE QUERY EXECUTION

CROSS-REFERENCE TO RELATED APPLICATIONS

The present U.S. Utility Patent Application claims priority pursuant to 35 U.S.C. § 120 as a continuation of U.S. Utility application Ser. No. 18/364,761, entitled "GENERATING ADDENDUM PARTS FOR SUBSEQUENT PROCESSING VIA A DATABASE SYSTEM," filed Aug. 3, 2023, which claims priority pursuant to 35 U.S.C. § 119(e) to U.S. Provisional Application No. 63/516,219, entitled "GENERATING ADDENDUM PARTS FOR SUBSEQUENT PROCESSING VIA A DATABASE SYSTEM," filed Jul. 28, 2023, each of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or online purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 25E is a schematic block diagrams of a node that implements a query processing module that reads records from segment storage and page storage in accordance with various embodiments;

FIG. 27F is a schematic block diagram of an example database system when a new node updates system configuration based on a registration response in accordance with various embodiments;

DETAILED DESCRIPTION OF THE INVENTION

Figure 1:
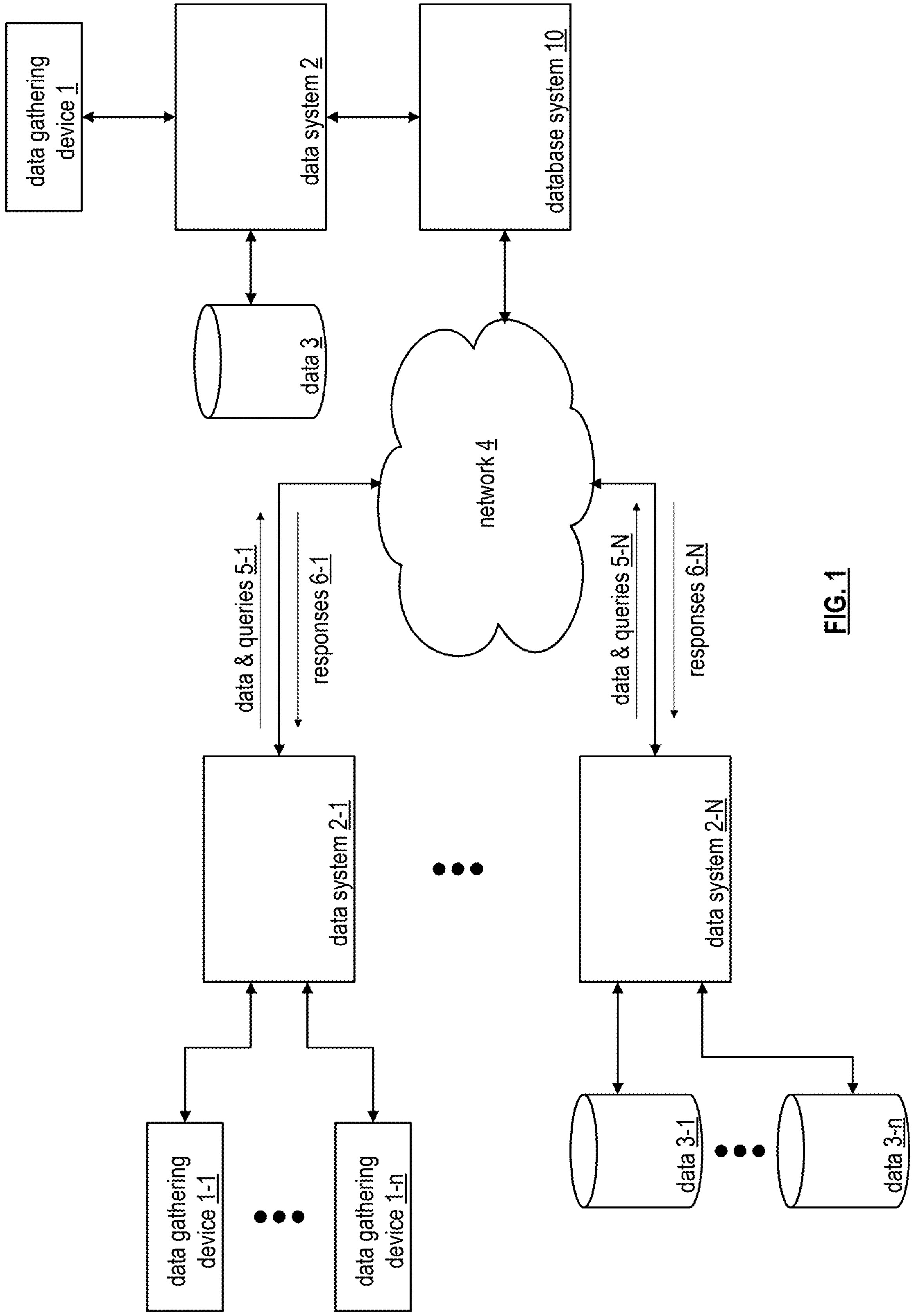
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
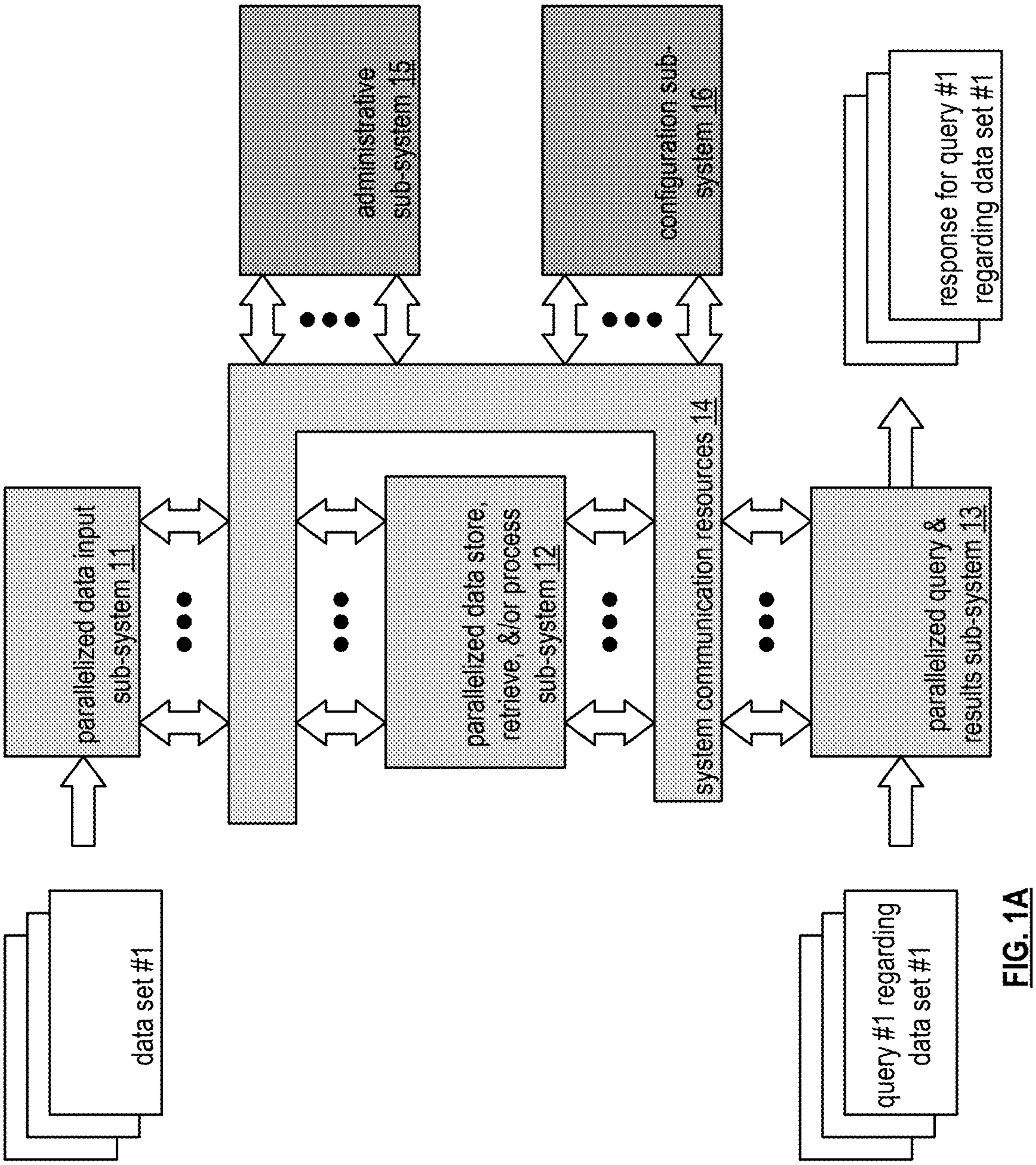
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches of dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
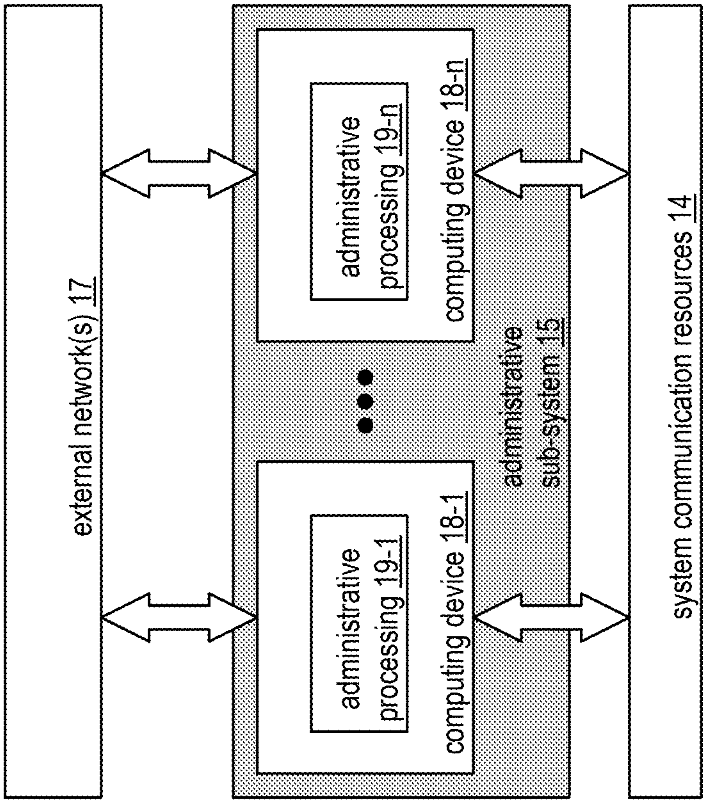
FIG. 2 is a schematic block diagram of an embodiment of an administrative sub-system in accordance with various embodiments.

FIG. 2 is a schematic block diagram of an embodiment of the administrative sub-system 15 of FIG. 1A that includes one or more computing devices 18-1 through 18-$n$. Each of the computing devices executes an administrative processing function utilizing a corresponding administrative processing of administrative processing 19-1 through 19-$n$ (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
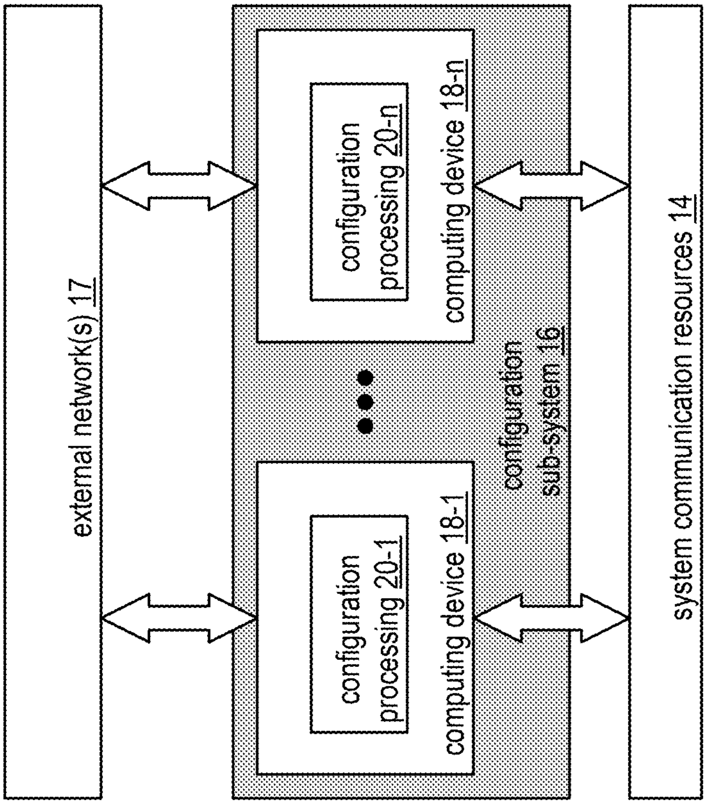
FIG. 3 is a schematic block diagram of an embodiment of a configuration sub-system in accordance with various embodiments.

FIG. 3 is a schematic block diagram of an embodiment of the configuration sub-system 16 of FIG. 1A that includes one or more computing devices 18-1 through 18-$n$. Each of the computing devices executes a configuration processing function 20-1 through 20-$n$ (which includes a plurality of configuration operations) that coordinates system level configurations of the database system. Each computing device is coupled to the external network 17 of FIG. 2, or networks, and to the system communication resources 14 of FIG. 1A.

Figure 4:
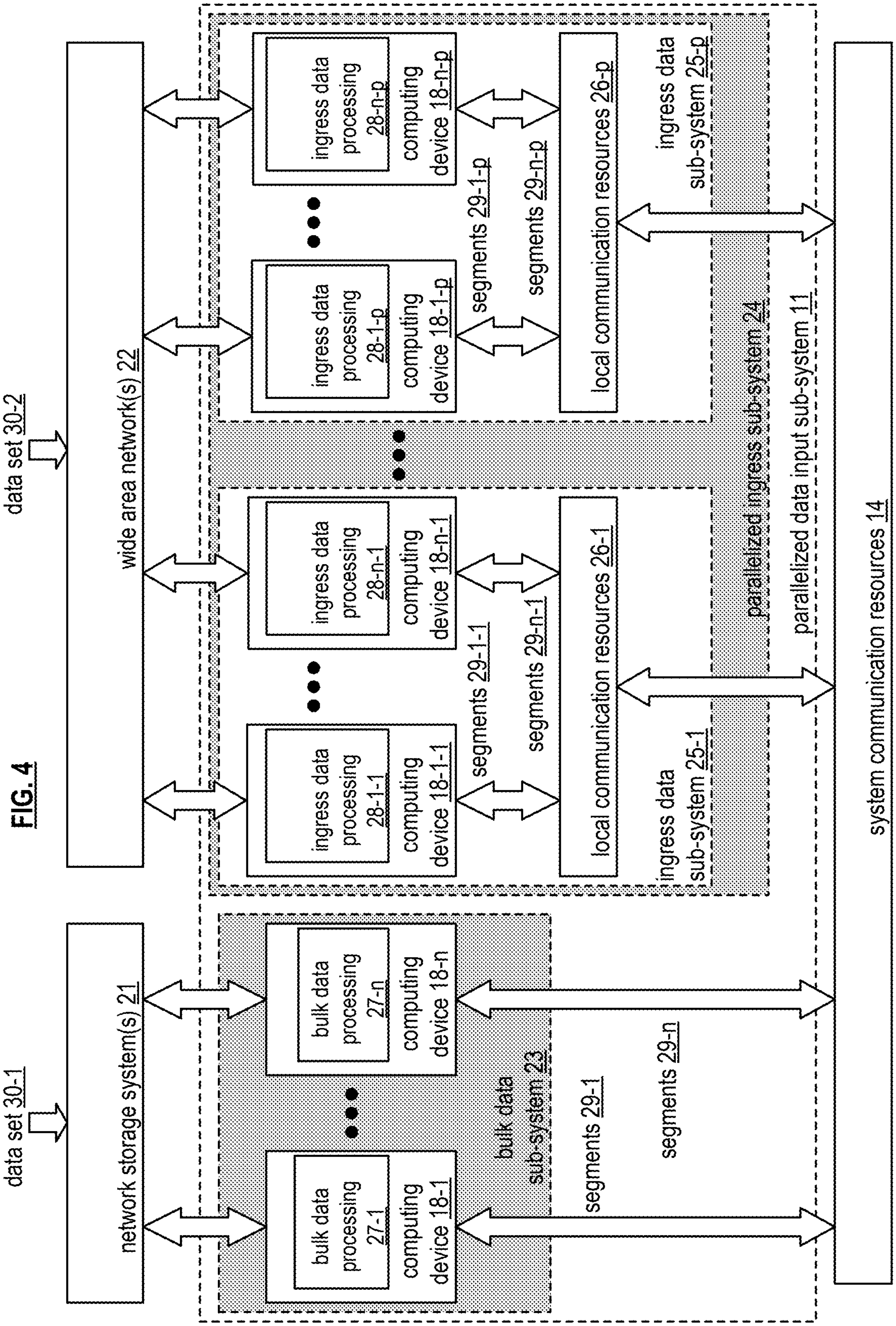
FIG. 4 is a schematic block diagram of an embodiment of a parallelized data input sub-system in accordance with various embodiments.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-$n$. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-$p$ that each include a local communication resource of local communication resources 26-1 through 26-$p$ and a plurality of computing devices 18-1 through 18-$n$. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through **25-*p*, data from a plurality of tables can be streamed into the database system 10** at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
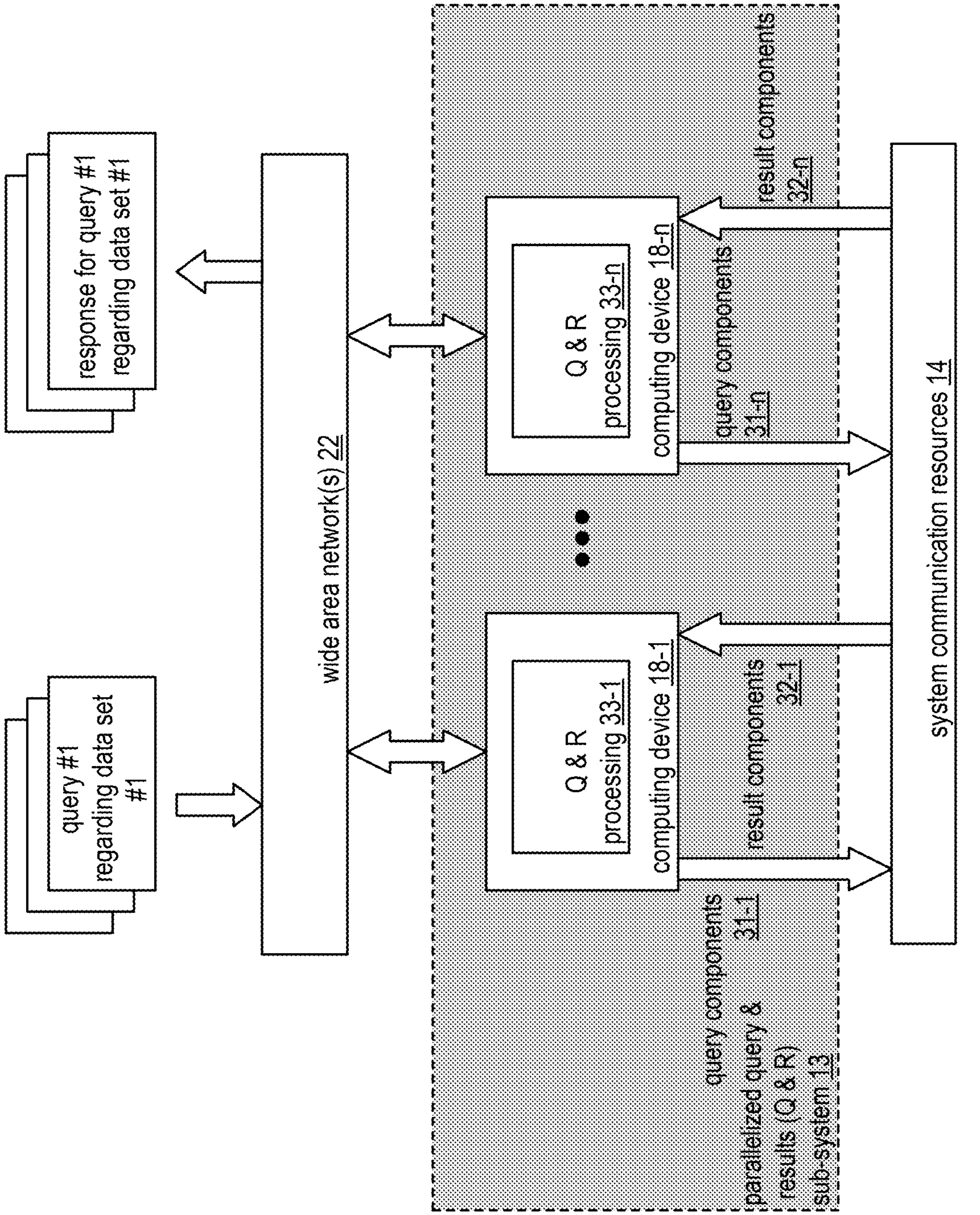
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through **18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12**.

Processing resources of the parallelized data store, retrieve, &/or process sub-system 12 processes the components of the optimized plan to produce results components 32-1 through **32-*n*. The computing device of the Q&R sub-system 13** processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
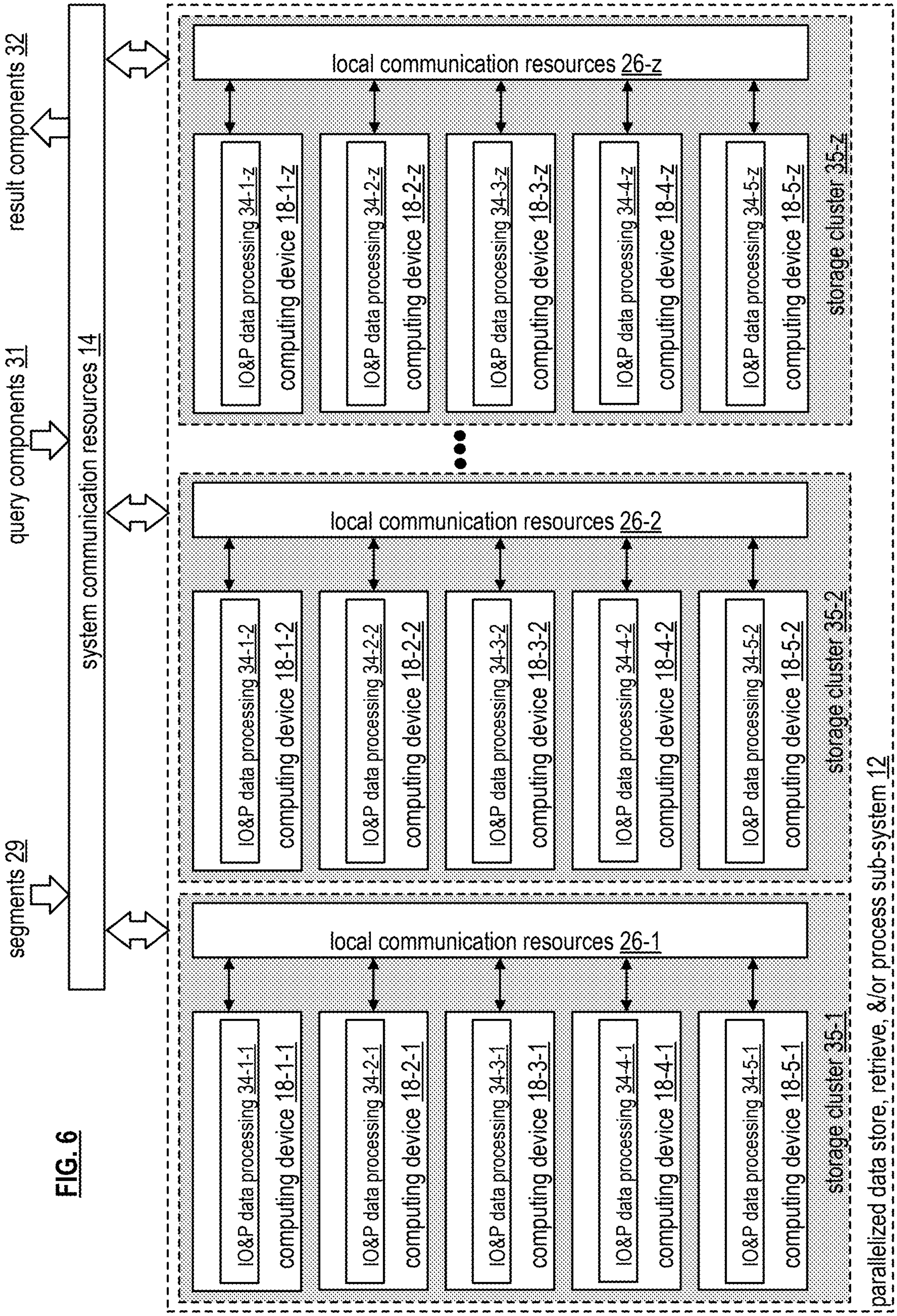
FIG. 6 is a schematic block diagram of an embodiment of a parallelized data store, retrieve, and/or process (IO& P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through **35-*z*. Each storage cluster includes a corresponding local communication resource 26-1 through 26-*z* and a number of computing devices 18-1 through 18-5. Each computing device executes an input, output, and processing (IO &P) processing function 34-1 through 34-5** to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through **35-*n* are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1** is storing and/or processing a second segment group while it is storing/or and processing a first segment group.

Figure 7:
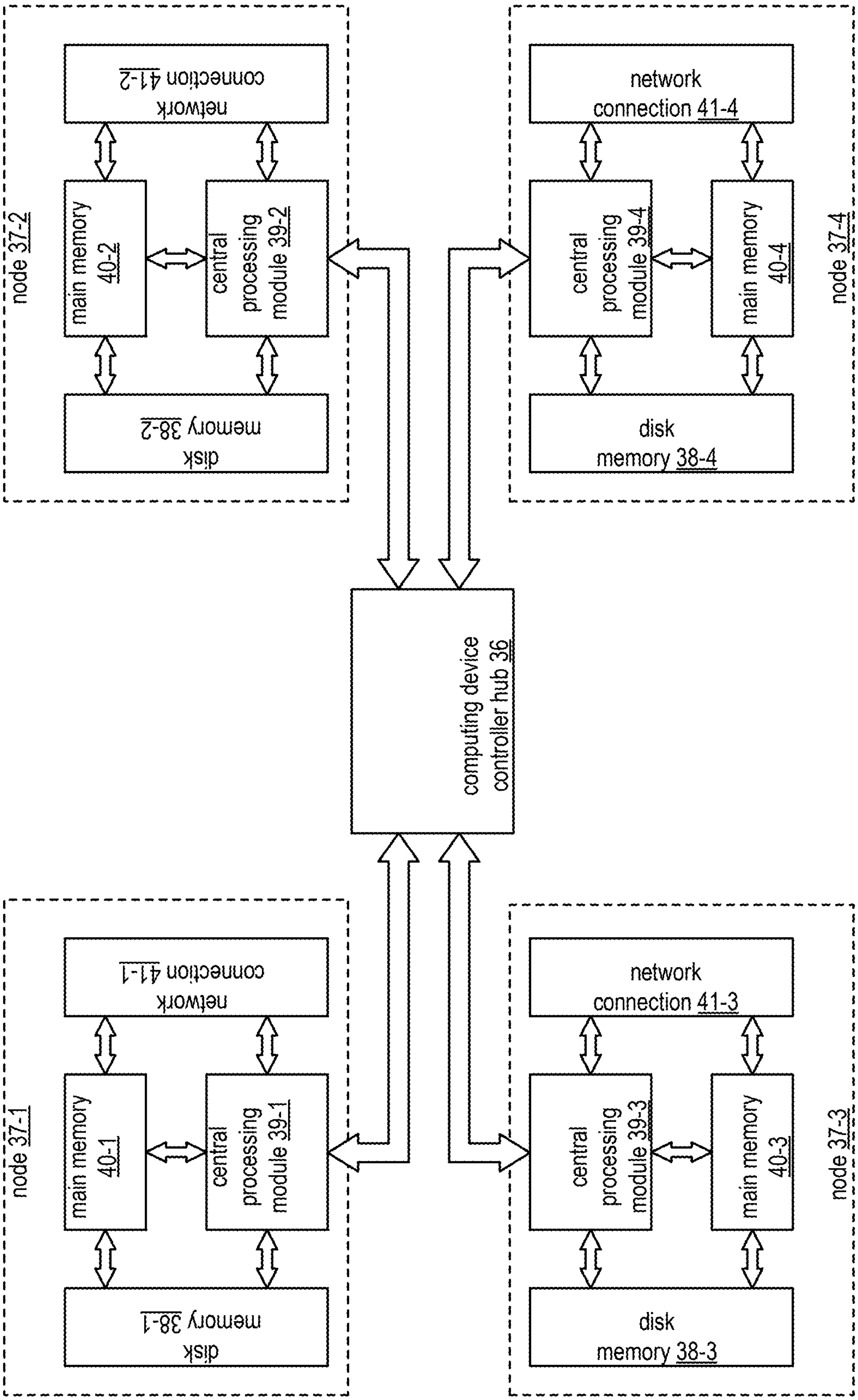
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
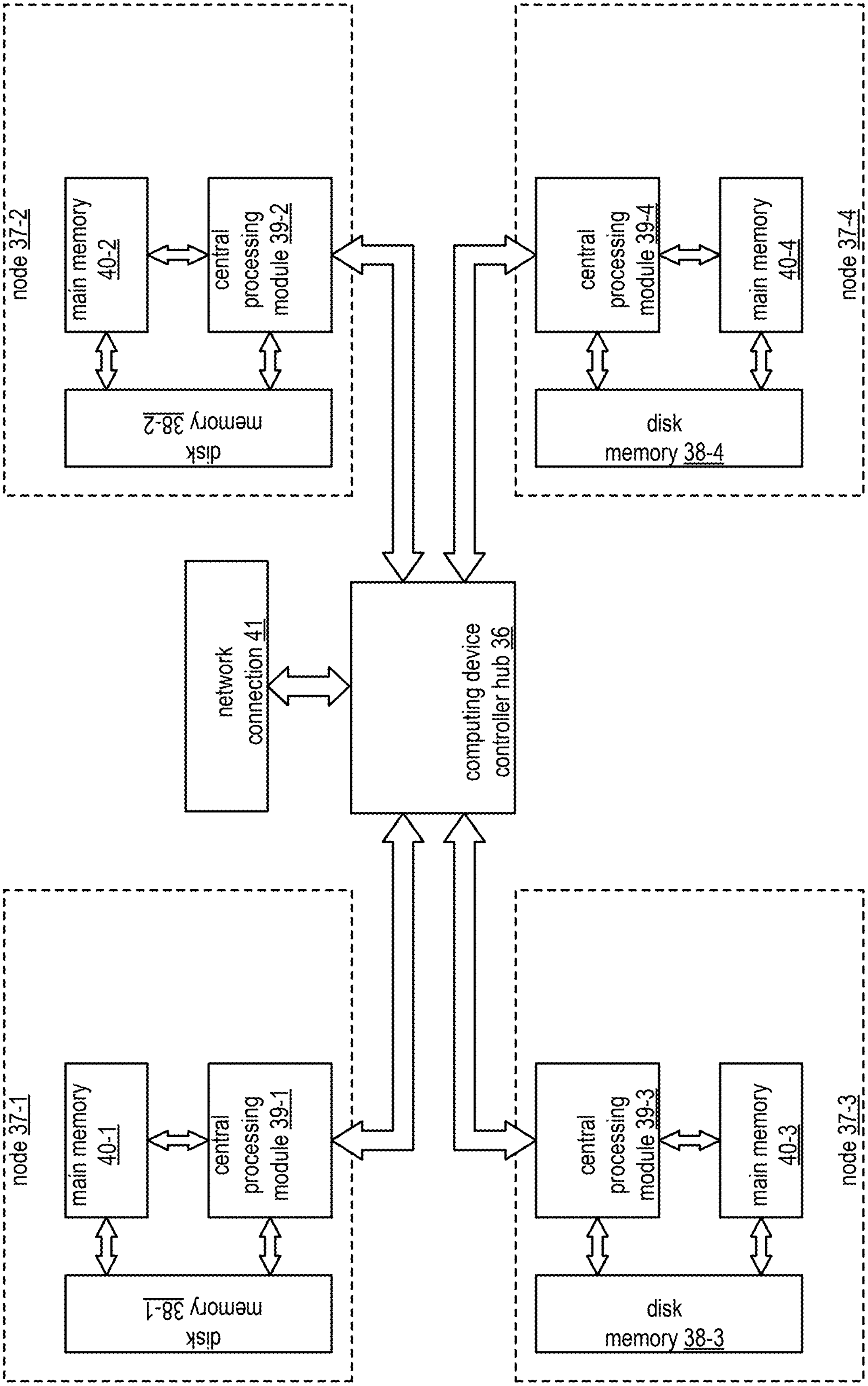
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
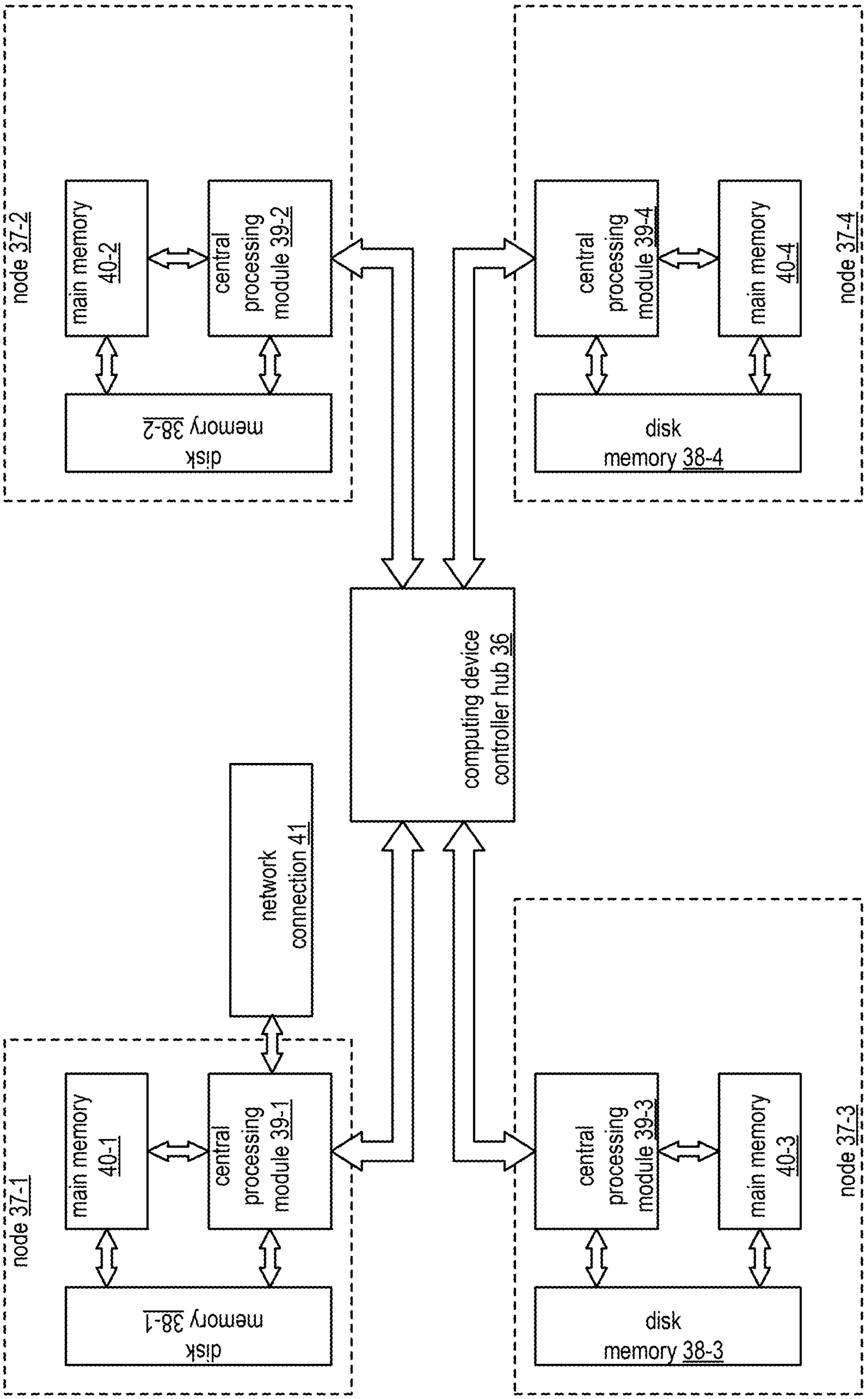
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
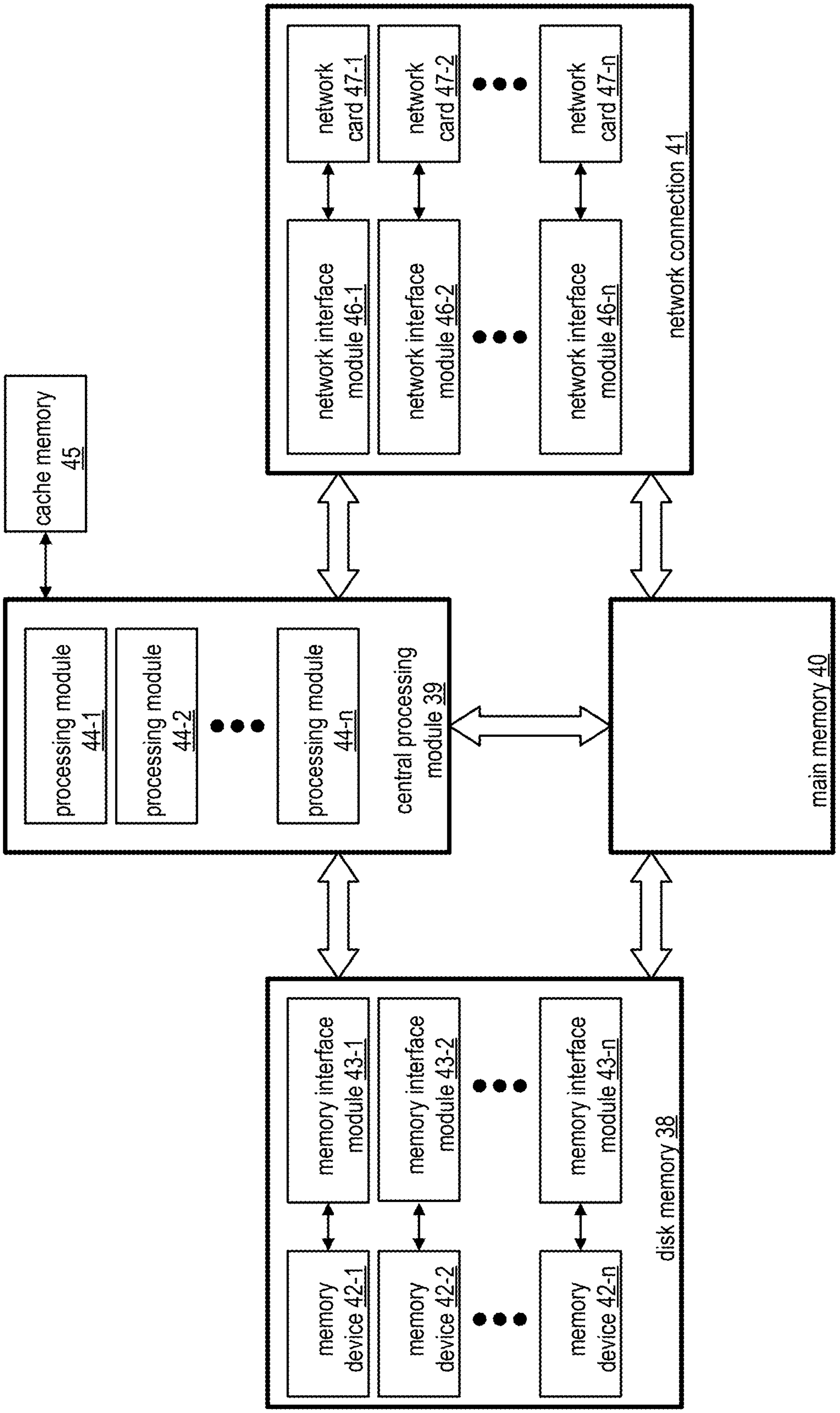
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through **44-*n* and an associated one or more cache memory 45**. A processing module is as defined at the end of the detailed description.

The disk memory 38 includes a plurality of memory interface modules 43-1 through **43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n*** is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through **46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39** or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
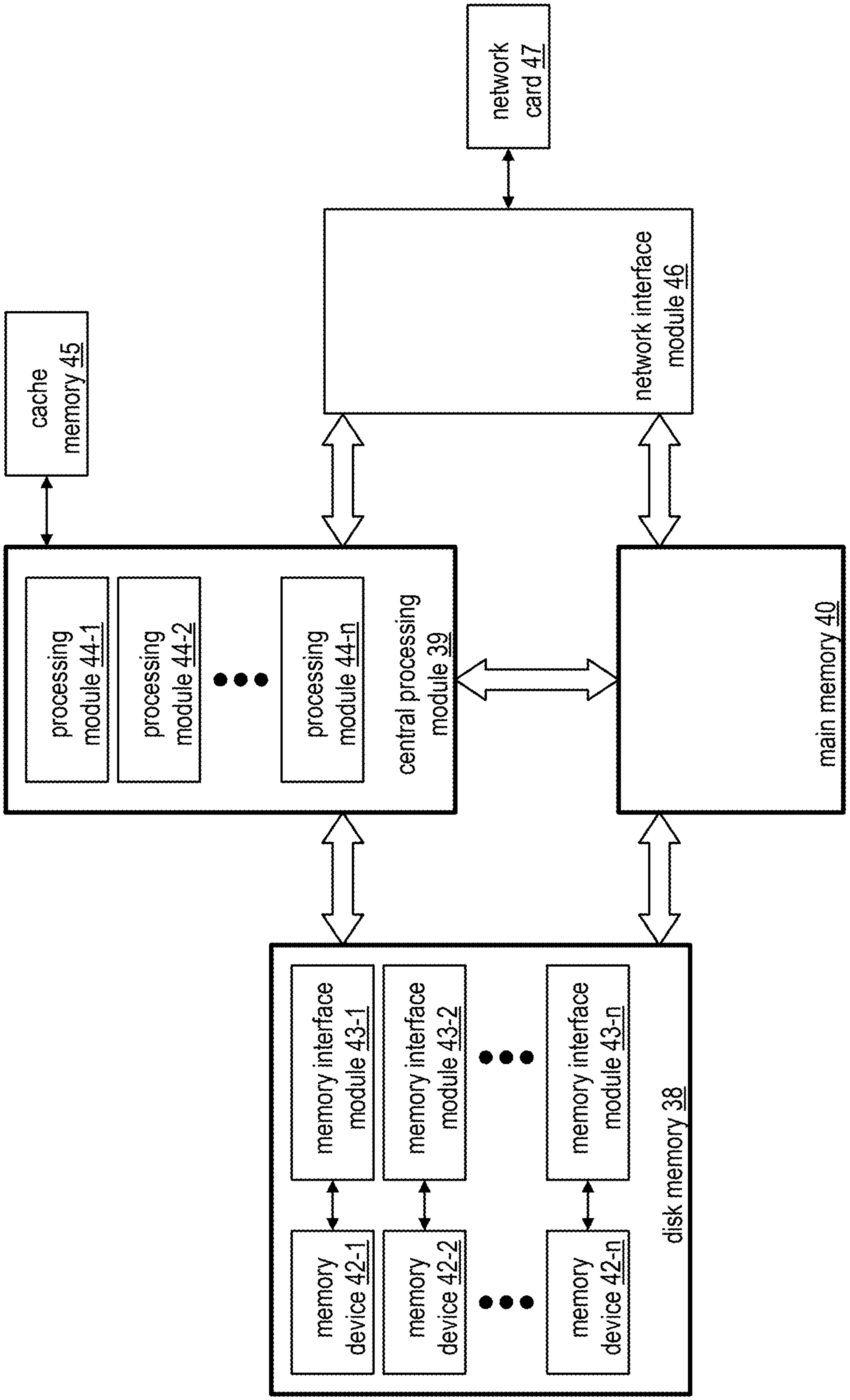
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
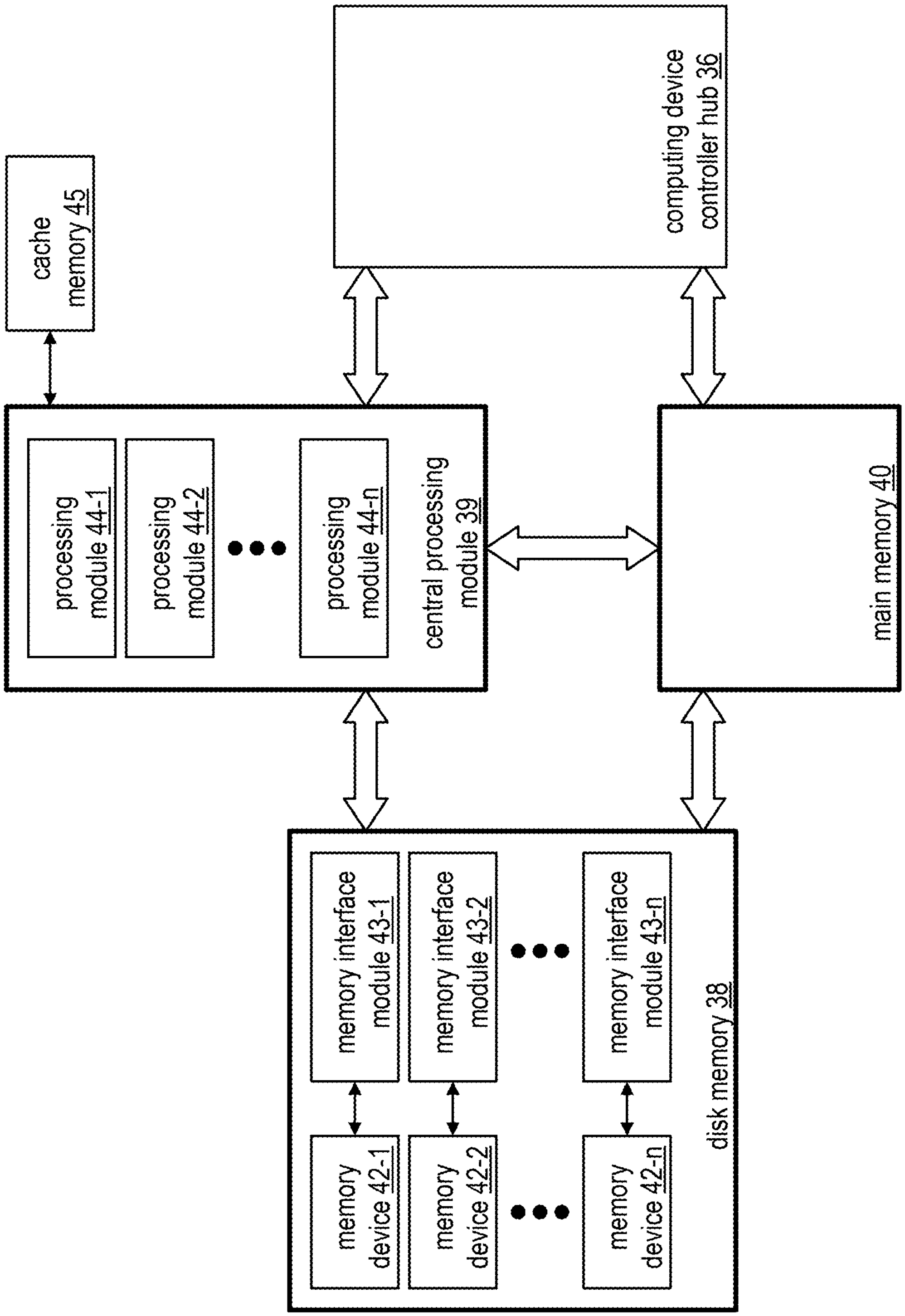
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
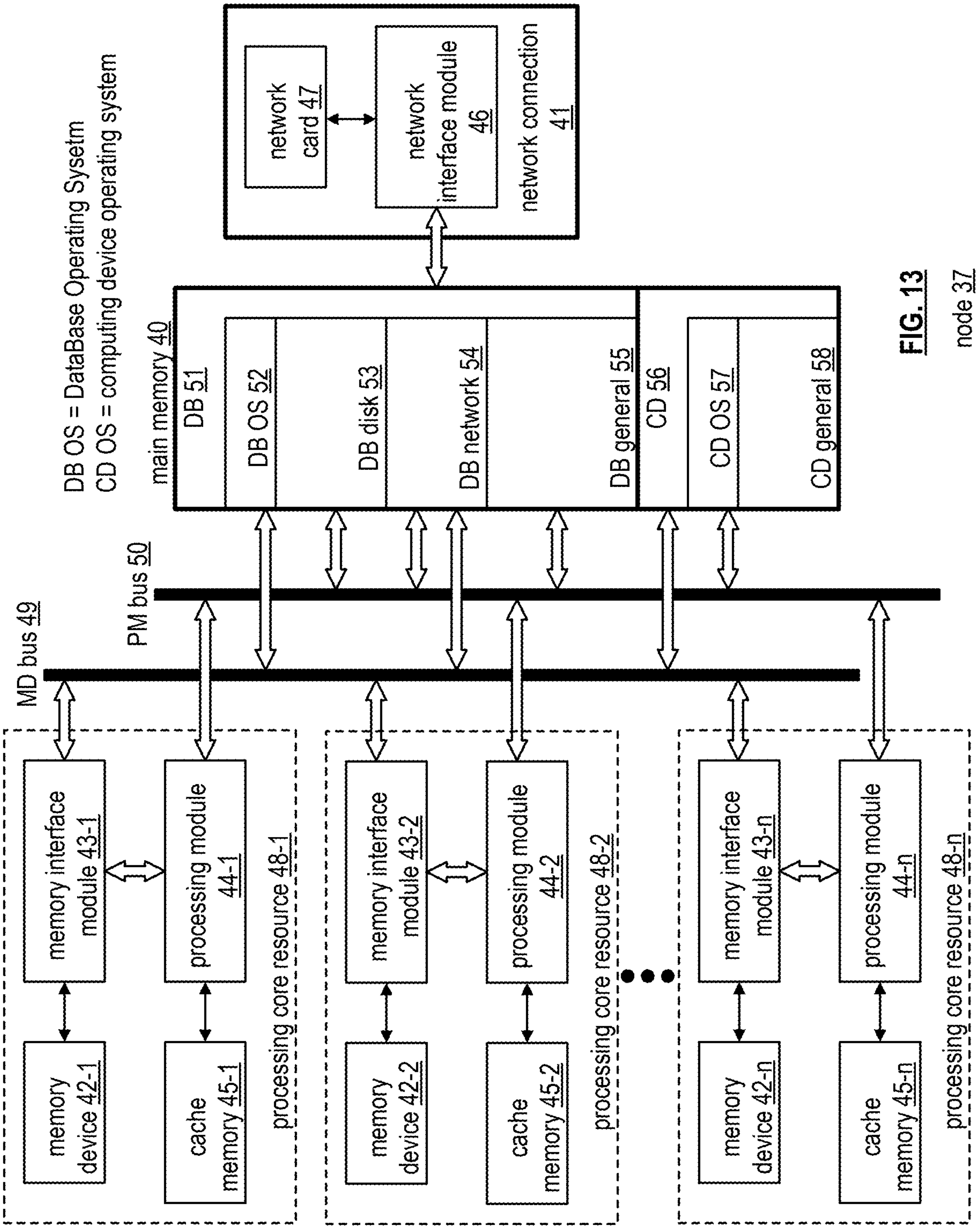
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through **48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n***. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
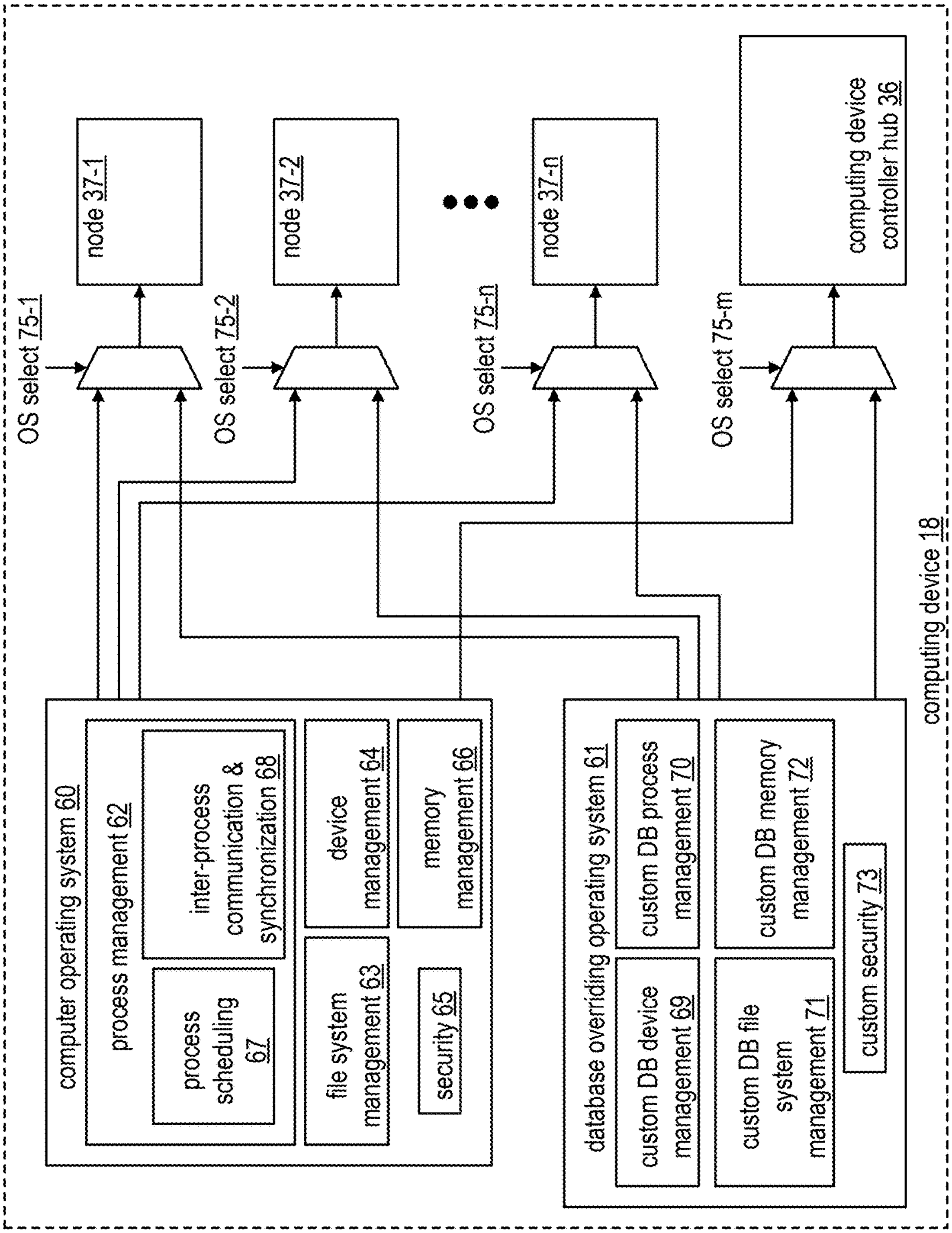
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through **75-*n*** when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
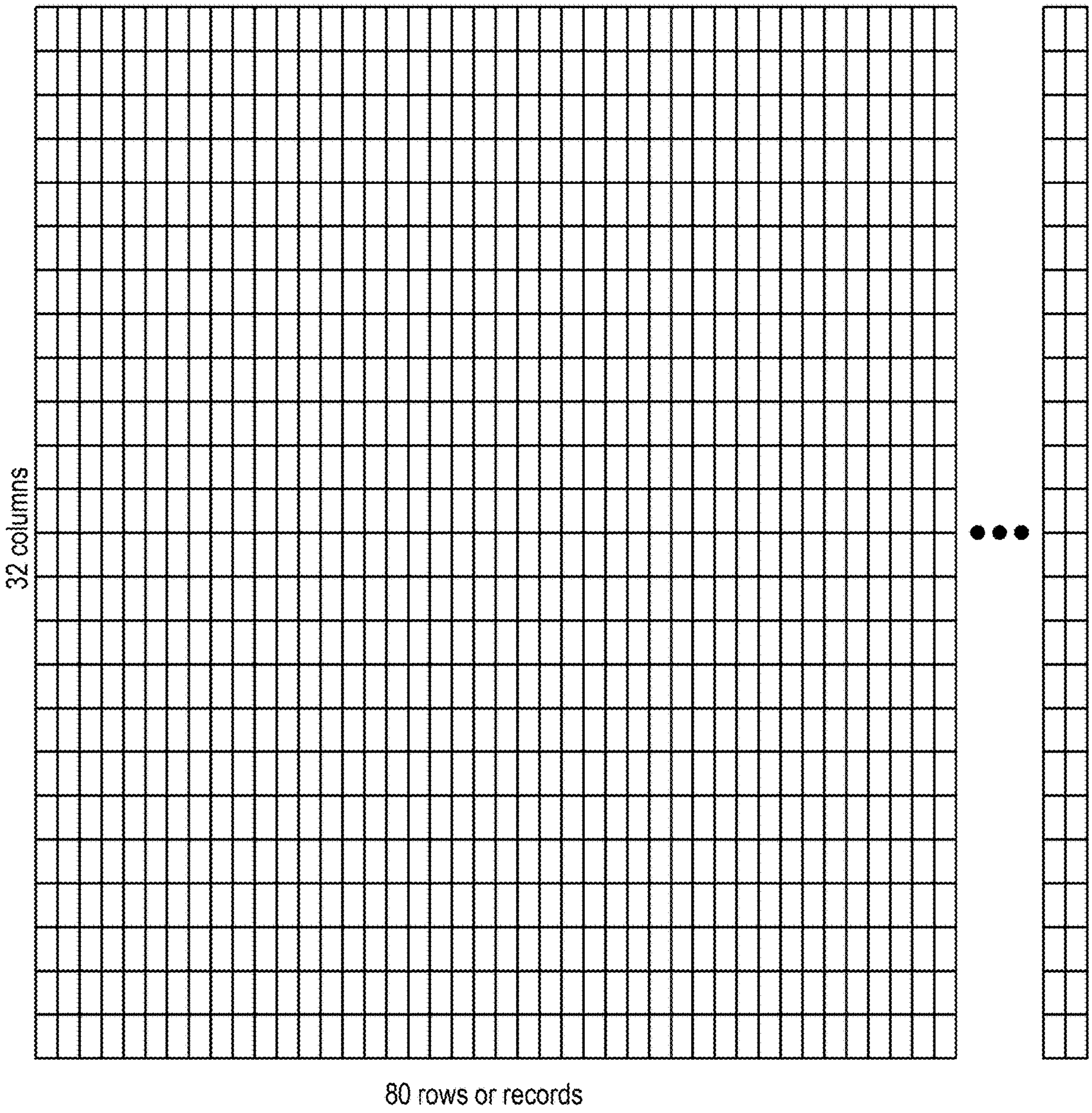
FIGS. 15-23 are schematic block diagrams of an example of processing a table or data set for storage in the database system in accordance with various embodiments.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
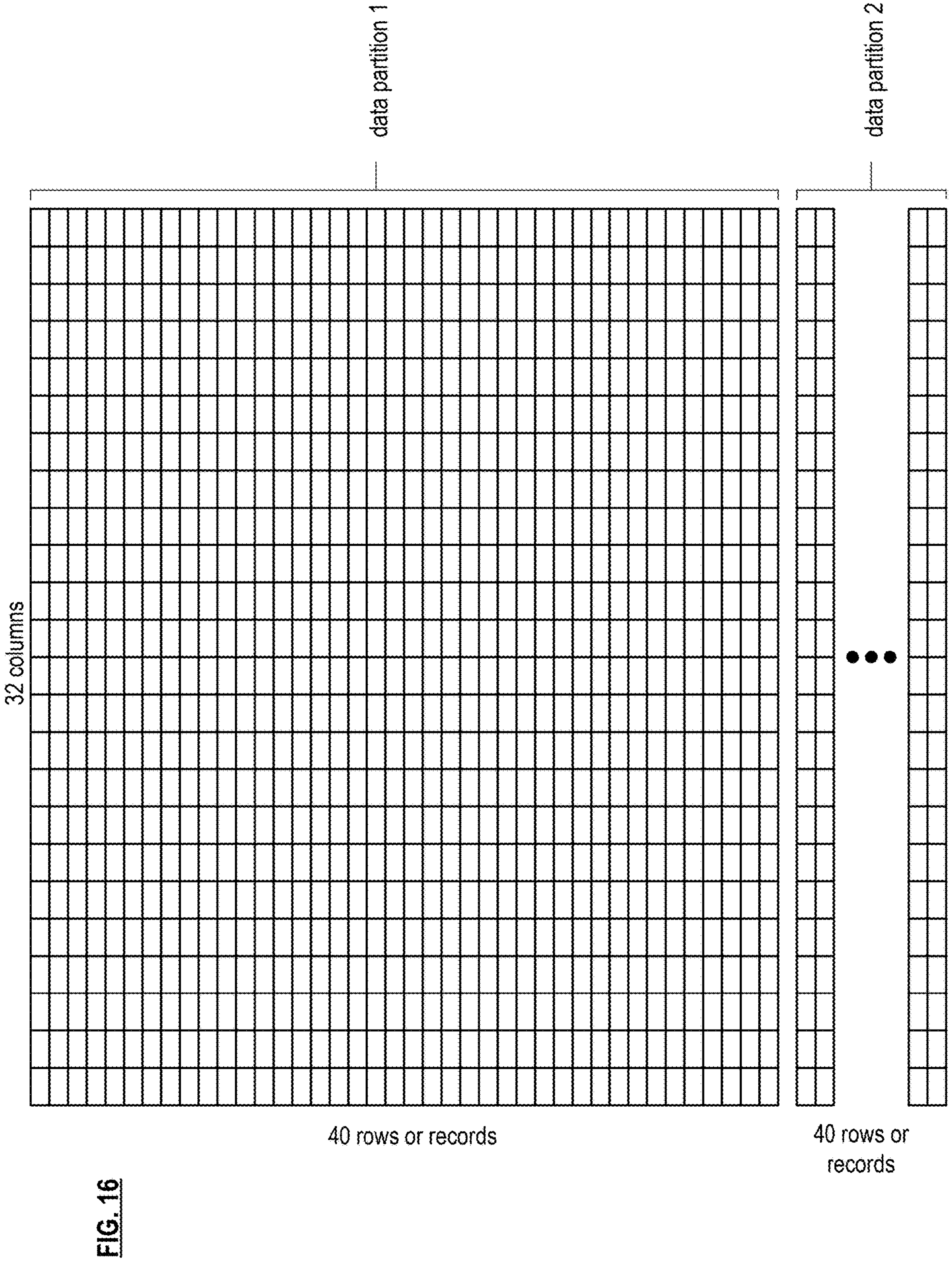

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
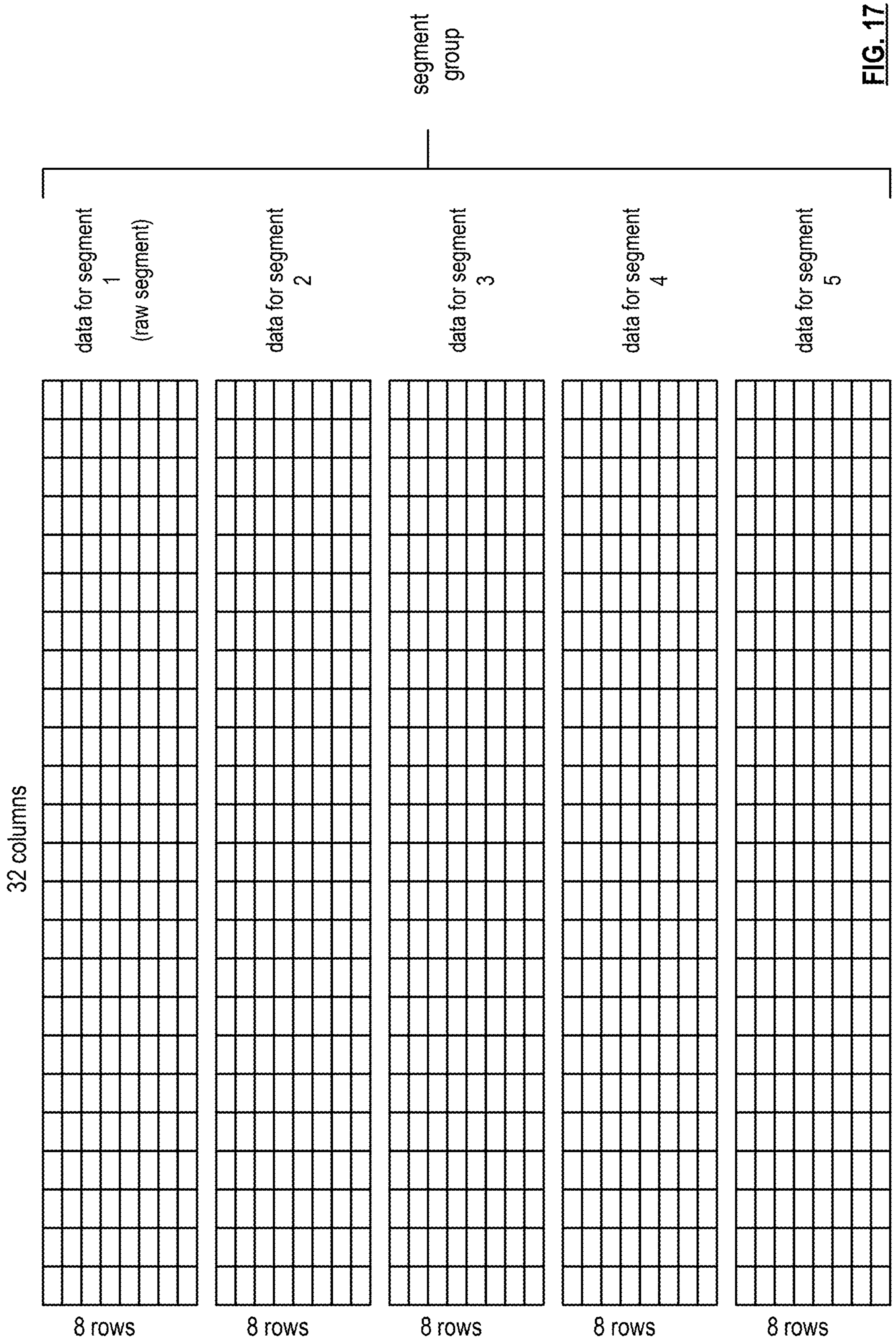

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figure 18:
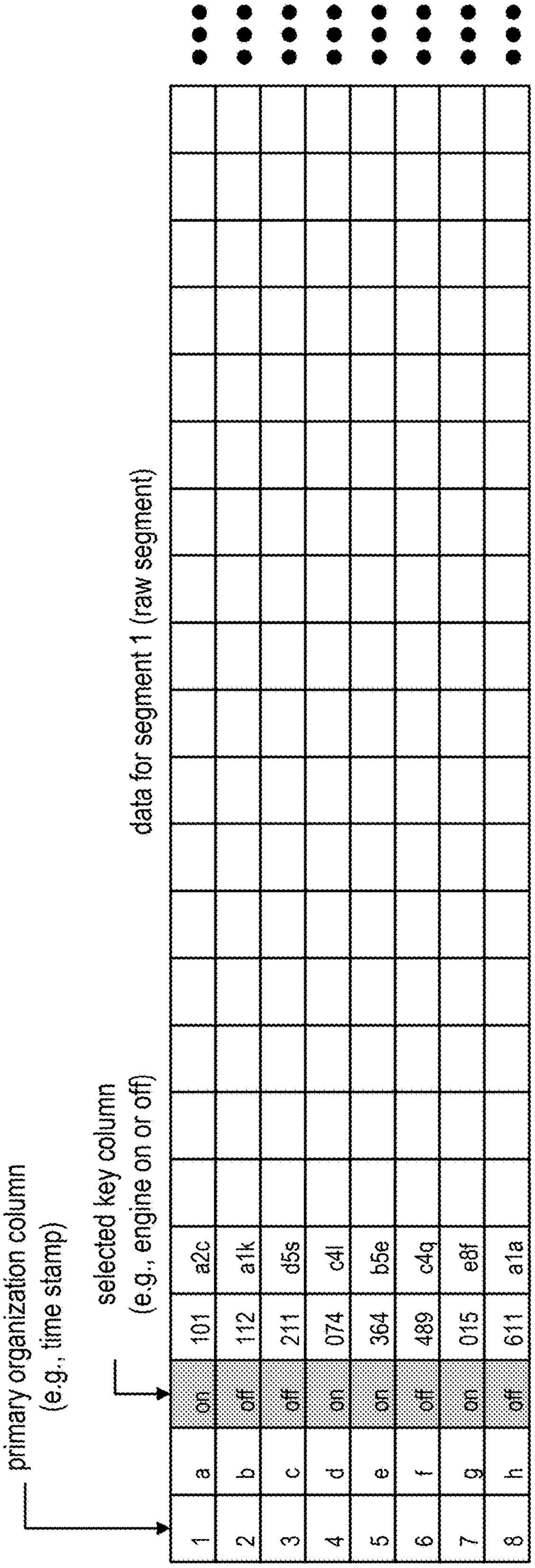

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

Figure 19:
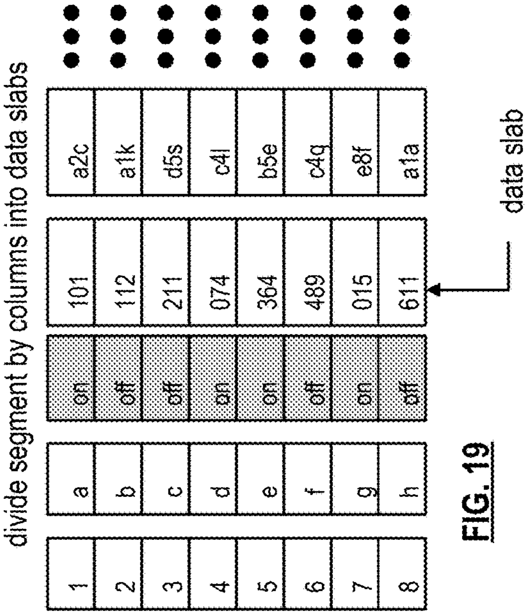

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

Figure 20:
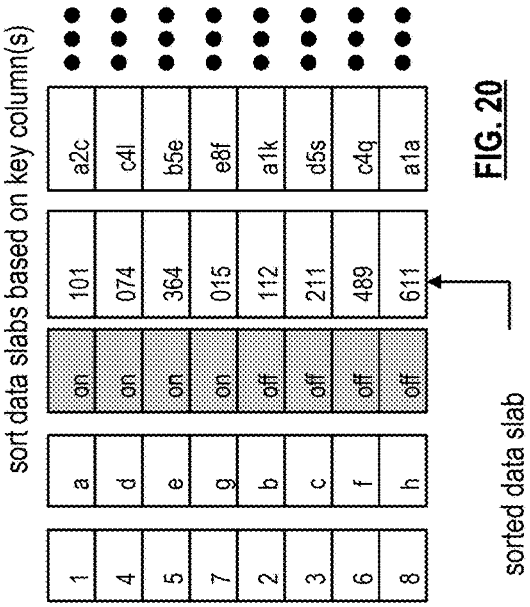

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
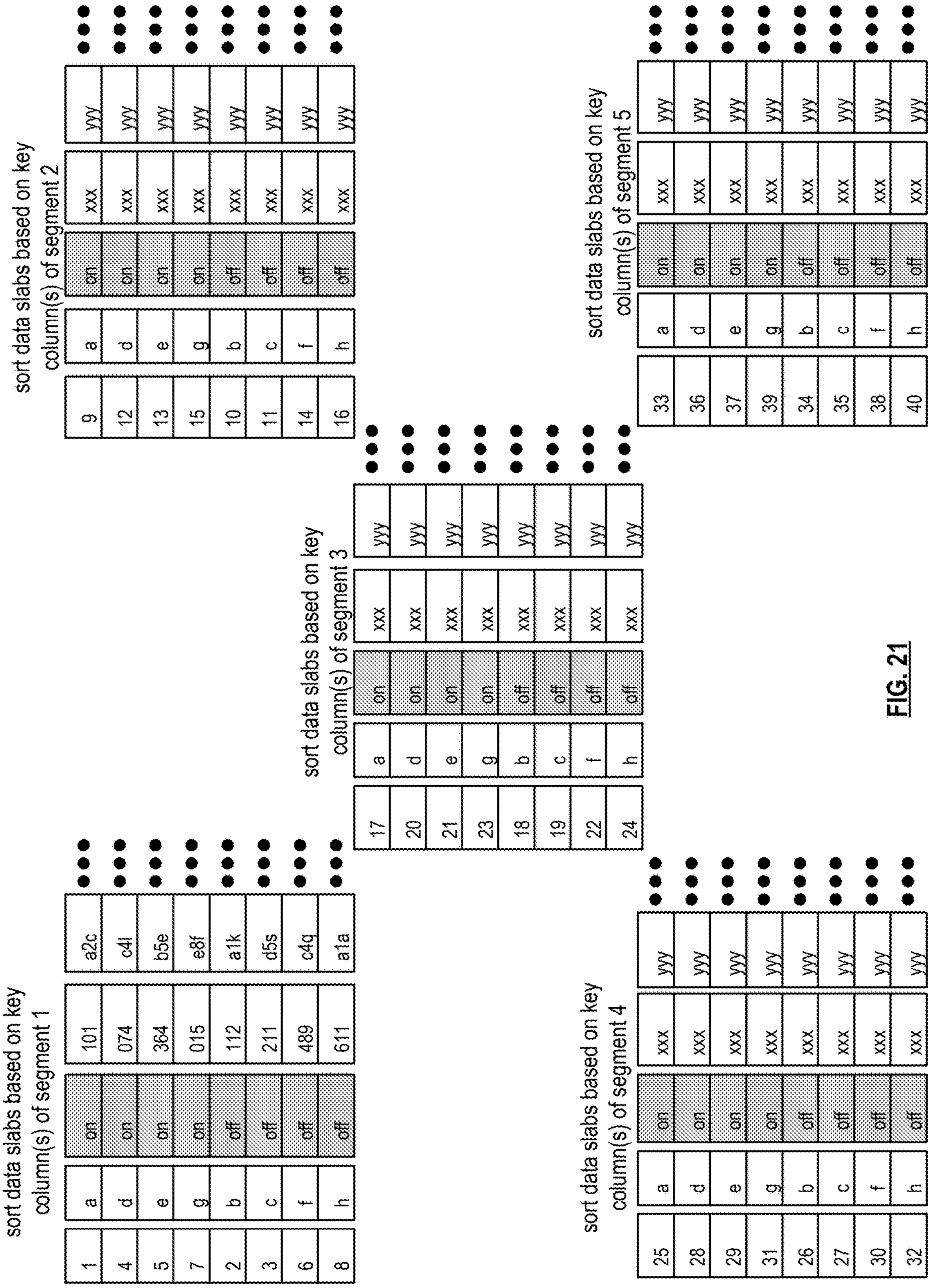

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
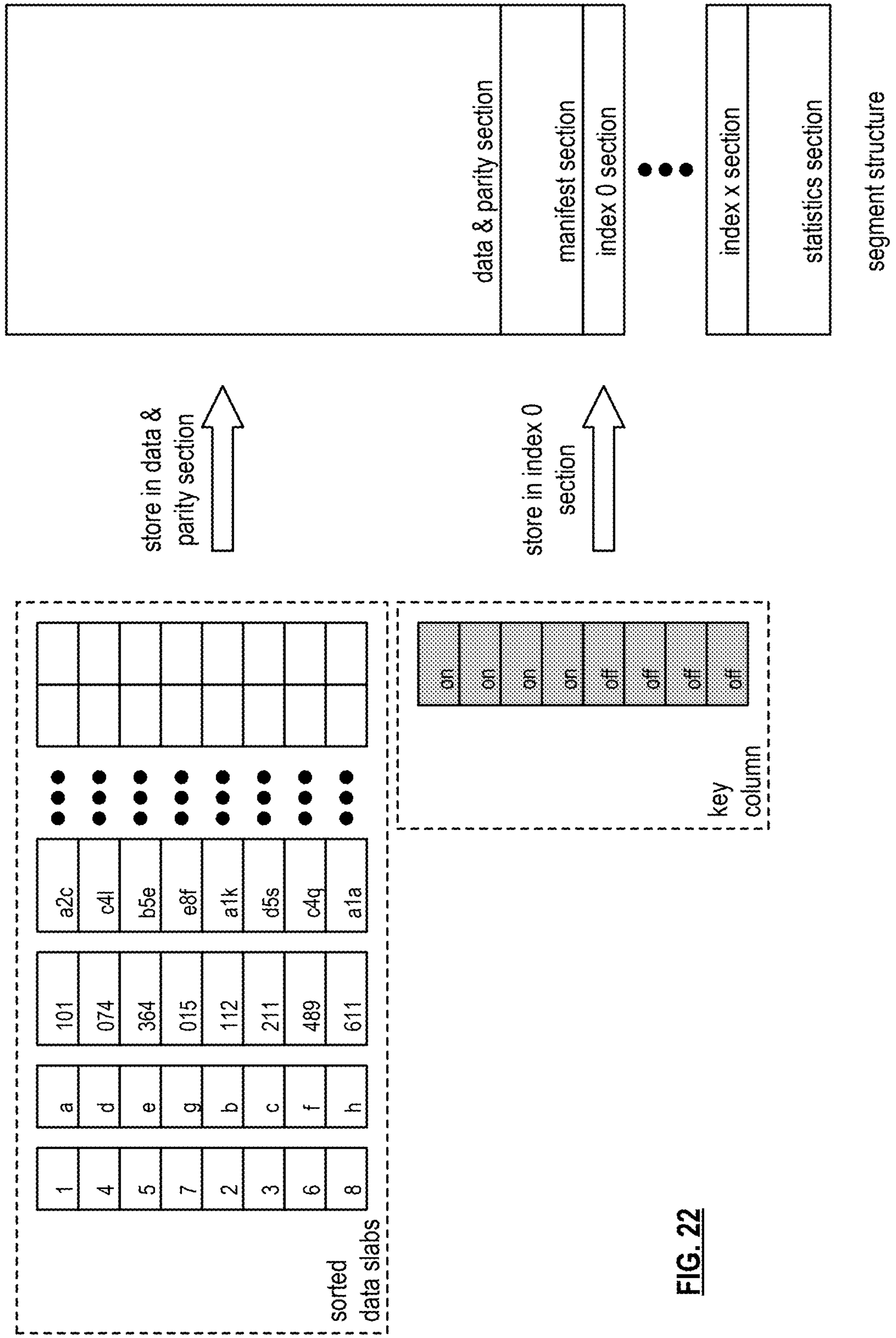

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
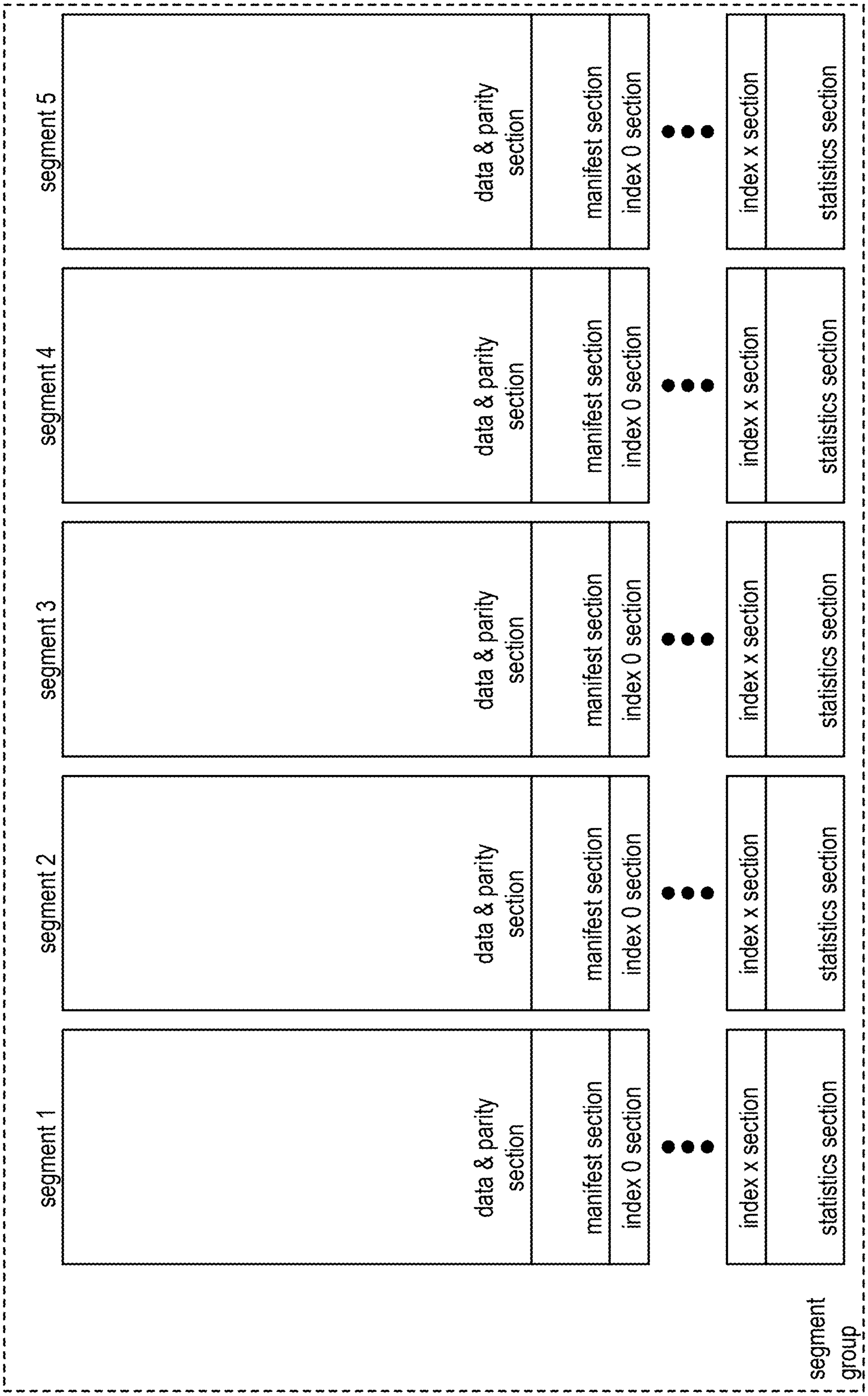

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
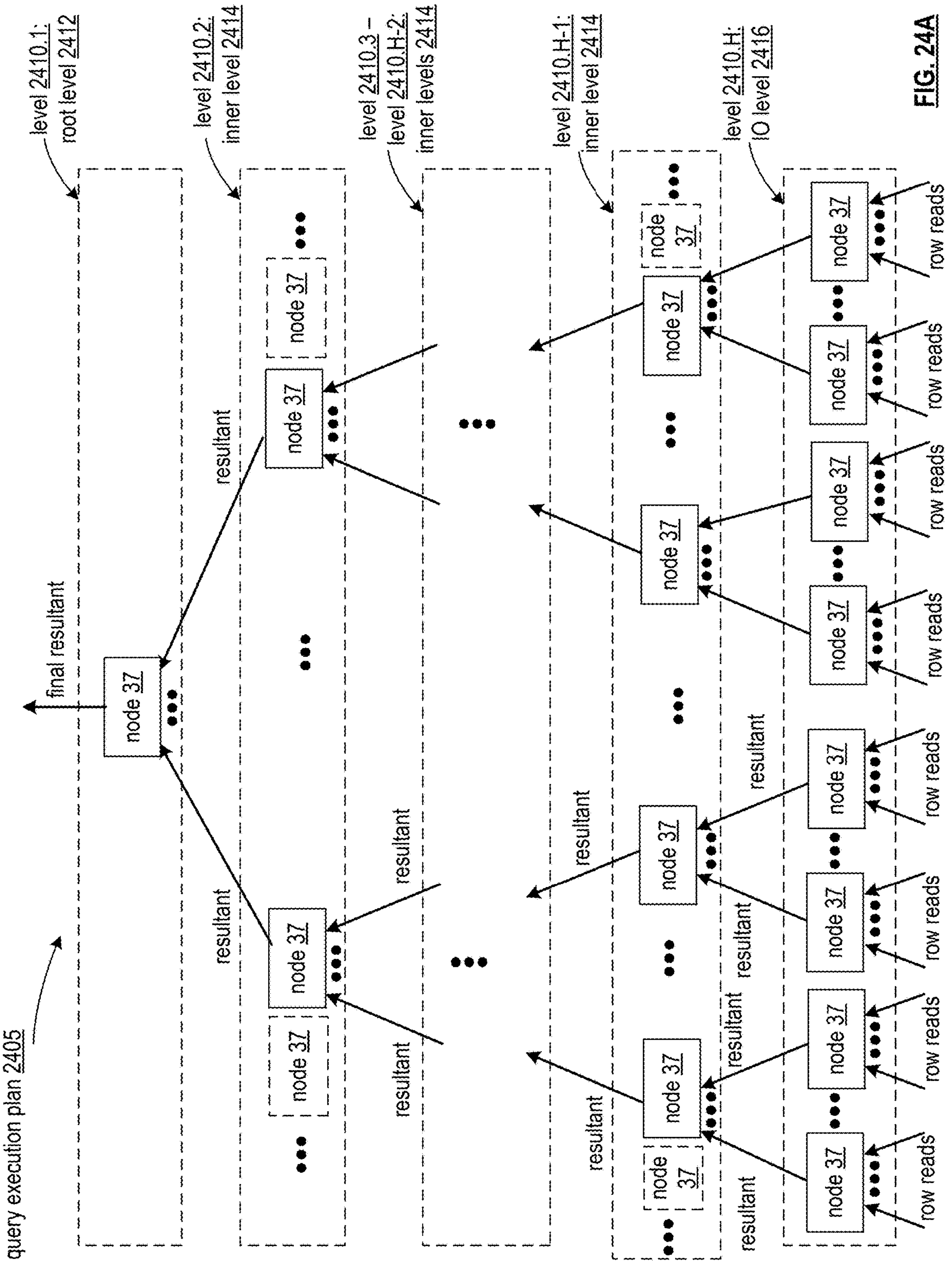
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H−1, and there are no other inner levels 2410.3-2410.H−2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H−1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H−1 includes at least one node from the IO level 2416 in the possible set of nodes. In such cases, while each selected node in level 2410.H−1 is depicted to process resultants sent from other nodes 37 in FIG. 24A, each selected node in level 2410.H−1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 24A based on receiving and storing the system metadata in local memory of the at least one node 37 as configuration data, such as the configuration data discussed in conjunction with FIGS. 27A-27J, and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
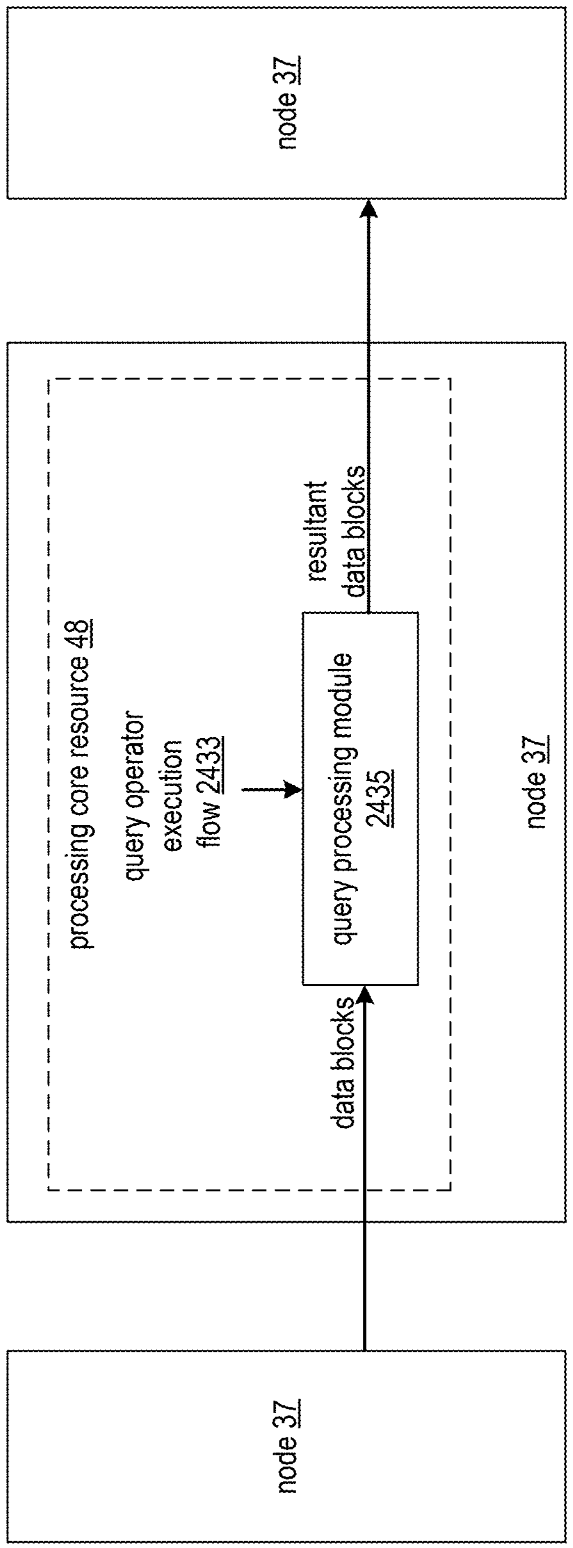
FIGS. 24B-24D are schematic block diagrams of embodiments of anode that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-*n* of a same node 37 can be executing at least one query concurrently via their own query processing module 2435, where a single node 37 implements each of set of operator processing modules 2435-1-2435-*n* via a corresponding one of the set of processing core resources 48-1-48-*n*. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata, such as system metadata discussed in conjunction with FIGS. 27A-27J, applied across a plurality of nodes 37 that includes the given node, for example, where the given node 37 participates in some or all features and/or functionality of FIG. 24B based on receiving and storing the system metadata in local memory of given node 37 as configuration data, such as the configuration data discussed in conjunction with FIGS. 27A-27J, and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
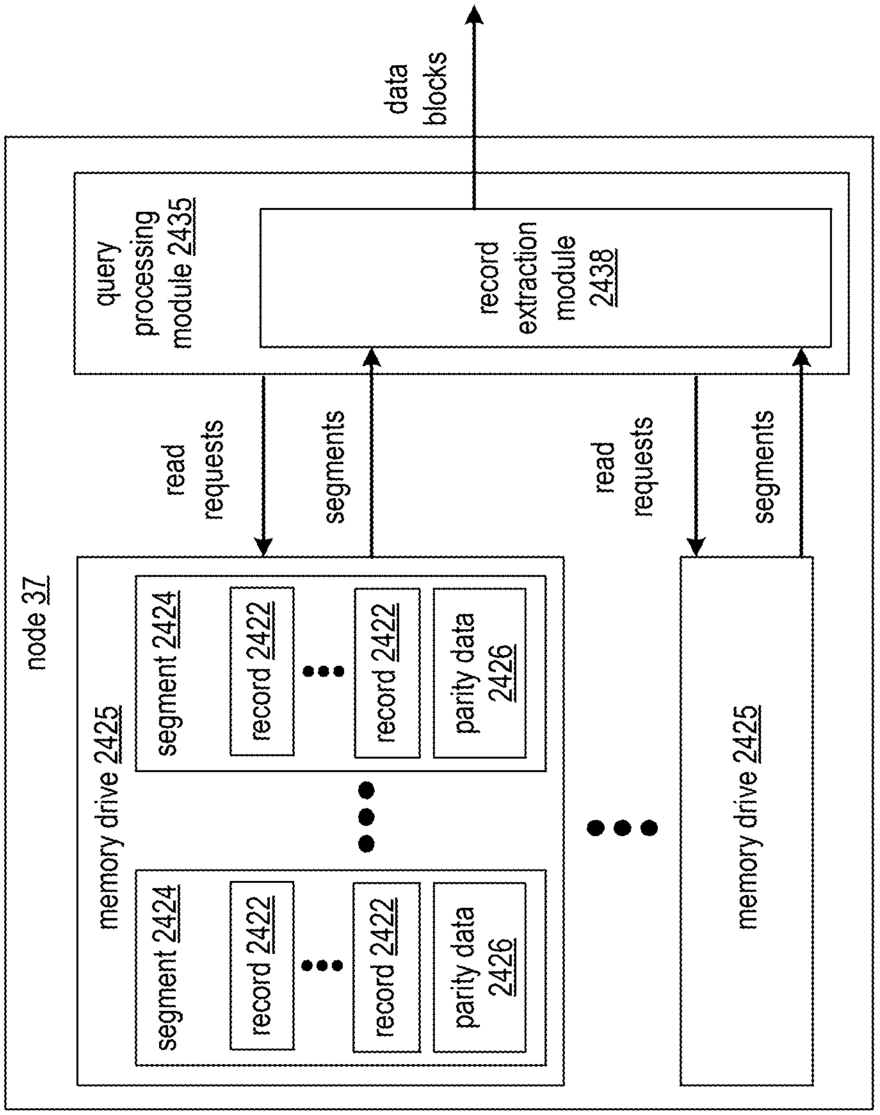

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-*n* of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata, such as system metadata discussed in conjunction with FIGS. 27A-27J, applied across a plurality of nodes 37 that includes the given node, for example, where the given node 37 participates in some or all features and/or functionality of FIG. 24C based on receiving and storing the system metadata in local memory of given node 37 as configuration data, such as the configuration data discussed in conjunction with FIGS. 27A-27J, and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
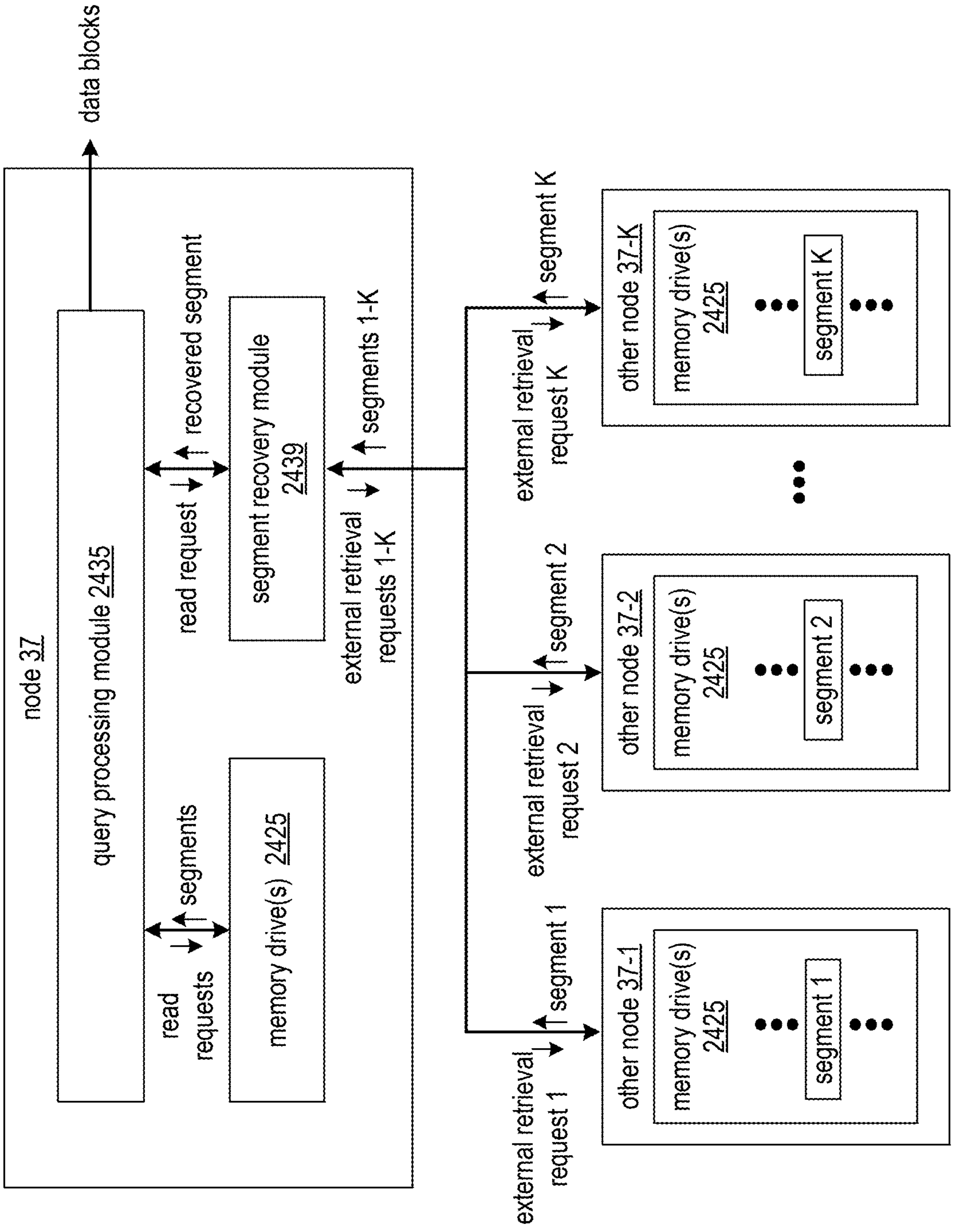

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata, such as system metadata discussed in conjunction with FIGS. 27A-27J, applied across a plurality of nodes 37 that includes the given node, for example, where the given node 37 participates in some or all features and/or functionality of FIG. 24D based on receiving and storing the system metadata in local memory of given node 37 as configuration data, such as the configuration data discussed in conjunction with FIGS. 27A-27J, and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24E:
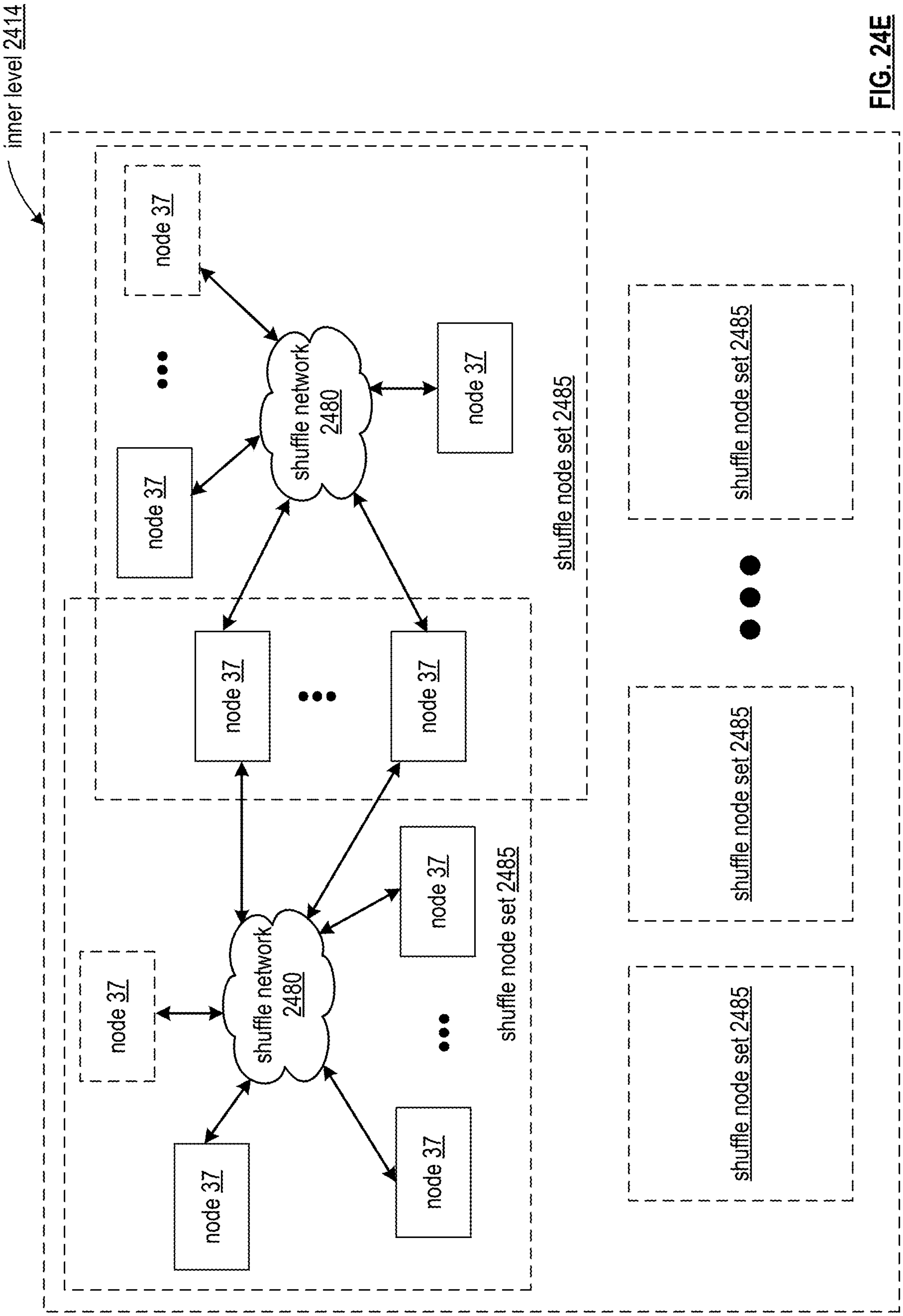
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 24E based on receiving and storing the system metadata in local memory of the at least one node 37 as configuration data, such as the configuration data discussed in conjunction with FIGS. 27A-27J, and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
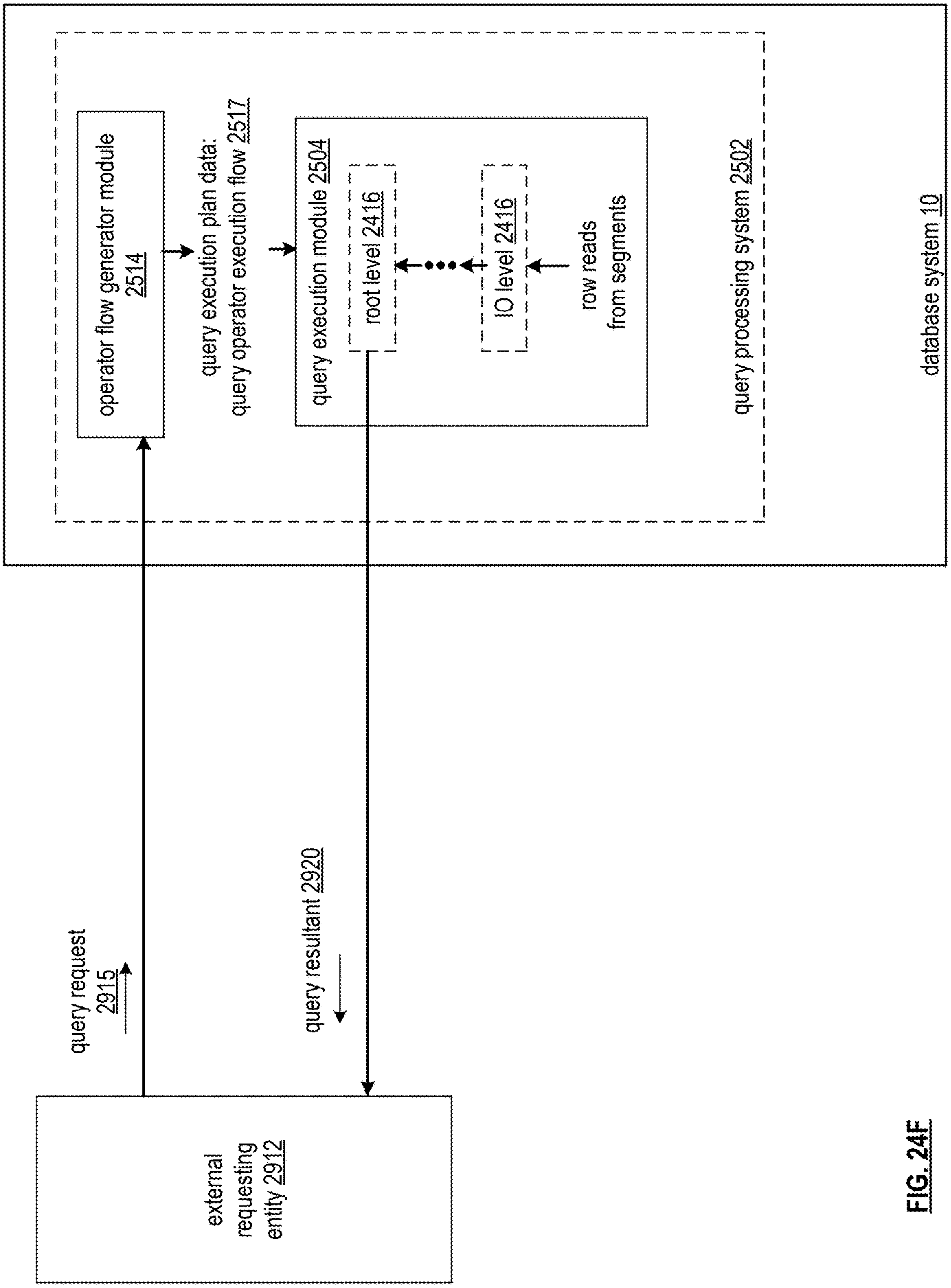
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2915. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2915 for execution via the database system 10, where the corresponding query resultant 2920 is transmitted back to the computing device, for example, for storage by the computing device and/or for display to the corresponding user via a display device.

Some or all features and/or functionality of FIG. 24F can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 24F based on receiving and storing the system metadata in local memory of the at least one node 37 as configuration data, such as the configuration data discussed in conjunction with FIGS. 27A-27J, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
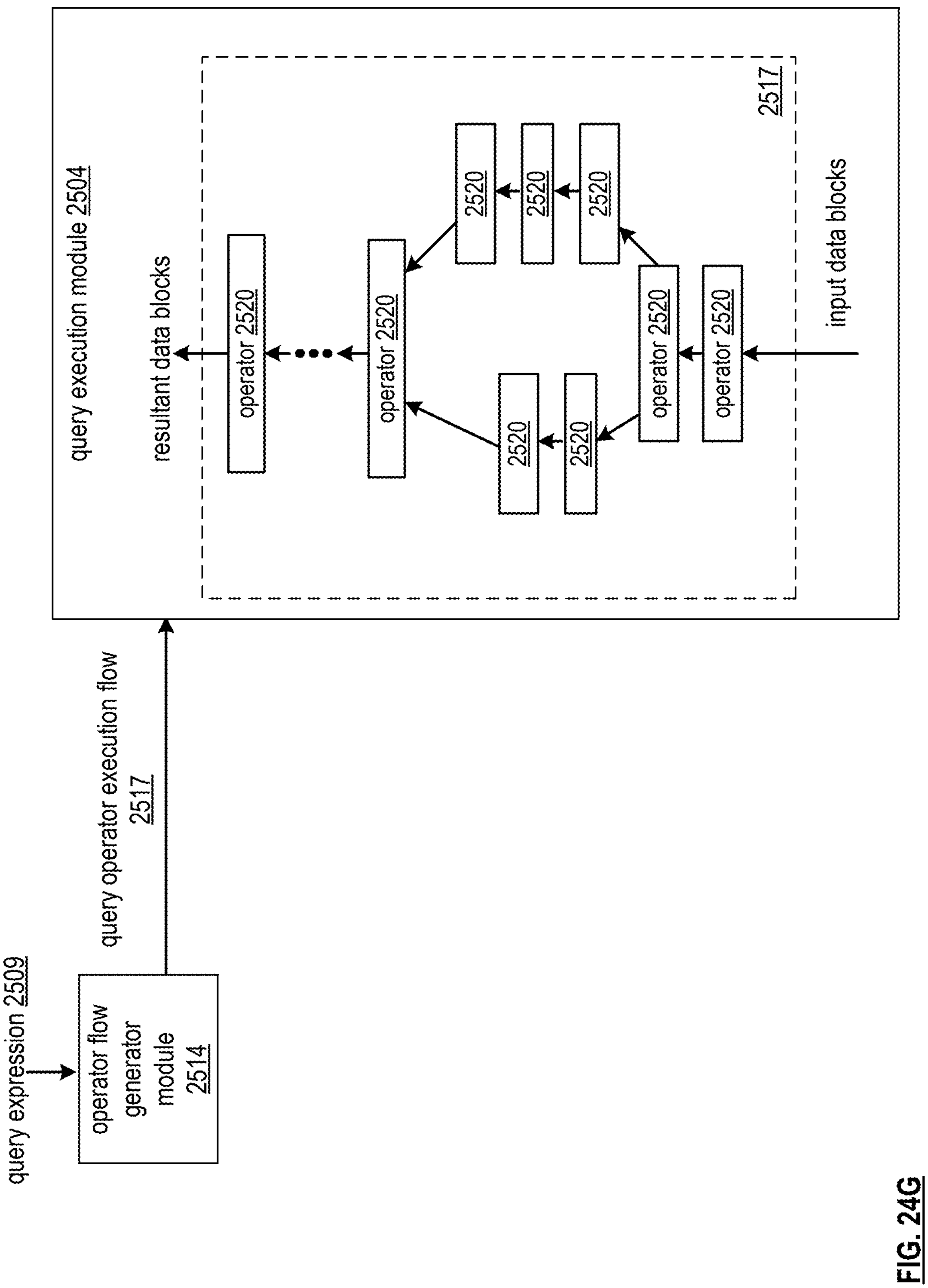
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 24G based on receiving and storing the system metadata in local memory of the at least one node 37 as configuration data, such as the configuration data discussed in conjunction with FIGS. 27A-27J, and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24H:
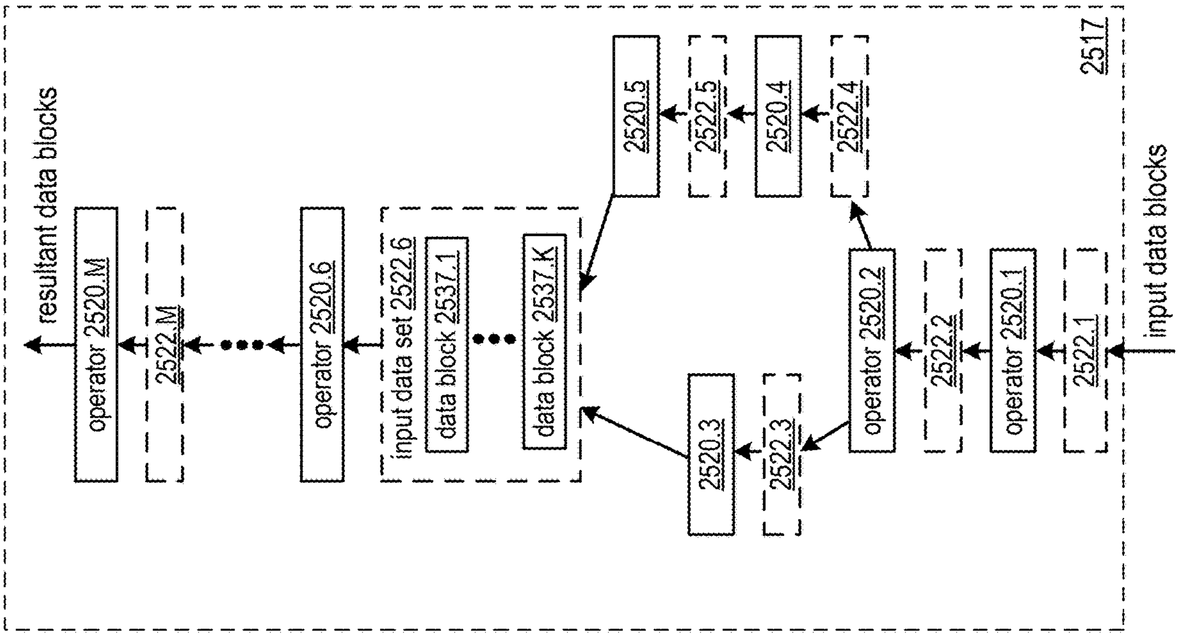
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.*i* this common query operator execution flow 2433 can be sent to the one or more other nodes 37 in a same shuffle node set as input data blocks to be added to the input data set 2522 the next operator 2520.*i*+1, with respect to the serialized ordering of the query of this common query operator execution flow 2433 of the one or more other nodes 37. For example, the output generated via a node's execution of a particular operator 2520.*i* is added input data set 2522 the next operator 2520.*i*+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in a same shuffle node set based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

Some or all features and/or functionality of FIG. 24H can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 24H based on receiving and storing the system metadata in local memory of the at least one node 37 as configuration data, such as the configuration data discussed in conjunction with FIGS. 27A-27J, and/or based on further accessing and/or executing this configuration data execute some or all operators of a query operator flow 2517 as part of its database functionality accordingly. Performance of some or all features and/or functionality of FIG. 24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
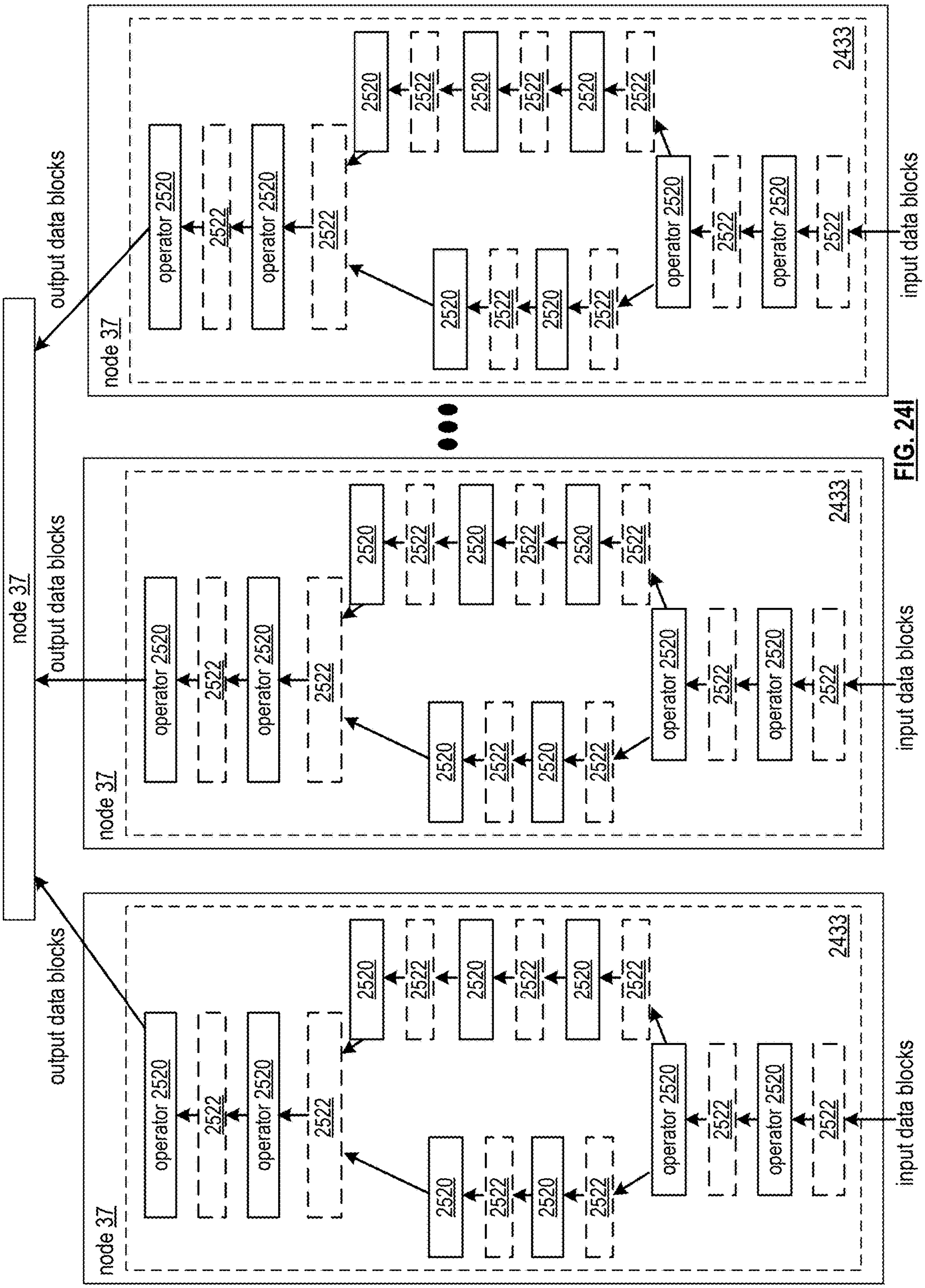
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 24I based on receiving and storing the system metadata in local memory of the at least one node 37 as configuration data, such as the configuration data discussed in conjunction with FIGS. 27A-27J, and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
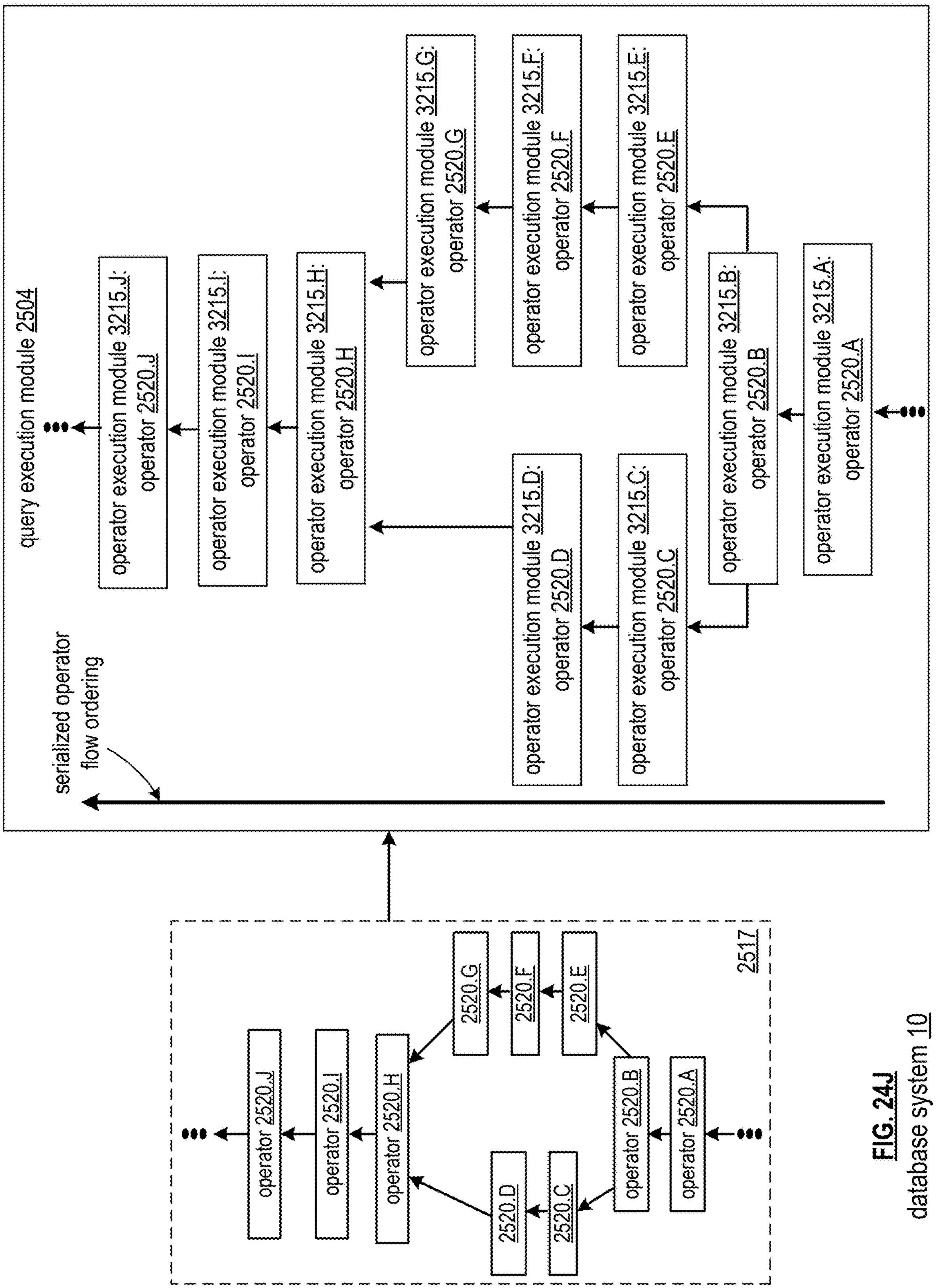
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
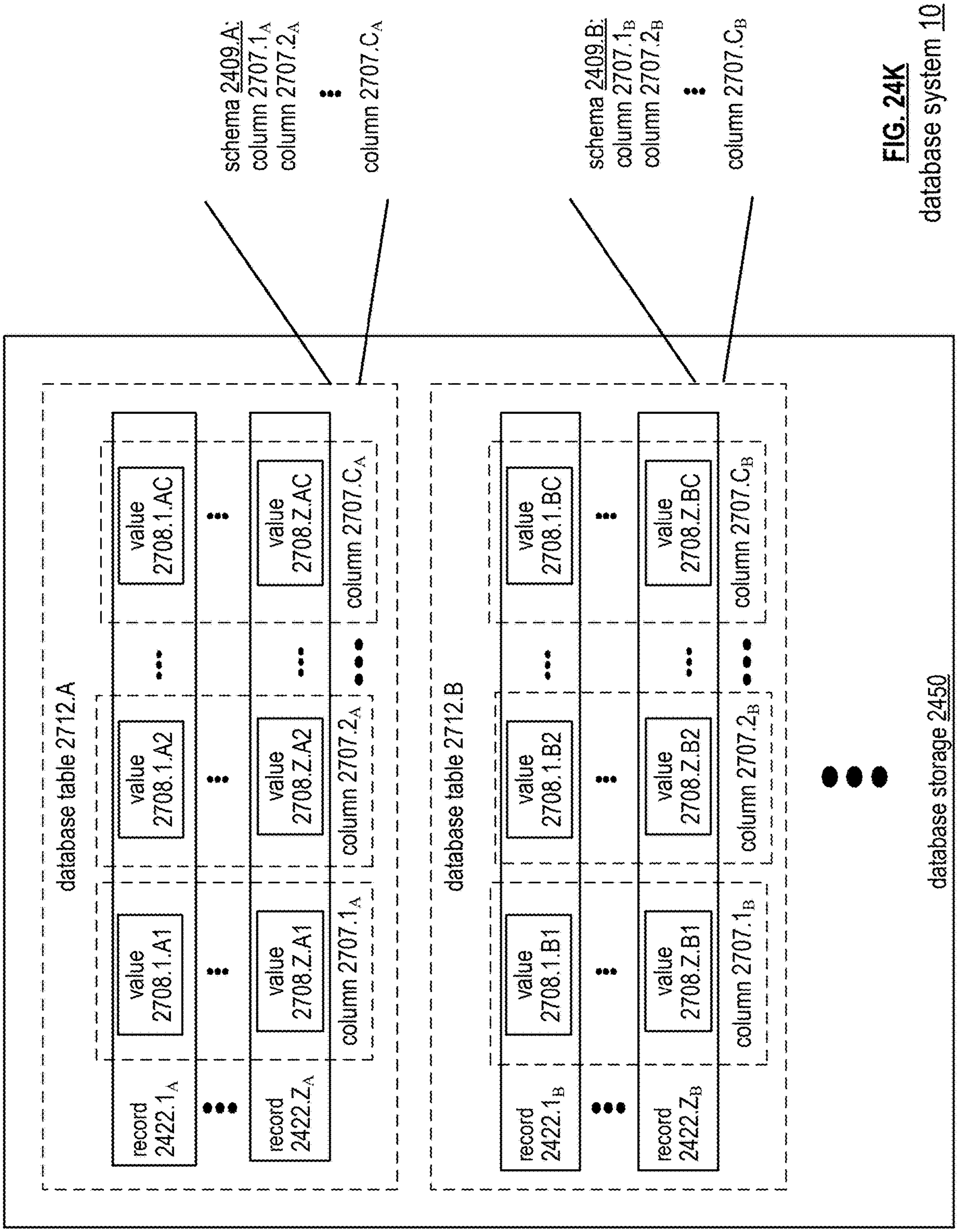
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.1_A$-$2707.C_A$ of schema 2709.A for database table 2712.A can have a different number of columns than and/or can have different datatypes for some or all columns of the set of columns $2707.1_B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
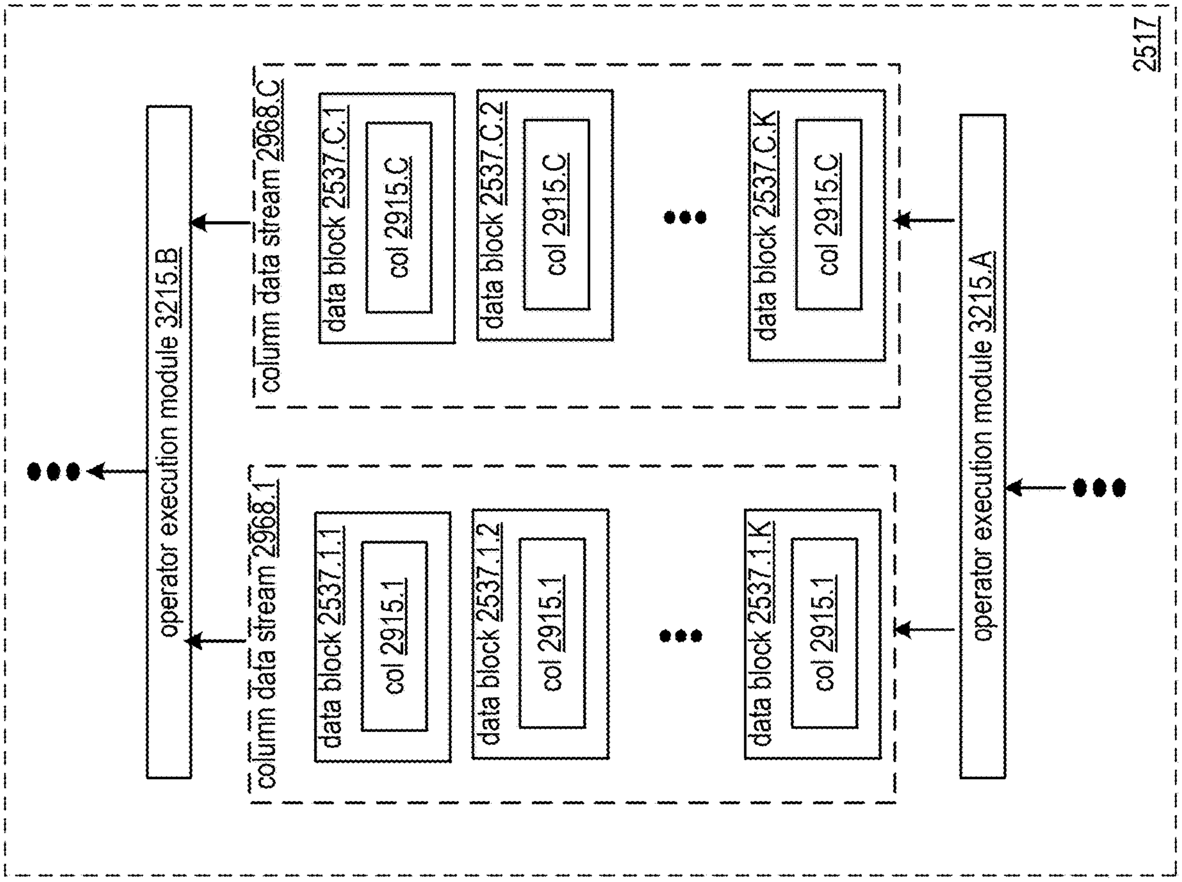
FIG. 24L is a schematic block diagram of a query execution module that implements a plurality of column data streams in accordance with various embodiments.
Figure 24M:
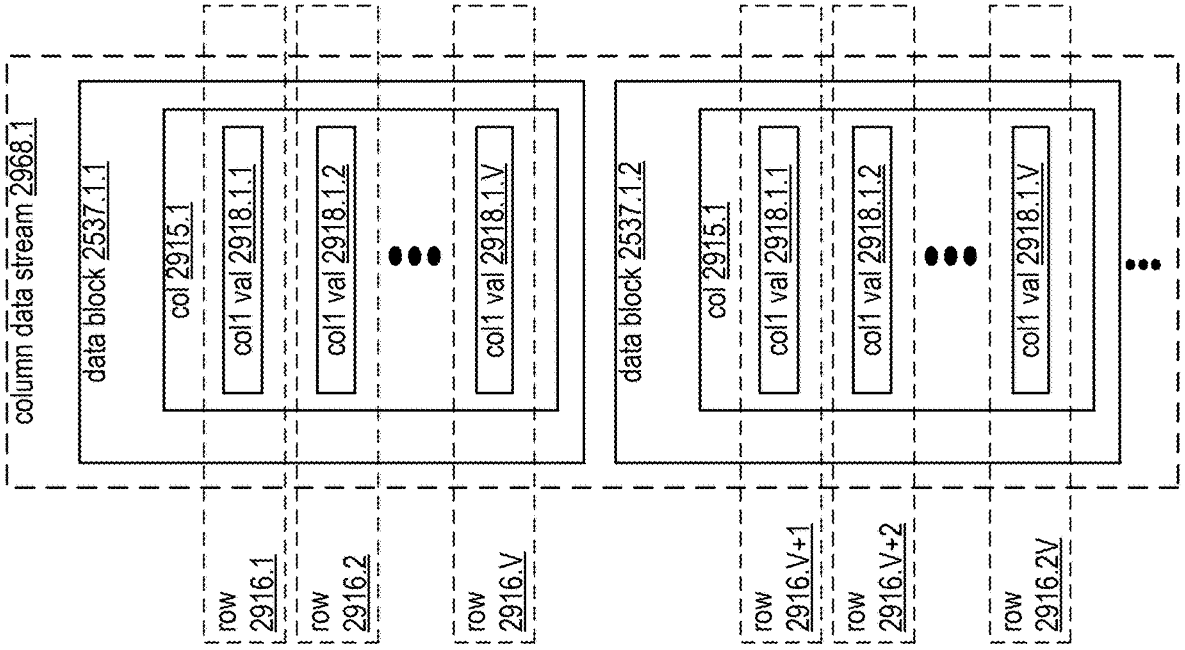
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24N:
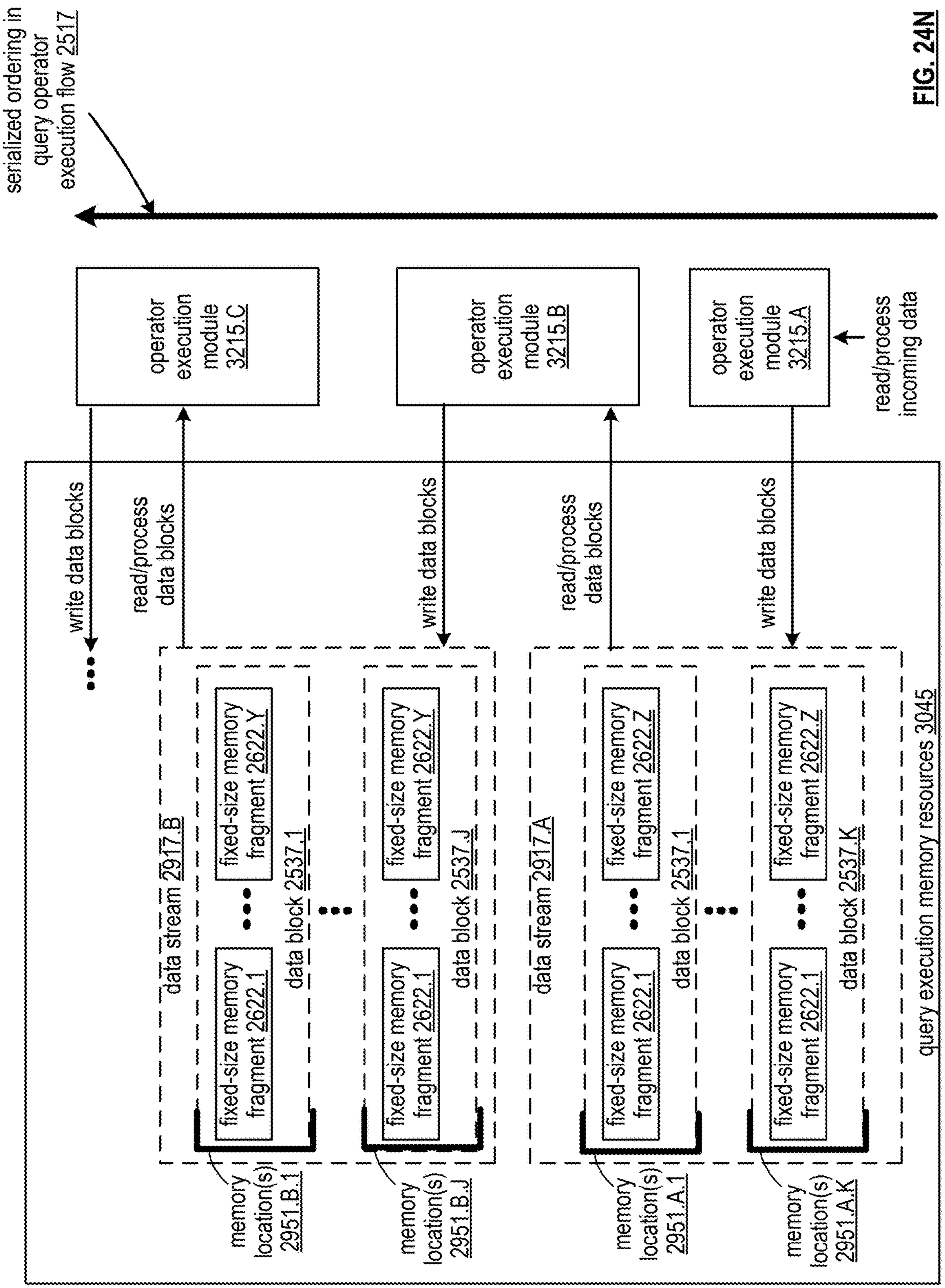
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Figure 24O:
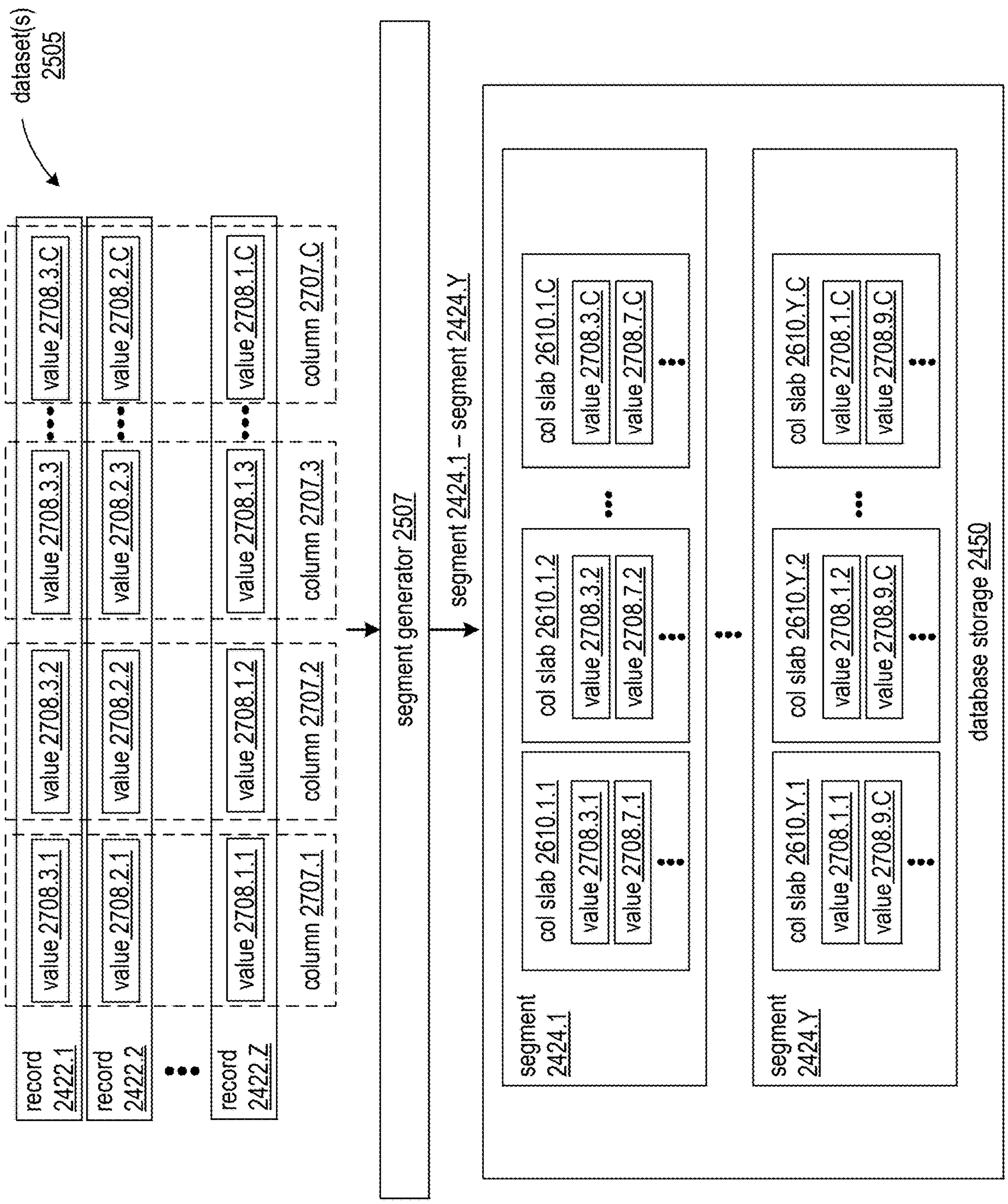
FIG. 24O is a schematic block diagram of a database system that implements a segment generator that generates segments from a plurality of records in accordance with various embodiments.

FIG. 24O illustrates an embodiment of a database system 10 that implements a segment generator 2507 to generate segments 2424. Some or all features and/or functionality of the database system 10 of FIG. 24O can implement any embodiment of the database system 10 described herein. Some or all features and/or functionality of segments 2424 of FIG. 24O can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

Figure 24P:
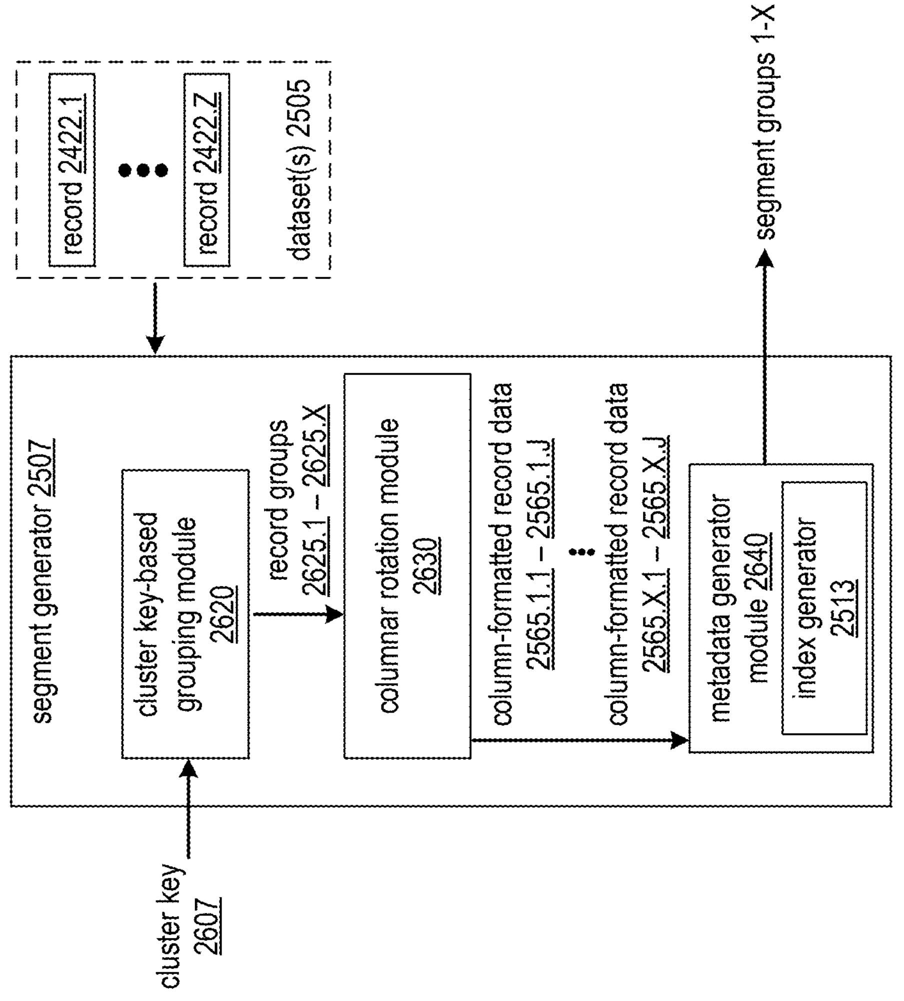
FIG. 24P is a schematic block diagram of a segment generator that implements a cluster key-based grouping module, a columnar rotation module, and a metadata generator module in accordance with various embodiments.

FIG. 24P illustrates an example embodiment of a segment generator 2507 of database system 10. Some or all features and/or functionality of the database system 10 of FIG. 24P can implement any embodiment of the database system 10 described herein. Some or all features and/or functionality of the segment generator 2507 of FIG. 24P can implement the segment generator 2507 of FIG. 24O and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator 2517 as disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility Patent Application for all purposes; and/or U.S. Utility application Ser. No. 16/985,930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility Patent Application for all purposes. For example, the database system 10 implements some or all features and/or functionality of record processing and storage system 2505 of U.S. Utility application Ser. No. 16/985,723, U.S. Utility application Ser. No. 16/985,957, and/or U.S. Utility application Ser. No. 16/985,930.

Figure 24Q:
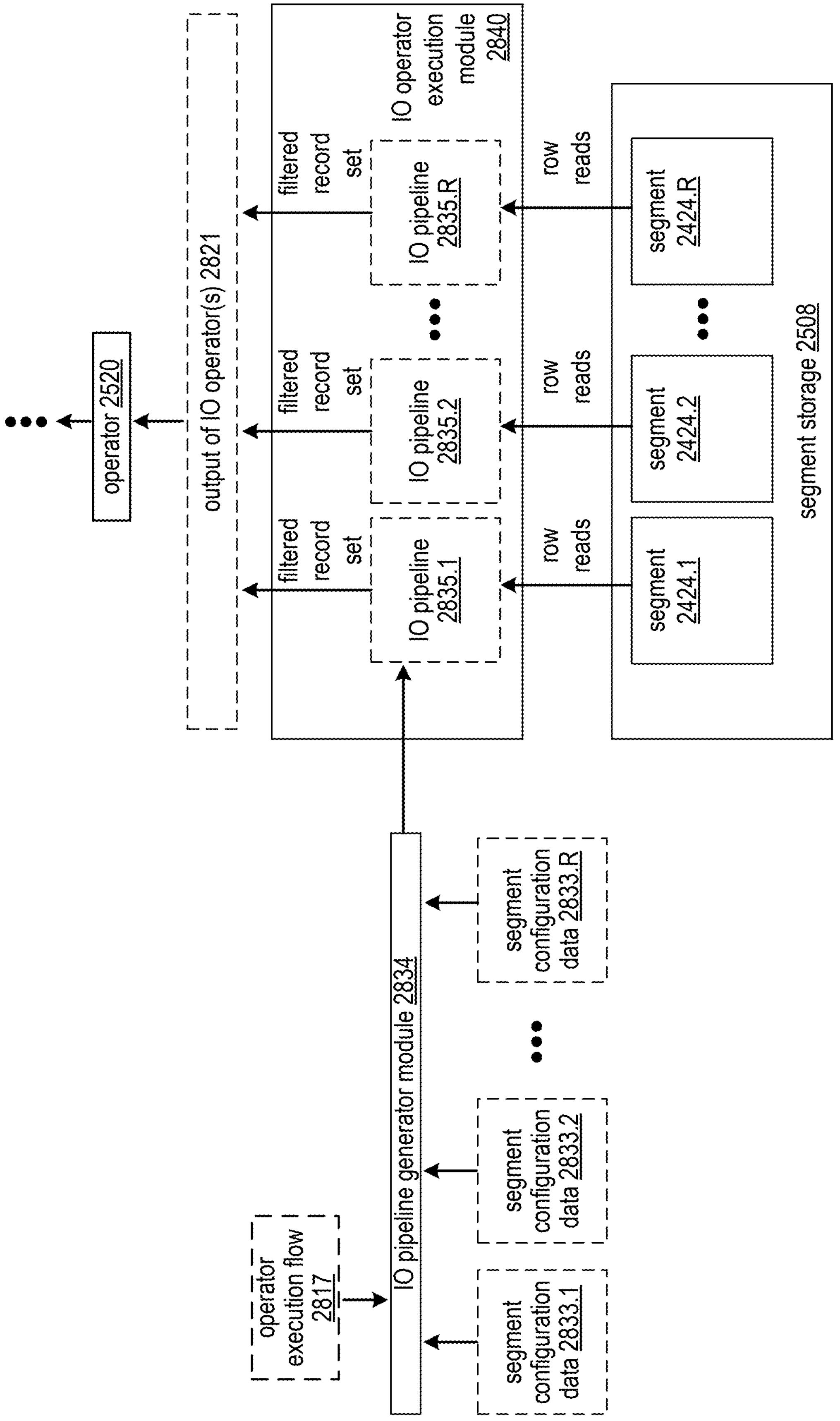
FIG. 24Q is a schematic block diagram of a query processing system that generates and executes a plurality of IO pipelines to generate filtered records sets from a plurality of segments in conjunction with executing a query in accordance with various embodiments.

FIG. 24Q illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24Q can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the columns slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24R:
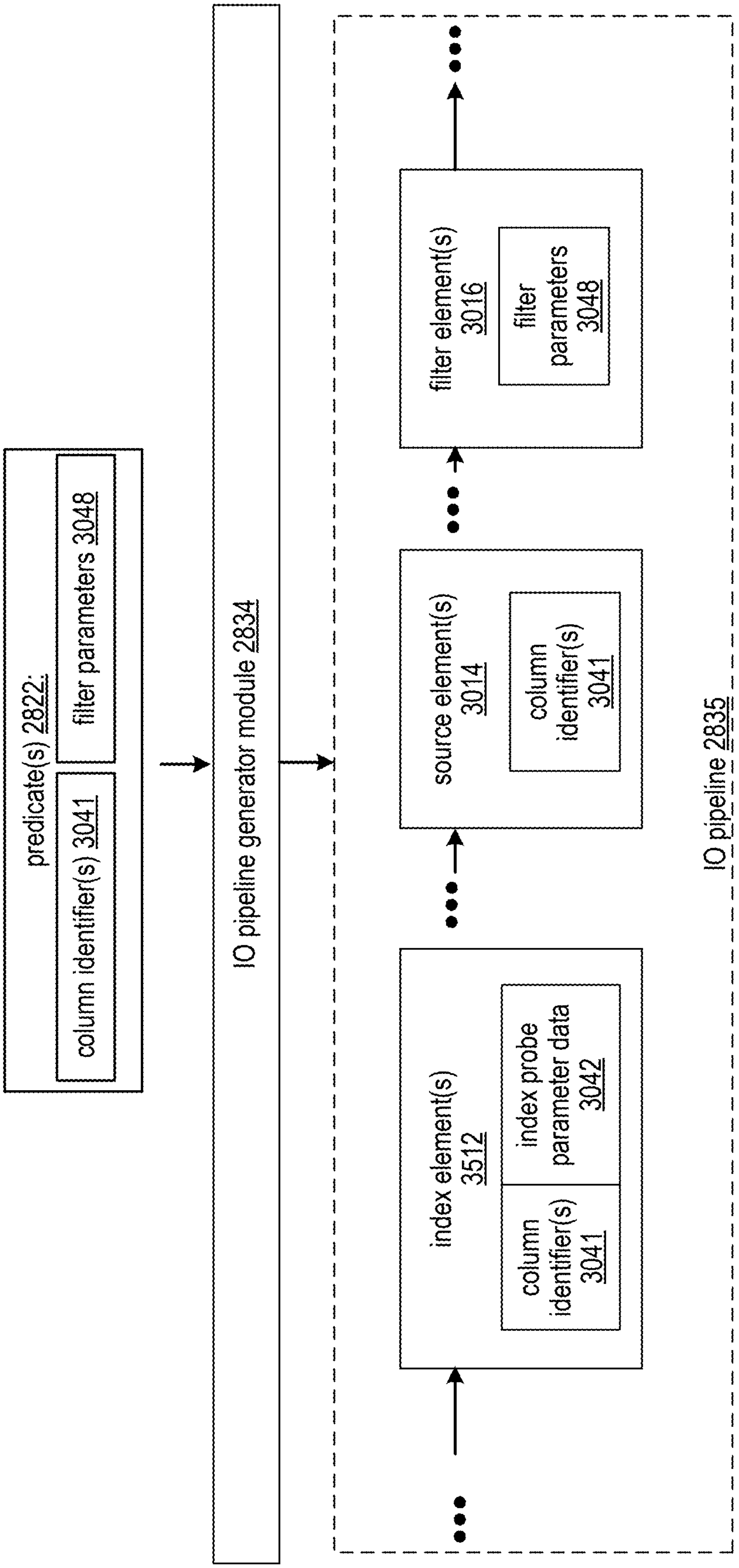
FIG. 24R is a schematic block diagram of a query processing system that generates an IO pipeline for accessing a corresponding segment based on predicates of a query in accordance with various embodiments.

FIG. 24R illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths. These elements can implement sourcing and/or filtering of rows based on query predicates 2822 applied one or more columns, identified by corresponding column identifiers 3041 and corresponding filter parameters 3048. Some or all features and/or functionality of the IO pipeline 2835 and/or IO pipeline generator module 2834 of FIG. 24R can implement the IO pipeline 2835 and/or IO pipeline generator module 2834 of FIG. 24Q, and/or any embodiment of IO pipeline 2835, of IO pipeline generator module 2834, or of any query execution via accessing segments described herein.

In some embodiments, the IO pipeline generator module 2834, IO pipeline 2835, and/or IO operator execution module 2840 implements some or all features and/or functionality of the IO pipeline generator module 2834, IO pipeline 2835, and/or IO operator execution module 2840 as disclosed by: U.S. Utility application Ser. No. 17/303,437, entitled "QUERY EXECUTION UTILIZING PROBABILISTIC INDEXING", filed May 28, 2021, which is hereby incorporated herein by reference in its entirety and made part of the present U.S. Utility Patent Application for all purposes. For example, the database system 10 can implement the indexing of segments 2424 and/or IO pipeline generation as execution for accessing segments 2424 during query execution via implementing some or all features and/or functionality as described in U.S. Utility application Ser. No. 17/303,437.

Figure 24S:
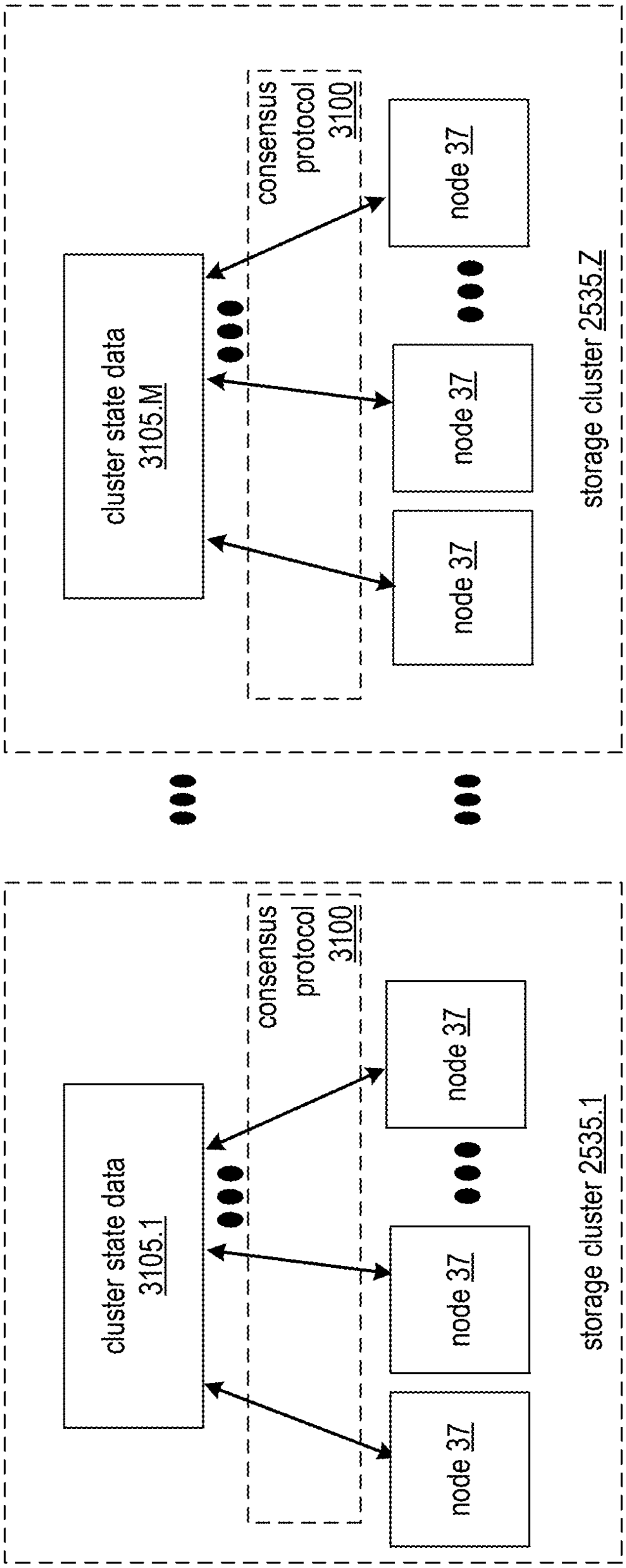
FIG. 24S is a schematic block diagram of a database system that includes a plurality of storage clusters that each mediate cluster state data via a plurality of nodes in accordance with a consensus protocol.

FIG. 24S presents an embodiment of a database system 10 that includes a plurality of storage clusters 2535. Storage clusters 2535.1-2535.Z of FIG. 24S can implement some or all features and/or functionality of storage clusters 35-1-35-Z described herein, and/or can implement some or all features and/or functionality of any embodiment of a storage cluster described herein. Some or all features and/or functionality of database system 10 of FIG. 24S can implement any embodiment of database system 10 described herein.

Each storage cluster 2535 can be implemented via a corresponding plurality of nodes 37. In some embodiments, a given node 37 of database system 10 is optionally included in exactly one storage cluster. In some embodiments, one or more nodes 37 of database system 10 are optionally included in no storage clusters (e.g. aren't configured to store segments). In some embodiments, one or more nodes 37 of database system 10 can be included in multiple storage clusters.

In some embodiments, some or all nodes 37 in a storage cluster 2535 participate at the IO level 2416 in query execution plans based on storing segments 2424 in corresponding memory drives 2425, and based on accessing these segments 2424 during query execution. This can include executing corresponding IO operators, for example, via executing an IO pipeline 2835 (and/or multiple IO pipelines 2835, where each IO pipeline is configured for each respective segment 2424). All segments in a given same segment group (e.g. a set of segments collectively storing parity data and/or replicated parts enabling any given segment in the segment group to be rebuilt/accessed as a virtual segment during query execution via access to some or all other segments in the same segment group as described previously) are optionally guaranteed to be stored in a same storage cluster 2535, where segment rebuilds and/or virtual segment use in query execution can thus be facilitated via communication between nodes in a given storage cluster 2535 accordingly, for example, in response to a node failing and/or a segment becoming unavailable.

Each storage cluster 2535 can further mediate cluster state data 3105 in accordance with a consensus protocol mediated via the plurality of nodes 37 of the given storage cluster. Cluster state data 3105 can implement any embodiment of state data and/or system metadata described herein. In some embodiments, cluster state data 3105 can indicate data ownership information indicating ownership of each segments stored by the cluster by exactly one node (e.g. as a physical segment or a virtual segment) to ensure queries are executed correctly via processing rows in each segment (e.g. of a given dataset against which the query is executed) exactly once.

Consensus protocol 3100 can be implemented via the raft consensus protocol and/or any other consensus protocol. Consensus protocol 3100 can be implemented be based on distributing a state machine across a plurality of nodes, ensuring that each node in the cluster agrees upon the same series of state transitions and/or ensuring that each node operates in accordance with the currently agreed upon state transition. Consensus protocol 3100 can implement any embodiment of consensus protocol described herein.

Coordination across different storage clusters 2535 can be minimal and/or non-existent, for example, based on each storage cluster coordinating state data and/or corresponding query execution separately. For example, state data 3105 across different storage clusters is optionally unrelated.

Each storage cluster's nodes 37 can perform various database tasks (e.g. participate in query execution) based on accessing/utilizing the state data 3105 of its given storage cluster, for example, without knowledge of state data of other storage clusters. This can include nodes syncing state data 3105 and/or otherwise utilizing the most recent version of state data 3105, for example, based on receiving updates from a leader node in the cluster, triggering a sync process in response to determining to perform a corresponding task requiring most recent state data, accessing/updating a locally stored copy of the state data, and/or otherwise determining updated state data.

Figure 25A:
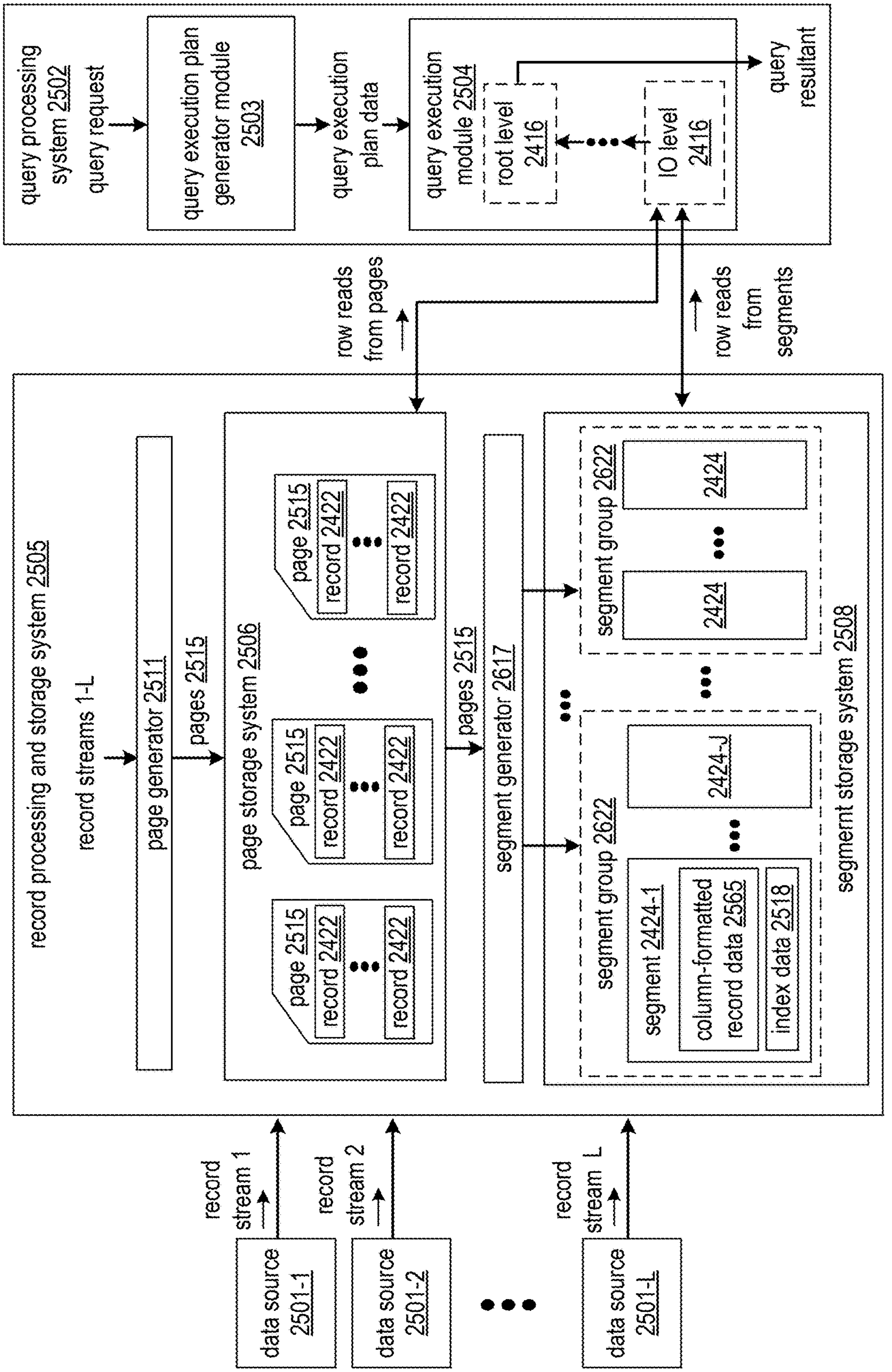
FIGS. 25A-25B are schematic block diagrams of embodiments of a database system that includes a record processing and storage system in accordance with various embodiments.
Figure 25B:
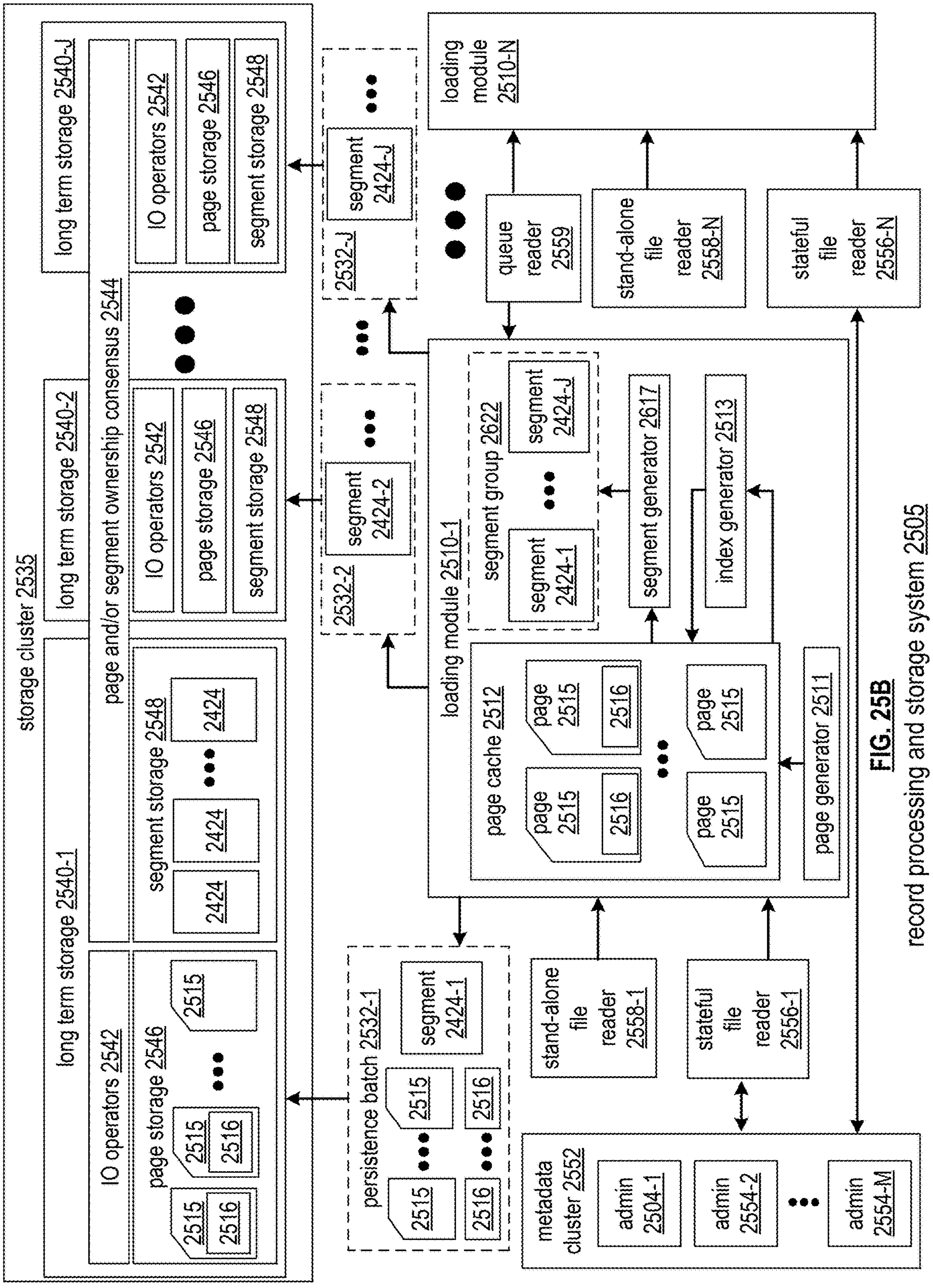
Figure 25C:
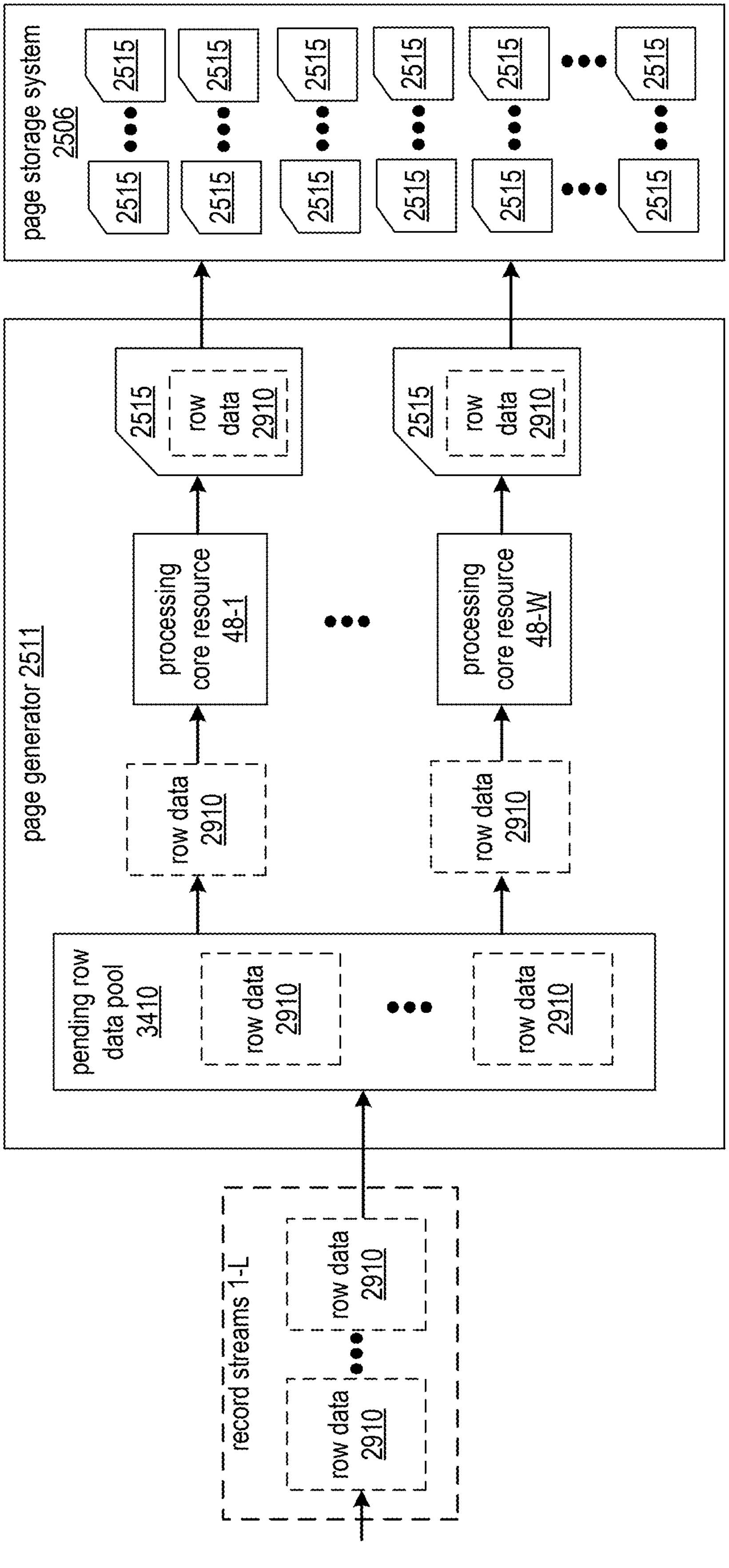
FIG. 25C is a is a schematic block diagrams of an embodiment of a page generator in accordance with various embodiments.

FIGS. 25A-25C illustrate embodiments of a database system 10 operable to execute queries indicating join expressions based on implementing corresponding join processes via one or more join operators. Some or all features and/or functionality of FIGS. 25A-25C can be utilized to implement the database system 10 of FIGS. 24A-24I when executing queries indicating join expressions. Some or all features and/or functionality of FIGS. 25A-25C can be utilized to implement any embodiment of the database system 10 described herein.

FIG. 25A illustrates an embodiment of a database system 10 that implements a record processing and storage system 2505. The record processing and storage system 2505 can be operable to generate and store the segments 2424 discussed previously by utilizing a segment generator 2617 to convert sets of row-formatted records 2422 into column-formatted record data 2565. These row-formatted records 2422 can correspond to rows of a database table with populated column values of the table, for example, where each record 2422 corresponds to a single row as illustrated in FIG. 15. For example, the segment generator 2617 can generate the segments 2424 in accordance with the process discussed in conjunction with FIGS. 15-23. The segments 2424 can be generated to include index data 2518, which can include a plurality of index sections such as the index sections 0-X illustrated in FIG. 23. The segments 2424 can optionally be generated to include other metadata, such as the manifest section and/or statistics section illustrated in FIG. 23.

The generated segments 2424 can be stored in a segment storage system 2508 for access in query executions. For example, the records 2422 can be extracted from generated segments 2424 in various query executions performed by via a query processing system 2502 of the database system 10, for example, as discussed in FIGS. 25A-25D. In particular, the segment storage system 2508 can be implemented by utilizing the memory drives 2425 of a plurality of IO level nodes 37 that are operable to store segments. As discussed previously, nodes 37 at the IO level 2416 can store segments 2424 in their memory drives 2425 as illustrated in FIG. 24C. These nodes can perform IO operations in accordance with query executions by reading rows from these segments 2424 and/or by recovering segments based on receiving segments from other nodes as illustrated in FIG. 24D. The records 2422 can be extracted from the column-formatted record data 2565 for these IO operations of query executions by utilizing the index data 2518 of the corresponding segment 2424.

To enhance the performance of query executions via access to segments 2424 to read records 2422 in this fashion, the sets of rows included in each segment are ideally clustered well. In the ideal case, rows sharing the same cluster key are stored together in the same segment or same group of segments. For example, rows having matching values of key columns(s) of FIG. 18 utilized to sort the rows into groups for conversion into segments are ideally stored in the same segments. As used herein, a cluster key can be implemented as any one or more columns, such as key columns(s) of FIG. 18, that are utilized to cluster records into segment groups for segment generation. As used herein, more favorable levels of clustering correspond to more rows with same or similar cluster keys being stored in the same segments, while less favorable levels of clustering correspond to less rows with same or similar cluster keys being stored in the same segments. More favorable levels of clustering can achieve more efficient query performance. In particular, query filtering parameters of a given query can specify particular sets of records with particular cluster keys be accessed, and if these records are stored together, fewer segments, memory drives, and/or nodes need to be accessed and/or utilized for the given query.

These favorable levels of clustering can be hard to achieve when relying upon the incoming ordering of records in record streams 1-L from a set of data sources 2501-1-2501-L. No assumptions can necessarily be made about the clustering, with respect to the cluster key, of rows presented by external sources as they are received in the data stream. For example, the cluster key value of a given row received at a first time $t_1$ gives no information about the cluster key value of a row received at a second time $t_2$ after $t_1$. It would therefore be unideal to frequently generate segments by performing a clustering process to group the most recently received records by cluster key. In particular, because records received within a given time frame from a particular data source may not be related and have many different cluster key values, the resulting record groups utilized to generate segments would render unfavorable levels of clustering.

To achieve more favorable levels of clustering, the record processing and storage system 2505 implements a page generator 2511 and a page storage system 2506 to store a plurality of pages 2515. The page generator 2511 is operable to generate pages 2515 from incoming records 2422 of record streams 1-L, for example, as is discussed in further detail in conjunction with FIG. 25C. Each page 2515 generated by the page generator 2511 can include a set of records, for example, in their original row format and/or in a data format as received from data sources 2501-1-2501-L. Once generated, the pages 2515 can be stored in a page storage system 2506, which can be implemented via memory drives and/or cache memory of one or more computing devices 18, such as some or all of the same or different nodes 37 storing segments 2424 as part of the segment storage system 2508.

This generation and storage of pages 2515 stored by can serve as temporary storage of the incoming records as they await conversion into segments 2424. Pages 2515 can be generated and stored over lengthy periods of time, such as hours or days. During this length time frame, pages 2515 can continue to be accumulated as one or more record streams of incoming records 1-L continue to supply additional records for storage by the database system.

The plurality of pages generated and stored over this period of time can be converted into segments, for example once a sufficient amount of records have been received and stored as pages, and/or once the page storage system 2506 runs out of memory resources to store any additional pages. It can be advantageous to accumulate and store as many records as possible in pages 2515 prior to conversion to achieve more favorable levels of clustering. In particular, performing a clustering process upon a greater numbers of records, such as the greatest number of records possible can achieve more favorable levels of clustering, For example, greater numbers of records with common cluster keys are expected to be included in the total set of pages 2515 of the page storage system 2506 when the page storage system 2506 accumulates pages over longer periods of time to include a greater number of pages. In other words. delaying the grouping of rows into segments as long as possible increases the chances of having sufficient numbers of records with same and/or similar cluster keys to group together in segments. Determining when to generate segments such that the conversion from pages into segments is delayed as long as possible, and/or such that a sufficient amount of records are converted all at once to induce more favorable levels of cluster, is discussed in further detail in conjunction with FIGS. 26A-26D. Alternatively, the conversion of pages into segments can occur at any frequency, for example, where pages are converted into segments more frequently and/or in accordance with any schedule or determination in other embodiments of the record processing and storage system 2505.

This mechanism of improving clustering levels in segment generation by delaying the clustering process required for segment generation as long as possible can be further leveraged to reduce resource utilization of the record processing and storage system 2505. As the record processing and storage system 2505 is responsible for receiving records streams from data sources for storage, for example, in the scale of terabyte per second load rates, this process of generating pages from the record streams should therefore be as efficient as possible. The page generator 2511 can be further implemented to reduce resource consumption of the record processing and storage system 2505 in page generation and storage by minimizing the processing of, movement of, and/or access to records 2422 of pages 2515 once generated as they await conversion into segments.

To reduce the processing induced upon the record processing and storage system 2505 during this data ingress, sets of incoming records 2422 can be included in a corresponding page 2515 without performing any clustering or sorting. For example, as clustering assumptions cannot be made for incoming data, incoming rows can be placed into pages based on the order that they are received and/or based on any order that best conserves resources. In some embodiments, the entire clustering process is performed by the segment generator 2617 upon all stored pages all at once, where the page generator 2511 does not perform any stages of the clustering process.

In some embodiments, to further reduce the processing induced upon the record processing and storage system 2505 during this data ingress, incoming record data of data streams 1-L undergo minimal reformatting by the page generator 2511 in generating pages 2515. In some cases, the incoming data of record streams 1-L is not reformatted and is simply "placed" into a corresponding page 2515. For example, a set of records are included in given page in accordance with formatted row data received from data sources.

While delaying segment generation in this fashion improves clustering and further improves ingress efficiency, it can be unideal to wait for records to be processed into segments before they appear in query results, particularly because the most recent data may be of the most interest to end users requesting queries. The record processing and storage system 2505 can resolve this problem by being further operable to facilitate page reads in addition to segment reads in facilitating query executions.

As illustrated in FIG. 25A, a query processing system 2502 can implement a query execution plan generator module 2503 to generate query execution plan data based on a received query request. The query execution plan data can be relayed to nodes participating in the corresponding query execution plan 2405 indicated by the query execution plan data, for example, as discussed in conjunction with FIG. 24A. A query execution module 2504 can be implemented via a plurality of nodes participating in the query execution plan 2405, for example, where data blocks are propagated upwards from nodes at IO level 2416 to a root node at root level 2412 to generate a query resultant. The nodes at IO level 2416 can perform row reads to read records 2422 from segments 2424 as discussed previously and as illustrated in FIG. 24C. The nodes at IO level 2416 can further perform row reads to read records 2422 from pages 2515. For example, once records 2422 are durably stored by being stored in a page 2515, and/or by being duplicated and stored in multiple pages 2515, the record 2422 can be available to service queries, and will be accessed by nodes 37 at IO level 2416 in executing queries accordingly. This enables the availability of records 2422 for query executions more quickly, where the records need not be processed for storage in their final storage format as segments 2424 to be accessed in query requests. Execution of a given query can include utilizing a set of records stored in a combination of pages 2515 and segments 2424. An embodiment of an IO level node that stores and accesses both segments and pages is illustrated in FIG. 25E.

The record processing and storage system 2505 can be implemented utilizing the parallelized data input sub-system 11 and/or the parallelized ingress sub-system 24 of FIG. 4. The record processing and storage system 2505 can alternatively or additionally be implemented utilizing the parallelized data store, retrieve, and/or process sub-system 12 of FIG. 6. The record processing and storage system 2505 can alternatively or additionally be implemented by utilizing one or more computing devices 18 and/or by utilizing one or more nodes 37.

The record processing and storage system 2505 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the page generator 2511 and/or of the segment generator 2617 discussed herein. In some cases, one or more individual nodes 37 and/or one or more individual processing core resources 48 can be operable to perform some or all of the functionality of the record processing and storage system 2505, such as some or all of the functionality of the page generator 2511 and/or of the segment generator 2617, independently or in tandem by utilizing their own processing resources and/or memory resources.

The query processing system 2502 can be alternatively or additionally implemented utilizing the parallelized query and results sub-system 13 of FIG. 5. The query processing system 2502 can be alternatively or additionally implemented utilizing the parallelized data store, retrieve, and/or process sub-system 12 of FIG. 6. The query processing system 2502 can alternatively or additionally be implemented by utilizing one or more computing devices 18 and/or by utilizing one or more nodes 37.

The query processing system 2502 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the query execution plan generator module 2503 and/or of the query execution module 2504 discussed herein. In some cases, one or more individual nodes 37 and/or one or more individual processing core resources 48 can be operable to perform some or all of the functionality of the query processing system 2502, such as some or all of the functionality of query execution plan generator module 2503 and/or of the query execution module 2504, independently or in tandem by utilizing their own processing resources and/or memory resources.

In some embodiments, one or more nodes 37 of the database system 10 as discussed herein can be operable to perform multiple functionalities of the database system 10 illustrated in FIG. 25A. For example, a single node can be utilized to implement the page generator 2511, the page storage system 2506, the segment generator 2617, the segment storage system 2508, the query execution plan generator module, and/or the query execution module 2504 as a node 37 at one or more levels 2410 of a query execution plan 2405. In particular, the single node can utilize different processing core resources 48 to implement different functionalities in parallel, and/or can utilize the same processing core resources 48 to implement different functionalities at different times.

Some or all data sources 2501 can implemented utilizing at least one processor and at least one memory. Some or all data sources 2501 can be external from database system 10 and/or can be included as part of database system 10. For example, the at least one memory of a data source 2501 can store operational instructions that, when executed by the at least one processor of the data source 2501, cause the data source 2501 to perform some or all of the functionality of data sources 2501 described herein. In some cases, data sources 2501 can receive application data from the database system 10 for download, storage, and/or installation. Execution of the stored application data by processing modules of data sources 2501 can cause the data sources 2501 to execute some or all of the functionality of data sources 2501 discussed herein.

In some embodiments, system communication resources 14, external network(s) 17, local communication resources 25, wide area networks 22, and/or other communication resources of database system 10 can be utilized to facilitate any transfer of data by the record processing and storage system 2505. This can include, for example: transmission of record streams 1-L from data sources 2501 to the record processing and storage system 2505; transfer of pages 2515 to page storage system 2506 once generated by the page generator 2511; access to pages 2515 by the segment generator 2617; transfer of segments 2424 to the segment storage system 2508 once generated by the segment generator 2617; communication of query execution plan data to the query execution module 2504, such as the plurality of nodes 37 of the corresponding query execution plan 2405; reading of records by the query execution module 2504, such as IO level nodes 37, via access to pages 2515 stored page storage system 2506 and/or via access to segments 2424 stored segment storage system 2508; sending of data blocks generated by nodes 37 of the corresponding query execution plan 2405 to other nodes 37 in conjunction with their execution of the query; and/or any other accessing of data, communication of data, and/or transfer of data by record processing and storage system 2505 and/or within the record processing and storage system 2505 as discussed herein.

The record processing and storage system 2505 and/or the query processing system 2502 of FIG. 25A, and/or any other embodiment of record processing and storage system 2505 and/or the query processing system 2502 described herein, can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the record processing and storage system 2505 and/or the query processing system 2502 can each be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the record processing and storage system 2505 and/or the query processing system 2502 at a massive scale.

Some or all functionality performed by the record processing and storage system 2505 and/or the query processing system 2502 as described herein cannot practically be performed by the human mind, particularly when the database system 10 is implemented to store and perform queries against records at a massive scale as discussed previously. In particular, the human mind is not equipped to perform record processing, record storage, and/or query execution for millions, billions, and/or trillions of records stored as many Terabytes, Petabytes, and/or Exabytes of data. Furthermore, the human mind is not equipped to distribute and perform record processing, record storage, and/or query execution as multiple independent processes, such as hundreds, thousands, and/or millions of independent processes, in parallel and/or within overlapping time spans.

Some or all features and/or functionality of FIG. 25A can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 25A based on receiving and storing the system metadata in local memory of the at least one node 37 as configuration data, such as the configuration data discussed in conjunction with FIGS. 27A-27J, and/or based on further accessing and/or executing this configuration data to implement some or all functionality of the record processing storage system and/or to implement some or all functionality of the query processing system as part of its database functionality accordingly. Performance of some or all features and/or functionality of FIG. 25A can optionally change and/or be updated over time, and/or a set of nodes participating in executing some or all features and/or functionality of FIG. 25A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25B illustrates an example embodiment of the record processing and storage system 2505 of FIG. 25A. Some or all of the features illustrated and discussed in conjunction with the record processing and storage system 2505 FIG. 25B can be utilized to implement the record processing and storage system 2505 and/or any other embodiment of the record processing and storage system 2505 described herein.

The record processing and storage system 2505 can include a plurality of loading modules 2510-1-2510-N. Each loading module 2510 can be implemented via its own processing and/or memory resources. For example, each loading module 2510 can be implemented via its own computing device 18, via its own node 37, and/or via its own processing core resource 48. The plurality of loading modules 2510-1-2510-N can be implemented to perform some or all of the functionality of the record processing and storage system 2505 in a parallelized fashion.

The record processing and storage system 2505 can include queue reader 2559, a plurality of stateful file readers 2556-1-2556-N, and/or stand-alone file readers 2558-1-2558-N. For example, the queue reader 2559, a plurality of stateful file readers 2556-1-2556-N, and/or stand-alone file readers 2558-1-2558-N are utilized to enable each loading modules 2510 to receive one or more of the record streams 1-L received from the data sources 2501-1-2501-L as illustrated in FIG. 25A. For example, each loading module 2510 receives a distinct subset of the entire set of records received by the record processing and storage system 2505 at a given time.

Each loading module 2510 can receive records 2422 in one or more record streams via its own stateful file reader 2556 and/or stand-alone file reader 2558. Each loading module 2510 can optionally receive records 2422 and/or otherwise communicate with a common queue reader 2559. Each stateful file reader 2556 can communicate with a metadata cluster 2552 that includes data supplied by and/or corresponding to a plurality of administrators 2554-1-2554-M. The metadata cluster 2552 can be implemented by utilizing the administrative processing sub-system 15 and/or the configuration sub-system 16. The queue reader 2559, each stateful file reader 2556, and/or each stand-alone file reader 2558 can be implemented utilizing the parallelized ingress sub-system 24 and/or the parallelized data input sub-system 11. The metadata cluster 2552, the queue reader 2559, each stateful file reader 2556, and/or each stand-alone file reader 2558 can be implemented utilizing at least one computing device 18 and/or at least one node 37. In cases where a given loading module 2510 is implemented via its own computing device 18 and/or node 37, the same computing device 18 and/or node 37 can optionally be utilized to implement the stateful file reader 2556, and/or each stand-alone file reader 2558 communicating with the given loading module 2510.

Each loading module 2510 can implement its own page generator 2511, its own index generator 2513, and/or its own segment generator 2617, for example, by utilizing its own processing and/or memory resources such as the processing and/or memory resources of a corresponding computing device 18. For example, the page generator 2511 of FIG. 25A can be implemented as a plurality of page generators 2511 of a corresponding plurality of loading modules 2510 as illustrated in FIG. 25B. Each page generator 2511 of FIG. 25B can process its own incoming records 2422 to generate its own corresponding pages 2515.

As pages 2515 are generated by the page generator 2511 of a loading module 2510, they can be stored in a page cache 2512. The page cache 2512 can be implemented utilizing memory resources of the loading module 2510, such as memory resources of the corresponding computing device 18. For example, the page cache 2512 of each loading module 2010-1-2010-N can individually or collectively implement some or all of the page storage system 2506 of FIG. 25A.

The segment generator 2617 of FIG. 25A can similarly be implemented as a plurality of segment generators 2617 of a corresponding plurality of loading modules 2510 as illustrated in FIG. 25B. Each segment generator 2617 of FIG. 25B can generate its own set of segments 2424-1-2424-J included in one or more segment groups 2622. The segment group 2622 can be implemented as the segment group of FIG. 23, for example, where J is equal to five or another number of segments configured to be included in a segment group. In particular, J can be based on the redundancy storage encoding scheme utilized to generate the set of segments and/or to generate the corresponding parity data 2426.

The segment generator 2617 of a loading module 2510 can access the page cache 2512 of the loading module 2510 to convert the pages 2515 previously generated by the page generator 2511 into segments. In some cases, each segment generator 2617 requires access to all pages 2515 generated by the segment generator 2617 since the last conversion process of pages into segments. The page cache 2512 can optionally store all pages generated by the page generator 2511 since the last conversion process, where the segment generator 2617 accesses all of these pages generated since the last conversion process to cluster records into groups and generate segments. For example, the page cache 2512 is implemented as a write-through cache to enable all previously generated pages since the last conversion process to be accessed by the segment generator 2617 once the conversion process commences.

In some cases, each loading module 2510 implements its segment generator 2617 upon only the set of pages 2515 that were generated by its own page generator 2511, accessible via its own page cache 2512. In such cases, the record grouping via clustering key to create segments with the same or similar cluster keys are separately performed by each segment generator 2617 independently without coordination, where this record grouping via clustering key is performed on N distinct sets of records stored in the N distinct sets of pages generated by the N distinct page generators 2511 of the N distinct loading modules 2510. In such cases, despite records never being shared between loading modules 2510 to further improve clustering, the level of clustering of the resulting segments generated independently by each loading module 2510 on its own data is sufficient, for example, due to the number of records in each loading module's 2510 set of pages 2515 for conversion being sufficiently large to attain favorable levels of clustering.

In such embodiments, each loading modules 2510 can independently initiate its own conversion process of pages 2515 into segments 2424 by waiting as long as possible based on its own resource utilization, such as memory availability of its page cache 2512. Different segment generators 2617 of the different loading modules 2510 can thus perform their own conversion of the corresponding set of pages 2515 into segments 2424 at different times, based on when each loading modules 2510 independently determines to initiate the conversion process, for example, based on each independently making the determination to generate segments as discussed in conjunction with FIG. 26A. Thus, as discussed herein, the conversion process of pages into segments can correspond to a single loading module 2510 converting all of its pages 2515 generated by its own page generator 2511 since its own last the conversion process into segments 2424, where different loading modules 2510 can initiate and execute this conversion process at different times and/or with different frequency.

In other cases, it is ideal for even more favorable levels of clustering to be attained via sharing of all pages for conversion across all loading modules 2510. In such cases, a collective decision to initiate the conversion process can be made across some or all loading modules 2510, for example, based on resource utilization across all loading modules 2510. The conversion process can include sharing of and/or access to all pages 2515 generated via the process, where each segment generator 2617 accesses records in some or all pages 2515 generated by and/or stored by some or all other loading modules 2510 to perform the record grouping by cluster key. As the full set of records is utilized for this clustering instead of N distinct sets of records, the levels of clustering in resulting segments can be further improved in such embodiments. This improved level of clustering can offset the increased page movement and coordination required to facilitate page access across multiple loading modules 2510. As discussed herein, the conversion process of pages into segments can optionally correspond to multiple loading modules 2510 converting all of their collectively generated pages 2515 since their last conversion process into segments 2424 via sharing of their generated pages 2515.

An index generator 2513 can optionally be implemented by some or all loading modules 2510 to generate index data 2516 for some or all pages 2515 prior to their conversion into segments. The index data 2516 generated for a given page 2515 can be appended to the given page, can be stored as metadata of the given page 2515, and/or can otherwise be mapped to the given page 2515. The index data 2516 for a given page 2515 correspond to page metadata, for example, indexing records included in the corresponding page. As a particular example, the index data 2516 can include some or all of the data of index data 2518 generated for segments 2424 as discussed previously, such as index sections 0-x of FIG. 23. As another example, the index data 2516 can include indexing information utilized to determine the memory location of particular records and/or particular columns within the corresponding page 2515.

In some cases, the index data 2516 can be generated to enable corresponding pages 2515 to be processed by query IO operators utilized to read rows from pages, for example, in a same or similar fashion as index data 2518 is utilized to read rows from segments. In some cases, index probing operations can be utilized by and/or integrated within query IO operators to filter the set of rows returned in reading a page 2515 based on its index data 2516 and/or to filter the set of rows returned in reading a segment 2424 based on its index data 2518.

In some cases, index data 2516 is generated by index generator 2513 for all pages 2515, for example, as each page 2515 is generated, or at some point after each page 2515 is generated. In other cases, index data 2516 is only generated for some pages 2515, for example, where some pages do not have index data 2516 as illustrated in FIG. 25B. For example, some pages 2515 may never have corresponding index data 2516 generated prior to their conversion into segments. In some cases, index data 2516 is generated for a given page 2515 with its records are to be read in execution of a query by the query processing system 2502. For example, a node 37 at IO level 2416 can be implemented as a loading module 2510 and can utilize its index generator 2513 to generate index data 2516 for a particular page 2515 in response to having query execution plan data indicating that records 2422 be read the particular page from the page cache 2512 of the loading module in conjunction with execution of a query. The index data 2516 can be optionally stored temporarily for the life of the given query to facilitate reading of rows from the corresponding page for the given query only. The index data 2516 alternatively be stored as metadata of the page 2515 once generated, as illustrated in FIG. 25B. This enables the previously generated index data 2516 of a given page to be utilized in subsequent queries requiring reads from the given page.

As illustrated in FIG. 25B, each loading modules 2510 can generate and send pages 2515, corresponding index data 2516, and/or segments 2424 to long term storage 2540-1-2540-J of a particular storage cluster 2535. For example, system communication resources 14 can be utilized to facilitate sending of data from loading modules 2510 to storage cluster 2535 and/or to facilitate sending of data from storage cluster 2535 to loading modules 2510.

The storage cluster 2535 can be implemented by utilizing a storage cluster 35 of FIG. 6, where each long term storage 2540-1-2540-J is implemented by a corresponding computing device 18-1-18-J and/or by a corresponding node 37-1-37-J. In some cases, each storage cluster 35-1-35-*z* of FIG. 6 can receive pages 2515, corresponding index data 2516, and/or segments 2424 from its own set of loading modules 2510-1-2510-N, where the record processing and storage system 2505 of FIG. 25B can include z sets of loading modules 2510-1-2510-N that each generate pages 2515, segments 2524, and/or index data 2516 for storage in its own corresponding storage cluster 35.

The processing and/or memory resources utilized to implement each long term storage 2540 can be distinct from the processing and/or memory resources utilized to implement the loading modules 2510. Alternatively, some loading modules can optionally share processing and/or memory resources long term storage 2540, for example, where a same computing device 18 and/or a same node 37 implements a particular long term storage 2540 and also implements a particular loading modules 2510.

Each loading module 2510 can generate and send the segments 2424 to long term storage 2540-1-2540-J in a set of persistence batches 2532-1-2532-J sent to the set of long term storage 2540-1-2540-J as illustrated in FIG. 25B. For example, upon generating a segment group 2522 of J segments 2424, a loading module 2510 can send each of the J segments in the same segment group to a different one of the set of long term storage 2540-1-2540-J in the storage cluster 2535. For example, a particular long term storage 2540 can generate recovered segments as necessary for processing queries and/or for rebuilding missing segments due to drive failure as illustrated in FIG. 24D, where the value K of FIG. 24D is less than the value J and wherein the nodes 37 of FIG. 24D are utilized to implement the long term storage 2540-1-2540-J.

As illustrated in FIG. 25B, each persistence batch 2532-1-2532-J can optionally or additionally include pages 2515 and/or their corresponding index data 2516 generated via index generator 2513. Some or all pages 2515 that are generated via a loading module 2510's page generator 2511 can be sent to one or more long term storage 2540-1-2540-J. For example, a particular page 2515 can be included in some or all persistence batches 2532-1-2532-J sent to multiple ones of the set of long term storage 2540-1-2540-J for redundancy storage as replicated pages stored in multiple locations for the purpose of fault tolerance. Some or all pages 2515 can be sent to storage cluster 2535 for storage prior to being converted into segments 2424 via segment generator 2617. Some or all pages 2515 can be stored by storage cluster 2535 until corresponding segments 2424 are generated, where storage cluster 2535 facilitates deletion of these pages from storage in one or more long term storage 2540-1-2540-J once these pages are converted and/or have their records 2422 successfully stored by storage cluster 2535 in segments 2424.

In some cases, a loading module 2510 maintains storage of pages 2515 via page cache 2512, even if they are sent to storage cluster 2535 in persistence batches 2532. This can enable the segment generator 2617 to efficiently read pages 2515 during the conversion process via reads from this local page cache 2512. This can be ideal in minimizing page movement, as pages do not need to be retrieved from long term storage 2540 for conversion into segments by loading modules 2510 and can instead be locally accessed via maintained storage in page cache 2512. Alternatively, a loading module 2510 removes pages 2515 from storage via page cache 2512 once they are determined to be successfully stored in long term storage 2540. This can be ideal in reducing the memory resources required by loading module 2510 to store pages, as only pages that are not yet durably stored in long term storage 2540 need be stored in page cache 2512.

Each longterm storage 2540 can include its own page storage 2546 that stores received pages 2515 generated by and received from one or more loading modules 2010-1-2010-N, implemented utilizing memory resources of the long term storage 2540. For example, the page storage 2546 of each long term storage 2540-1-2540-J can individually or collectively implement some or all of the page storage system 2506 of FIG. 25A. The page storage 2546 can optionally store index data 2516 mapped to and/or included as metadata of its pages 2515. Each long term storage 2540 can alternatively or additionally include its own segment storage 2548 that stores segments generated by and received from one or more loading modules 2010-1-2010-N. For example, the segment storage 2548 of each long term storage 2540-1-2540-J can individually or collectively implement some or all of the segment storage system 2508 of FIG. 25A.

The pages 2515 stored in page storage 2546 of long term storage 2540 and/or the segments 2424 stored in segment storage 2548 of long term storage 2540 can be accessed to facilitate execution of queries. As illustrated in FIG. 25B, each long term storage 2540-1-2540-J can perform IO operators 2542 to facilitate reads of records in pages 2515 stored in their page storage 2546 and/or to facilitate reads of records in segments 2424 stored in their segment storage 2548. For example, some or all long term storage 2540-1-2540-J can be implemented as nodes 37 at the IO level 2416 of one or more query execution plans 2405. In particular, the some or all long term storage 2540-1-2540-J can be utilized to implement the query processing system 2502 by facilitating reads to stored records via IO operators 2542 in conjunction with query executions.

Note that at a given time, a given page 2515 may be stored in the page cache 2512 of the loading module 2510 that generated the given page 2515, and may alternatively or additionally be stored in one or more long term storage 2540 of the storage cluster 2535 based on being sent to the in one or more long term storage 2540. Furthermore, at a given time, a given record may be stored in a particular page 2515 in a page cache 2512 of a loading module 2510, may be stored the particular page 2515 in page storage 2546 of one or more long term storage 2540, and/or may be stored in exactly one particular segment 2424 in segment storage 2548 of one long term storage 2540.

Because records can be stored in multiple locations of storage cluster 2535, the long term storage 2540 of storage cluster 2535 can be operable to collectively store page and/or segment ownership consensus 2544. This can be useful in dictating which long term storage 2540 is responsible for accessing each given record stored by the storage cluster 2535 via IO operators 2542 in conjunction with query execution. In particular, as a query resultant is only guaranteed to be correct if each required record is accessed exactly once, records reads to a particular record stored in multiple locations could render a query resultant as incorrect. The page and/or segment ownership consensus 2544 can include one or more versions of ownership data, for example, that is generated via execution of a consensus protocol mediated via the set of long term storage 2540-1-2540-J. The page and/or segment ownership consensus 2544 can dictate that every record is owned by exactly one long term storage 2540 via access to either a page 2515 storing the record or a segment 2424 storing the record, but not both. The page and/or segment ownership consensus 2544 can indicate, for each long term storage 2540 in the storage cluster 2535, whether some or all of its pages 2515 or some or all of its segments 2424 are to be accessed in query executions, where each long term storage 2540 only accesses the pages 2515 and segments 2424 indicated in page and/or segment ownership consensus 2544.

In such cases, all record access for query executions performed by query execution module 2504 via nodes 37 at IO level 2416 can optionally be performed via IO operators 2542 accessing page storage 2546 and/or segment storage 2548 of long term storage 2540, as this access can guarantee reading of records exactly once via the page and/or segment ownership consensus 2544. For example, the long term storage 2540 can be solely responsible for durably storing the records utilized in query executions. In such embodiments, the cached and/or temporary storage of pages and/or segments of loading modules 2510, such as pages 2515 in page caches 2512, are not read for query executions via accesses to storage resources of loading modules 2510.

Some or all features and/or functionality of FIG. 25B can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 25B based on receiving and storing the system metadata in local memory of the at least one node 37 as configuration data, such as the configuration data discussed in conjunction with FIGS. 27A-27J, and/or based on further accessing and/or executing this configuration data to implement some or all functionality of a loading module 2510, to implement some or all functionality of a file reader, and/or to implement some or all functionality of the storage cluster 2535 as part of its database functionality accordingly. Performance of some or all features and/or functionality of FIG. 25B can optionally change and/or be updated over time, and/or a set of nodes participating in executing some or all features and/or functionality of FIG. 25B can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25C illustrates an example embodiment of a page generator 2511. The page generator 2511 of FIG. 25C can be utilized to implement the page generator 2511 of FIG. 25A, can be utilized to implement each page generator 2511 of each loading module 2510 of FIG. 25B, and/or can be utilized to implement any embodiments of page generator 2511 described herein.

A single incoming record stream, or multiple incoming record streams 1-L, can include the incoming records 2422 as a stream of row data 2910. Each row data 2910 can be transmitted as an individual packet and/or a set of packets by the corresponding data source 2501 to include a single record 2422, such as a single row of a database table. Alternatively each row data 2910 can be transmitted by the corresponding data source 2501 as an individual packet and/or a set of packets to include a batched set of multiple records 2422, such as multiple rows of a database table. Row data 2910 received from the same or different data source over time can each include a same number of rows or a different number of rows, and can be sent in accordance with a particular format. Row data 2910 received from the same or different data source over time can include records with the same or different numbers of columns, with the same or different types and/or sizes of data populating its columns, and/or with the same or different row schemas. In some cases, row data 2910 is received in a stream overtime for processing by a loading module 2510 via a stateful file reader 2556 and/or via a stand-alone file reader 2558.

Incoming rows can be stored in a pending row data pool 3410 while they await conversion into pages 2515. The pending row data pool 3410 can be implemented as an ordered queue or an unordered set. The pending row data pool 3410 can be implemented by utilizing storage resources of the record processing and storage system. For example, each loading module 2510 can have its own pending row data pool 3410. Alternatively, multiple loading modules 2510 can access the same pending row data pool 3410 that stores all incoming row data 2910, for example, by utilizing queue reader 2559.

The page generator 2511 can facilitate parallelized page generation via a plurality of processing core resources 48-1-48-W. For example, each loading module 2510 has its own plurality of processing core resources 48-1-48-W, where the processing core resources 48-1-48-W of a given loading module 2510 is implemented via the set of processing core resources 48 of one or more nodes 37 utilized to implement the given loading module 2510. As another example, the plurality of processing core resources 48-1-48-W are each implemented by a corresponding one of the set of each loading module 2510-1-2510-N, for example, where each loading module 2510-1-2510-N is implemented via its own processing core resources 48-1-48-W.

Over time, each processing core resource 48 can retrieve and/or can be assigned pending row data 2910 in the pending row data pool 3410. For example, when a given processing core resource 48 has finished another job, such as completed processing of another row data 2910, the processing core resource 48 can fetch a new row data 2910 for processing into a page 2515. For example, the processing core resource 48 retrieves a first ordered row data 2910 from a queue of the pending row data pool 3410, retrieves a highest priority row data 2910 from the pending row data pool 3410, retrieves an oldest row data 2910 from the pending row data pool 3410, and/or retrieves a random row data 2910 from the pending row data pool 3410. Once one processing core resource 48 retrieves and/or otherwise utilizes a particular row data 2910 for processing into a page, the particular row data 2910 is removed from the pending row data pool 3410 and/or is otherwise not available for processing by other processing core resources 48.

Each processing core resource 48 can generate pages 2515 from the row data received over time. As illustrated in FIG. 25C, the pages 2515 are depicted to include only one row data, such as a single row or multiple rows batched together in the row data 2910. For example, each page is generated directly from corresponding row data 2910. Alternatively, a page 2515 can include multiple row data 2910, for example, in sequence and/or concatenated in the page 2515. The page can include multiple row data 2910 from a single data source 2501 and/or can include multiple row data 2910 from multiple different data sources 2501. For example, the processing core resource 48 can retrieve one row data 2910 from the pending row data pool 3410 at a time, and can append each row data 2910 to a given page until the page 2515 is complete, where the processing core resource 48 appends subsequently retrieved row data 2910 to a new page. Alternatively, the processing core resource 48 can retrieve multiple row data 2910 at once, and can generate a corresponding page 2515 to include this set of multiple row data 2910.

Once a page 2515 is complete, the corresponding processing core resource 48 can facilitate storage of the page in page storage system 2506. This can include adding the page 2515 to the page cache 2512 of the corresponding loading module 2510. This can include facilitating sending of the page 2515 to one or more long term storage 2540 for storage in corresponding page storage 2546. Different processing core resources 48 can each facilitate storage of the page via common resources, or via designated resources specific to each processing core resources 48, of the page storage system 2506.

Some or all features and/or functionality of FIG. 25C can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 25C based on receiving and storing the system metadata in local memory of the at least one node 37 as configuration data, such as the configuration data discussed in conjunction with FIGS. 27A-27J, and/or based on further accessing and/or executing this configuration data to implement some or all functionality of a loading module 2510, to implement some or all functionality of page generator 2511 and/or page storage system 2506 as part of its database functionality accordingly. Performance of some or all features and/or functionality of FIG. 25C can optionally change and/or be updated over time, and/or a set of nodes participating in executing some or all features and/or functionality of FIG. 25C can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 25D:
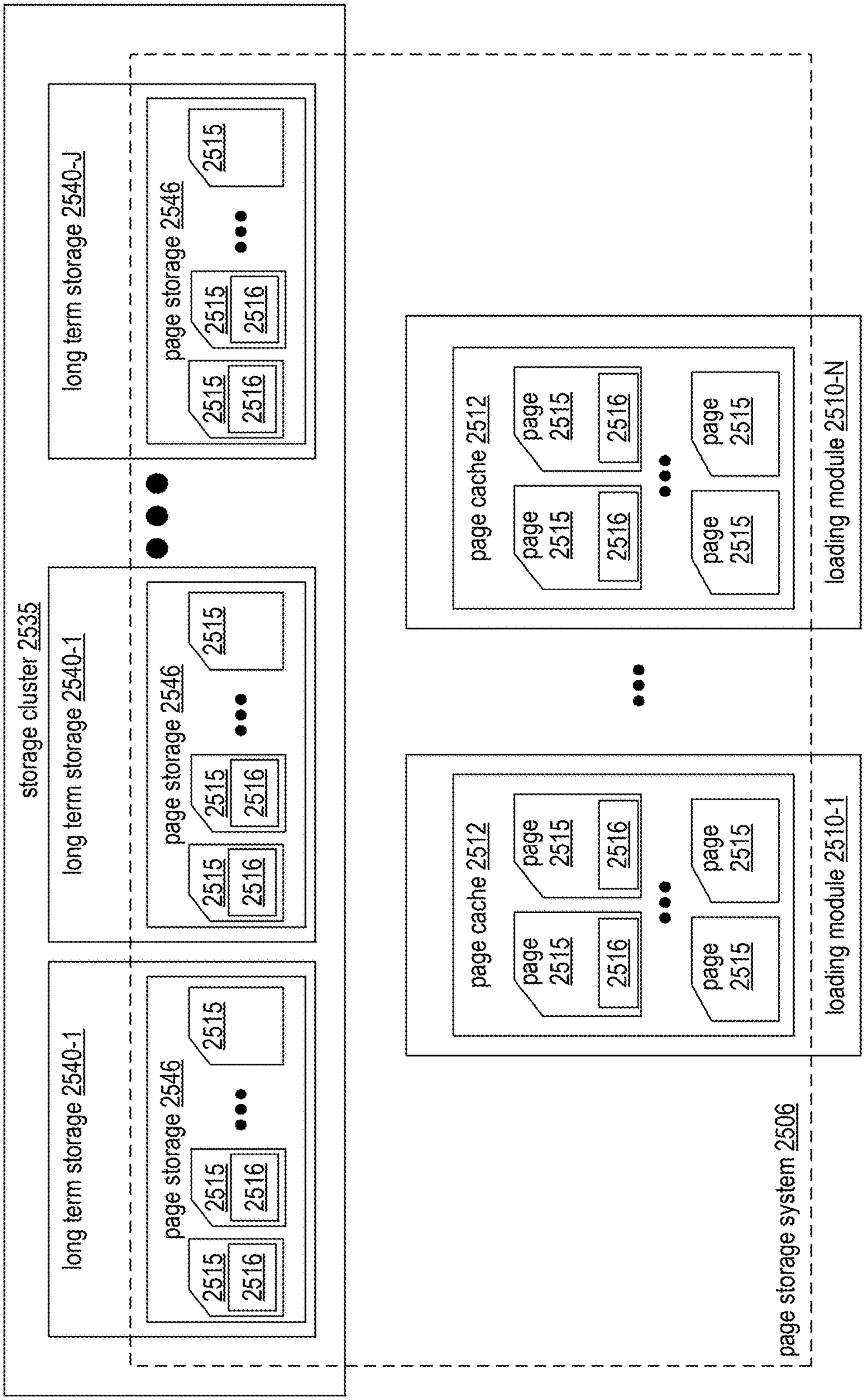
FIG. 25D is a schematic block diagrams of an embodiment of a page storage system of a record processing and storage system in accordance with various embodiments.

FIG. 25D illustrates an example embodiment of the page storage system 2506. As used herein, the page storage system 2506 can include page cache 2512 of a single loading module 2510; can include page caches 2512 of some or all loading module 2510-1-2510-N; can include page storage 2546 of a single long term storage 2540 of a storage cluster 2535; can include page storage 2546 of some or all long term storage 2540-1-2540-J of a single storage cluster 2535; can include page storage 2546 of some or all long term storage 2540-1-2540-J of multiple different storage clusters, such as some or all storage clusters 35-1-35-*z*; and/or can include any other memory resources of database system 10 that are utilized to temporarily and/or durably store pages.

Some or all features and/or functionality of FIG. 25D can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 25D based on receiving and storing the system metadata in local memory of the at least one node 37 as configuration data, such as the configuration data discussed in conjunction with FIGS. 27A-27J, and/or based on further accessing and/or executing this configuration data to implement some or all functionality of a loading module 2510 and/or a given long term storage 2540 as part of its database functionality accordingly. Performance of some or all features and/or functionality of FIG. 25D can optionally change and/or be updated over time, and/or a set of nodes participating in executing some or all features and/or functionality of FIG. 25D can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25E illustrates an example embodiment of a node 37 utilized to implement a given long term storage 2540 of FIG. 25B. The node 37 of FIG. 25E can be utilized to implement the node 37 of FIG. 25B, FIG. 25C, 25D, some or all nodes 37 at the IO level 2416 of a query execution plan 2405 of FIG. 24A, and/or any other embodiments of node 37 described herein. As illustrated a given node 37 can have its own segment storage 2548 and/or its own page storage 2546 by utilizing one or more of its own memory drives 2425. Note that while the segment storage 2548 and page storage 2546 are segregated in the depiction of a memory drives 2425, any resources of a given memory drive or set of memory drives can be allocated for and/or otherwise utilized to store either pages 2515 or segments 2424. Optionally, some particular memory drives 2425 and/or particular memory locations within a particular memory drive can be designated for storage of pages 2515, while other particular memory drives 2425 and/or other particular memory locations within a particular memory drive can be designated for storage of segments 2424.

The node 37 can utilize its query processing module 2435 to access pages and/or records in conjunction with its role in a query execution plan 2405, for example, at the IO level 2416. For example, the query processing module 2435 generates and sends segment read requests to access records stored in segments of segment storage 2548, and/or generates and sends page read requests to access records stored in pages 2515 of page storage 2546. In some cases, in executing a given query, the node 37 reads some records from segments 2424 and reads other records from pages 2515, for example, based on assignment data indicated in the page and/or segment ownership consensus 2544. The query processing module 2435 can generate its data blocks to include the raw row data of the read records and/or can perform other query operators to generate its output data blocks as discussed previously. The data blocks can be sent to another node 37 in the query execution plan 2405 for processing as discussed previously, such as a parent node and/or a node in a shuffle node set within the same level 2410.

Some or all features and/or functionality of FIG. 25E can be performed a given node 37 in conjunction with system metadata, such as system metadata discussed in conjunction with FIGS. 27A-27J, applied across a plurality of nodes 37, for example, where the given node 37 performs some or all features and/or functionality of FIG. 25E based on receiving and storing the system metadata in local memory of the at least one node 37 as configuration data, such as the configuration data discussed in conjunction with FIGS. 27A-27J, and/or based on further accessing and/or executing this configuration data to implement some or all functionality of the given node 37 of FIG. 25E as part of its database functionality accordingly. Performance of some or all features and/or functionality of FIG. 25E can optionally change and/or be updated over time based on the system metadata applied across the plurality of nodes 37 being updated over time and/or based on nodes on updating their configuration data stored in local memory to reflect changes in the system metadata based on receiving data indicating these changes to the system metadata.

Figure 26A:
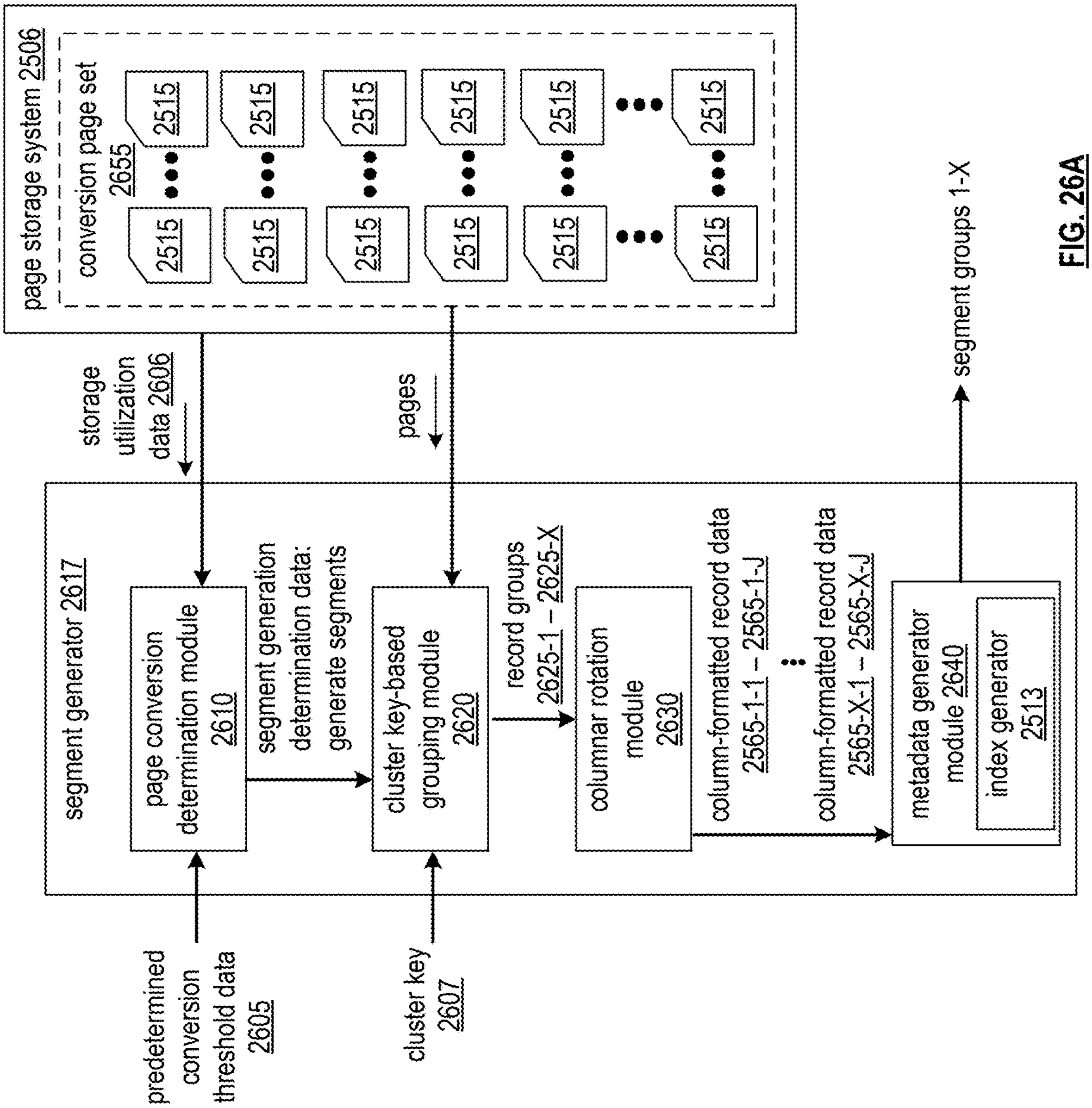
FIG. 26A is a schematic block diagram of a segment generator of a record processing and storage system in accordance with various embodiments.

FIG. 26A illustrates an example embodiment of a segment generator 2617. The segment generator 2617 of FIG. 26A can be utilized to implement the segment generator 2617 of FIG. 25A, can be utilized to implement each segment generator 2617 of each loading module 2510 of FIG. 25B, and/or can be utilized to implement any embodiments of segment generator 2617 described herein.

As discussed previously, the record processing and storage system 2505 can be operable to delay the conversion of pages into segments. Rather than frequently clustering rows and converting rows into column format, movement and/or processing of rows can be minimized by delaying the clustering and conversion process required to generate segments 2424, for example, as long as possible. This delaying of the conversion process "as long as possible" can be bounded by resource availability, such as disk and/or memory capacity of the record processing and storage system 2505. In particular, the conversion process can be delayed to accumulate as many pages in the page storage system 2506 that page storage system 2506 is capable of storing.

Maximizing the delay until pages are processed as enabled by storage resources of the record processing and storage system 2505 improves the technology of database systems by improving query efficiency. In particular, delaying the decision of which rows to group together into segments as long as possible increased the chances of having many records with common cluster keys to group together, as cluster key-based groups are formed from a largest possible set of records. These more favorable levels of clustering enable queries to be performed more efficiently as discussed previously. For example, rows that need be accessed in a given query as dictated by filtering parameters of the query are more likely to be stored together, and fewer segments and/or memory locations need to be accessed.

Maximizing the delay until pages are processed as enabled by storage resources of the record processing and storage system 2505 improves the technology of database systems by improving data ingress efficiency. By placing rows directly into pages without regard for clustering as they are received, this delayed approach minimizes the number of times a row "moves" through the system, such as from disk, to memory, and/or through the processor. In particular, by delaying all clustering until segment generation for the received rows all at once, the rows are moved exactly once, to their final resting place as a segment 2424. This conserves resources of the record processing and storage system 2505, enabling higher rates of records to be received and processed for storage via data sources 2501 and thus enabling a richer, denser database to be generated over time. For example, this can enable the record processing and storage system 2505 to effectively process incoming records at a scale of terabits per second.

This delay can be accomplished via a page conversion determination module 2610 implemented by the segment generator 2617 and/or implemented via other processing resources of the record processing and storage system 2505. The page conversion determination module 2610 can be utilized to generate segment generation determination data indicating whether the conversion process of pages into segments should be commenced at a given time. For example, the page conversion determination module 2610 generates an interrupt or notification that includes the generate segment generation determination data indicating it is time to generate segments based on determining to generate segments at the given time. The page conversion determination module 2610 can otherwise trigger the commencement of converting pages into segments once it deems the conversion process appropriate, for example, based on delaying as long as possible. The segment generator 2617 can commence the conversion process accordingly in response to the segment generation determination data indicating it is time to generate segments, for example, via a cluster key-based grouping module 2620, a columnar rotation module 2630, and/or a metadata generator module 2640.

In some cases, the page conversion determination module 2610 optionally generates some segment generation determination data indicating it is not yet time to generate segments. In some embodiments, this information may not be communicated if it is determined that is not yet time to generate segments, where only notifications instructing the conversion process be commenced is communicated to initiate the process via cluster key-based grouping module 2620, a columnar rotation module 2630, and/or a metadata generator module 2640.

The page conversion determination module 2610 can generate segment generation determination data: in predetermined intervals; in accordance with a schedule; in response to determining a new page has been generated and stored in page storage system 2506; in response determining at least a threshold number of new pages have been generated and stored in page storage system 2506; in response to determining the storage space and/or memory utilization of page storage system 2506 has changed; in response to determining the total storage capacity of page storage system 2506 has changed; in response to determining at least one memory drive of the page storage system 2506 has failed or gone offline; in response to receiving storage utilization data from page storage system 2506; based on instruction supplied via user input, for example, via administration sub-system 15 and/or configuration sub-system 16; based on receiving a request; and/or based on another determination.

The page conversion determination module 2610 can generate its segment generation determination data based on comparing storage utilization data 2606 to predetermined conversion threshold data 2605. The storage utilization data can optionally be generated by the page storage system 2506. The record processing and storage system 2505 can indicate and/or be based on one or more storage utilization metrics indicating: an amount and/or percentage of storage resources of the page storage system 2506 that are currently being utilized to store pages 2515; an amount and/or percentage of available resources of the page storage system 2506 that are not currently being utilized to store pages 2515; a number of pages 2515 currently stored by the page storage system 2506; a data size, such as a number of bytes, of the set of pages 2515 currently stored by the page storage system 2506; an expected amount of time until storage resources of the page storage system 2506 are expected to become fully utilized for page storage based on current and/or historical data rates of record streams 1-L; current health data and/or failure data of storage resources of the page storage system 2506; an amount of time since the last conversion process was initiated and/or was completed; and/or other information regarding the storage utilization of the page storage system 2506.

In some cases, the storage utilization data 2606 can relate specifically to storage utilization of a page cache 2512 of a loading module 2510 of FIG. 25B, where the segment generator 2617 of FIG. 26A is implemented by the corresponding loading module 2510 and where the segment generator 2617 of FIG. 26A is operable to perform the conversion process only upon pages 2515 in the page cache 2512. In some cases, the storage utilization data 2606 can relate specifically to storage utilization across all page caches 2512 of all loading modules 2510-1-2510-N, where the page conversion determination module 2610 of FIG. 26A is implemented to dictate whether the conversion process be commenced across all corresponding loading modules 2510. In some cases, the storage utilization data 2606 can alternatively or additionally include storage utilization of page storage 2546 of one or more of the long term storage 2540-1-2540-J of FIG. 25B. The storage utilization data 2606 can relate to any combination of storage resources of page storage system 2506 as discussed in conjunction with FIG. 25D that are utilized to store a particular set of pages to be converted into segments in tandem via the conversion process performed by segment generator 2617.

The storage utilization data 2606 can be sent to and/or requested by the segment generator 2617: in predefined intervals; in accordance with scheduling data; based on the page conversion determination module 2610 determining to generate the segment generation determination data; based on a determination, notification, and/or instruction that the page conversion determination module 2610 should generate the segment generation determination data; and/or based on another determination. In some cases, some or all of the page conversion determination module 2610 is implemented via processing resources and/or memory resources of the page storage system 2506, for example, to enable the page conversion determination module 2610 to monitor and/or measure the storage utilization data 2606 of its own resources included in page storage system 2506.

The predetermined conversion threshold data 2605 can indicate one or more threshold metrics or other threshold conditions that, when met by one or more corresponding metrics of the storage utilization data 2606 at a given time, trigger the commencement of the conversion process. In particular, the page conversion determination module generates the segment generation determination data indicating that segments be generated when the at least one metric of the storage utilization data 2606 meets the threshold metrics and/or conditions of the predetermined conversion threshold data 2605 and/or otherwise compares favorably to a condition for page conversion indicated by the predetermined conversion threshold data 2605. If the none of the metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, the page conversion determination module generates the segment generation determination data indicating that segments be generated only when at least a predetermined threshold number of metrics of the storage utilization data 2606 compare favorably to the corresponding threshold metrics of the predetermined conversion threshold data 2605. In such cases, if less than the predetermined threshold number of metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, there is only one metric in the storage utilization data 2606 that is compared to a corresponding metric of the predetermined conversion threshold data 2605, and the page conversion determination module generates the segment generation determination data when the metric in the storage utilization data 2606 meets or otherwise compares favorably to the corresponding metric of the predetermined conversion threshold data 2605.

As used herein, the storage utilization data 2606 compares favorably to the predetermined conversion threshold data 2605 when the conditions indicated in the predetermined conversion threshold data 2605 that dictate the conversion process be initiated are met by corresponding metrics of the storage utilization data 2606. As used herein, the storage utilization data 2606 compares unfavorably to the predetermined conversion threshold data 2605 when the conditions indicated in the predetermined conversion threshold data 2605 that dictate the conversion process be initiated are not met by corresponding metrics of the storage utilization data 2606. In some embodiments, the page conversion determination module 2610 generates the segment generation determination data indicating that segments be generated and/or otherwise indicating that the conversion process be initiated only when the storage utilization data 2606 compares favorably to the predetermined conversion threshold data 2605.

The predetermined conversion threshold data 2605 can indicate one or more conditions that trigger the conversion process such as: a total memory capacity of page storage system 2506; a threshold maximum amount and/or percentage of storage resources of the page storage system 2506 that can be utilized to store pages 2515; a threshold minimum amount and/or percentage of resources page storage system that must remain available; a threshold minimum number of pages 2515 that must be included in the set of pages for conversion; a threshold maximum number of pages 2515 that can be converted in a single conversion process; a threshold maximum and/or threshold a data size of the set of pages that can be converted in a single conversion process; a threshold minimum amount of time that storage resources of the page storage system can be expected to become fully utilized for page storage based on current and/or historical data rates of record streams 1-L; threshold requirements for health data and/or failure data of storage resources of the page storage system 2506; a threshold minimum and/or threshold maximum amount of time at which a new conversion process must commence since the last conversion process was initiated and/or was completed; and/or other information regarding the requirements and/or conditions for initiation of the conversion process.

The predetermined conversion threshold data 2605 can be received and/or configured based on user input, for example, via administrative sub-system 15 and/or via configuration sub-system 16. The predetermined conversion threshold data 2605 can alternatively or additionally be determined automatically by the record processing and storage system 2505. For example, the predetermined conversion threshold data 2605 can be determined automatically to indicate and/or be based on determining a threshold memory capacity of the page storage system 2506; based on determining a threshold amount of bytes worth of pages 2515 the page storage system 2506 can store; and/or based on determining a threshold expected and/or average amount of time that pages can be generated and stored in the page storage system 2506 by the page generator 2511 until the page storage system 2506 becomes full. Note that these thresholds can be automatically buffered to account for a threshold percentage of drive failures, a historical expected rate of drive failures, a threshold amount of additional pages data that may be stored in communication lag since the storage utilization data 2606 was sent, a threshold amount of additional pages data that may be stored in processing lag to perform some or all of the conversion process, and/or other buffering to ensure that segment generation is completed before page storage system 2506 reaches its capacity.

As another example, the predetermined conversion threshold data 2605 can be determined automatically based on determining a sufficient number of records 2422 and/or a sufficient number of pages 2515 that can achieve sufficiently favorable levels of clustering. For example, this can be based on tracking and/or measuring clustering metrics for records in previous iterations of the conversion process and/or based on analysis of the measuring clustering metrics for records in previous iterations of the process to determine and/or estimate these thresholds. The storage utilization data 2606 can also be measured and/or tracked for each of this plurality of previous conversion processes to determine average and/or estimated storage utilization metrics that rendered conversion processes with favorable levels of clustering based on the corresponding clustering metrics measured for these previous conversion processes.

The clustering metrics can be based on a total or average number and/or proportion of records in each segment that: match cluster key of at least a threshold proportion of other records in the segment, are within a threshold vector distance and/or other similarity measure from at least a threshold number of other records in the segment. The clustering metrics can alternatively or additionally be based on an average and/or total number of segments whose records have a variance and/or standard deviation of their cluster key values that compare favorably to a threshold. The clustering metrics can alternatively or additionally be determined in accordance with any other similarity metrics and/or clustering algorithms.

Once the page conversion determination module 2610 generates segment generation determination data indicating that segments be generated via the conversion process, the segment generator 2617 can initiate the process of generating stored pages into segments. This can include identifying the pages for conversion in the conversion process. For example, all pages currently stored by the page storage system 2506 and awaiting their conversion into segments 2424 at the time when segment generation determination data is generated to indicating that the conversion process commence are identified for conversion. This set of pages can constitute a conversion page set 2655, where only the set of pages identified for conversion in the conversion page set 2655 are processed by segment generator 2617 for a given conversion process. For example, the record processing and storage system 2505 may continue to receive records from data sources 2501, and rather than buffering all of these records until after this conversion process is completed, additional pages can be generated at this time for storage in page storage system 2506. However, as processing of pages into segments has already commenced, these pages may not be clustered and converted during this conversion process, and can await their conversion in the next iteration of the conversion process. As another example, the page storage system 2506 may still be storing some other pages that were previously converted into segments but were not yet deleted. These pages are similarly not included in the conversion page set 2655 because their records are already included in segments via the prior conversion.

Figure 26B:
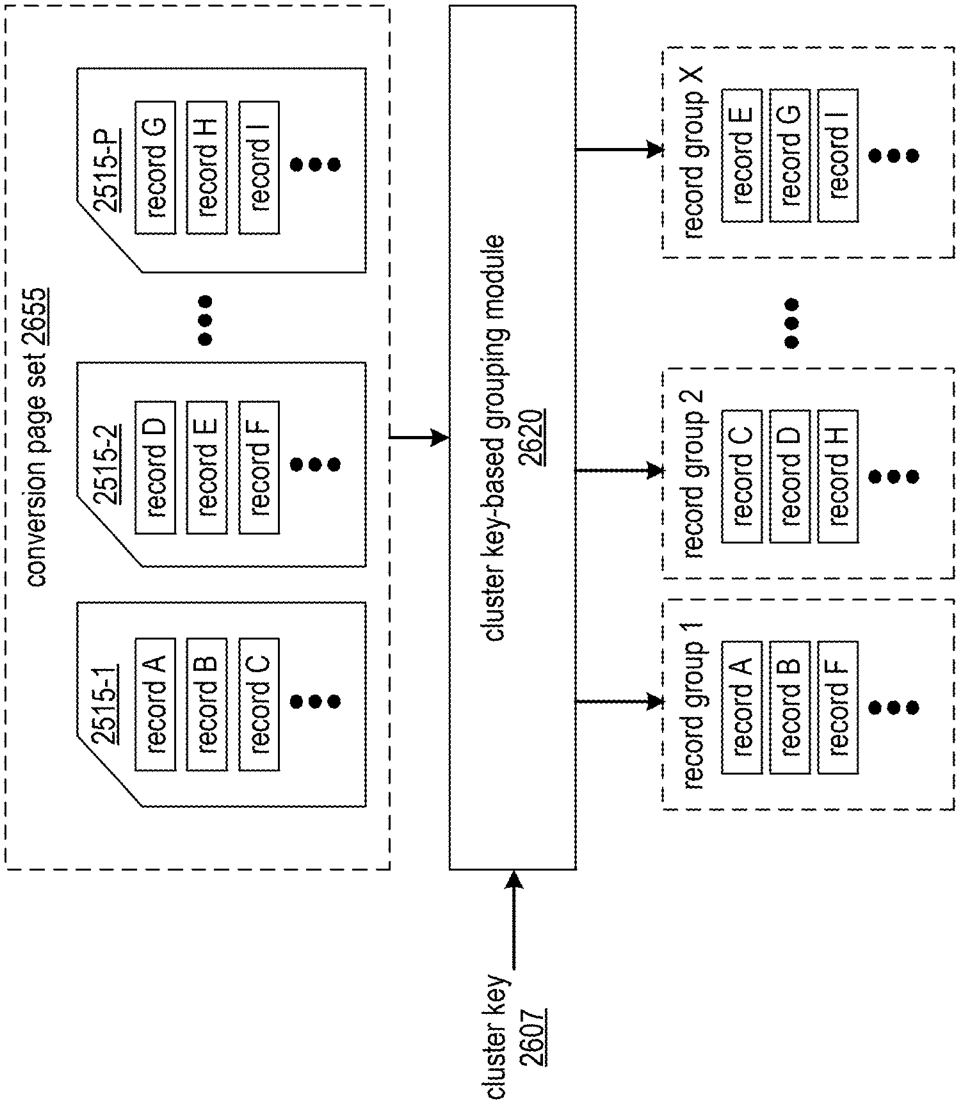
FIG. 26B is a schematic block diagram of a cluster key-based grouping module of a segment generator in accordance with various embodiments.

The segment generator can implement a cluster key-based grouping module 2620 to generate a plurality of record groups 2625-1-2625-X from the plurality of records 2422 included in the conversion page set 2655. The cluster key-based grouping module 2620 can receive and/or determine a cluster key 2607, which can be automatically determined by the cluster key-based grouping module 2620, can be stored in memory, can be received from another computing device, and/or can be configured via user input. The cluster key can indicate one or more columns, such as the key column(s) of FIGS. 18-22, by which the records are to be sorted and segregated into the record groups. For example, the plurality of records 2422 included in the conversion page set 2655 are sorted and/or grouped by cluster key, where records 2422 with matching cluster keys and/or similar cluster keys are grouped together in the resulting record groups 2625-1-2625-X. The record groups 2625-1-2625-X can be a fixed size, or can be dynamic in size, for example, based on including only records that have matching and/or similar cluster keys. An example of generating the record groups 2625-1-2625-X via the cluster key-based grouping module 2620 is illustrated in FIG. 26B.

The records 2422 of each record group in the set of record groups 2625-1-2625-X generated by the cluster key-based grouping module 2620 are ultimately included in one segment 2424 of a corresponding segment group in the set of segment groups 1-X generated by the segment generator 1-X. For example, segment group 1 includes a set of segments 2424-1-2424-J that include the records 2422 from record groups 2625-1, segment group 2 includes another set of segments 2424-1-2424-J that include the records 2422 from record groups 2625-2, and so on. The identified record groups 2625-1-2625-X can be converted into segments in a same or similar fashion as discussed in conjunction with FIGS. 18-23.

The record groups are processed into segments via a columnar rotation module 2630 of the segment generator 2617. Once the plurality of record groups 2625-1-2625-X are formed, the columnar rotation module 2630 can be implemented to generate column-formatted record data 2565 for each record group 2625. For example, the records 2422 of each record group are extracted from pages 2515 as row-formatted data. In particular, the records 2422 can be received from data sources 2501 as row-formatted data and/or can be stored in pages 2515 as row-formatted data. All records 2422 in the same record group 2625 are converted into column-formatted row data 2565 in accordance with a column-based format, for example, by performing a columnar rotation of the row-formatted data of the records 2422 in the given record group 2625. The column-formatted row data 2565 generated for a given record group 2625 can be divided into a set of column-formatted row data 2565-1-2565-J, for example, where the column-formatted row data 2565 is redundancy storage error encoded by the segment generator 2617 as discussed previously, and where each column-formatted row data 2565-1-2565-J is included in a corresponding segment of a set of J segments 2424 of a segment group 2622.

The final segments can be formed from the column-formatted row data 2565 to include metadata generated via a metadata generator module 2640. The metadata generator module 2640 can be operable to generate the manifest section, statistics section, and/or the set of index sections 0-x for each segment as illustrated in FIG. 23. The metadata generator module 2640 can generate the index data 2518 for each segment 2424 by utilizing the same or different index generator 2513 of FIG. 25B, where index data 2518 generated for segments 2424 via the metadata generator module 2640 is the same as or similar to the index data 2516 generated for pages as discussed in conjunction with FIG. 25B. The column-formatted row data 2565 and its metadata generated via metadata generator module 2640 can be combined to form a final corresponding segment 2424.

Some or all features and/or functionality of FIG. 26A can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 26A based on receiving and storing the system metadata in local memory of the at least one node 37 as configuration data, such as the configuration data discussed in conjunction with FIGS. 27A-27J, and/or based on further accessing and/or executing this configuration data to implement some or all functionality of segment generator 2617 and/or page storage system 2508 as part of its database functionality accordingly. Performance of some or all features and/or functionality of FIG. 26A can optionally change and/or be updated over time, and/or a set of nodes participating in executing some or all features and/or functionality of FIG. 26A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 26B illustrates an example embodiment of a cluster key-based grouping module 2620 implemented by segment generator 2617. This example serves to illustrate that the grouping of sets of records in pages does not necessarily correlate with the sets of records in the record groups generated by the cluster key-based grouping module 2620. In particular, in embodiments where the pages can be generated directly from sets of incoming records as they arrive without any initial clustering, the grouping of sets of records in pages may have no bearing on the record groups generated by the cluster key-based grouping module 2620 due to the timestamp and/or receipt time of various records not necessarily having a correlation with cluster key. The embodiment of cluster key-based grouping module 2620 of FIG. 26B can be utilized to implement the segment generator 2617 of FIG. 26A and/or any other embodiment of the segment generator 2617 discussed herein.

In this example, a plurality of P pages 2515-1-2515-P of conversion page set 2655 include records received from one or more sources over time up until the page conversion determination module 2610 dictated that conversion of this conversion page set 2655 commence. The plurality of records in pages 2515-1-2515-P can be considered an unordered set of pages to be clustered into record groups. Regardless of which pages these records may belong to, records are grouped into their record groups in accordance with cluster key. In this example, records of page 2515-1 are dispersed across at least record groups 1 and 2; records of page 2515-2 are dispersed across at least record groups 1, 2, and X, and records of page 2515-P are dispersed across at least record groups 2 and X.

The value of X can be: predetermined prior to clustering, can be the same or different for different conversion page sets 2655; can be determined based on a predetermined minimum and/or maximum number of records that are included per record group; can be determined based on a predetermined minimum and/or maximum data size per record group; can be determined based on each record group having a predetermined level of clustering, for example, in accordance with at least one clustering metric, and/or can be determined based on other information. In some cases, different record groups of the set of record groups 1-X can include different numbers of records, for example, based on maximizing a clustering metric across each record group.

For example, all records with a matching cluster key, such as having one or more columns corresponding to the cluster key with matching values, can be included in a same record group. As another example, a set of records having similar cluster keys can all be included in a same record group. As another example, if the value of the cluster key can be represented as a continuous variable, numeric variable, or other variable with an inherent ordering with respect to a cluster key domain, the cluster key domain can be subdivided into a plurality of discrete intervals. In such cases, a given record group, or a given set of record groups, can include records with cluster keys having values in the same discrete interval of the cluster key domain. As another example, a record group has cluster key values that are within a predefined distance from, or otherwise compare favorably to, an average cluster key value of cluster keys within the record group. In such cases, a Euclidian distance metric, another vector distance metric, and/or any other similarity and/or distance metric can be utilized to measure distance between cluster key values of the record group. In some cases, a clustering algorithm and/or an unsupervised machine learning model can be utilized to form record groups 1-X.

Some or all features and/or functionality of FIG. 26B can be performed via at least one node 37 in conjunction with system metadata, such as system metadata discussed in conjunction with FIGS. 27A-27J, applied across a plurality of nodes 37, for example, where at least one node 37 participates in some or all features and/or functionality of FIG. 26B based on receiving and storing the system metadata in local memory of the at least one node 37 as configuration data, such as the configuration data discussed in conjunction with FIGS. 27A-27J, and/or based on further accessing and/or executing this configuration data to implement some or all functionality of cluster key-based grouping module 2620 as part of its database functionality accordingly. Performance of some or all features and/or functionality of FIG. 26B can optionally change and/or be updated over time, and/or a set of nodes participating in executing some or all features and/or functionality of FIG. 26B can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time. FIGS. 27A-27H present embodiment of a database system 10 that facilitates updating of configuration data utilized by nodes to perform respective functionality over time via corresponding system metadata update processes 2705 in conjunction with an event driven model. Some or all features and/or functionality of the database system 10 of FIGS. 27A-27H can implement the database system 10 of FIG. 1, FIG. 24A, and/or FIG. 25A, and/or any other embodiment of database system 10 described herein.

Utilizing an event driven model for metadata delivery, for example, as presented in conjunction with FIGS. 27A-27H, can be favorable over other mechanisms of delivering metadata, such as polling driven models where each node periodically refreshes its local copy of system configuration, particularly in cases where the corresponding database system is implemented as a massive database system and/or grows larger and larger over time. In particular, sending the entire system configuration object across the wire with every metadata change can be more expensive as the size of a system grows. Larger systems, such as massive scale database systems, also tend to make changes more frequently, necessitating more frequent metadata changes. over other mechanisms of metadata delivery.

Implementing metadata delivery some or all features and/or functionality presented in conjunction with FIGS. 27A-27H can improve the technology of database systems by reducing the amount of data communicated in metadata updates and/or reducing the number of times updates are communicated, which can open up communications and/or processing resources for other database functionality, increasing database efficiency.

Implementing metadata delivery as an event driven model rather than a polling based model via some or all features and/or functionality presented in conjunction with FIGS. 27A-27H can improve the technology of database systems by ensuring that all nodes receive corresponding updates as they are generated. This can help ensure all nodes utilize consistent metadata at a given time, can enable updates to metadata more frequency, and/or can reduce the polling traffic required to ensure that updates are facilitated at a reasonable frequency.

Implementing metadata delivery some or all features and/or functionality presented in conjunction with FIGS. 27A-27H can further enable updates to system configuration even when the database is implemented as a massive scale database system, improving the technology of database systems by enabling large amounts of data to be processed and/or large numbers of queries to be executed as discussed previously. In particular, the functionality of a massive scale database system can be performed while ensuring that all participating nodes 37, for example, independently executing their own functionality as discussed herein, are operating in accordance with a same version of system-wide metadata, which can guarantee consistency across nodes to enable durable storage of data, query correctness in query execution, and/or other appropriate execution of some or all various database system functionality described herein.

In some embodiments, a system metadata update processes 2705 enabling such event driven metadata delivery can be implemented via a consensus protocol, such as a raft consensus protocol or any other consensus protocol. In some embodiments, the system metadata update processes 2705 is implemented in accordance with a metadata storage protocol, for example, where the metadata storage protocol is implemented as a raft state of a raft consensus protocol. This metadata storage protocol can be implemented via a plurality of corresponding hash maps, such as raft hash maps of the raft consensus protocol, where hash maps are implemented for each member variable of abase system object, for example, of corresponding system metadata and/or system configuration. This metadata storage protocol can be implemented via a system metadata management system 2702. Using raft hash maps in this fashion, for example, instead of repeated protocol buffer elements, can allows for faster access time by identifier.

Any embodiment of the consensus protocol described herein can be implemented via the raft consensus protocol, or any other consensus protocol. Any embodiment of the consensus protocol described herein can be based on distributing a state machine across a plurality of nodes, ensuring that each node in the cluster agrees upon the same series of state transitions and/or ensuring that each node operates in accordance with the currently agreed upon state transition.

In some embodiments, the database system defines and/or implements methods, such as custom functions, for converting the metadata storage protocol implemented as a raft state into a system object, such as a protocol buffer object, and/or vice versa. This can enable nodes to update their own system configuration as system metadata is communicated via the metadata storage protocol by performing at least one corresponding conversion function.

In some embodiments, the system metadata is updated over time via a plurality of sequential metadata updates. Each metadata update can have a corresponding metadata sequence number (MSN), which can be implemented as an atomically increasing integer that defines an order for a specific version of system configuration. Such embodiments are discussed in further detail in conjunction with FIG. 27C.

In some embodiments, on node startup, each node fetches the entire system configuration and MSN. A given node can use this configuration to bootstrap roles and protocols, for example, including a health role protocol relating to health role of the node and/or a system configuration subscription protocol relating to system configuration subscription of the node. Example initialization of a node to facilitate protocol startup is discussed in further detail in conjunction with FIG. 27D.

On protocol startup, a register node action can be executed, for example, against the metadata storage protocol. This can include utilizing the system configuration subscription protocol to execute this register node action. The execution of the register node action can include sending a registration request, for example, along with the given MSN utilized to initialize, to the metadata storage protocol and/or corresponding system metadata management system 2702. Example execution of such as register node action is discussed in conjunction with FIG. 27E.

The system metadata management system 2702, such as a corresponding metadata storage protocol node of the system metadata management system 2702 processing this register node action, can add the node to its subscriber registry accordingly, and/or can otherwise send further updates to this node accordingly. Example processing of such as register node action is discussed in conjunction with FIG. 27E.

If the MSN of this registration request is out of date, for example, meaning that some metadata change occurred between node startup and the register node action to the metadata storage protocol, a corresponding response can include a full copy of system configuration, for example that has the most up to date MSN and/or that is otherwise up to date. The corresponding node can update their system configuration accordingly to reflect this most up to date system metadata. AN example processing further updating system information for a new node is discussed in conjunction with FIGS. 27E and 27F.

The system metadata management system 2702 can execute metadata storage protocol leader methods, for example, in accordance with being implemented as a leader in a corresponding raft protocol. For example, a given metadata storage protocol node of the system metadata management system 2702 can be implemented via a metadata storage protocol leader node of the system metadata management system 2702 that executes such leader methods. Follower methods, such as raft follower methods generated for each of the raft state members, can coalesce all the modifications from the raft event into a notify system configuration change request. For example, a plurality of follower nodes subscribed to system metadata management system 2702, for example, in a subscriber registry of a corresponding leader node, can execute the follower methods. In some embodiments, follower event handling is auto-generated via macros. Each given leader node can notify all of its followers of these changes, and/or each subscribed node can apply the change onto its local copy of system configuration, ensuring consistency. On communications failure or node outage, nodes can automatically resubscribe to a different leader node. Example embodiments of implementing system metadata update processes via leader nodes and follower nodes are discussed in further detail in conjunction with FIGS. 27G-27I.

Figure 27A:
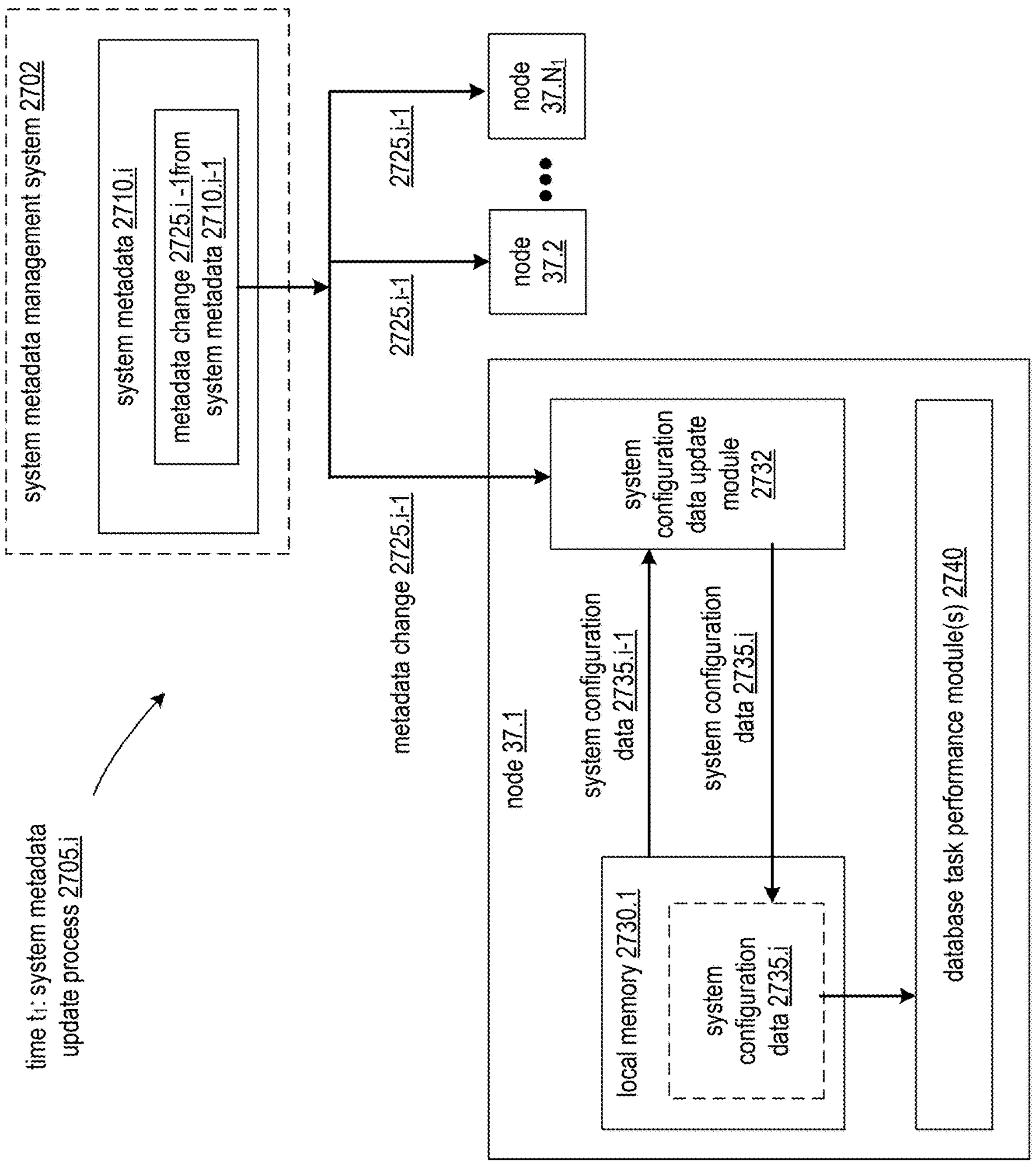
FIG. 27A is a schematic block diagrams of a database system that implements a system metadata update process to communicate system configuration updates for a plurality of nodes in accordance with various embodiments.

FIG. 27A presents an embodiment of a system metadata update process 2705 performed at a first time $t_1$. Some or all features and/or functionality of the system metadata update process 2705 of FIG. 27A can implement any embodiment of system metadata update process 2705 and/or any embodiment of communicating metadata updates and/or facilitating updating of corresponding system metadata described herein.

A metadata change 2725.*i*−1 from prior system metadata 2710.*i*−1 can be communicated to a plurality of nodes 37.1-27.N1 via a system metadata management system 2702, for example, that implements a corresponding metadata system protocol via a consensus protocol such as a raft consensus protocol. The transmitted data denoting this metadata change 2725.*i*−1 defining the corresponding system metadata 2710.*i* with respect to prior system metadata 2710.*i* can be substantially smaller than data denoting the full system metadata 2710.*i*.

In some embodiments, some or all of system metadata management system 2702 is implemented via the administrative processing sub-system 15 and/or the configuration sub-system 16. In some embodiments, some or all of system metadata management system 2702 is implemented as metadata cluster 2552 of FIG. 25B, for example, where one or more admins 2554 implemented the system metadata management system 2702 as one or more corresponding nodes 37.

Each node 37 can implement a system configuration data update module 2732 to update previously stored system configuration data 2735.*i*−1 as updated system configuration data 2735.*i*, for example, based on applying the received metadata change 2725.*i*−1 to the previously stored system configuration data 2735.*i*−1. This system configuration data 2735.*i* can be stored in corresponding local memory 2730 of the given node 37. The system configuration data update module 2732 can optionally update the given system configuration data 2735,*i*−1 as the new system configuration data 2735,*i*−1 based on performing a conversion method and/or other processing of the received metadata change 2725. For example, the system configuration data update module 2732 performs a conversion of the metadata change 2725 received as a raft state and/or other state data into a system object, such as some or all of a protocol buffer object, for storage as system configuration data 2735.

Transmitting only the metadata change 2725.*i*−1 can reduce the amount of data that need be communicated and processed by the database system 10 with every metadata update. Sending each update to corresponding nodes in accordance with an event driven model ensures all nodes can apply the update accordingly to reflect the corresponding system metadata 2710.*i*, for example, based on guaranteeing the node stores the prior version of corresponding system configuration data to which the corresponding metadata change can be applied.

The local memory 2730 of a given node 37 storing system configuration data 2735.*i* can be implemented by any memory resources accessible by a given node 37, such as some or all main memory 40. For example, some or all system configuration data 2735.*i* can be stored in a corresponding database operating system area 52 to implement a corresponding database operating system and/or corresponding database functionality. As another example, some or all system configuration data 2735.*i* can be stored in a corresponding computing device operating system area 57 to implement a corresponding computing device operating system and/or corresponding computing device functionality.

In some embodiments, a given computing device 18 implementing multiple nodes 37-1-37-*n*, for example, as illustrated in FIG. 14, can store the system configuration data 2735.*i* as some or all of computer operating system 60 to implement functionality of one or nodes 37 of the given computing device and/or as some or all of database overriding operating system 61 to implement corresponding functionality of one or nodes 37 of the given computing device. The system configuration data 2735.*i* can be communicated to some or all of a plurality of computing devices 18 of the database system 10 that each implement a subset of nodes of a full plurality of nodes of the database system 10. Nodes 37 of a same computing device 18 can implement shared local memories 2730 that utilize common memory resources of this computing device 18. Nodes 37 of a same computing device 18 can alternatively implement distinct local memories 2730 that utilize separate memory resources of this computing device 18.

The node can implement one or more database task performance modules 2740 to perform various database functionality in accordance with the given system configuration data 2735.*i*. This can include implementing the database task performance modules 2740 to access and/or executing the given system configuration data 2735.*i* to perform database functionality in accordance with this system configuration data 2735.*i*.

Performance of corresponding database functionality by a given node 37, configured by given system configuration data 2735.*i* can denote the corresponding node's such as assignment to participate in various query execution plans and/or assignment to perform tasks of other modules and/or systems of database system 10, and/or can denote functions and/or other means by which corresponding functionality is performed. Given system configuration data 2735.*i* can change the way a corresponding node performs one or more database functions and/or can change the node's assignment to tasks within the database system 10 from performance of database functionality as outlined in prior system configuration data 2735.*i*−1.

In some embodiments, one or more database task performance modules 2740 of a given node 37 can be implemented via one or more processing modules 44 and/or one or more processing core resources 48 of the given node 37. The database task performance modules 2740 can access and/or execute a corresponding operating system and/or other operational instructions stored in local memory 2730 as system configuration data 2735.*i*−1 via at least one processor of the one or more database task performance modules 2740. Execution of the corresponding operational instructions via the one or more database task performance modules 2740 can cause a given node to execute some or all functionality of nodes 37 as described herein, for example, in accordance with the current version of the system configuration data 2735.*i*.

In some embodiments, alternatively of or in addition to denoting executable instructions and/or operating system information, the system configuration data 2735 includes other system-wide metadata associated with the database system that need be synchronized across the plurality of nodes to enable the nodes to execute queries appropriately and/or to perform other functionality appropriately.

For example, the system metadata 2710 and/or corresponding system configuration data 2735 indicates a set of relational database tables stored in the database at a given time, such as their respective table names or other identifiers; their respective set of columns with corresponding column names, other column identifiers, and/or required datatypes, if applicable; which segments store these respective tables, which nodes store these respective segments, and/or which one or more columns are implemented as cluster keys for these respective segments; which tables and/or corresponding segments are durably stored, are available for access in query executions, and/or are assigned for access and/or rebuilding by particular nodes; and/or other information regarding storage of database tables. For example the system metadata indicates a new table is not visible, and/or otherwise not available for access, during a first time while the table is being loaded and/or stored as segments, for example, in conjunction with executing a corresponding Create Table As Select (CTAS) query, and is later updated to indicate this new table is visible, and/or otherwise available for query access, during a second time after the first time once all of the table has been loaded and/or durably stored in segments. Nodes 37 can access their system configuration data to determine whether received query requests can or cannot be executed, for example, based on whether they denote tables and/or columns that do not exist or are not yet visible, based on whether they denote operations to which the corresponding user has permissions to perform, and/or other reasons and/or requirements as denoted by the corresponding system metadata at the given time.

The corresponding system metadata 2710 can thus change over time as tables are added, deleted, and/or modified, for example: via storage of corresponding new data via record processing and storage system 2505, such as nodes 37 implementing corresponding loading modules 2510 and/or corresponding storage clusters, based on receiving this data from one or more data sources 2501; via execution of corresponding queries such as Create Table As Select (CTAS) queries or Insert queries by nodes 37 participating in query execution plans; and/or via execution of other requests for example, from external requesting entities 2912, Nodes 37 receiving and/or executing such data loading, query execution, an/or other requests can indicate these changes be reflected in subsequently updated metadata, for example, based on communicating with and/or being implemented as part of system metadata management system 2702 to generate corresponding metadata updates. For example, subsequent query requests denoting identifiers for new tables and/or tables previously not visible may have not been executable prior to the metadata being updated to reflect these changes, and are able to be executed once the system metadata is updated to reflect these changes. As another example, subsequent query requests denoting identifiers for tables and/or columns that have been removed may have been executable prior to the metadata being updated to reflect these deletions, and are not able to be executed once the system metadata is updated to reflect these deletions.

As another example, alternatively or in addition to storing data regarding relational database tables, the system metadata 2710 and/or corresponding system configuration data 2735 indicates information regarding permissions, such as permissions data regarding which users and/or other requesting entities can read data in various tables, can modify data in various tables, can add rows to various tables, and/or can generate new tables. This metadata can change over time as new users are added, removed, and/or have their permissions changed, for example, via execution of corresponding queries and/or other requests to database system 10, for example, from external requesting entities 2912. Nodes receiving and/or executing such queries and/or requests can indicate these changes be reflected in subsequently updated metadata, for example, based on communicating with and/or being implemented as part of system metadata management system 2702 to generate corresponding metadata updates.

Figure 27B:
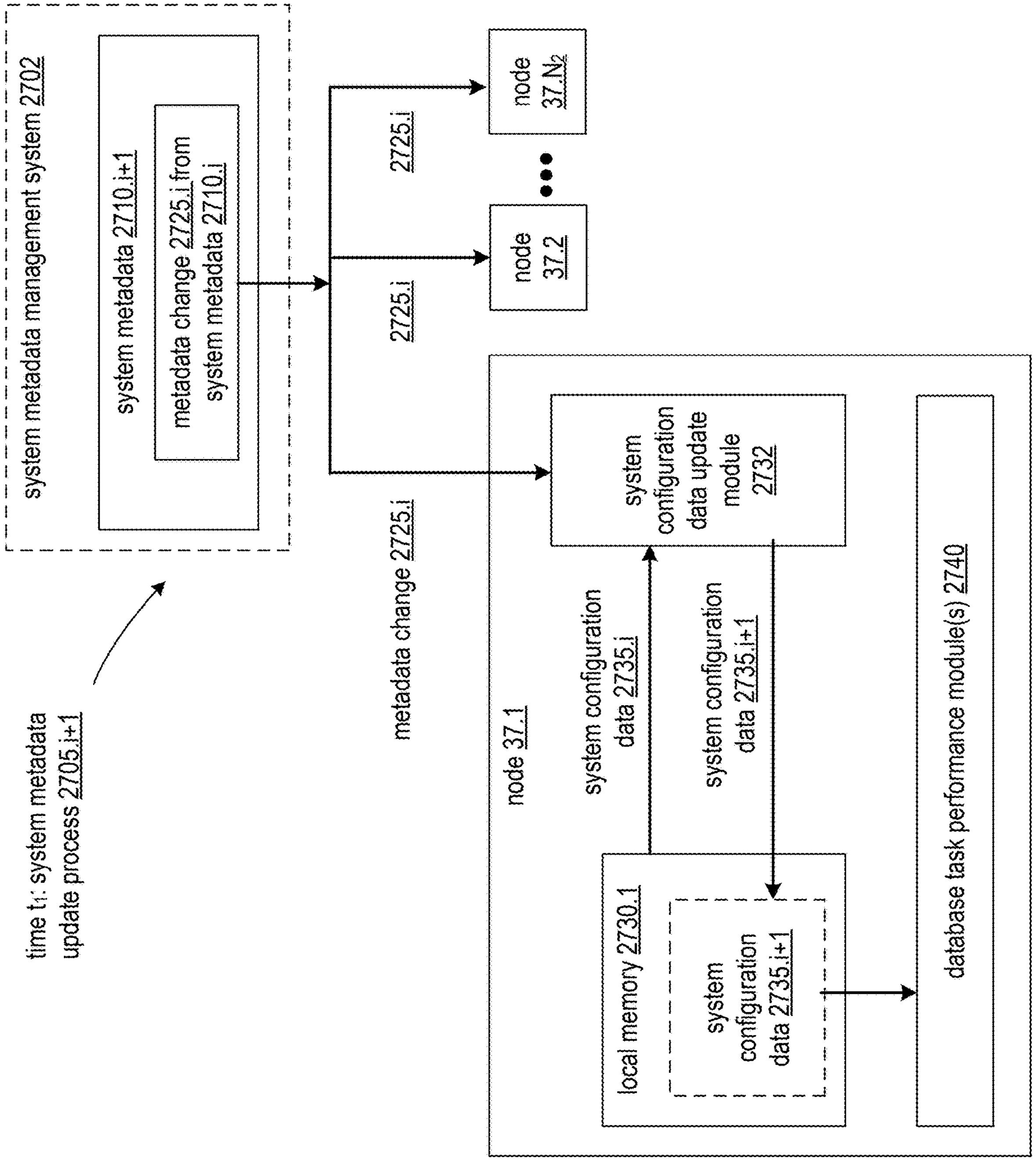
FIG. 27B is a schematic block diagrams of a database system that implements a subsequent system metadata update process to communicate further system configuration updates for a plurality of nodes in accordance with various embodiments.

FIG. 27B illustrates execution of a subsequent system metadata update process 2705.*i*+1, for example, at a time $t_2$ after time $t_1$ of FIG. 27A to further update the system metadata 2710.*i* to system metadata 2710.*i*+1 via a corresponding metadata change 2725.*i*. Some or all features and/or functionality of the database system 10 of FIG. 27B can implement the database system 10 of FIG. 27A, for example at a later time corresponding to a subsequent system metadata update process 2705.*i*+1 after the system metadata update process 2705.*i* of FIG. 27A. The execution of multiple system metadata update processes over time to update corresponding system configuration data over time across a plurality of nodes can implement any embodiment of communicating metadata updates and/or facilitating updating of corresponding system metadata described herein.

The system metadata 2710.*i*+1 can correspond to a version of system metadata 2710 consecutively after the system metadata 2710.*i*, where no other versions of system metadata were between these versions.

The corresponding metadata change 2725.*i* of system metadata 2710.*i*+1 can be communicated to nodes 37 via system metadata management system 2702 in a same or similar fashion as discussed in conjunction with FIG. 27A, where nodes 37 update their system configuration data in local memory accordingly as discussed in conjunction with FIG. 27A to facilitate corresponding updates to their performance of database tasks via database task performance modules 2740 as discussed in conjunction with FIG. 27A.

The set of nodes 37.1-37.$N_2$ of FIG. 27B can be the same or different set of nodes as the set of nodes 37.1-37.$N_1$ of FIG. 27A. For example, some or all of the plurality of nodes 37.1-37.$N_2$ of FIG. 27B are the same as nodes in the plurality of nodes 37.1-37.$N_1$ of FIG. 27A that previously updated system configuration data as system configuration data 2735.*i* via the system metadata update process 2705.*i* of FIG. 27A, that are further updating their system configuration data as system configuration data 2735.*i*+1 via the system metadata update process 2705.*i* of FIG. 27B.

In some embodiments, the plurality of nodes 37.1-37.$N_2$ of FIG. 27B include nodes that are different from nodes in the plurality of nodes 37.1-37.$N_1$ of FIG. 27A, or vice versa, based on new nodes having been added to the system between times $t_1$ and $t_2$, for example, based on the system expanding and/or new data being added to necessitate further nodes, based on a failed node being replaced with a new node, or other reasons. An example of a new node being added to the system is discussed in conjunction with FIGS. 27D-27F.

In some embodiments, the plurality of nodes 37.1-37.$N_2$ of FIG. 27B include nodes that are different from nodes in the plurality of nodes 37.1-37.$N_1$ of FIG. 27A, or vice versa, based on nodes having been removed from the system between times $t_1$ and $t_2$, for example, based on the node failing, ceasing communicating with the system metadata management system 2702, being reallocated elsewhere, becoming unavailable, and/or other reasons. An example of a failed node no longer participating in the system metadata update processes is discussed in further detail in conjunction with FIG. 27I.

Figure 27C:
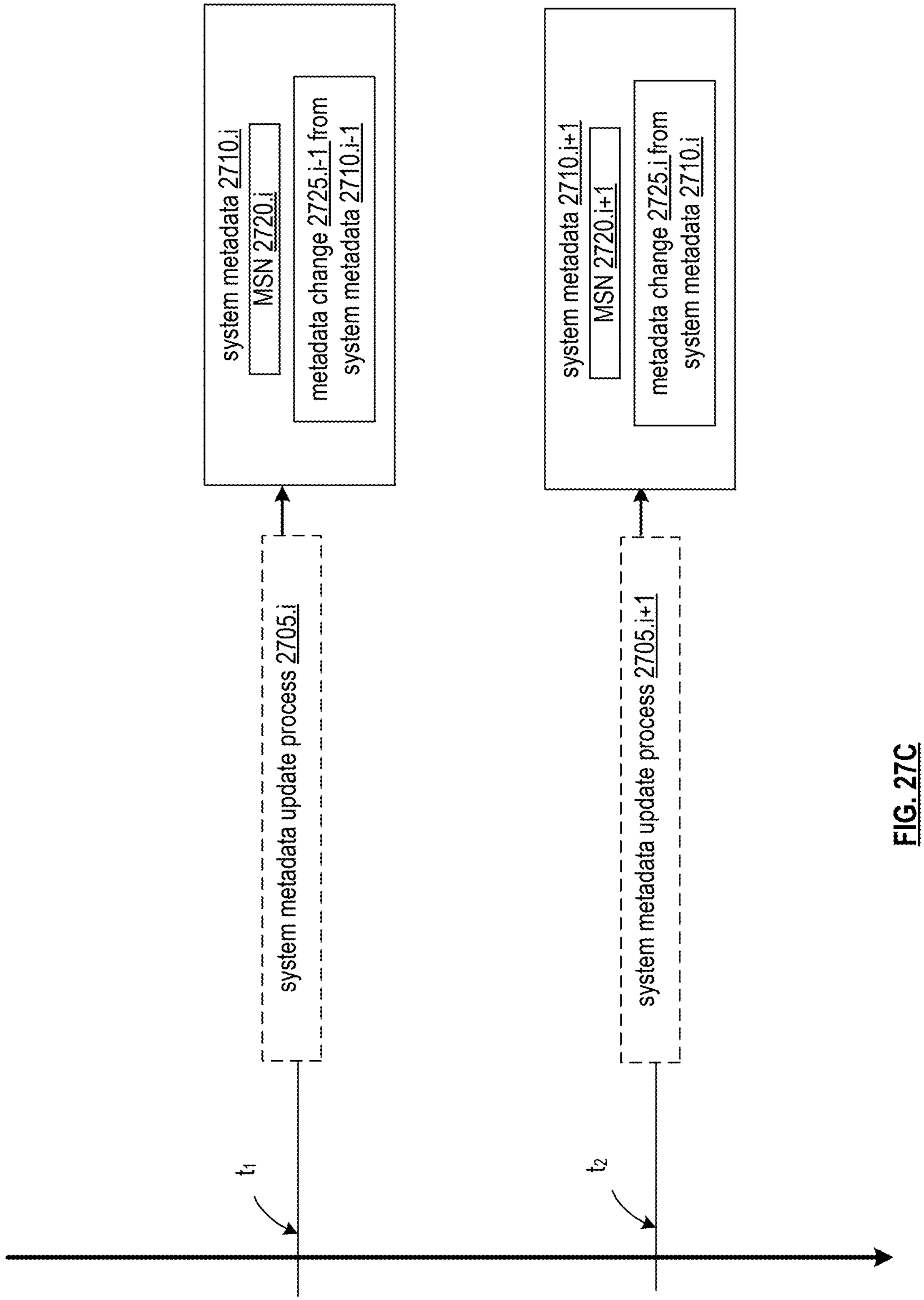
FIG. 27C illustrates a timeline of implement multiple system metadata update processes over time to communicate system metadata having different corresponding metadata sequence numbers in accordance with various embodiments.

FIG. 27C presents an example timeline of updating system metadata 2710 over time via multiple corresponding system metadata updated processes 2705. Some or all features and/or functionality of updating metadata via multiple system metadata updated processes 2705 can be utilized to implement the updating of system metadata from 2710.*i* to 2710.*i*+1 via system metadata updated processes 2705.*i* and 2705.*i*+1, respectively, at times $t_1$ and $t_2$ of FIGS. 27A and 27B.

Each system metadata 2710 can be tagged with a corresponding metadata sequence number (MSN) 2720. MSNs can be implemented as distinct values that increment serially, such as in fixed integer intervals of 1 or another number, or via other predetermined means which can be utilized to identify an ordering of corresponding system metadata 2710, which can be utilized to identify whether corresponding system metadata 2710 is up to date, and/or which can be utilized to identify an immediately prior and/or immediately subsequent system metadata 2710 of given system metadata 2710. While not illustrated in FIG. 27A, the corresponding MSN 2720.*i* can be received with and/or indicated by the metadata change 2725.*i*−1 communicated to nodes 37. While not illustrated in FIG. 27B, the corresponding MSN 2720.*i*+1 can be received with and/or indicated by the metadata change 2725.*i* communicated to nodes 37.

For example, upon receiving metadata change 2725.*i* with MSN 2720.*i*+1, nodes 37 can determine that this metadata change is for metadata immediately subsequent to the prior metadata 2710.*i*, and can thus determine that applying this metadata change to their stored system configuration data for metadata 2710.*i* with MSN 2020.*i* will render the appropriate system configuration data 2735.*i*+1 reflecting system metadata 2710.*i*+1. For example, this determination is based on MSN 2720.*i*+1 having an integer value that is exactly one greater than MSN 2720.*i* for the currently stored prior system configuration data, or is another predetermined interval greater than greater than MSN 2720.*i*. In some embodiments, if a newly received metadata change has an MSN 2720 that is more than or otherwise different from this expected increment from the most prior metadata change utilized to generate the currently stored system configuration data, a corresponding node can determine it is not up to date, and can optionally request a full version of the most recent system metadata 2710.

The system metadata management system 2702 can optionally store some or all prior versions of system metadata 2710 and/or can track some or all corresponding MSNs with this metadata. Alternatively, the system metadata management system 2702 only stores the most recent system metadata 2710 in conjunction with the most recent corresponding MSN.

In various embodiments, generation of system metadata 2710 over time with different corresponding MSNs can be implemented via any features and/or functionality of the generation of data ownership information over time with corresponding OSNs as disclosed by U.S. Utility application Ser. No. 16/778,194, entitled "SERVICING CONCURRENT QUERIES VIA VIRTUAL SEGMENT RECOVERY", filed Jan. 31, 2020, and issued as U.S. Pat. No. 11,061,910 on Jul. 13, 2021, which is hereby incorporated herein by reference in its entirety and made part of the present U.S. Utility Patent Application for all purposes. In some embodiments, the system metadata management system 2702 and/or a corresponding metadata system protocol can be implemented via a consensus protocols mediated via a plurality of nodes, for example, to update system metadata 2710, in a via any features and/or functionality of the execution of consensus protocols mediated via a plurality of nodes as disclosed by this U.S. Utility application Ser. No. 16/778,194. In some embodiments, each version of system metadata 2710 can assign nodes to different tasks and/or functionality via any features and/or functionality of assigning nodes to different segments for access in query execution in different versions of data ownership information as disclosed by this U.S. Utility application Ser. No. 16/778,194. In some embodiments, system metadata indicates a current version of data ownership information, where nodes utilize system metadata and corresponding system configuration data to determine their own ownership of segments for use in query execution accordingly, and/or to execute queries utilizing correct sets of segments accordingly, based on processing the denoted data ownership information as U.S. Utility application Ser. No. 16/778,194.

Figure 27D:
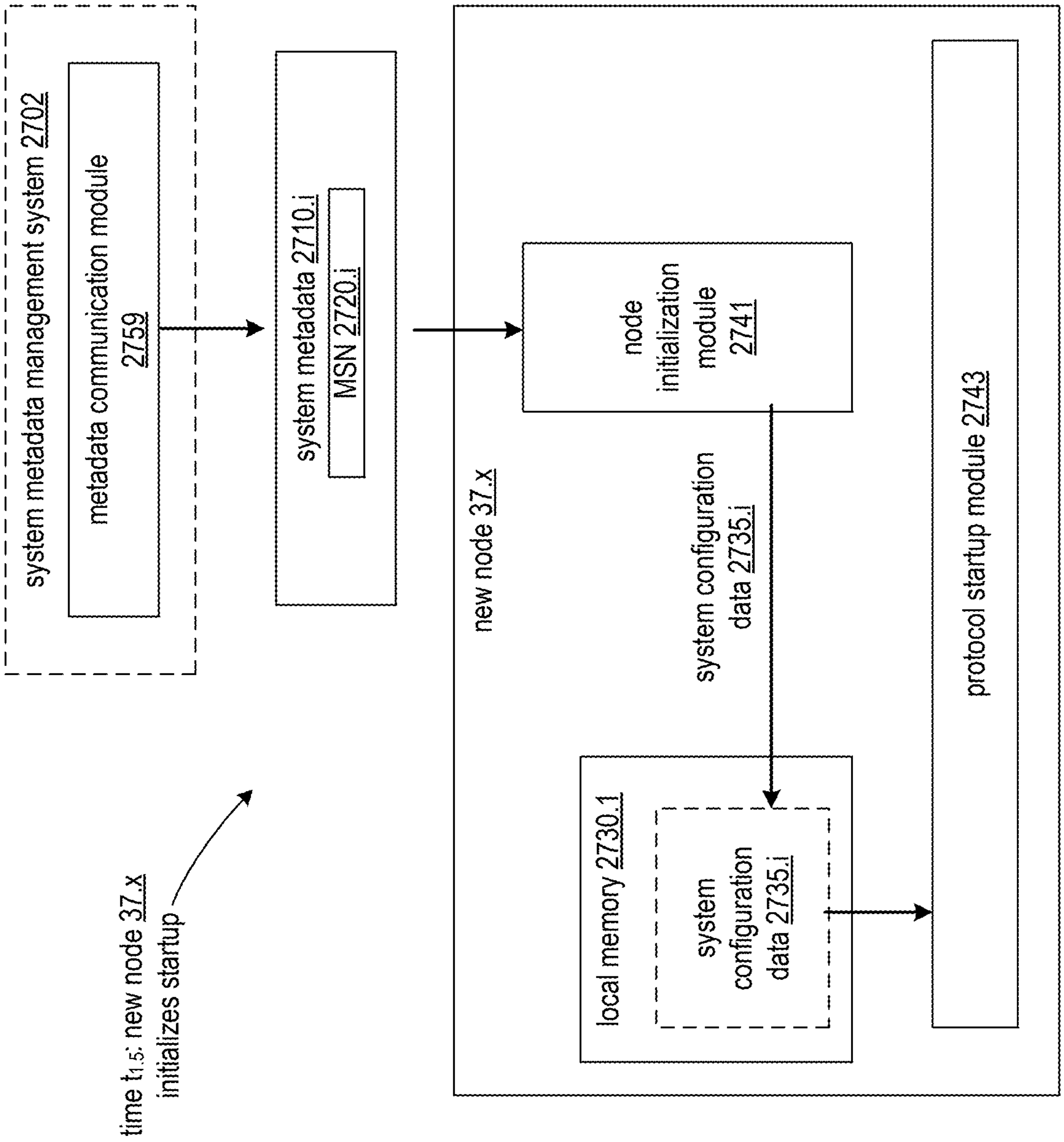
FIG. 27D is a schematic block diagram of an example database system when a new node of initializes a startup process in accordance with various embodiments.
Figure 27E:
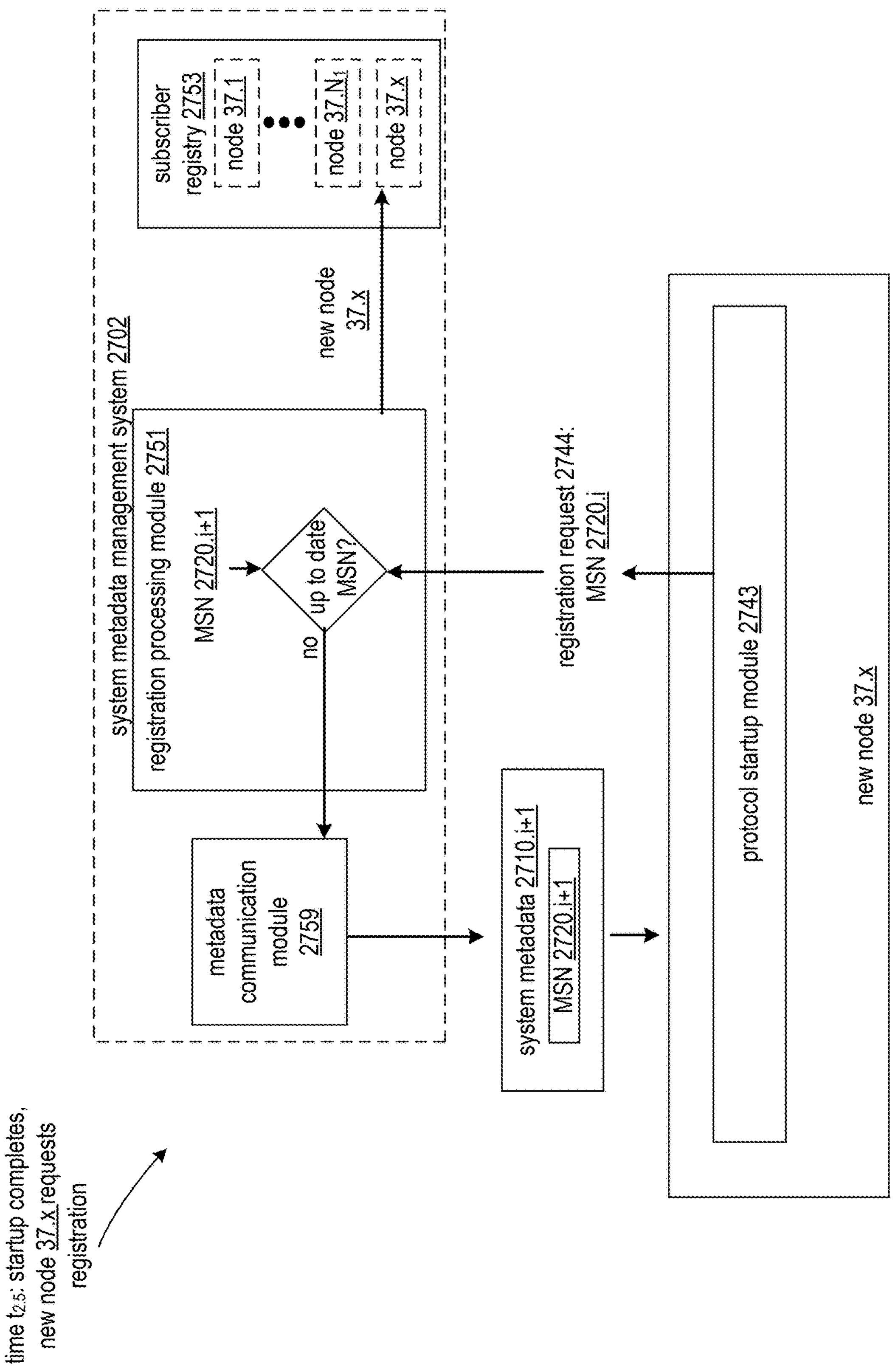
FIG. 27E is a schematic block diagram of an example database system when a new node of completes a startup process and requests registration in accordance with various embodiments.

FIGS. 27D-27F illustrate embodiments of a node 37.X being added to the database system 10 and configuring its system configuration data 2735 in accordance with the most recent system metadata 2710 accordingly based on communication with the system metadata management system 2702. Some or all features and/or functionality of node 37 of FIGS. 27D-27F can implement some or all of the plurality of nodes of FIG. 27A, for example, at previous times when they were added to the system, and/or can implement any embodiment of node 37 described herein. Some or all features and/or functionality of system metadata management system 2702 of FIGS. 27D-27F can implement the system metadata management system 2702 of FIG. 27A and/or any other embodiment of the system metadata management system 2702 described herein.

FIG. 27D illustrates a new node 37.*x* at a time $t_{1.5}$. This time $t_{1.5}$ is after time $t_1$ of FIGS. 27A and/or 27C and/or is before time $t_2$ of FIGS. 27B and/or 27C. This time $t_{1.5}$ can correspond to this new node 37.*x* initializing its startup. For example, the new node 37.*x* was not one of the plurality of nodes 37.1-37.N1 of FIG. 27A based on not yet been initialized as a new node of the system.

A node initialization module 2741 of the new node 37.*x* can receive the most recent system metadata 2710.*i* from the system metadata management system 2702. The system metadata management system 2702 can send full system metadata 2710.*i* accordingly, for example, based on the new node requesting the most recent system metadata 2710 from the system metadata management system 2702 and/or initiating communications with the system metadata management system 2702. The node can generate and store corresponding system configuration data 2735.*i* in its own local memory 2730 from this full system metadata 2710, for example, via implementing some or all features and/or functionality of system configuration data update module. However, rather than only receiving and applying a small change to existing metadata, the new node receives and stores the full system metadata based on not having any prior versions to work from as a new node.

The new node can utilize this stored system configuration data 2735.*i* to extract, bootstrap, and/or otherwise begin to implement corresponding protocols denoted in the stored system configuration data 2735.*i* via a protocol startup module 2743 of the new node 37.*x*.

FIG. 27E illustrates new node 37.*x* at a time $t_{2.5}$. This time $t_{2.5}$ can be after time $t_{1.5}$ of FIG. 27D and/or can also be after time $t_2$ of FIGS. 27B and/or 27C. This time $t_{2.5}$ can correspond to this new node 37.*x* sending a registration request 2744 in accordance with completing its startup, for example, initiated and performed as discussed in conjunction with FIG. 27D between times $t_{1.5}$ and $t_{2.5}$.

As illustrated in FIG. 27E, part of executing the protocol startup module can include sending a registration request 2744 to the system metadata management system 2702, for example, to facilitate subscribing to corresponding system metadata updates communicated by the system metadata management system 2710.

Based on receiving the corresponding registration request 2744, the system metadata management system 2702 implement a registration processing module 2751 that adds the new node 37.*x* to a subscriber registry 2753 maintained by the system metadata management system 2702, for example, in memory accessible by the system metadata management system 2702. For example, the system metadata management system 2702 sends metadata changes 2725 of FIGS. 27A-27B to a corresponding plurality of nodes that are subscribed in the corresponding subscriber registry 2753 maintained by the system metadata management system 2710. The registration request 2744 can indicate a node identifier and/or communication address and/or data denoting the node and/or means of communicating with this node, and the subscriber registry 2753 can denote this data and/or otherwise enable the new node 37 to receive future metadata changes 2725 communicated by the system metadata management system 2702.

In this example, because this registration request is not received until time $t_{2.5}$ after time $t_2$, the metadata change 2725.*i* for system metadata 2710.*i*+1 communicated by the system metadata management system 2702 at time $t_2$ as discussed in conjunction with FIGS. 27B and/or 27C is not received by the node 37.*x*, for example, due to not yet being denoted in the subscriber registry 2753 at this time $t_2$, wherein node 37.*x* is thus not included in the plurality of nodes 37.1-27.$N_2$ of FIG. 27B. To anticipate issues with new nodes missing updates to system metadata based on their protocol startup process not elapsing until after one or more metadata updates have communicated and sent by the system for implementation by nodes 37, for example, due to metadata updates occurring frequently as a result of the system being implemented as a massive scale database system 10, the registration processing module 2751 can further determine whether the new node is up to date, for example, based on the registration request 2744 sent by the node 37 denoting the MSN 2720 of its current system configuration data 2735 stored upon initializing of FIG. 27D, in this case MSN 2720.*i*, and/or based on the registration processing module 2751 comparing the MSN 2720 received in the registration request 2744 with the MSN 2720 of the current version of the system metadata 2710, in this case MSN 2720.*i*+1.

As these MSNs do not match in this example, the registration processing module 2751 can implement metadata communication module to send the most recent system metadata 2710.*i*+1 to the new node. For example, a full version of the current system metadata 2710 is again sent and processed by the new node in a same or similar fashion as discussed in conjunction with FIG. 27D. Sending a full version rather than a metadata change can be preferred, despite the larger volume of data being sent, as many changes to system metadata may have occurred since the new node initialized, and thus simply sending the most recent metadata change would not be sufficient in such cases. In some embodiments, in cases where the node is only one version behind, such as the case in the example of FIG. 27E, the system metadata management system 2702 only sends the corresponding metadata update 2725.*i*.

In other cases, when the registration processing module 2751 processes a registration request 2744 sent by a new node 37 denoting the MSN 2720 of its current system configuration data 2735 stored upon initializing, and determines this received MSN 2720 matches the MSN 2720 MSN 2720 of the current version of the system metadata 2710 based on no new updates occurring since this new node initialized in performing its protocol startup, the current system metadata 2710 need not be sent to the new node, for example, as the new node is already up to date in this case.

FIG. 27F illustrates new node 37.*x* at a time $t_{2.7}$. This time $t_{2.7}$ can be after time $t_{2.5}$ of FIGS. 27E. This time $t_{2.7}$ can correspond to this new node 37.*x* receiving the response to the registration request 2744 of FIG. 27E denoting the current system metadata 2710.*i*+1 and updating its system configuration data 2735 accordingly via a registration response processing module 2745 as system configuration data 2735.*i*+1. Protocol startup module 2743 can be implemented to perform any further protocol and/or implement any changes from the system configuration data 2735.*i* to finalize startup in accordance with the current system metadata accordingly. The new node 37.*x* can begin performing functionality via database task performance modules 2740 accordingly based on completing startup. The new node 37.*x* can receive_subsequent updates to this system configuration data 2735.*i*+1, such as a next metadata change 2725.*i*+1 from the current system metadata 2710.*i*+1 denoting a next version of system metadata system metadata 2710.*i*+2, for example, sent at a time $t_3$ after time $t_{2.7}$ by the system metadata management system 2702 based on the new node 37.*x* being included in the subscriber registry 2753 and based on the system metadata management system 2702 sending the next metadata change 2725.*i*+1 to all of a plurality of nodes 37.1-37.$N_3$ that includes node 37.*x*, for example, all indicated by subscriber registry 2753.

In other embodiments, rather than the system metadata management system 2702 adding the new node to the subscriber registry when its metadata is not up to data as determined in FIG. 37E, the new node sends another registration request to the system metadata management system 2702 after the new node applies the current system metadata 2710.*i*+1, where the metadata management system 2702 again determines whether the new node is up to data or if further metadata updates incurred while the node was applying the current metadata. For example, this process repeats, where the new node sends registration requests and the system metadata management system 2702 sends the most recent system metadata 2710 to be applied by the node, until the new node's registration request indicates an MSN that is up to date with the current MSN, where the node is only added to the subscriber registry 2753 at this time, based on being determined to be up to date and thus capable of applying subsequent metadata changes 2725 appropriately.

Figure 27G:
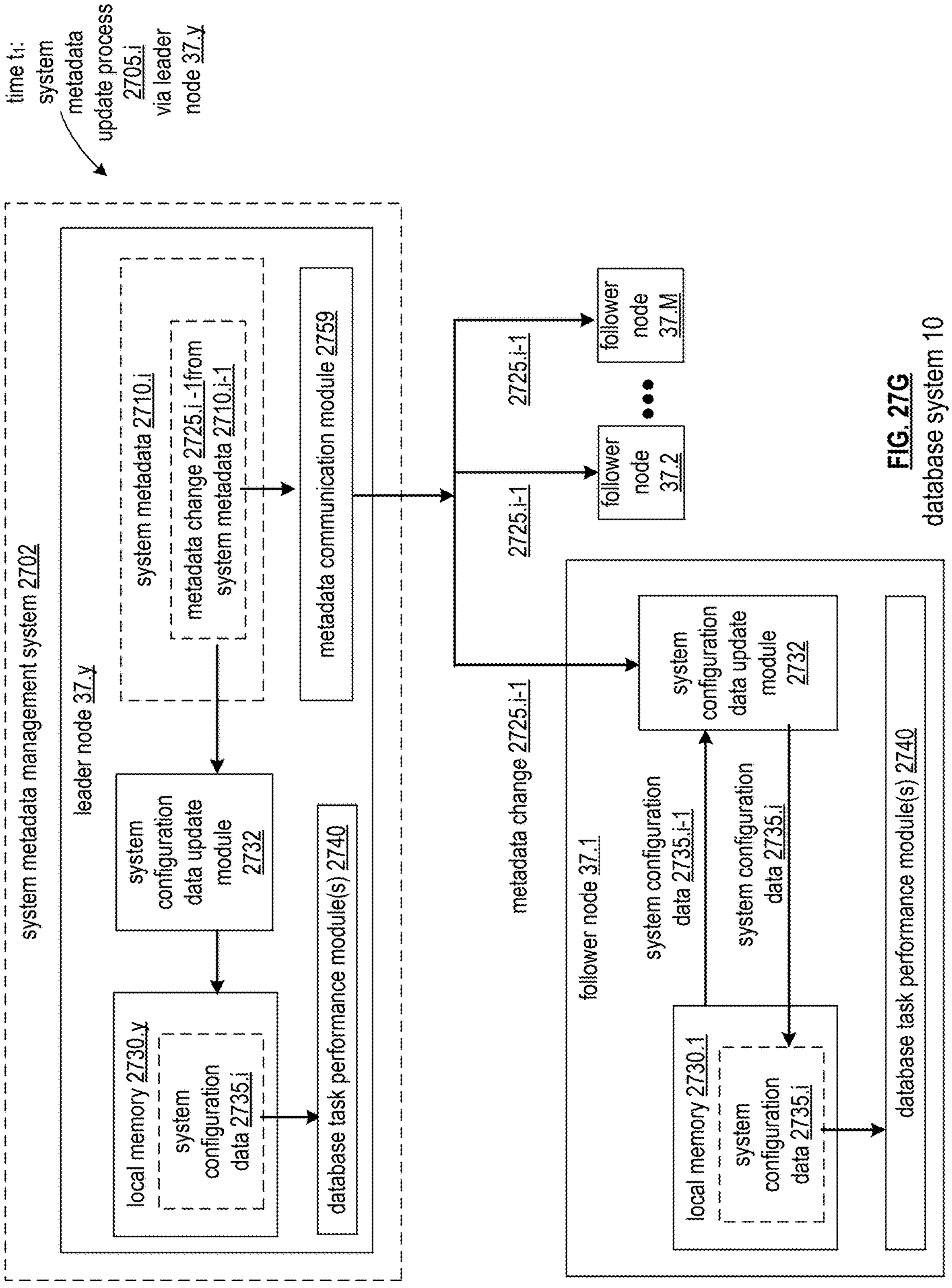
FIG. 27G is a schematic block diagram of an example database system that implements a leader node that communicates a metadata change to a plurality of follower nodes in accordance with various embodiments.
Figure 27H:
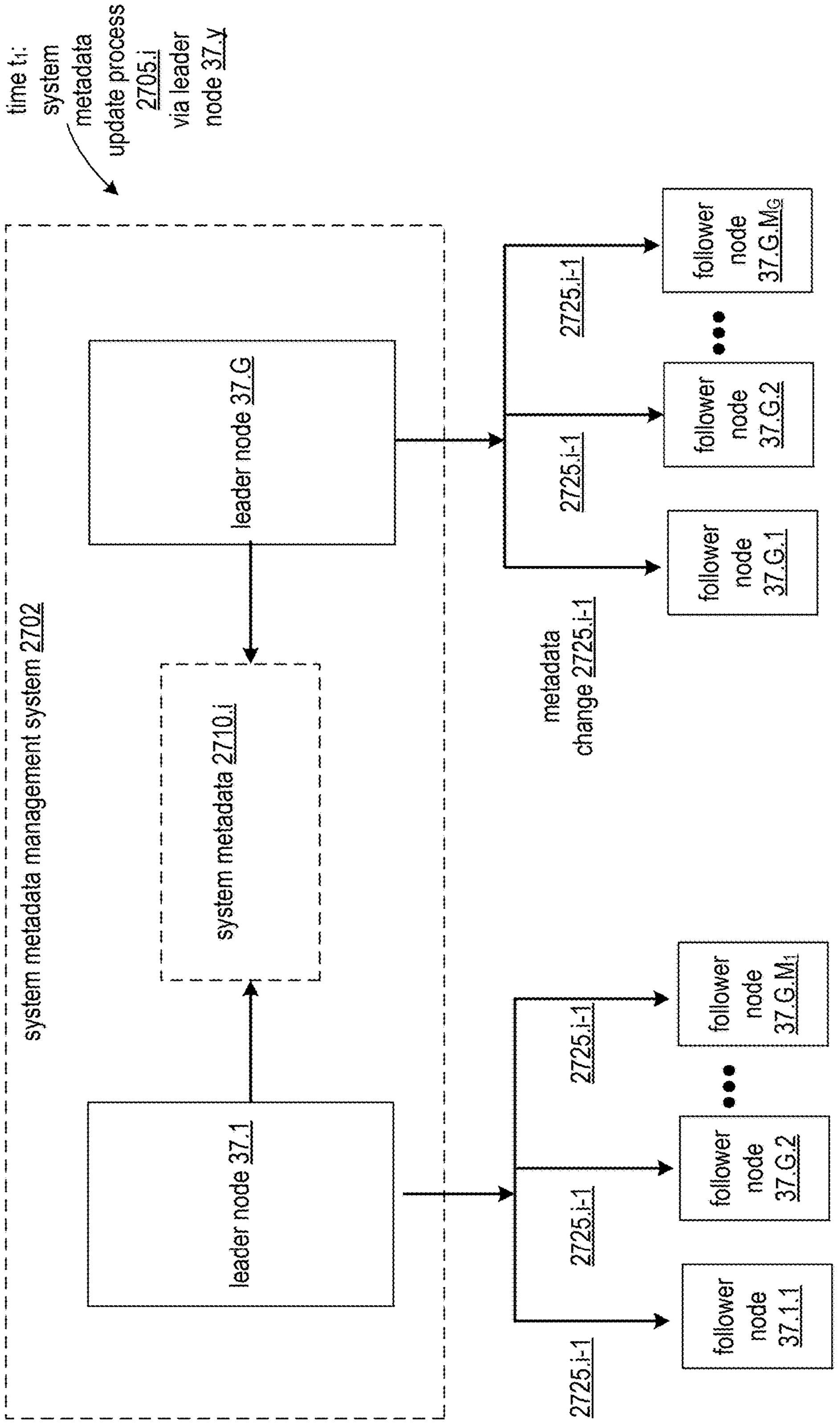
FIG. 27H is a schematic block diagram of an example database system that implements a plurality of leader nodes that each communicate a metadata change to a corresponding plurality of follower nodes in accordance with various embodiments.
Figure 27I:
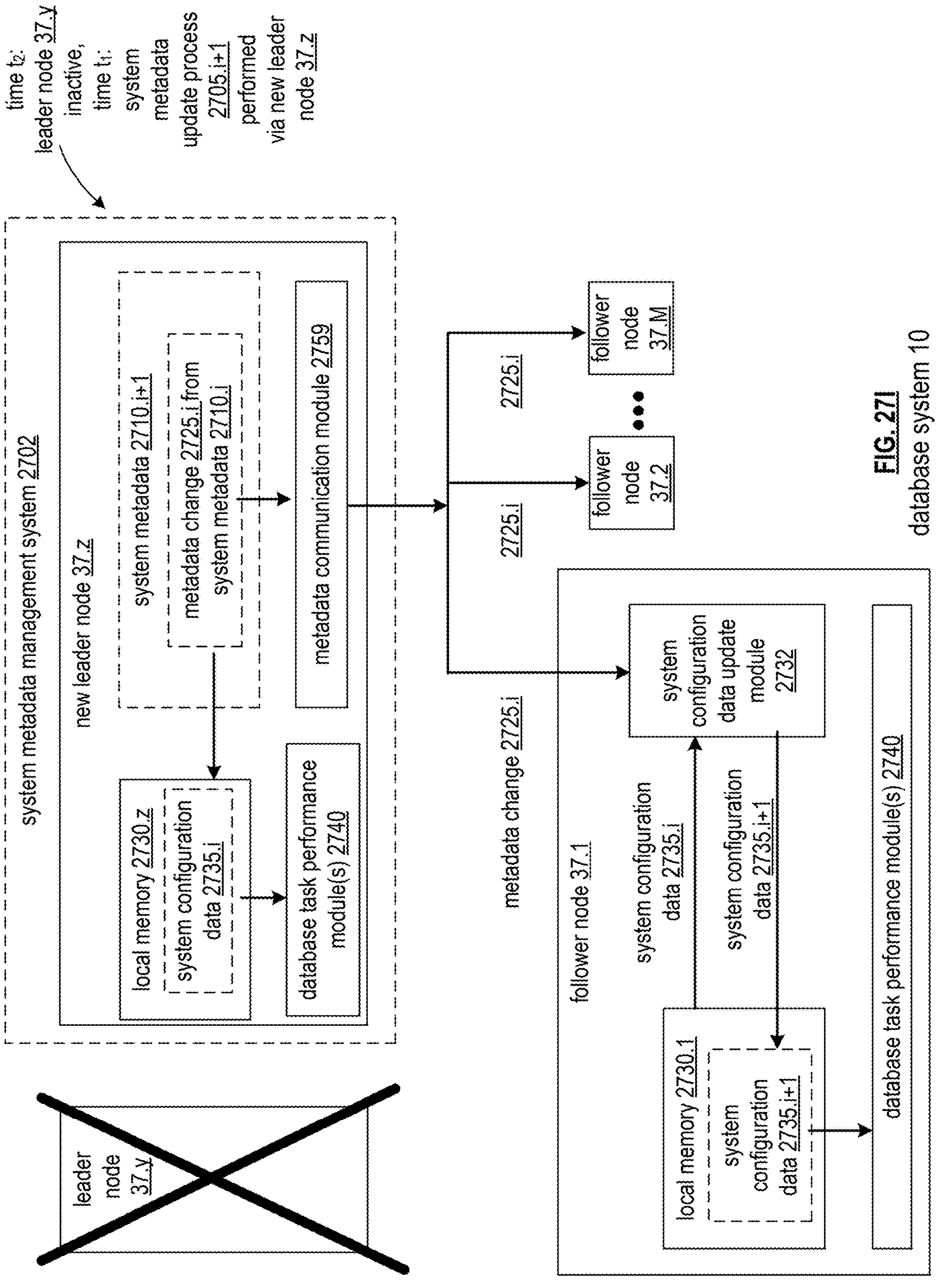
FIG. 27I is a schematic block diagram of an example database system that implements that communicates a subsequent metadata change to a plurality of follower nodes via a new leader node after a prior leader node becomes inactive in accordance with various embodiments.

FIGS. 27G-27I illustrate embodiments of database system 10 that implement system metadata management system via at least one leader node 37 that communicates metadata changes 2725 to follower nodes, for example, in accordance with a consensus protocol such as a raft consensus protocol. Some or all features and/or functionality of leader nodes 37 of FIGS. 27G-27I can implement the system metadata management system 2702 of FIGS. 27A-27B, any embodiment of node 37 described herein, and/or any other embodiment of the system metadata management system 2702 and/or corresponding performance of system metadata update processes 2705 and/or corresponding updates to system metadata and/or system configuration data described herein. Some or all features and/or functionality of follower nodes 37 of FIGS. 27G-27I can implement some or all of the nodes 37.1-27.$N_1$ of FIG. 27A, some or all of the nodes 37.1-27.$N_2$ of FIG. 27B, and/or any other embodiment of node 37 described herein.

FIG. 27G illustrates an embodiment where a leader node 37.*y* implements a metadata communication module 2759 to send metadata change 2725 to a set of follower nodes 37.1-37.M at a time $t_1$, for example, to implement the communication of metadata change 2725.*i*−1 to some or all nodes 37.1-37.$N_1$ at time $t_1$ of FIG. 27A, where M is optionally equal to $N_1$. The set of follower nodes 37.1-37. M can be subscribers of the leader node 37.*y*, for example, in a subscriber registry 2753 maintained by the leader node 37.*y*. For example, some or all features and/or functionality of the system metadata management system 2702 of FIGS. 27A-27F is implemented via this leader node 37.

In some embodiments, as illustrated in FIG. 27G, the leader node itself performs database tasks via database task performance modules 2740, for example, in parallel with and/or in conjunction with some or all follower nodes 37.1-37.$N_1$, and can thus apply the metadata change 2725.*i* itself to update its own system configuration data 2735 in its own local memory 2730.*y* via system configuration data update module 2732. In other embodiments, the leader node serves only to generate and/or communicate metadata changes and need not perform other database functionality.

The leader node 37.*y* can generate the updated system metadata 2710.*i* itself, can generate the updated system metadata 2710.*i* based on communicating with other nodes, for example, in accordance with a consensus protocol. This can include communicating with some or all follower nodes 37 that relay necessary changes incurred when performing their own database tasks. This can alternatively or additionally include communicating with one or more other leader nodes, where multiple leader nodes of the system metadata management system generate the updated system metadata 2710.*i* in tandem.

FIG. 27H illustrates an embodiment where a plurality of leader nodes 37.1-37.G send metadata change 2725 to respective set of follower nodes 37 at a time $t_1$, for example, to implement the communication of metadata change 2725.*i*−1 to some or all nodes 37.1-37.$N_1$ at time $t_1$ of FIG. 27A. Each leader node of the plurality of leader nodes 37.1-37.G of FIG. 27H can be implemented via some or all features and/or functionality of leader nodes 37.*y* of FIG. 27G. Each leader node of the plurality of leader nodes 37.1-37.G can have their own set of M follower nodes, where the number of follower nodes M for different leader nodes can be the same or different. The G sets of follower nodes of the plurality of leader nodes 37.1-37.G can collectively implement the plurality of nodes 37.1-37.$N_1$ of FIG. 27A that all receive metadata change 2725.*i*−1 from system metadata management system 2702, where each of the plurality of nodes 37.1-37.$N_1$ follows a single leader node, for example, as a subscriber in this given leader nodes subscriber registry 2753, and/or receives the metadata change 2725.*i*−1 from only this corresponding leader node.

The plurality of leader nodes can communicate changes for common version of system metadata 2710.*i* to be applied across all follower nodes, for example, based on collectively generating and/or determining this common system metadata 2710.*i*, for example, in conjunction with a consensus protocol. In other embodiments, different system metadata applied to different aspects of the database system with tasks performed by different sets of nodes, and each grouping of leader node with follower node can update different metadata relating to these different aspects of the database system accordingly.

FIG. 27I illustrates an embodiment of a system metadata management system that updates an unavailable leader node 37.*y* with a new leader node 37.*z*, for example, prior to a time $t_2$ after time $t_1$ of FIG. 27G. This new leader node 37.*z* can send a subsequent metadata change 2725.*i* to a set of follower nodes 37.1-37.M at this time $t_2$, for example, to implement the communication of metadata change 2725.*i* to some or all nodes 37.1-37.$N_2$ at time $t_2$ of FIG. 27B, where M is optionally equal to $N_2$, or is smaller than $N_2$ based on leader node 37.*z* being one of a set of multiple leader nodes each having their own sets of followers as discussed in conjunction with FIG. 27H.

The set of M nodes of FIG. 27I can be the same as the set of M nodes of FIG. 27G, for example, based on all subscriber nodes of unavailable node 37.*y* becoming subscribers of new leader node 37.*z*. This can include the follower nodes 37.1-37.M of unavailable node 37.*y* electing the new leader and/or sending registration requests 2744 to this new leader after node 37.*y* is determined to become unavailable. The new node 37.*z* can determine to send the metadata change 2725.*i* to these follower nodes 37.1-37.M based on these nodes being indicated in a subscriber registry 2753 of the new node 37.*z* accordingly, based on retrieving this subscriber registry from node 37.*y* before it became unavailable and/or based on receiving registration requests 2744 from this set of nodes. The set of M nodes of FIG. 27I is optionally different from the set of M nodes of FIG. 27G based on one or more new nodes having been added and/or removed between time $t_1$ and time $t_2$, and/or changing to follow a different leader node of FIG. 27H.

In some embodiments, the new node 37.*z* is a prior follower node of the follower nodes 37.1-37.M of node 37.*y* in FIG. 27G. In some embodiments, the new node 37.*z* is optionally another leader node of the set of leader nodes 37.1-37.G of FIG. 27H that takes on follower nodes 37.1-37.M as new followers in addition to its existing followers of FIG. 27H. In some embodiments, the new node 37.*z* is optionally a new node added to the system after time $t_1$ and/or that was not a leader node or follower node of FIG. 27G and/or 27H at time $t_1$.

Figure 27J:
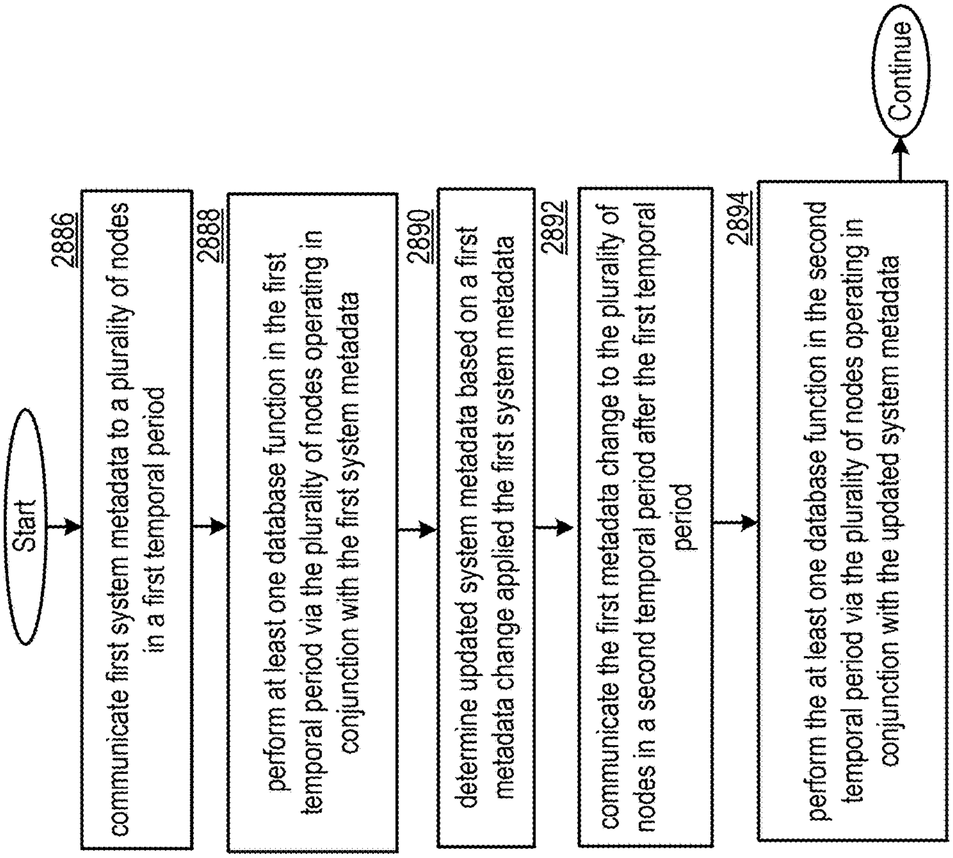
FIG. 27J is a logic diagram illustrating a method for execution in accordance with various embodiments.

FIG. 27J illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27J. In particular, a node 37 can utilize system configuration data update module 2732, local memory 2730, and/or database task performance modules 2740 to execute some or all of the steps of FIG. 27J, where multiple nodes 37 implement their own system configuration data update modules 2732, local memory 2730, and/or database task performance modules 2740 to independently execute the steps of FIG. 27J, for example, to facilitate corresponding updates of system configuration data based on updates to system metadata.

Some or all of the method of FIG. 27J can be performed by the system metadata management system 2702, for example, via one or more nodes 37 implemented as leader nodes, for example, by implementing a metadata communication module 2759 to send metadata changes to a set of follower nodes. Some or all of the steps of FIG. 27J can optionally be performed by any other processing module of the database system 10. Some or all steps of FIG. 27J can be performed in conjunction with performance of one or more system metadata updates processes 2705. Some or all of the steps of FIG. 27J can be performed to implement some or all of the functionality of the database system 10 as described in conjunction with FIGS. 27A-27H, for example, by implementing some or all of the functionality of the system metadata management system 2702, of nodes 37, and/or of the system metadata update process 2705. Some or all of the steps of FIG. 27J can be performed to implement some or all of the functionality regarding receiving of data, generation of segments from received data, and/or execution of a queries against the data stored in segments as described in conjunction with some or all of FIGS. 24A-26B via a plurality of nodes 37 in conjunction with corresponding system metadata 27J. Some or all steps of FIG. 27J can be performed by database system 10 in accordance with other embodiments of the database system 10 and/or nodes 37 discussed herein.

Step 2886 includes communicating first system metadata to a plurality of nodes in a first temporal period. For example, the first system metadata is communicated in conjunction with performance of a system metadata update process 2705. The first system metadata can be communicated to the plurality of nodes via a system metadata management system 2702, such as via one or more leader nodes of the system metadata management system 2702. The method can further include each of the plurality of nodes updating corresponding system configuration data as the first system metadata, for example in their own local memory, based on receiving the first system metadata.

Step 2888 includes performing at least one database function in the first temporal period via the plurality of nodes operating in conjunction with the first system metadata, for example, based on each of the plurality of nodes utilizing the corresponding system configuration data. For example, each of the plurality of nodes utilize the corresponding system configuration data to participate in performance in the at least one database function based on accessing the system configuration data in local memory and/or by executing instructions included in the system configuration data.

Step 2890 includes determining updated system metadata based on a first metadata change applied the first system metadata. The updated system metadata can be generated by system metadata management system 2702, for example, via one or more leader nodes in conjunction with a consensus protocol mediated between the one or more leader nodes and/or one or more follower nodes of the plurality of nodes. The first metadata change can be based on changes determined by and/or received from one or more of the plurality of nodes, for example, based on updates induced during performance in the at least one database function by the plurality of nodes.

Step 2892 includes communicating the first metadata change to the plurality of nodes in a second temporal period after the first temporal period. For example, the first metadata change is communicated in conjunction with performance of another system metadata update process 2705. The first metadata change can be communicated to the plurality of nodes via a system metadata management system 2702, such as via one or more leader nodes of the system metadata management system 2702. Communicating the first metadata change can include only sending the data corresponding to the first metadata change, and/or not sending other data corresponding to portions of updated system metadata that are the same as and/or were already included in the first system metadata.

The method can further include each of the plurality of nodes further updating the corresponding system configuration data as the updated system metadata based on the each of the plurality of nodes receiving the first metadata change and applying the first metadata change to the first system metadata.

Step 2894 includes performing the at least one database function in the second temporal period via the plurality of nodes operating in conjunction with the updated system metadata, for example, based on each of the plurality of nodes utilizing the updated corresponding system configuration data, after updating the corresponding system configuration data based on receiving the first metadata change.

In various examples, the at least one database function includes: receiving a plurality of row data of at least one dataset via a first set of nodes of the plurality of nodes; generating a plurality of segments from the plurality of row data via a second set of nodes of the plurality of nodes; storing the plurality of segments via memory resources of a third set of nodes of the plurality of nodes; and/or executing a database query via a fourth set of nodes of the plurality of nodes participating in a corresponding query execution plan based on accessing the plurality of segments. In various examples, the first set of nodes, the second set of nodes, the third set of nodes, and/or the fourth set of nodes have a non-null set difference. In various examples, the first set of nodes, the second set of nodes, the third set of nodes, and/or the fourth set of nodes are mutually exclusive. In various examples, the first set of nodes, the second set of nodes, the third set of nodes, and/or the fourth set of nodes have a non-null intersection. In various examples, the first set of nodes, the second set of nodes, the third set of nodes, and/or the fourth set of nodes are equivalent sets of nodes. In various examples, the first set of nodes, the second set of nodes, the third set of nodes, and/or the fourth set of nodes are collectively exhaustive with respect to the plurality of nodes. In various examples, the first set of nodes, the second set of nodes, the third set of nodes, and/or the fourth set of nodes are not collectively exhaustive with respect to the plurality of nodes.

In various examples, generating the plurality of segments from the plurality of row data via the second set of nodes of the plurality of nodes includes: storing the plurality of row data via a plurality of pages generated via a first subset of the second set of nodes; and/or performing a page conversion process upon the plurality of pages via a second subset of the second set of nodes to generate a plurality of segments from the plurality of pages. In various examples, the first subset of the second set of nodes and the second subset of the second set of nodes have a non-null set difference. In various examples, the first subset of the second set of nodes and the second subset of the second set of nodes are mutually exclusive. In various examples, the first subset of the second set of nodes and the second subset of the second set of nodes have a non-null intersection. In various examples, the first subset of the second set of nodes and the second subset of the second set of nodes are equivalent sets of nodes. In various examples, the first subset of the second set of nodes and the second subset of the second set of nodes are collectively exhaustive with respect to the second set of nodes. In various examples, the first subset of the second set of nodes and the second subset of the second set of nodes are not collectively exhaustive with respect to the second set of nodes.

In various examples, the first system metadata indicates at least one of: a set of tables stored by the database system; a set of columns of at least one table stored by the database system; whether each of the set of tables is designated for access during query execution; and/or a set of user permissions of a plurality of users of the database system. In various examples, at least one of the set of user permission denotes whether a corresponding user has permissions to at least one of: read rows from at least one of the set of tables; modify rows in the at least one of the set of tables; modify the set of columns of the at least one of the set of tables; add new rows to the at least one of the set of tables; and/or generate a new table for inclusion in the set of tables. In various examples, the first metadata change indicates at least one of: at least one change to the set of tables stored by the database system, such as a modified table, a new table, or a deleted table; at least one change to set of columns of at least one table stored by the database system, such as a modified column, a new column, and/or a deleted column; at least one change to whether each of the set of tables is designated for access during query execution, such as changing from not visible to visible, or vice versa; and/or at least one change to the set of user permissions of a plurality of users of the database system, such as a new user, a removed user, and/or changes to one or more permissions of an existing user.

In various examples, performing the at least one database function during the first temporal period includes determining whether a query request can be executed by the database system based on at least one of: identifying whether a table indicated in the query request exists based on determining whether the table is included in the set of tables stored by the database system based on the first system metadata; identifying whether a column indicated in the query request exists based on is included in the set of columns of the at least one table based on the first system metadata; identifying whether the table indicated in the query request can be accessed based on determining whether the table is designated for access during query execution based on the first system metadata; or identifying a corresponding user has permissions for executing the query request based on identifying permissions for the corresponding user based on the first system metadata. For example, performing the at least one database function during the first temporal period includes not executing the query request via the database system, and/or sending a corresponding error to the external requesting entity, when the first system metadata indicates the query request cannot be executed due to a denoted table and/or column not existing, a denoted table not being available for query execution, and/or a corresponding user not having permissions to perform a respective operation of the query request.

In various examples, the method further includes generating the first system metadata via at least one of the plurality of nodes; and/or generating the updated system metadata via the same or different at least one of the plurality of nodes. In various examples, the at least one of the plurality of nodes that generates and/or otherwise determines the first system metadata and/or the updated system metadata is implemented as at least one leader node of the plurality of nodes in accordance with a consensus protocol mediated between the plurality of nodes. In various examples, remaining ones of the at least one of the plurality of nodes are implemented as a plurality of follower nodes of the at least one leader node in accordance with the consensus protocol mediated between the plurality of nodes. In various examples, communicating the first system metadata to the plurality of nodes can be based on the at least one leader node sending the first system metadata to the plurality of follower nodes, and/or communicating the first metadata change to the plurality of nodes is based on the at least one leader node sending the first metadata change to the plurality of follower nodes.

In various examples, one leader node of the at least one leader node sends the first system metadata to a corresponding set of follower nodes of the plurality of follower nodes based on the corresponding set of follower nodes subscribing to the one leader node. In various examples, the one leader node becomes unavailable, for example, based on a communications failure or communications outage of the one leader node, after sending the first system metadata to a corresponding set of follower nodes. In various examples, some or all of the set of follower nodes subscribe to a new leader node based on the one leader node becoming unavailable, and/or the new leader node sends the first metadata change to the corresponding set of follower nodes in the second temporal period based on the corresponding set of follower nodes subscribing to this new leader node.

In various examples, the consensus protocol mediated between the plurality of nodes is based on a raft consensus algorithm. In various examples, the first system metadata and the updated system metadata are indicated via a metadata storage protocol raft state. In various examples, the system metadata and or the updated system metadata are generated via are implemented via a plurality of hash maps for a plurality of member variables.

In various examples, each of the plurality of nodes store the corresponding system configuration data in corresponding local memory of the each of the plurality of nodes.

In various examples, the first system metadata is based on a prior metadata change from prior system metadata. In various examples, the first system metadata is communicated based on communicating only the prior metadata change, where each of the plurality of nodes update the corresponding system configuration data as the first system metadata based on applying the prior metadata change to prior system configuration data stored by each of the plurality of nodes.

In various examples, the plurality of nodes in the second temporal period is different from the plurality of nodes in the first temporal period based on at least one of: at least one of the plurality of nodes of the first temporal period being removed from the plurality of nodes prior to the second temporal period, or at least one new node not included in the plurality of nodes in the first temporal period being added to the plurality of nodes prior to the second temporal period.

In various examples, the first system metadata and the updated system metadata are two consecutive system metadata of a plurality of system metadata incrementally updated over time. In various examples, the method further includes assigning the first system metadata a first metadata sequence number, where the first metadata sequence number is communicated to the plurality of nodes in accordance with communicating the first system metadata; and/or assigning the updated system metadata a second metadata sequence number based on incrementing the first metadata sequence number, wherein the second metadata sequence number is communicated to the plurality of nodes in accordance with communicating the updated system metadata.

In various examples, the method further includes the adding a new node to the plurality of nodes based on: the new node receiving the first system metadata based on the new node retrieving most current system metadata upon startup; and/or the new node performing a startup action by utilizing the corresponding system configuration data indicated by the first system metadata, for example, to determine at least one role for the new node and/or at least one protocol for the new node.

In various examples, wherein the first system metadata is received by the new node in conjunction with a first metadata sequence number corresponding to the first system metadata. In various examples, adding the new node to the plurality of nodes is further based on: the new node sending a node registration request that indicates the a first metadata sequence number corresponding to the first system metadata based on completing performance of the startup action; and/or the new node receiving a response to the node registration request, wherein the response indicates whether the corresponding system configuration data of the new node is up to date based on the first metadata sequence number.

In various examples, the new node receives the first system metadata and the new node initiates performing the startup action during the first temporal period. In various examples, the new node sends the node registration request in the second temporal period based on completing performance of the startup action in the second temporal period after the updated system metadata is determined and after the first metadata change is communicated to registered nodes of the plurality of nodes, where the response to the node registration request indicates the updated system metadata based on the first metadata sequence number being determined to be not up to date, and/or where the adding the new node to the plurality of nodes is further based on the new node updating its system configuration data to indicate the updated system metadata.

In various embodiments, any one of more of the various examples listed above are implemented in conjunction with performing some or all steps of FIG. 27J. In various embodiments, any set of the various examples listed above can be implemented in tandem, for example, in conjunction with performing some or all steps of FIG. 27J.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27J described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27J, for example, in conjunction with further implementing any one or more of the various examples described above.

In various embodiments, the operational instructions, when executed by the at least one processor, cause the database system to: communicate first system metadata to a plurality of nodes in a first temporal period, where each of the plurality of nodes update corresponding system configuration data as the first system metadata based on receiving the first system metadata; perform at least one database function in the first temporal period via the plurality of nodes operating in conjunction with the first system metadata based on the each of the plurality of nodes utilizing the corresponding system configuration data; determine updated system metadata based on a first metadata change applied the first system metadata; communicate the first metadata change to the plurality of nodes in a second temporal period after the first temporal period, where each of the plurality of nodes further update the corresponding system configuration data as the updated system metadata based on the each of the plurality of nodes receiving the first metadata change and applying the first metadata change to the first system metadata; and/or perform the at least one database function in the second temporal period via the plurality of nodes operating in conjunction with the updated system metadata based on the each of the plurality of nodes utilizing the corresponding system configuration data.

FIGS. 28A-28G present embodiments of a database system 10 that performs loading coordination and manages corresponding transactions for loading of a query result set via the query execution module while executing a corresponding query to generate and load the result set. Some or all features and/or functionality of the database system 10 of FIGS. 28A-28G can implement any embodiment of the database system 10 described herein.

When performing a query operation, such as a CTAS or INSERT INTO SELECT, to load result set data as segments for future access, certain system metadata transactions should be performed, e.g. create a table, make created storage visible, etc. It can be advantageous for these asynchronous transactions to be done in coordination with, and in response to, specific events happening during the lifetime of the query, where various query signals should be detected and responded to accordingly in real time.

The query execution module 2504 can be implemented to coordinate performance of these asynchronous transactions, for example, based on executing a corresponding a load coordinator operator inserted in the query plan that is executed as part a part of the query execution by the query execution module 2504, for example, via a corresponding virtual machine. This can improve the technology of database systems because all tasks associated with the CTAS and/or other loading of result set data for storage are carried out by the same execution engine that executes other queries that, for example, don't require loading of result sets. In particular, no special infrastructure is needed to coordinate the query lifetime with its associated external transactions, since the load coordinator fits into the query framework. Furthermore, this can be advantageous over other solutions that would execute all management tasks for the operation independent of the query itself, as they would have a more complicated workflow, with execution occurring in multiple areas of the system. As it would be challenging to observe or cancel the operation while it is processing tasks beyond the loading itself in such cases, the technology of database systems is improved by designating the transactional coordination to the query execution module alone to ensure cancellation of tasks can be easily implemented in a transactional manner.

Figure 28A:
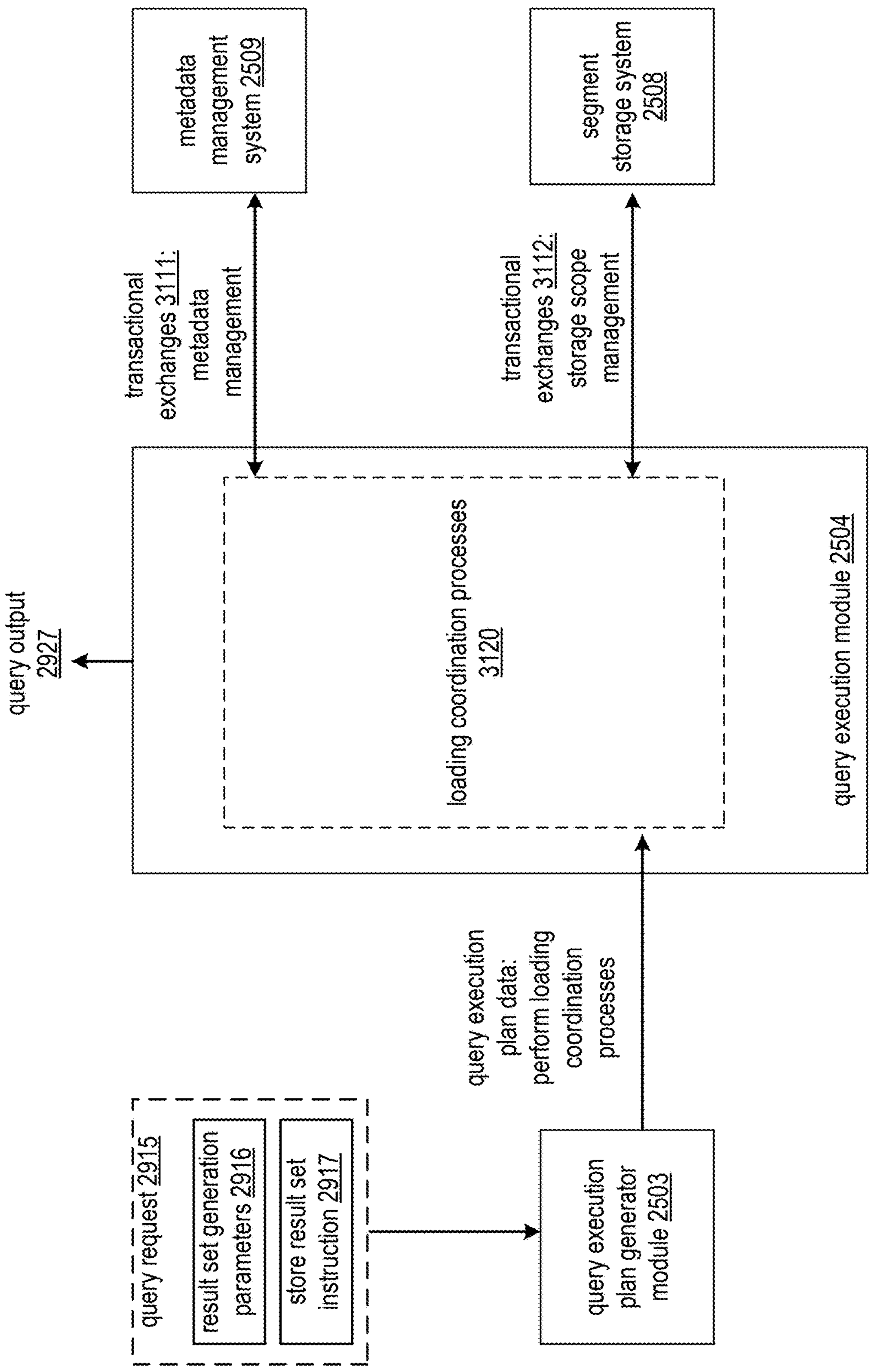
FIG. 28A is a schematic embodiment of a database system that performs loading coordination processes via a query execution module in accordance with various embodiments.

FIG. 28A illustrates an embodiment of database system 10 where the query execution module 2504 performs loading coordination processes 3120 based on this performance of the perform loading coordination processes 3120 being indicated in query execution plan data generated for a corresponding query having a store result set instruction 2917. The loading coordination processes 3120 can include transactional exchanges 3112 corresponding to storage scope management with the segment storage system 2508. The loading coordination processes 3120 can include transactional exchanges 3111 corresponding to metadata management with a metadata management system 2509.

The metadata management system 2509 can be implemented via one or more computing devices 18 and/or other processing and/or memory resources of the database system 10. The processing and/or memory resources implementing the metadata management system 2509 can be shared with or distinct from the processing and/or memory resources of the query execution plan generator module 2503, of the query execution module 2504, of the record processing system 2507, and/or of the segment storage system 2508. The metadata management system 2509 can include at least one memory storing operational instructions that, when executed by at least one processor of the metadata management system 2509, cause the metadata management system 2509 to perform some or all of its functionality.

Some or all features and/or functionality of the query execution module 2405 of FIG. 28A can be performed by a single node, such as the root node at the root level of a query execution plan 2405. For example, while the result set may be generated in a query execution plan by many nodes, some or all of the loading coordination process 3120 are optionally performed by a single node and/or process performed by query execution module 2504, where each of the transactional exchanges 3111 and 3112 are only exchanged with the metadata management system 2509 and 2508 once.

Figure 28B:
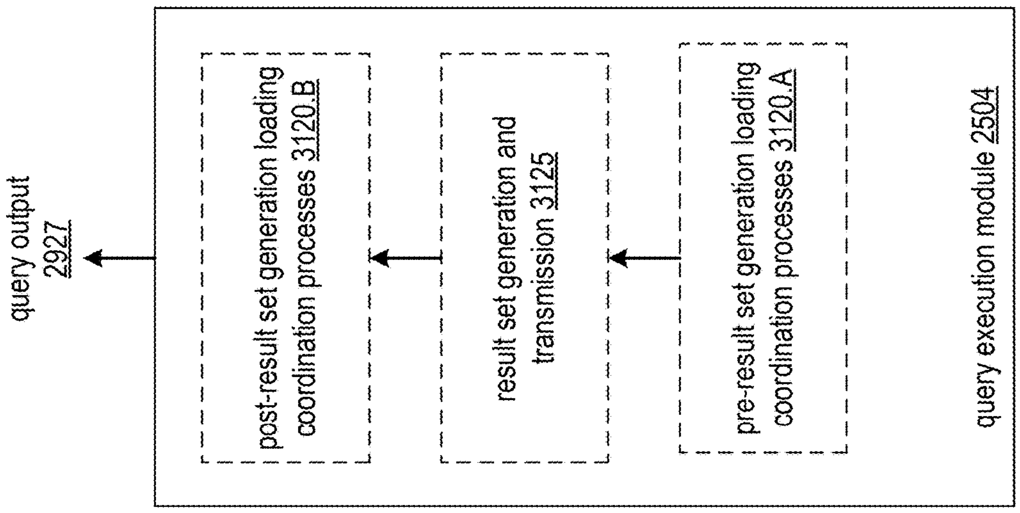
FIG. 28B is a schematic embodiment of a database system that performs loading coordination processes via a query execution module before and after performance of result set generation and transmission in accordance with various embodiments.

FIG. 28B illustrates an embodiment of query execution module that implements the loading coordination processes 3120 of FIG. 28A as pre-result set generation loading coordination processes 3120.A and/or post-result set generation loading coordination processes 3120.B. The pre-result set generation loading coordination processes 3120.A can be performed prior to result set generation and transmission 3125, and/or the post-result set generation loading coordination processes 3120.B can be performed after this result set generation and transmission 3125.

Figure 28C:
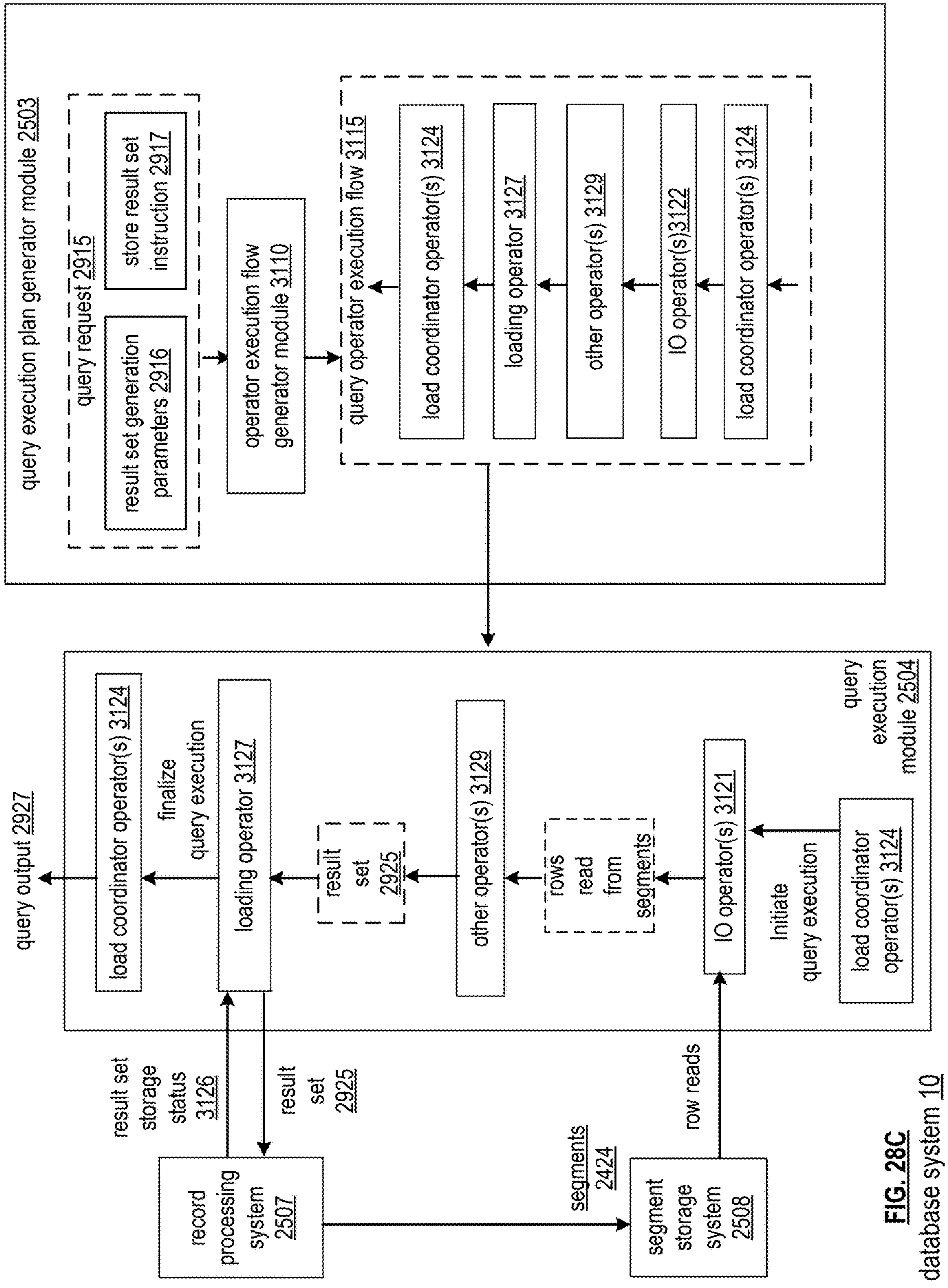
FIG. 28C is a schematic embodiment of a database system that executes a query by implementing at least one load coordination operator in accordance with various embodiments.

FIG. 28C illustrates an example of a query execution module 2504 that executes a query based on implementing a query operator execution flow 3115 generated by a query execution plan generator module 2503 based on a query request 2915. In particular, the query operator execution flow 3115 includes at least one load coordinator operators 3124 based on the query indicating the store result set instruction 2917. Some or all features and/or functionality of the query execution plan generator module 2503 and/or the query execution module 2504 of FIG. 28C to facilitate loading of query result sets can be implemented via any embodiment of database system 10 described herein. The execution of the load coordinator operator(s) of FIG. 28C can implement the pre-result set generation loading coordination processes 3120.A and/or post-result set generation loading coordination processes 3120.B. The execution of the IO operators 3122, other operators 3129, and/or loading operator 3127 can implement the result set generation and transmission 3125 of FIG. 28B.

While FIG. 28C illustrates load coordinator operators inserted into the top and bottom of the query execution plan to illustrate implementation of the pre-result set generation loading coordination processes 3120.A and the post-result set generation loading coordination processes 3120.B before and after other operators for the query, a single load coordinator operator 3124 can be inserted in the query operator execution flow 3115 for the query plan, but can cause the execution of the query by the query execution module 2504 to implement the pre-result set generation loading coordination processes 3120.A and the post-result set generation loading coordination processes 3120.B. For example, execution of a single load coordinator operator 3124 at the beginning of the query operator execution flow 3115, serially before some or all other operators, can cause all of the pre-result set generation loading coordination processes 3120.A and the post-result set generation loading coordination processes 3120.B to be performed before and after, respectively, the execution of the IO operators 3122, other operators 3129, and/or loading operator 3127.

Execution of the loading coordination operator at the base of the query operator execution flow 3115, and/or any other loading coordination operators appearing in the query, can cause the query execution module to execute loading coordination processes 3120 while executing the corresponding query by: first consuming initialization signal from the query execution module and/or a corresponding virtual machine, where any pull signals will be consumed and delayed from this point on; kicking off a rights verification request to the metadata management system 2509 and/or corresponding admin; receive rights check response, where, if user does not have permission to create/insert, fail query, and otherwise continue; send a create table request (if query includes CTAS instruction) and wait for response; send create storage scope request and wait for response; on failure for any of the prior requests, fail query, and otherwise, trigger delayed pull signals to start query execution for the load itself; wait for an end of file or other signal from the query execution module based on the query execution for the load itself, where on this signal, draining of segments by the record processing module is triggered; poll status of scope in the storage cluster until all data has been converted to segments; commit the storage scope, making data visible to queries; make new table visible (if query includes CTAS instruction); send results (indicating rows loaded) upstream and notify query is complete.

Execution of the loading coordination operator at the base of the query operator execution flow 3115, and/or any other loading coordination operators appearing in the query, can alternatively or additional cause the query execution module to execute loading coordination processes 3120 while executing the corresponding query by, if at any point in the steps indicated above a fatal failure is seen, fail the query. Upon failure or query cancellation, the following cleanup steps can be taken: if a table was created, send a drop table request; if any data was loaded, send a delete storage scope request; wait for responses to all in-progress network requests, then finalize.

Examples of executing loading coordination processes 3120 by the query execution module, for example, based on execution of a load coordinator operator 3124, is illustrated in FIGS. 28D-28H. Some or all features and/or functionality of the execution of loading coordination processes 3120 of FIGS. 28D-28H can be utilized to implement the execution of loading coordination processes 3120 of FIGS. 28A and/or 28B, and/or can be utilized to implement the execution of one or more load coordinator operators 3124 of FIG. 28C.

The result set generation and transmission 3125 can collectively be performed by nodes the IO level of a query execution plan and/or by nodes at some or all inner levels of the query execution plan. In some embodiments, the IO operators 3122 are processed by IO level nodes at the IO level of a query execution plan, and some or all and/or other operators 3129 are processed by these IO level nodes at the IO level of a query execution plan and/or by nodes at one or more inner levels. In some embodiments, the loading operator 3127 is processed by a plurality of inner level nodes, for example, at a final inner level before the root level, where the value of the number of rows stored is determined by executing loading operator 3127 and is emitted to the root node.

In some embodiments, the load coordination operator 3124 is processed by a root level node, and/or is processed via exactly one process by the query execution module 2504. For example, before initiating execution of IO operators, the root level node executes the load coordination operator 3124 to perform the pre-result set generation loading coordination processes 3120.A. Once these are performed and/or once success is determined, the root level node initiates execution of the query itself starting with the IO operators, for example, by sending the query execution plan data to nodes participating in the query execution plan. This root node can later receive the emitted values of the number of rows stored from its child nodes executing the loading operator, and can determine all rows of the entire result set have been stored in pages based on receiving such confirmation from all of its child nodes. The root node can then initiate finalization of the query by performing the post-result set generation loading coordination processes 3120.B.

Figure 28D:
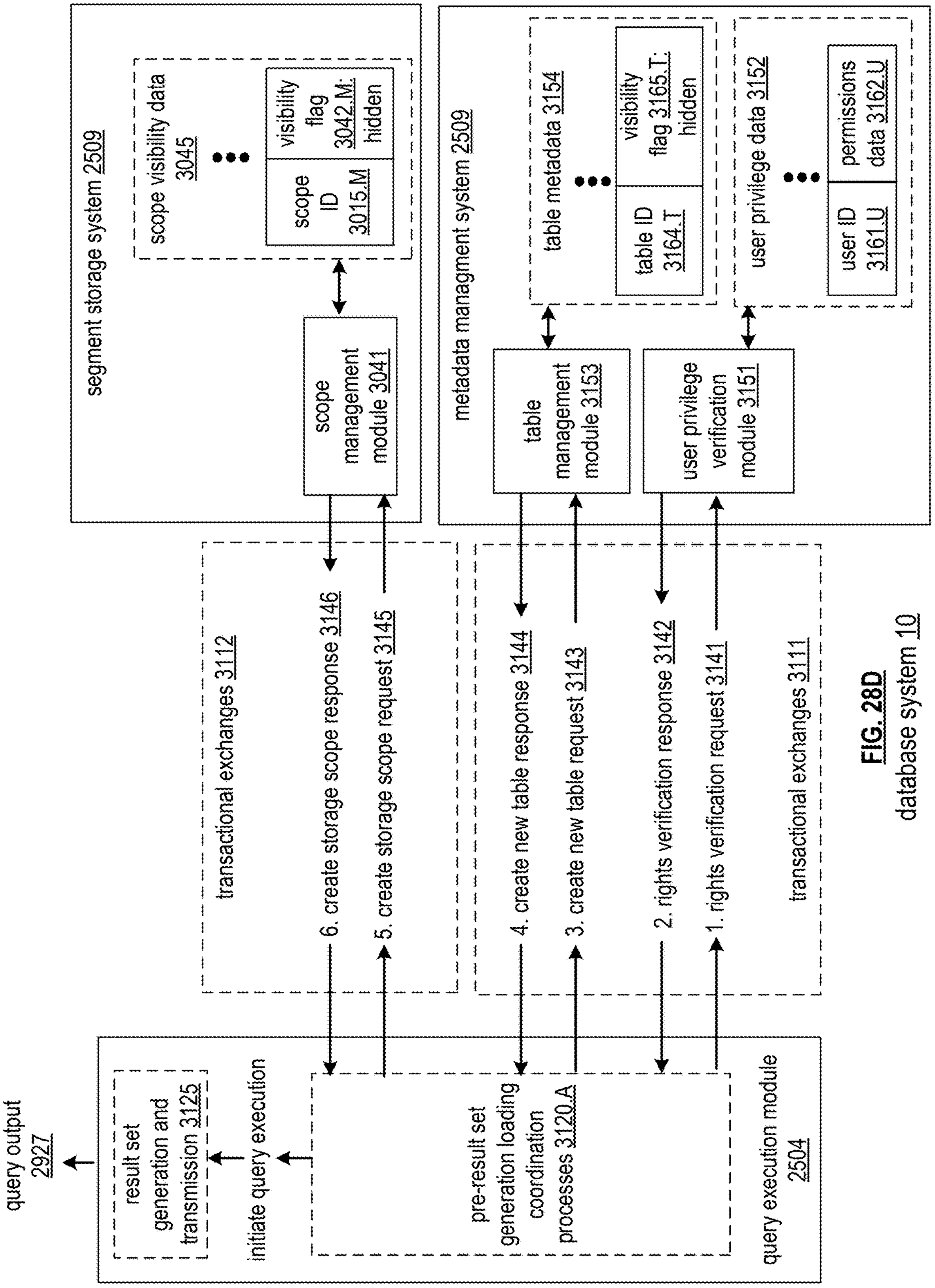
FIG. 28D is a schematic embodiment of a database system that performs sets of transactional exchanges with a metadata management system and a segment storage system via a query execution module prior to result set generation and transmission in accordance with various embodiments.

As illustrated in FIG. 28D, performing the pre-result set generation loading coordination processes 3120.A can include first sending a rights verification request 3141 to the metadata management system 2509. A user privilege verification module 3151 of the metadata management system 2509 can generate and send a rights verification response 3142 to this rights verification request based on accessing user privilege data 3152 to determine whether a corresponding user and/or entity has rights to perform the query and/or to write data into tables of the database system, based on, for example, permissions data 3162 mapped to different user IDs 3161. The rights verification request 3141 can indicate the user ID or type of user, and/or can indicate the type of operations being requested, such as the CTAS, the Insert Into Select, or other instruction to write new rows to the database system. The rights verification response 3142 can indicate whether the rights verification request 3141 was successful or not, based on whether user has rights to execute the query or not.

Alternatively or in addition, the pre-result set generation loading coordination processes 3120.A can include sending a create new table request 3143 to the metadata management system 2509. A table management module 3153 can generate and send a create new table response 3144, for example, based on accessing table metadata to create the new table. The new table can be denoted with a visibility flag 3165 of hidden due to the table not yet being stored as segments. Subsequent queries requesting access to this table with corresponding table ID 3164.T can fail and/or do not access this table while the corresponding visibility flag 3165.T indicates this table is hidden. The create new table response 3144 can indicate whether the create new table request 3143 was successful or not. The create new table request 3143 and create new table response 3144 are optionally only exchanged for CTAS queries, and not for Insert Into Select queries. The create new table request 3143 can indicate a name or other identifier of the new table, a name or other identifier of each column of the new table, and/or a datatype designated for each column of the new table, for example, based on being indicated a CTAS instruction or other parameter of the query. This information can be optionally stored for the corresponding table in table metadata 3154.

Alternatively or in addition, the pre-result set generation loading coordination processes 3120.A can include sending a create storage scope request 3145 to the segment storage system 2508. A scope management module 3041 can generate and send a create storage scope response 3146, for example, based on accessing scope visibility data to create the new storage scope. The new storage scope can be denoted with a visibility flag 3042 of hidden due to the corresponding result set not yet being stored as segments. The create new storage scope response 3146 can indicate whether the create storage scope request 3145 was successful or not.

Query execution can be initiated once responses to all requests are received and processed, where the query execution module proceeds to result set generation and transmission 3125 for the query. In some cases, this query execution is only initiated if all responses indicate success.

Figure 28E:
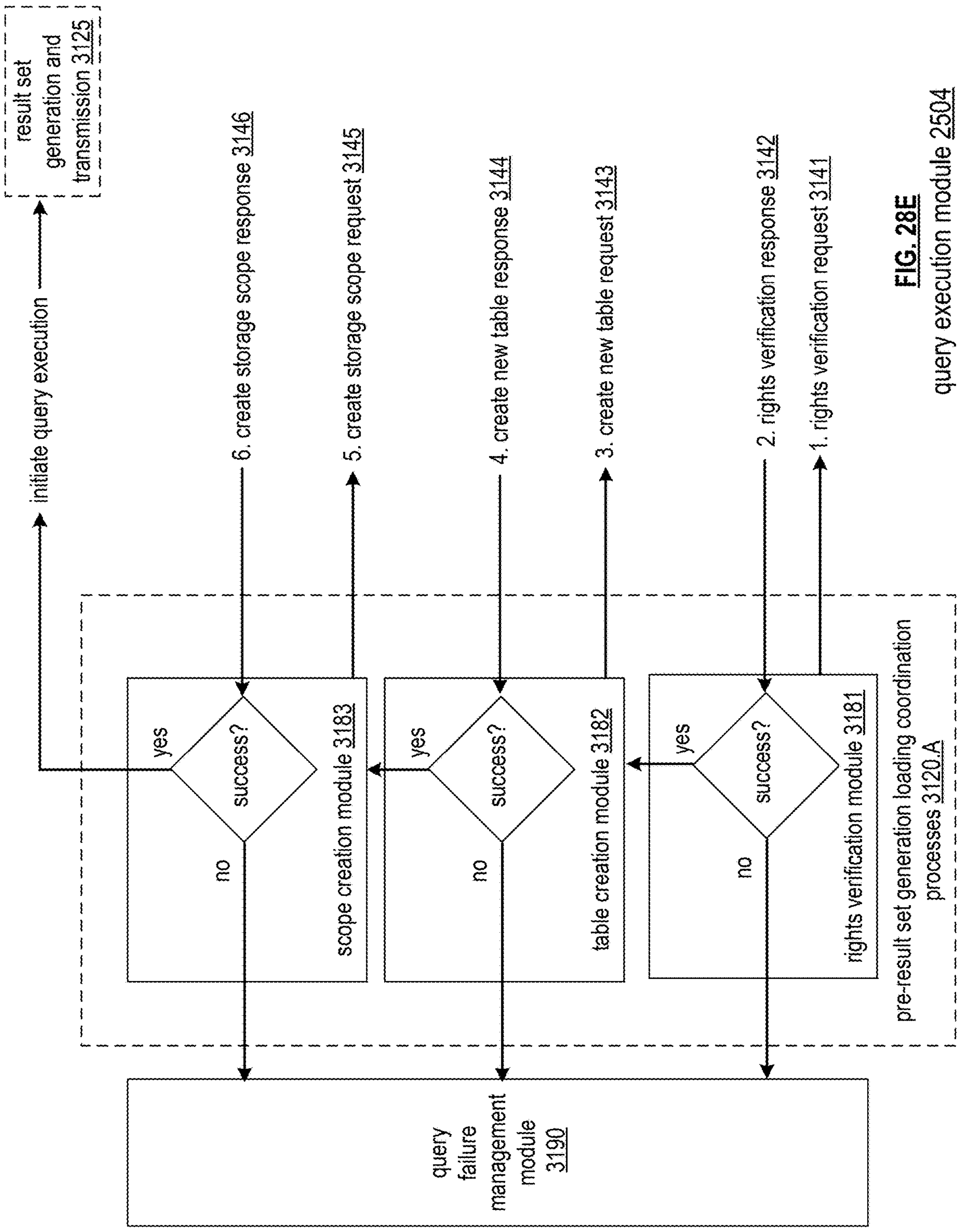
FIG. 28E illustrates a flow implemented by a query execution module performing loading coordination processes in accordance with various embodiments.

FIG. 28E illustrates a flow of processing these transactional exchanges of FIG. 28D via a rights verification module 3181, a table creation module 3182, and a scope creation module 3183. If any response indicates a corresponding request fails, a query failure management module 3190 is implemented by query execution module 2504 to reverse any creation made thus far (e.g. drop a created table, delete the created storage scope). The query failure management module 3190 is discussed in further detail in conjunction with FIG. 28H.

In other embodiments, requests and responses of FIGS. 28D and 28E can be sent and received in a different ordering than depicted in FIGS. 28D and 28E. While FIG. 28E depicts that each subsequent request is only transmitted once success of the response of a previously received request is determined, in other embodiments, some or all requests are transmitted to their respective entities without first waiting for responses to other requests, where responses may be received at different times in a different ordering than depicted in FIG. 28D and/or 28E.

Figure 28F:
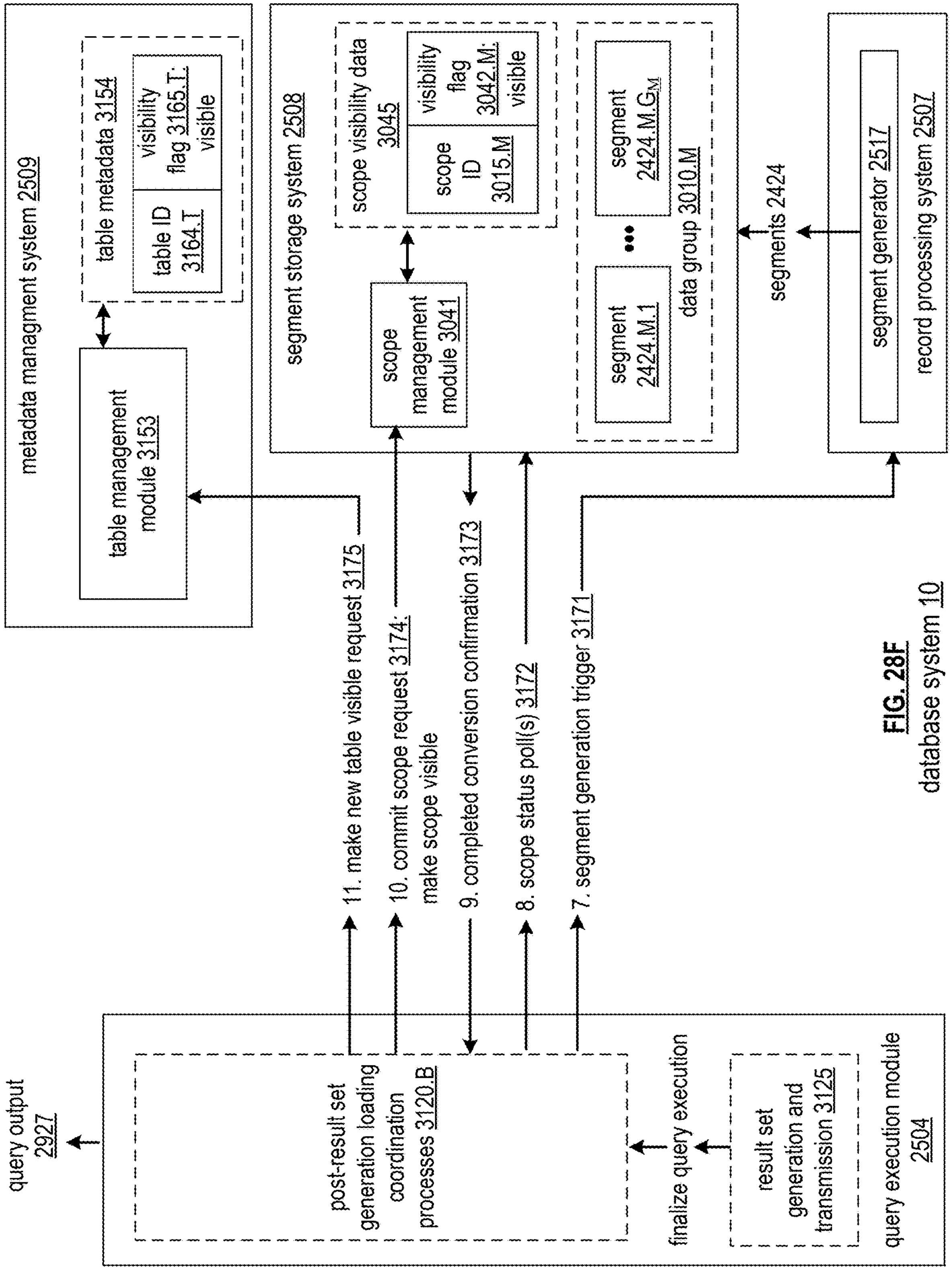
FIG. 28F is a schematic embodiment of a database system that performs sets of transactional exchanges with a metadata management system and a segment storage system via a query execution module prior to result set generation and transmission in accordance with various embodiments.

As illustrated in FIG. 28F, performing the post-result set generation loading coordination processes 3120.B can include first sending a segment generation trigger 3171 to the record processing system 2507, which can cause the record processing system to perform the conversion process upon all pages 2515 storing the result set to generate corresponding segments for storage. For example, this segment generation trigger 3171 is not initiated until the result set storage status 3126 indicating that all received data blocks of the result set are stored in pages is received, based on prior execution of loading operator 3127 before finalizing query execution as illustrated in FIG. 28C.

Alternatively or in addition, the post-result set generation loading coordination processes 3120.B can include sending one or more scope status polls 3172, for example, as a stream of status polls over time, such as once every second or another short, fixed time frame, polling the segment storage system 2508 for whether all segments of the scope have been generated from the pages via the conversion process initiated by the segment generation trigger 3171. The scope status polls 3172 can indicate the scope ID 3015 of the corresponding scope created via the create storage scope request 3145. The segment storage system can generate and send completed conversion confirmation 3173 in response, indicating when all segments of the scope have been generated and stored.

Alternatively or in addition, the post-result set generation loading coordination processes 3120.B can include sending a commit scope request 3174 to the segment storage system 2508 to make the scope visible. The commit scope request 3174 can indicate the scope ID 3015 of the corresponding scope created via the create storage scope request 3145. The segment storage system can update the visibility data 3045 in response to change the visibility flag 3042 for the given scope ID 3015 from hidden to visible, for example, in the consensus storage layer, via a data ownership information generation process, and/or by updating data ownership information via execution of a consensus protocol medicated by a plurality of nodes of the segment storage system.

Alternatively or in addition, the post-result set generation loading coordination processes 3120.B can include sending a make table visible request 3175 to the metadata management system 2509 to make the scope visible. The make table visible request 3175 can indicate the table ID 3164 of the newly created table created in table metadata via the create new table request 3143. The metadata management system 2509 can update the visibility data 3045 in response to change the visibility flag 3165 for the given table ID 3164 from hidden to visible. Subsequent queries requesting access to this table with corresponding table ID 3164.T can be processed successfully and/or can access this table once the corresponding visibility flag 3165.T indicates this table is visible. The make table visible request 3175 is optionally only sent for CTAS queries, and not for Insert Into Select queries.

FIG. 28E illustrates a flow of processing these transactional exchanges of FIG. 28D via a conversion monitoring module 3184, a scope commitment module 3185, and/or a make table visible module 3186. While not depicted in FIG. 28F, the post-result set generation loading coordination processes 3120.B can include waiting for responses to the commit scope request 3174 and/or the make table visible request 3175 to determine whether these requests were processed successfully.

If the execution of the query itself fails in operators of the result set generation and transmission 3125, and/or if any response indicates a corresponding request fails, the query failure management module 3190 can be implemented by query execution module 2504 to reverse any creation made thus far (e.g. drop a created table, delete the created storage scope). The query failure management module 3190 is discussed in further detail in conjunction with FIG. 28H.

If the query execution and all requests are successful, a successful query output module 3186 can be implemented to emit the query output 2927, such as the number of rows created and stored.

Figure 28G:
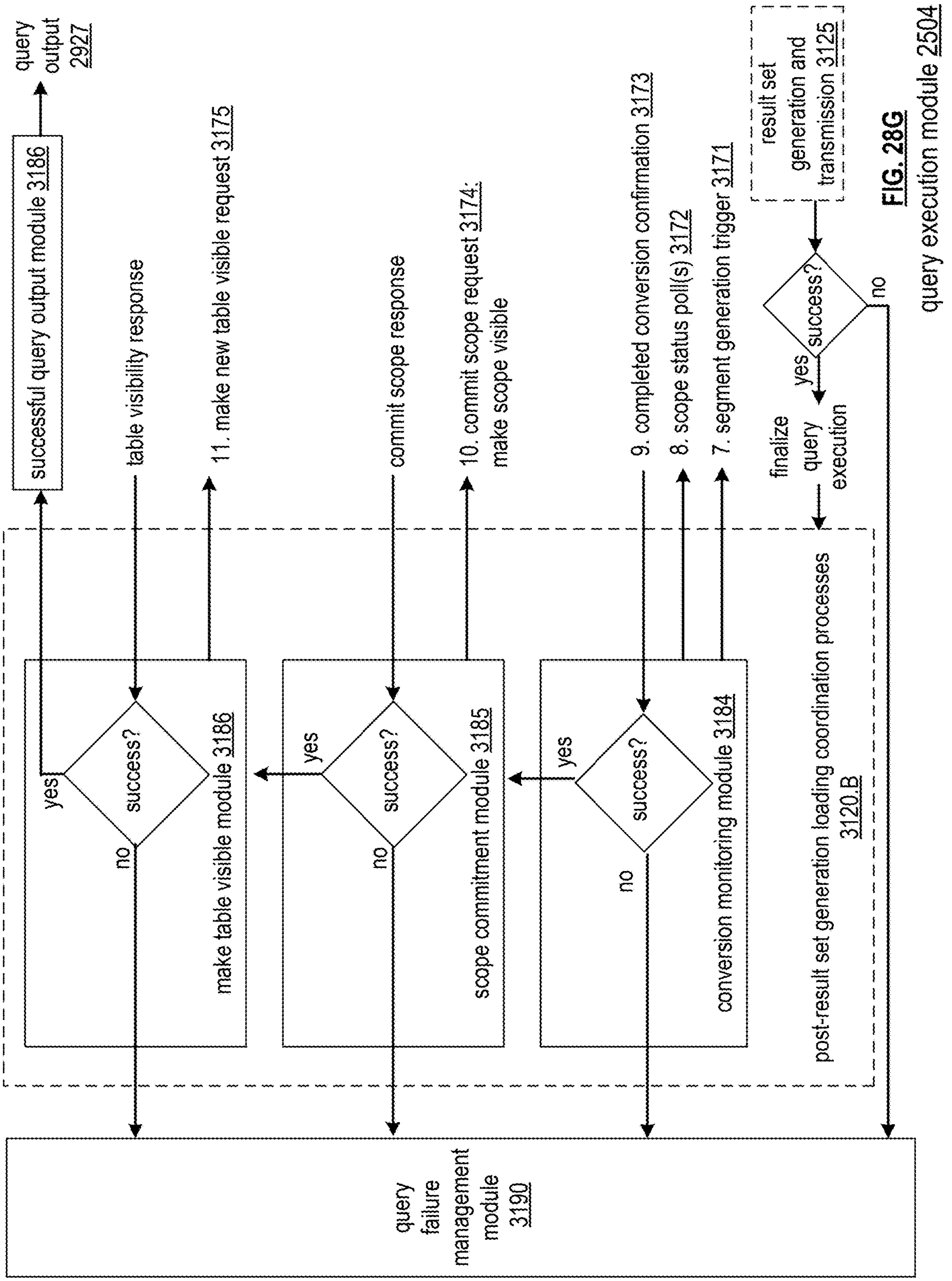
FIG. 28G illustrates a flow implemented by a query execution module performing loading coordination processes in accordance with various embodiments.

In other embodiments, requests and responses of FIGS. 28F and 28G can be sent and received in a different ordering than depicted in FIGS. 28F and 28G. While FIG. 28G depicts that each subsequent request is only transmitted once success of the response of a previously received request is determined, in other embodiments, some or all requests are transmitted to their respective entities without first waiting for responses to other requests, where responses may be received at different times in a different ordering than depicted in FIG. 28F and/or 28G.

Figure 28H:
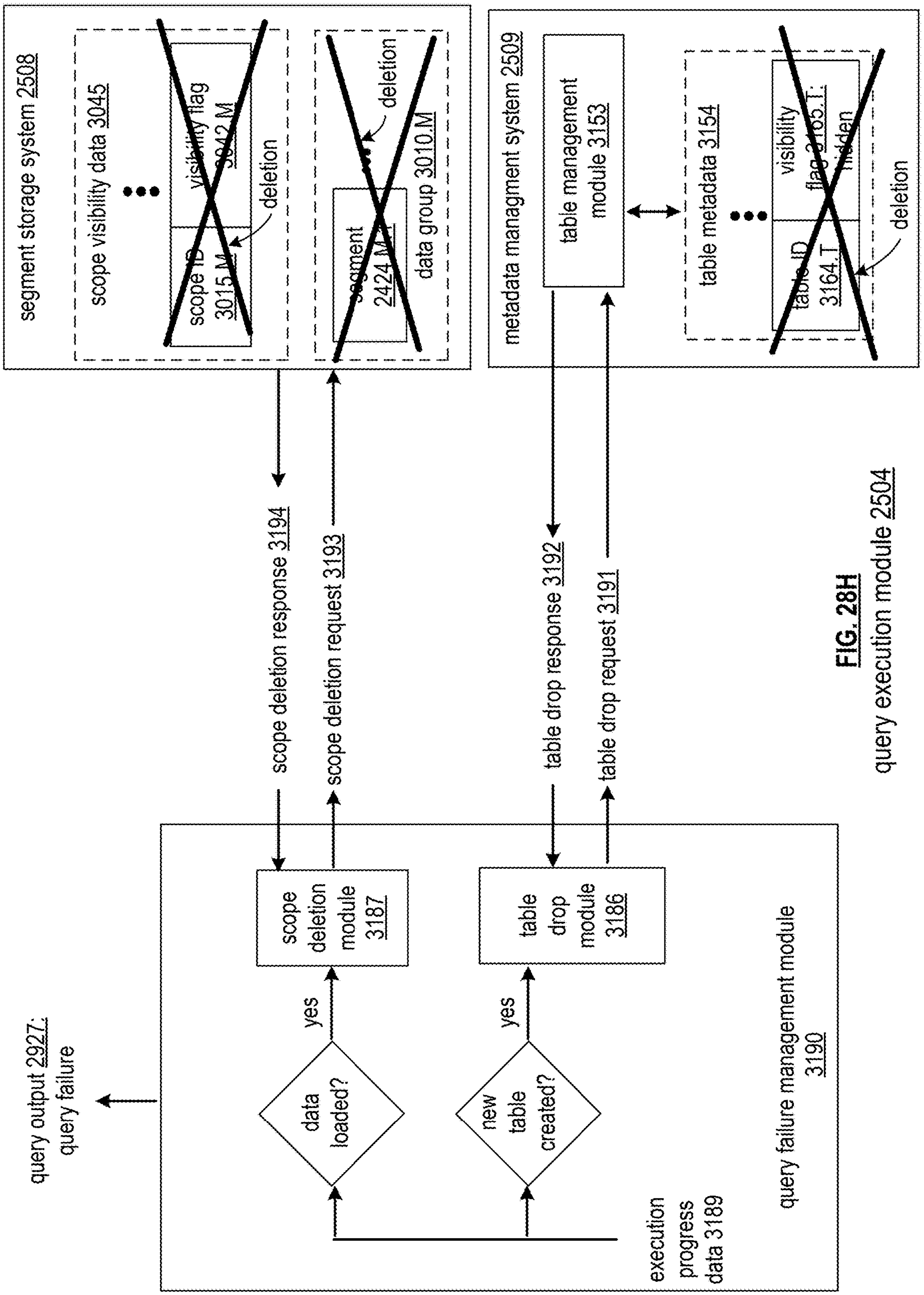
FIG. 28H illustrates a flow implemented by a query failure management module of a query execution module in accordance with various embodiments.

FIG. 28H illustrates a flow implemented via the query failure management module 3190 of FIG. 28E and/or 28G.

If a new table was created via a create new table request 3143 and successful create new table response 3144, a table drop module 3186 can be implemented to send a table drop request 3191 to the metadata management system 2509, and the table management module 3153 can delete the corresponding table from table metadata 3154 accordingly, to reverse the prior creation of this table in the failed query. The table drop request 3191 can indicate the table ID 3164, such as the table name, for the table previously created via the create new table request 3143. The table management module 3153 can further send a table drop response 3192 indicating the corresponding table was deleted from table metadata successfully.

Alternatively or in addition, if a new scope was created via a create storage scope request 3145 and successful create storage scope response 3146, a scope deletion module 3187 can be implemented to send a scope deletion request 3193 to the segment storage system 2508, and the segment storage system 2508 can delete the segments having the corresponding scope identifier accordingly, to reverse the prior creation of this scope in the failed query and/or to reverse creation of any segments generated from the result set. The segment storage system 2508 can further delete the scope identifier and/or corresponding visibility from the scope visibility data managed via the scope management module. The scope deletion request 3193 can indicate the scope ID 3015 for the storage scope previously created via the create storage scope request 3145. The segment storage system 2508 can further send a scope deletion response 3194 indicating the segments of the corresponding scope were deleted from storage successfully.

Determining whether the new table and/or some or all segments of the new scope were created can be based on execution progress data 3189 and/or any other information regarding how far the query progressed before failure and/or whether these actions were required for the query request at all. For example, the drop table request is not sent for a CTAS query if the query execution module did not progress far enough to send a new table request and/or did not receive a new table response confirming creation of the new table. As another example, the scope deletion request is not sent if no segments were generated and stored for the corresponding scope, if no pages were generated for the corresponding scope for eventual conversion into segments, and/or if no scope creation request was sent indicating the upcoming creation of the scope.

FIG. 29A-29D illustrate embodiments of a database system 10 that assigns pairs of nodes of the system to facilitate execution and tracking of various tasks executed by database system 10. Some or all features and/or functionality of FIGS. 29A-29D can implement performance of tasks, for example, via database task performance module 2740 and/or any performance of any database tasks described herein, and/or any corresponding tracking of task status, for example, via any embodiment of system metadata management system 2702 and/or any other management/storage of system metadata, or other system administration functionality described herein.

The database system 10 can have a plurality of different tasks (e.g. long-running tasks that run in overlapping time periods) that are ideally executed asynchronously to maintain efficient database system performance. Some or all of these tasks are be initiated and monitored by a user (e.g. a user requesting queries, a user storing their data in the database, an administrator of the system, a software engineer or database manager maintaining/troubleshooting/configuring functionality of the database system 10, or other users). There may be constraints around which node or set of multiple nodes are allowed to run the task, and/or task ownership is ideally balanced among available nodes as much as possible to improve efficiency. Furthermore, currently running task statuses as well as historical task results are ideally available for querying. FIGS. 29A-29E present embodiments of a database system 10 that enables this functionality.

Figure 29A:
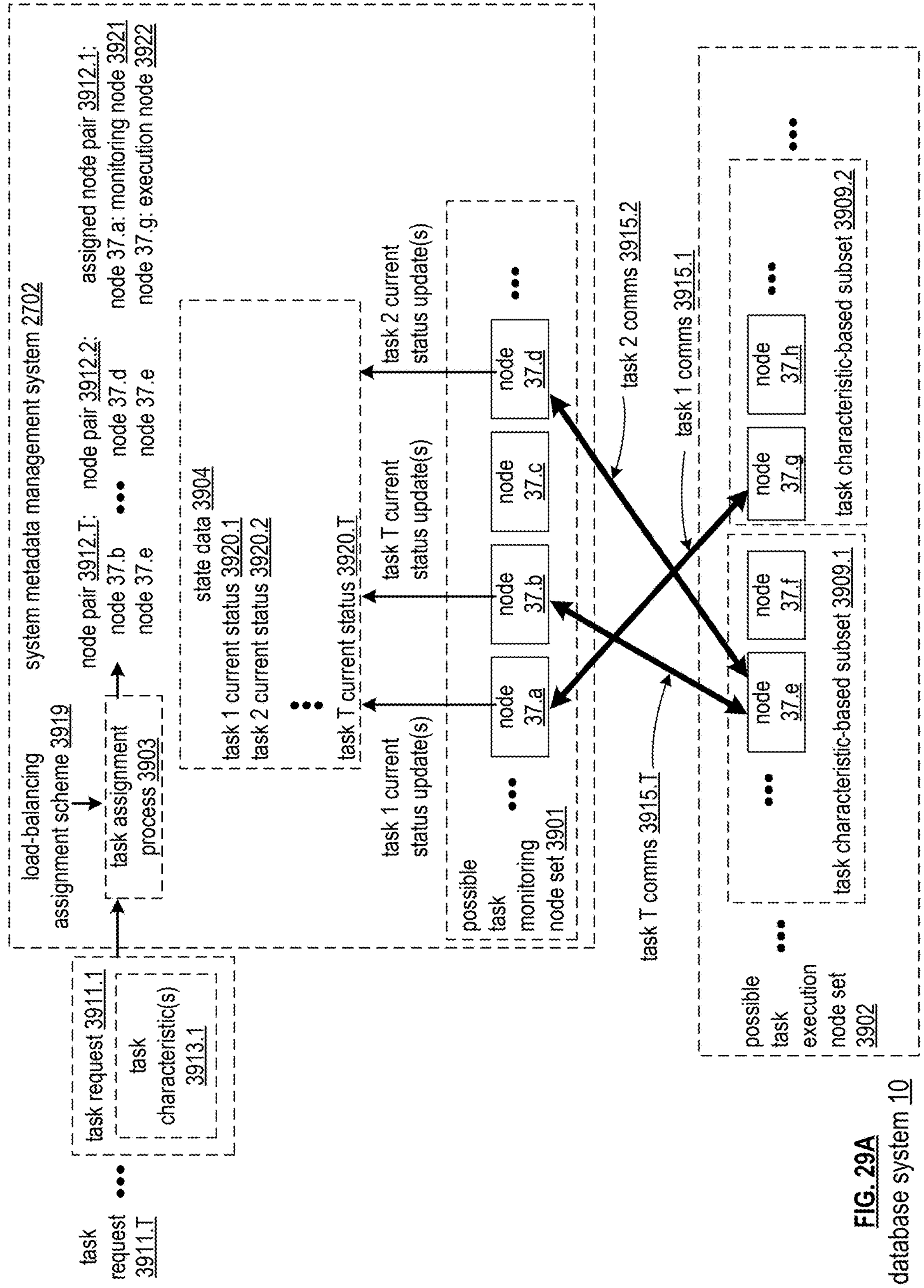
FIG. 29A is a schematic block diagram of a database system that executes a plurality of tasks via a plurality of pairs of nodes in accordance with various embodiments.

FIG. 29A presents an embodiment of a database system 10 where a system metadata management system 2702 implements a task assignment process 3903 that assigns pairs of nodes 37 to collectively facilitate execution of a given incoming task denoted in a task request 3911. For example each task request 3911 is generated by/received from a requesting entity/user, such as via a client device based on being generated based on user input to the client device. Different tasks can be generated via the same or different a requesting entity/user/client device.

Task information can be sent to and stored in system metadata management system 2702 (e.g. the database system 10's global metadata storage cluster). Tasks can be executed by a pair of nodes: an admin owner and a task owner. The admin owner can be required to be an online node in the metadata storage cluster, and can be responsible for starting and monitoring the task. The task owner can be any node (for example, that that meets the location constraints specified by the task creator) and can be implemented to execute the actual task. Both owners can be assigned upon task creation, chosen randomly in order to balance the load.

A given task request can define some or all functionality of the given task via a set of one or more task characteristics 3913, such as one or more parameters optionally configured via user input in the task request and/or otherwise determined for the task, for example, based on the requesting entity. In some embodiments task characteristics 3913 can define a corresponding task based on including some or all of: a type factory and/or other information regarding the type/functionality of the corresponding task and/or task object, one or more arguments, a location type, and/or a location id. For example, the generic nature of these characteristics can be favorable, as many different types of tasks can be instantiated and managed by a common infrastructure as presented in conjunction with FIGS. 29A-29D.

The assigned node pair 3912 for a given task can collectively facilitate tracking and execution of the given task asynchronously from the tracking/execution of other tasks, for example, by other pairs of nodes. This can include each pair of nodes exchanging and processing various task communications 3915.

In particular, each assigned node pair 3912 can include a task monitoring node 3921 (e.g. an "admin owner" node) and a task execution node 3922 (e.g. a "task owner" node). The nodes assigned to these rows in an assigned node pair 3912 can perform their respective roles for the execution of the given task, for example, based on receiving/otherwise determining their assignment to this task and/or the task characteristics 3913/other parameters or information regarding the task itself and/or how the task be executed. For example, the task characteristics 3913/other parameters or information is communicated to the assigned nodes via processing resources implementing the task assignment process 3903, and/or such as via a leader node of the system metadata management system 2702 and/or via a consensus protocol mediated via a plurality of nodes of the system metadata management system 2702.

The task assignment module can select which node be assigned as the task monitoring node 3921 based on selecting the task monitoring node 3921 from a set of nodes in a possible task monitoring node set 3901. As illustrated in FIG. 29A, this possible task monitoring node set 3901 from which a given task monitoring node 3921 is selected for a given task can include some or all nodes of the system metadata management system 2702 itself, such as admin nodes of a corresponding metadata storage cluster collectively storing state data 3904 indicating current system metadata and/or that collectively mediate state data 3904 and/or other current configuration data/system metadata via a corresponding consensus protocol mediated by some or all of this set of nodes, for example, based on assignment of a leader node and follower nodes as discussed in conjunction with FIGS. 27A-27J.

In some embodiments, a given node in the possible task monitoring node set 3901 is selected for a given task based on task assignment module 3903 implementing a load-balancing assignment scheme 3919. For example, implementing load-balancing assignment scheme 3919 is based on distributing work across the nodes of possible task monitoring node set 3901 as evenly as possible. In some cases, implementing load-balancing assignment scheme 3919 is based on uniformly dispersing assignment of tasks across the nodes of possible task monitoring node set 3901, which can include implementing a randomized selection of a node from the possible task monitoring node set 3901 for assignment to a task as task monitoring node 3921 in accordance with a uniform probability distribution, and/or can include implementing a turn-based/round-robin selection of the node from the possible task monitoring node set 3901 for assignment to a task as task monitoring node 3921.

The task assignment module can select which node be assigned as the task execution node 3922 based on selecting the task execution node 3922 from a set of nodes in a possible task execution node set 3902. As illustrated in FIG. 29A, this possible task execution node set 3902. from which a given task execution node 3922 is selected for a given task can be distinct from/have a null intersection with possible task monitoring node set 3901 (e.g. are nodes of database system 10 that are not included in the system metadata management system 2702 itself, and/or are not admin nodes of a corresponding metadata storage cluster). In other embodiments, one or more nodes is included in both the possible task monitoring node set 3901 and the possible task execution node set 3902.

In some embodiments, a given node in the possible task execution node set 3902 is constrained by one or more types of task characteristics 3913. For example, a given first task can only be performed by a first task characteristic-based subset 3909.1 of the possible task execution node set 3902 based on having a first particular set of task characteristics 3913 constraining the execution to being performed by only nodes in this first particular proper subset of the possible task execution node set 3902, while a given second task can only be performed by a second task characteristic-based subset 3909.2 of the possible task execution node set 3902 based on having a second particular set of task characteristics 3913 constraining the execution to being performed by only nodes in this second particular proper subset of the possible task execution node set 3902, for example, based on the second particular set of task characteristics 3913 being different from the first particular set of task characteristics 3913.

As a particular example, a given task characteristic-based subset 3909 determined for a given task can be based on the location type and/or a location identifier denoted in the set of task characteristics 3913 for the given task. The task characteristic-based subset 3909 identified based on the location type and/or a location identifier can include only nodes possible task execution node set 3902 that are located in physical and/or virtual locations denoted by location type and/or a location identifier, and/or otherwise can include only nodes in the possible task execution node set 3902 that meet requirements specified by a location type and/or a location identifier configured for/required for executing the given task. Other types of characteristics in a set of task characteristics 3913 can alternatively or additionally which nodes be assigned to execute a corresponding task.

Any number of such task characteristic-based subsets 3909 can include such characteristic-constrained proper subset of the possible task execution node set 3902. Some or all task characteristic-based subsets 3909 can be mutually exclusive, or one or more characteristic-based subsets 3909 can optionally have non-null intersections with one or more other characteristic-based subsets 3909. Some tasks optionally have characteristics inducing no constraints, where any node in possible task execution node set 3902 can be selected. Some nodes 37 can be included in exactly one characteristic-based subsets 3909, or can be included in two or more characteristic-based subsets 3909.

In some embodiments, a given node in the possible task execution node set 3902 is selected for a given task based on task assignment module 3903 implementing the load-balancing assignment scheme 3919. For example, implementing load-balancing assignment scheme 3919 is based on distributing work across the nodes of possible task execution node set 3902 as evenly as possible. In some cases, implementing load-balancing assignment scheme 3919 is based on uniformly dispersing assignment of tasks across the nodes of possible task monitoring node set 3901, which can include implementing a randomized selection of a node from the possible task monitoring node set 3901 for assignment to a task as task monitoring node 3921 in accordance with a uniform probability distribution, and/or can include implementing a turn-based/round-robin selection of the node from the possible task monitoring node set 3901 for assignment to a task as task monitoring node 3921.

In embodiments where only a proper subset of nodes in a corresponding characteristic-based subset 3909 is able to/allowed to execute the corresponding task, implementing load-balancing assignment scheme 3919 for selecting the execution node for the given task can be based on implementing a randomized selection of a node within this corresponding characteristic-based subset 3909, in accordance with a uniform probability distribution, and/or can include implementing a turn-based/round-robin selection of the node from the characteristic-based subset 3909 as tasks are received for which this corresponding characteristic-based subset 3909 applies.

The system metadata management system 2702 and/or some or all nodes 37 of the database system 10 of FIG. 29A can be implemented via some or all features and/or functionality discussed in conjunction with FIGS. 27A-27J. In some embodiments, a leader node of the system metadata management system 2702 performs some or all of the task assignment process 3903, communicates the respective assignments to the assigned nodes for processing the task accordingly, and/or maintains some or all of the state data 3904. In some embodiments, a consensus protocol mediated via a plurality of nodes of the system metadata management system 2702 performs some or all of the task assignment process 3903, communicates the respective assignments to the assigned nodes for processing the task accordingly, and/or maintains some or all of the state data 3904.

As execution of various tasks (e.g. indicated in incoming tasks requests 3911 or automatically/otherwise determined for performance) are initiated/in processing/completed over time, monitoring nodes 3921 can update state data 3904 (e.g. the consensus state of the nodes 37 of the metadata storage cluster implementing the system metadata management system 2702) with current status updates 3914 for tasks that they are individually monitoring, where state data 3904 can collectively store the current status of all tasks that were created (e.g. received in task requests), optionally including historical task information denoting some or all previously completed tasks (e.g. all tasks that were initialed/completed up to a threshold amount of time prior to the current time, where a sliding window of task statuses are maintained).

Users/administrators (e.g. the same or different entity that requested these tasks) can query the state data to retrieve state data for particular tasks/all tasks/tasks with characteristics denoted in corresponding query requests to the state data. For example, the state data 3904 includes all relevant information for a given task, such as its set of characteristics, who requested the task, when it was requested, the current status, the result of the task (if execution is complete) or other information. The state data 3904 optionally stores this information as relational database rows and/or in accordance with a relational database format/other predefined structure to enable querying of the state data via SQL queries or queries in accordance with another relational query language/any other query language. Some or all features and/or functionality of query executions described herein can optionally implement querying of the state data 3904.

Figure 29B:
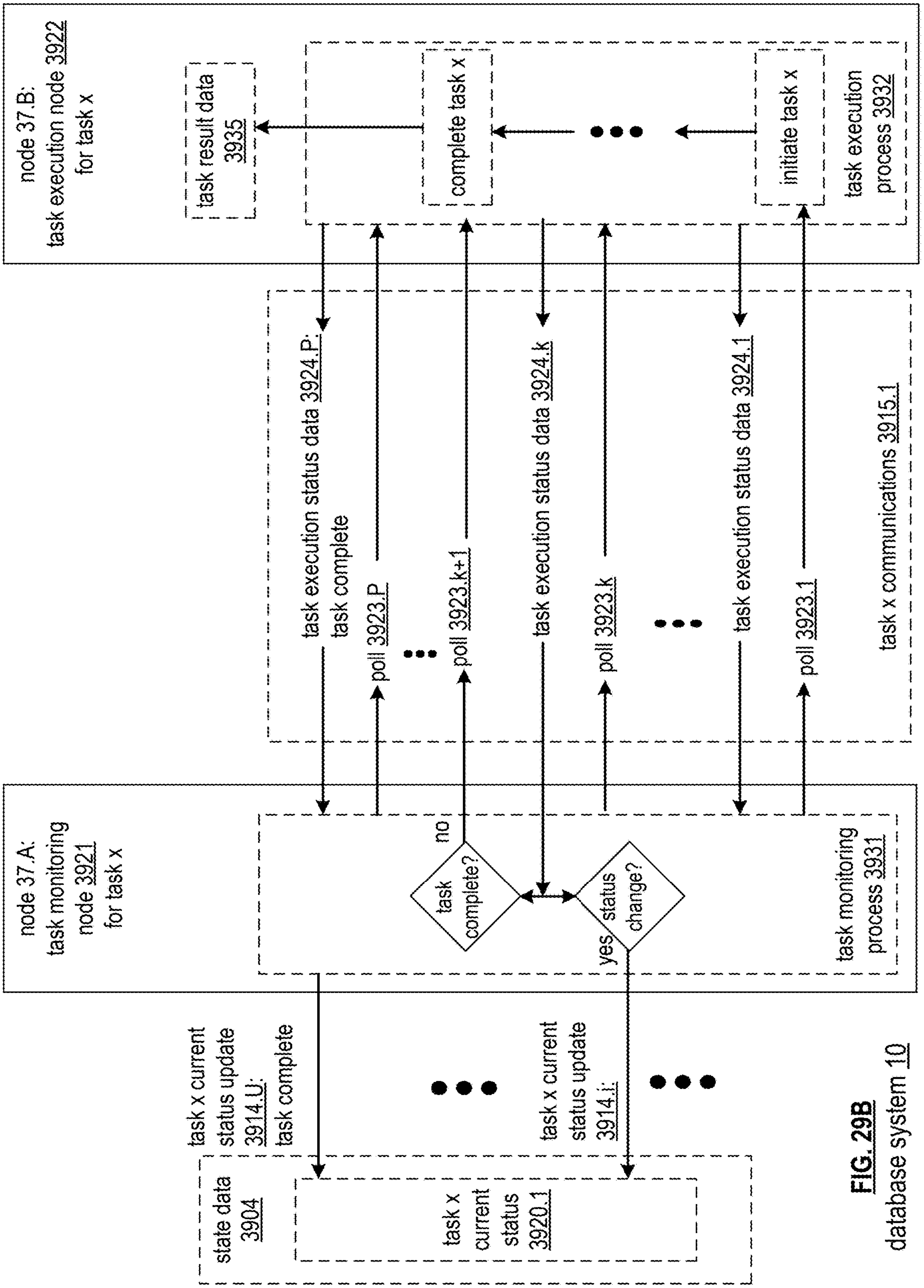
FIG. 29B is a schematic block diagram of a task monitoring node communicating with a task execution node via task communications in accordance with various embodiments.

FIG. 29B illustrates an embodiment of a pair of nodes 37.A and 37.B facilitating execution of a given task x, while tracking its execution status in state data 3904, based on exchanging task communications 3915 for task x based on node 37.A and node 37.B being implemented as a task monitoring node 3921 (e.g. "admin owner") and a task execution node 3922 (e.g. "task owner"), respectively, for the given task x. Some or all features and/or functionality of the pair of nodes 37.A and 37.B of FIG. 29B can implement any task monitoring node 2921 and task execution node 2922 of any assigned node pair 3912 assigned to execute a given task of FIG. 29A and/or any task described herein.

In some embodiments, all steps in a task's lifetime can be managed and monitored by its admin owner. The admin owner can execute some or all the following steps after being notified that it should monitor a task:

1. evaluate whether task should run/continue running (e.g. determine to run the task when it is in a non-terminal state/has not already completed execution)
2. if yes, send the task owner a poll, which will additionally start the task if it is not already running.
   a. update the task's status in the cluster state with status details from response (if there is any change), set a timeout, repeat step 1
3. if no, tell the task owner to stop tracking the task, end the action In some embodiments, when a task completes, the admin owner can set its state (e.g. in (e.g. state data 3904) to a terminal status and/or optionally will no longer poll or interact with the task (e.g. via no further interactions with the task owner node). Historical tasks can be retained in the state (e.g. state data 3904) until a configurable limit is reached, for example to prevent the state from growing unboundedly. This approach can improve the functionality of database systems by allowing any admin node to be an admin owner, which means that task management can be load-balance task management across the nodes in the system metadata management system 2702 (e.g. a corresponding metadata storage cluster of nodes), rather than every task owner having to be connected to the admin leader (e.g. the leader node in the corresponding metadata storage cluster or other leader).

As illustrated in FIG. 29B, node 37.A assigned as task monitoring node 3921 for the given task x can implement a task monitoring process 3931, which can include sending a plurality of polls 3923.1-3923.1 to the node 37.B. Node 37.B, upon receiving each of the plurality of these polls 3923, can generate and send task execution status data 3924 back to node 37.A in response via a corresponding task execution process 3932 for task x. For example, each given poll 3923.*k* generated and sent via task monitoring process 3931 of node 37.A for task x is received and processed by the task execution status data 3924 of node 37.B, a corresponding task execution status data 3924.*k* is sent to node 37.A in response. Node 37.A can send polls 3923 over time in accordance with a predetermined schedule and/or fixed time interval. The rate at which polls 3923 are sent by node 37.A can optionally be a function of some or all characteristics of task x or the requesting user, or is optionally the same rate configured for all task monitoring processes 3931 for all tasks.

Node 37.A, upon receiving each given task execution status data 3924, can update the current status 3920 of task x in state data 3904 accordingly. In some cases, this includes sending requests to a leader node 37 of the system metadata management system 2702 to update the status data, where the leader node stores/mediates the state data 3904.

In some embodiments, the current status reflects current state only (and optionally not time stamps/etc.), where state data 3904 is thus optionally only updated by the task monitoring node 3921 when the status has changed from a prior status. Thus, the number of changes to state data 3904 (e.g. number of current status updates 3914) is optionally less than the number of task execution state data received based on receiving multiple consecutive state data 3924 that indicate the same status based on the execution status not having changed within a corresponding period of time.

Node 37.A can send subsequent polls as long as the task is executing, to continue to request status updates. The node 37.A can cease sending polls once determining that the task is complete (e.g. fully completed successfully, or aborted early due to failure or requested cancellation). The current status 3920 can be updated in state data 3904 via a corresponding current status update 3914 to denote the task is complete, and/or to further indicate task result data 3935 corresponding to the task (e.g. data results, whether the task was successful, details regarding execution, or other additional information rather than a binary flag/simple information denoting completion). Additional information included in task result data 3935 can otherwise be retrieved from memory resources 3938 from the node 37.A, and/or other processing resources of database system 10, for example, to ultimately be included in current status 3920 in state data 3904 and/or to ultimately be conveyed to a user requesting the task and/or requesting status of the task. Alternatively, task result data 3935 simply denotes the task is completed.

Figure 29C:
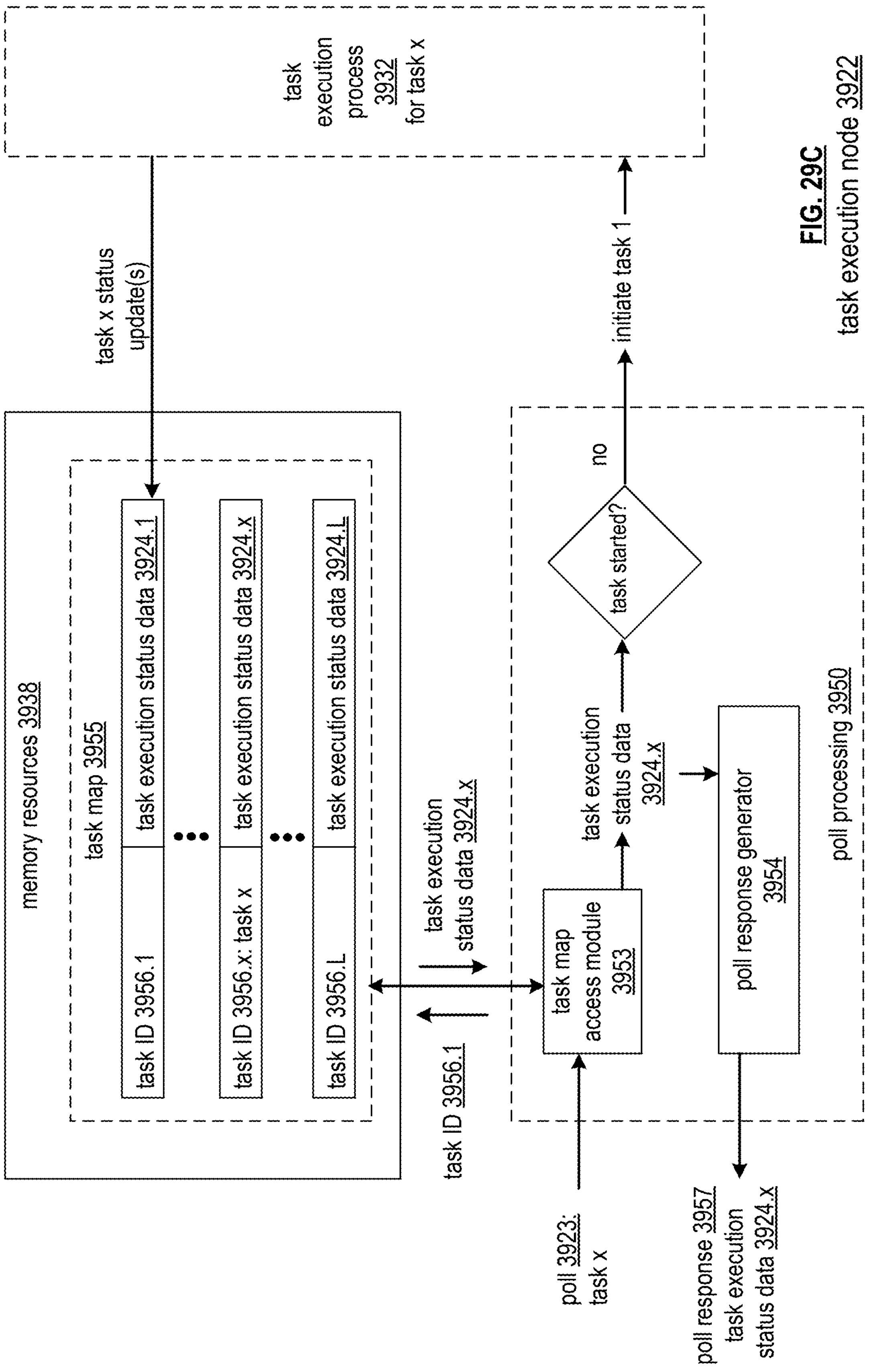
FIG. 29C is a schematic block diagram of a task execution node that implements poll processing and a task execution process in accordance with various embodiments.

FIG. 29C illustrates an embodiment of task execution node 3922. Some or all embodiments of task execution node 3922 of FIG. 29C can implement any task execution node 3922 of FIG. 29A and/or 29B, and/or any embodiment of executing tasks described herein. Some or all features and/or functionality of task execution node 3922 of FIG. 29C can optionally be implemented as one or more database task performance modules 2740 of FIGS. 27A-27I.

In some embodiments, the task owner maintains an in-memory map of running tasks by id, for example in a health protocol. The tasks can be polled for execution status as needed. In some embodiments, when a poll task request is received from an admin owner, a task owner checks for existence of the task, starting it if necessary and/or returning the current status.

Memory resources accessible by a node 37 implemented as a task execution node 3922 for one or more tasks can store a task map 3955 indicating data for some or all of these tasks (e.g. the ones currently executing, all ones having executed within a predetermined time period into the past, and/or all ones for which a request to delete of the data has not yet been received by a corresponding task monitoring node 3921. The task map can store a task identifier 3956 for each task assigned to the node (e.g. pending completion and/or already completed), which can map to corresponding task execution status data 3924. The task identifier 3956 can optionally further map to the set of characteristics 3913 and/or other information regarding/configuring how the task be executed, utilized by the node 37 to execute the task accordingly.

In some embodiments, task execution node 3922 can perform poll processing 3950 to process incoming polls 3923 from one or more task monitoring nodes that are assigned to monitor the one or more corresponding tasks assigned to the node 37.

A given incoming poll 3923 for a given task x can indicate the task ID 3956.*x* for the given task x, and/or can otherwise be processed to access the task execution status data 3924.*x* for the corresponding task x via a task access module 3953. A poll response generator 3954 can generate and/or send a corresponding poll response 3957 indicating the task execution status data 3924.*x* in response to the given poll 3923 as illustrated in FIG. 29B.

If the task execution status data 3924 indicates the task has not yet started (e.g. based on this being the first poll received from the corresponding task monitoring node 3921 for the given task x), the task can be initiated in response to receiving this first poll 3923 for task x. In response to this initiated execution of the task, a task execution process 3922 for task x is performed by the task execution node 3922. Over time, for example, in configured time intervals and/or as checkpoints in execution are reached, the task execution node 3922 can store such updates to the status of the task's execution in task map 3955, which are thus conveyed over time in response to subsequent polls 3923 for the task to convey corresponding changes in the task's execution progress over time.

Figure 29D:
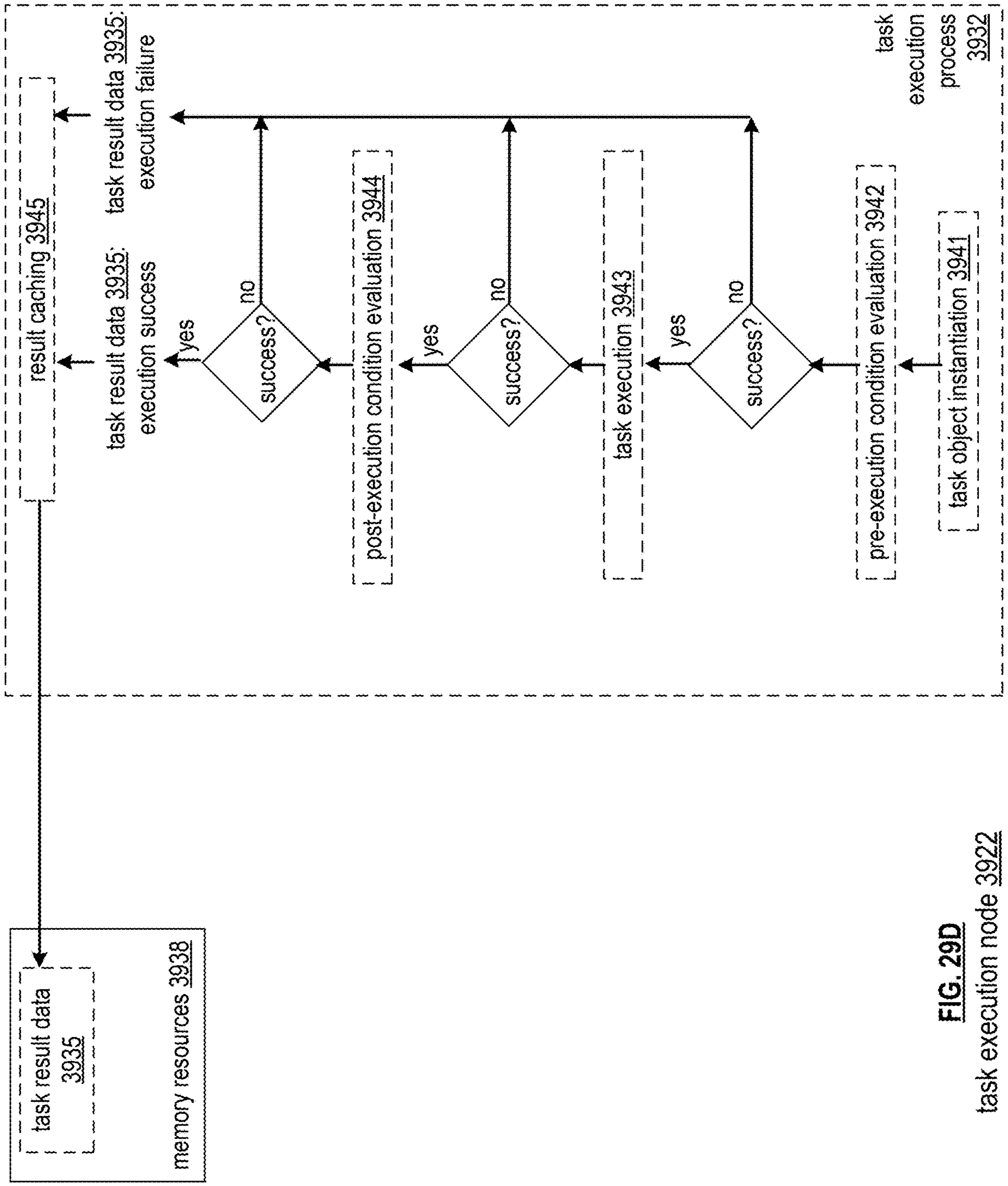
FIG. 29D illustrates an example flow of a task execution process performed by a task execution node in accordance with various embodiments.

FIG. 29D illustrates an illustrates an embodiment of such a task execution process 3932 implemented by a task execution node 3922. Some or all embodiments of task execution node 3922 of FIG. 29D can implement any task execution node 3922 of FIG. 29A, 29B and/or 29C, and/or any embodiment of executing tasks described herein. Some or all features and/or functionality of task execution node 3922 of FIG. 29D can optionally be implemented as one or more database task performance modules 2740 of FIGS. 27A-27I.

In some embodiments, a task is started by: instantiating a task object via the factory type, for example, via task object instantiation 3941; then calling its (e.g. the instantiated task object's) pre-condition check, for example via pre-execution condition evaluation 3942; execute method (e.g. of the instantiated task object), for example, via task execution evaluation 3943, and/or call is post-condition check (e.g. of the instantiated task object), for example, via post-execution condition evaluation 3944. If at any point a failure is encountered, execution can be short-circuited, where the remainder or execution is aborted and/or where task result data 3935 indicates and/or is based on a corresponding execution failure and/or where/when the execution failed. When a task completes (either via successful completion of all these steps or via failure being encountered and execution being aborted as some point), the task owner can store the corresponding results in memory, for example, as task result data 3935 (e.g. memory resources 3938, optionally in task map 3955 as task execution status data 3924 mapped to its task ID, where this task result data 3935 is included in the task execution status data 3924 sent to the task monitoring node 3921 in response to a poll 3923 after the completion of execution). The task owner can store the corresponding results in memory until it receives an indication from the admin owner that it is safe to remove the results (e.g. while not illustrated, the task monitoring node 3921 sends a subsequent poll/send an instruction to remove the results from memory and/or to remove the entry from memory/send other confirmation based on the task result data being received, stored in state data, and/or conveyed to the requesting user. The task result data 3935 can denote whether or not the task was successful and/or failed, and/or can indicate further information regarding how the task was executed and/or respective output.

In some embodiments, long-running tasks may need to be cancelled. The embodiments of FIGS. 29A-29D can be further configured to enable communicating the task cancellation to the node running the task, as well facilitating gracefully end the task.

For example, when a client requests to cancel a task, an is_canceled flag (e.g. flag/information denoting the cancellation) is set on the task object and/or otherwise communicated. The admin owner can evaluate this state on its next poll cycle (e.g. based on reading task execution status data 3924 indicating this flag, where task execution status data 3924 is optionally based on and/or mapped to data/attributes/variables set on task objects. The admin owner can further notify the task owner that the task should be cancelled via a corresponding instruction.

The exact mechanism by which the running task is cancelled by the task owner can vary by type, For example, some tasks may need to communicate with other protocols (e.g. other nodes/other processing resources/etc.) to stop execution. The asynchronous nature of cancellation can allow for multiple implementation patterns. As one example of implementation, the task execution process 3932 periodically checks for cancellation and chooses not to continue execution, ending before its next step. As another example of implementation the task execution process 3932 forwards on the cancellation request to some other protocol that is actually doing the work. These example implementations can be each used for corresponding types of tasks/corresponding sets of characteristics 3912 of tasks.

This approach can also enable the task to perform any cleanup necessary before it terminates. If the task is successfully cancelled, execution can end with a CANCELLED status (e.g. as task result data 3935 and/or task execution status data 3924) and propagate back to the admin owner and/or raft state (e.g. state data 3904 and/or other consensus protocol state) via normal success/failure paths.

Figure 29E:
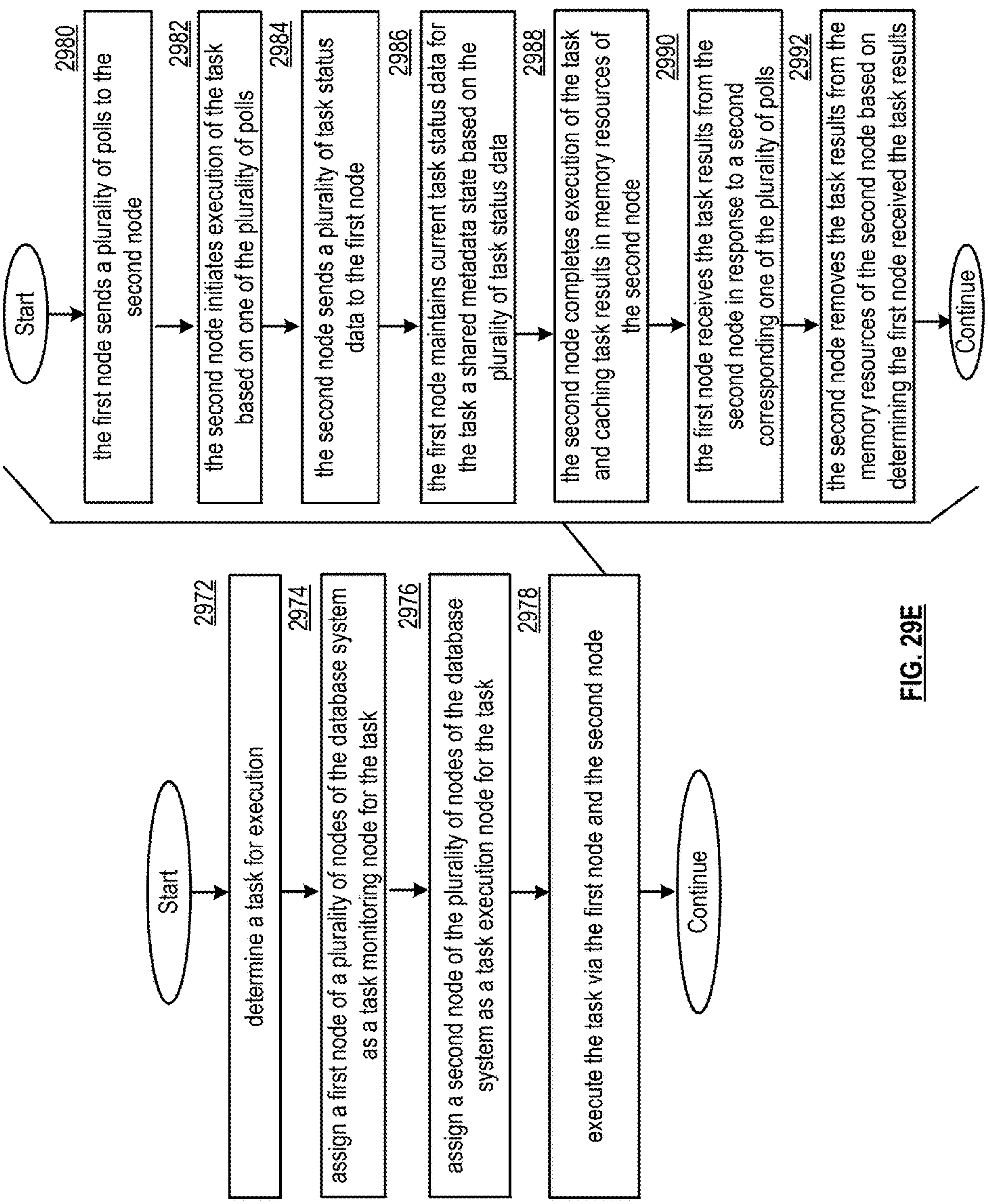
FIG. 29E is a logic diagram illustrating a method for execution in accordance with various embodiments.

FIG. 29E illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29E. In particular, a node 37 can participate in some or all steps of FIG. 29E based on being assigned as a task monitoring node for one or more tasks being executed by the database system 10, and/or based on being assigned as a task execution node for one or more tasks being executed by the database system 10. Some or all of the method of FIG. 29E can be performed by nodes executing a query in conjunction with a query execution, for example, via one or more nodes 37 implemented as nodes of a query execution module 2504 implementing a query execution plan 2405, where one or more nodes implement operator scheduling modules 2815. Some or all of the steps of FIG. 29E can optionally be performed by any other processing module of the database system 10. Some or all of the steps of FIG. 29E can be performed to implement some or all of the functionality of the database system 10 as described in conjunction with FIGS. 29A-29E, for example, by implementing some or all of the functionality of system metadata management system 2702, task monitoring node 2921, and/or task execution node 2922. Some or all of the steps of FIG. 29E can optionally be performed by a leader node a metadata storage cluster and/or one or more follower nodes of the leader node, in accordance with some or all features and/or functionality discussed in conjunction with FIGS. 27A-27J. Some or all steps of FIG. 29E can be performed by database system 10 in accordance with other embodiments of the database system 10 and/or nodes 37 discussed herein.

Step 2972 includes determining a task for execution. Step 2974 includes assigning a first node of a plurality of nodes of the database system as a task monitoring node for the task. Step 2976 includes assigning a second node of the plurality of nodes of the database system as a task execution node for the task. Step 2978 includes executing the task via the first node and the second node.

Performing step 2978 can include performing some or all steps 2980-2992. Step 2980 includes the first node sending a plurality of polls to the second node. Step 2982 includes the second node initiating execution of the task based on one of the plurality of polls. Step 2984 includes the second node sending a plurality of task status data to the first node, for example, where each of the plurality of task status data is sent by the second node in response to a corresponding one of the plurality of polls. Step 2986 includes the first node maintaining current task status data for the task a shared metadata state based on the plurality of task status data. Step 2988 includes the second node completing execution of the task and caching task results in memory resources of the second node. Step 2990 includes the first node receiving the task results from the second node in response to a second corresponding one of the plurality of polls. Step 2992 includes the second node removing the task results from the memory resources of the second node based on determining the first node received the task results.

In various examples, executing the task via the first node and the second node is further based on, after the second node initiating execution of the task based on one the of the plurality of polls: the second node instantiating a task object having one task type of a plurality of possible task types based on the second node initiating execution of the task; the second node performing a pre-execution condition check for the task based on instantiating the task object; determining whether a pre-execution condition check failure occurred in the pre-execution condition check for the task; when determining a pre-execution condition check failure did not occur in performing the pre-execution condition check, performing execution of functionality associated with the task based on the one task type; determining whether an execution failure occurred in performing the execution of the functionality associated with the task; when determining the execution failure did not occur in performing the execution of the functionality associated with the task, performing a post-execution condition check for the task; and/or determining whether a post-execution condition check failure occurred in the post-execution condition check for the task. In various examples, the task results cached in the memory resources indicate one of: the pre-execution condition check failure when determining the pre-execution condition check failure did occur, the execution failure when determining the execution failure did occur; the post-execution condition check failure when determining the post-execution condition check failure did occur; or success of the task when determining the post-execution condition check failure did not occur.

In various examples, the method includes determining a set of characteristics of the task, where the set of characteristics includes at least one location constraint. In various examples, the second node of the plurality of nodes is assigned based on: determining a proper subset of nodes of the plurality of nodes meeting the at least one location constraint; and/or selecting the second node from the proper subset of nodes based on a load-balancing selection scheme.

In various examples, the at least one location constraint includes a location type and/or a location identifier. In various examples, the set of characteristics of the task further includes: a task type and/or at least one argument for the task type. In various examples, the task is executed by the second node from the proper subset of nodes in accordance with the task type based on applying the at least one argument.

In various examples, assigning the first node of a plurality of nodes of the database system as the task monitoring node for the task is based on: determining a proper subset of nodes of the plurality of nodes that collectively implement a metadata storage cluster; and/or selecting the first node from the proper subset of nodes based on a load-balancing selection scheme. In various examples, the load-balancing selection scheme is based on a random selection in accordance with a uniform distribution. In various examples, the load-balancing selection scheme is based on a round-robin selection scheme.

In various examples, executing the task via the first node and the second node is further based on the first node determining state data for the task. In various examples, the first node requests execution of the task by the second node via sending each of the plurality of polls to the second node based on corresponding prior ones of the plurality of state data for the task indicating the task is in a non-terminal state. In various examples, the method further includes the first node determining the task is in a terminal state based on the first node receiving the task results from the second node. In various examples, the first node sends no subsequent ones of the plurality of polls to the second node based on the first node determining the task is in the terminal state. In various examples, the first node updates the current task status data indicating the terminal state.

In various example, the method further includes: determining a plurality of other tasks for execution; assigning, for each other task of the plurality of other tasks, a corresponding first node of the plurality of nodes of the database system as the task monitoring node for the each other task; assigning, for each other task of the plurality of other tasks, a corresponding second node of the plurality of nodes of the database system as the task execution node for the each other task; and/or executing each other task of the plurality of other tasks via the corresponding first node and the corresponding second node assigned for the each other task. In various examples, the task and the plurality of other tasks are executed asynchronously within a plurality of overlapping time periods.

In various examples, a same one of the plurality of nodes is assigned as the first node for the task and is further assigned as the corresponding first node for one of the plurality of other tasks. In various examples, the task is executed by the first node and the second node within a first temporal period. In various examples, the one of the plurality of other tasks is executed by the first node and a different second node within a second temporal period overlapping with the first temporal period. In various examples, the different second node is distinct from the second node.

In various examples, a same one of the plurality of nodes is assigned as the second node for the task and further as the corresponding second node for one of the plurality of other tasks. In various examples, the task is executed by the first node and the second node within a first temporal period. In various examples, the one of the plurality of other tasks is executed by a different first node and the second node within a second temporal period overlapping with the first temporal period. In various examples, the different first node is distinct from the first node.

In various examples, the second node maintains a map indicating a set of tasks assigned for execution by the second node that includes the task and the one of the plurality of other tasks. In various examples, executing the task via the first node and the second node is further based on the second node, in response to receiving each of the plurality of polls, accessing the map to determine the task exists based on an identifier of the task indicated in the each of the plurality of polls being included in the map. In various examples, the current status for the task mapped to the identifier of the task in the map is sent by the second node to the first node as a corresponding one of the plurality of task status data.

In various examples, the corresponding first node of the plurality of nodes of the database system is assigned as the task monitoring node for the each other task based selecting the first node from the plurality of nodes by applying a load-balancing selection scheme. In various examples, the corresponding second node of the plurality of nodes of the database system is assigned as the task execution node for the each other task based selecting the second node from the plurality of nodes by applying the load-balancing selection scheme. In various examples, the task and the plurality of other tasks are all executed within a same temporal period via a plurality of assigned pairs of the plurality of nodes in accordance with an even distribution of tasks across the plurality of nodes within the same temporal period based on applying the load-balancing selection scheme.

In various examples, the method further includes: receiving a request to perform the task based on user input by a user; and/or conveying at least one of the plurality of task status data to the user. In various examples, conveying the at least one of the plurality of task status data to the user is based on sending the at least one of the plurality of task status data to a client device associated with the user, where the at least one of the plurality of task status data is displayed to the user via a display device associated with the client device. In various examples, the request to perform the task is generated by the client device based on user input to the client device, for example, based on the user interacting with a graphical user interface displayed by the display device.

In various examples, the method further includes receiving a request to cancel the task based on further user input by the user after initiating execution of the task via the first node and the second node. In various examples, the request to cancel the task is received task based on user input by the user. In various example, the request to cancel the task is generated by the client device based on user input to the client device, for example, based on the user interacting with the same or different graphical user interface displayed by the display device.

In various examples, the method further includes setting a cancellation flag of a task object for the task denoting cancellation of the task in response to the request to cancel the task. In various examples, the method further includes cancelling execution of the task via the first node and the second node based on: the first node evaluating a corresponding of the plurality of task status data indicating a cancellation status based on the cancellation flag; the first node notifying the second node that the task be cancelled; and/or the second node performing a cancellation procedure for the task based on a task type of the task. In various examples, completing the execution of the task is based on cancelling the execution of the task prior to successful completion of the execution of the task. In various examples, the task results cached in the memory resources indicate successful cancellation of the task based on successful performance of the cancellation procedure.

In various examples, the second node performs the cancellation procedure for the task based on periodically checking for cancellation and choosing not to continue execution; and/or forwarding the request to cancel the task to another protocol performing at least one functionality of executing the task. In various examples, the second node performs different cancellation procedures for different task types, where the cancellation procedure is selected for performance by the second node based on the task type of the task.

In various embodiments, any one of more of the various examples listed above are implemented in conjunction with performing some or all steps of FIG. 29E. In various embodiments, any set of the various examples listed above can be implemented in tandem, for example, in conjunction with performing some or all steps of FIG. 29E.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29E, for example, in conjunction with further implementing any one or more of the various examples described above.

In various embodiments, the operational instructions, when executed by the at least one processor, cause the database system to: determine a task for execution; assign a first node of a plurality of nodes of the database system as a task monitoring node for the task; assigning a second node of the plurality of nodes of the database system as a task execution node for the task; and/or execute the task via the first node and the second node based on: the first node sending a plurality of polls to the second node; the second node initiating execution of the task based on one of the plurality of polls; the second node sending a plurality of task status data to the first node, where each of the plurality of task status data is sent by the second node in response to a corresponding one of the plurality of polls; the first node maintaining current task status data for the task a shared metadata state based on the plurality of task status data; the second node completing execution of the task and caching task results in memory resources of the second node; the first node receiving the task results from the second node in response to a second corresponding one of the plurality of polls; and/or the second node removing the task results from the memory resources of the second node based on determining the first node received the task results.

Figure 30A:
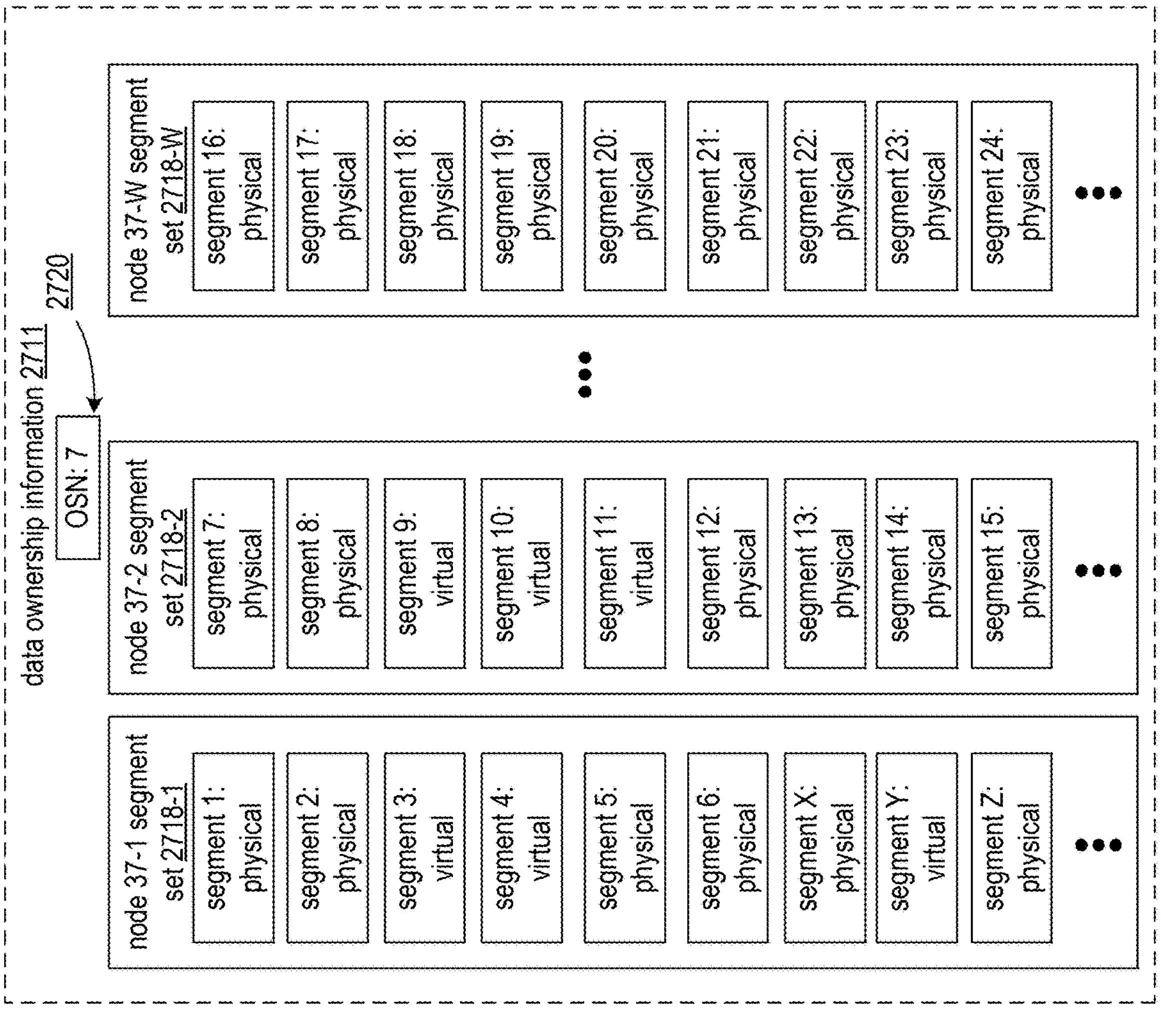
FIG. 30A illustrates an embodiment of data ownership information in accordance with various embodiments.

FIG. 30A illustrates an example embodiment of a database system 10 that reassigns node roles during a tasks execution. Some or all of the features and/or functionality of FIG. 30A can implement the asynchronous execution of tasks via assigned pairs of nodes discussed in conjunction with some or all features and/or functionality of FIGS. 29A-29E.

In embodiments where the database system 10 is large (e.g. is implemented at a massive scale) and/or further grows larger over time, problems can be introduced that require coordinating across separate consensus protocol clusters. The database system 10 can be implemented to guarantee that some set of steps interacting with multiple system components will execute in their entirety, even in the case of a node outage.

Distributed tasks can solve this problem with persistent storage of task information in the database system's system metadata management system 2702 (e.g. a global metadata Storage cluster of nodes), allowing tasks to be tracked and/or retried until completion even if there is an intermediate crash. To correctly allow task retries, all task types must be idempotent. This requirement can be built in to the design of individual task implementations (e.g. via different task types/corresponding factory types).

An important responsibility of the admin owner (e.g. the assigned task monitoring node 3921 of FIGS. 29A-29E) can be to detect and handle task owner outages. If a poll fails for any reason, the admin owner can reassign the task's owner (e.g. the assigned task monitoring node 3922 of FIGS. 29A-29E) in the state, and start the task in the new location.

If an admin owner itself fails, an admin leader (e.g. leader node or other processing resources of system metadata management system 2702) detects the connectivity change and reassigns the admin owner. The new admin owner can begin polling the task owner when it receives the update, preventing the ownership change from interfering with task execution.

In some embodiments, the task owner need not be aware of or handle outages. However, in extreme situations, (e.g. network splits), an admin owner may not be able to communicate with its task owner, and orphan a task. To prevent rogue tasks from running in multiple locations in the system in these cases, the task owner can time out and/or cancels a running task if it has not heard from the admin owner within a threshold amount of time (e.g. multiple poll cycles).

FIG. 30A illustrates an example execution of a task that includes outages of both an admin owner node and a task owner node during the lifecycle of the task execution. Some or all features and/or functionality of the task execution of FIG. 30A can implement the task executions of FIGS. 27A-27J and/or of FIGS. 29A-29E.

As illustrated in the example of FIG. 30A, a client implementing a task requesting entity 3010 (e.g. corresponding to a client device/requesting entity/administrator/user requesting the task) sends a task request 3911.*x* for a given task x (e.g. a createTask instruction and/or other request/communications). The task request 3911.*x* can be received/processed by a leader node 37 (e.g. admin01 of a set of admin nodes of a metadata storage cluster of nodes). The leader node 37 of FIG. 30A can optionally be implemented by any embodiment of system metadata management system 2702 described herein.

As illustrated in the example of FIG. 30A, the leader node 37 generates assignment data assigning an initially assigned monitoring node 3921.0 as the task monitoring node for the given task x in response to receiving/processing the task request 3911.*x*. The leader node 37 can communicate this assignment data/corresponding task information for task x to initially assigned monitoring node 3921.0 via an initial assignment notification 4011.0 (e.g. an adminOwnerModified instruction and/or other request/communications).

As illustrated in the example of FIG. 30A, the initially assigned monitoring node 3921.0 sends one or more polls 3923 (e.g. as pollTask instructions and/or other requests/communications) to an initially assigned executing node 3922.0 assigned as the task monitoring node (e.g. node01 of a plurality of nodes of the database system 10) for the given task x in response to receiving/processing the assignment notification 4011.0. For example, the initially assigned monitoring node 3921.0 selects/generates assignment data to assign the initially assigned executing node 3922.0 as the task monitoring node for the given task x, and/or the leader node 37 optionally assigns the initially assigned executing node 3922.0 as the task monitoring node for the given task x in assignment notification 4011.0. While not illustrated in FIG. 30A, one or more responses that include task execution status data 3924 can be sent by the initially assigned executing node 3922.0 back to the initially assigned monitoring node 3921.0 in response to the one or more polls 3923, for example, as illustrated in FIG. 29B, where the initially assigned monitoring node 3921.0 updates current status data for the task's execution accordingly as discussed in conjunction with FIGS. 29A-29E.

The initially assigned executing node 3922.0 can initiate/partially execute the task over a period of time as polls are received over time, for example, based on the initially assigned executing node 3922.0 initiating execution of the task in response to receiving a first poll 3923. The initially assigned executing node 3922.0 can execute the task via some or all features and/or functionality of FIGS. 29C and/or 29D, and/or via implementing a database task performance module 2740.

As illustrated in the example of FIG. 30A, an executing node failure detection 4022 is received/determined by initially assigned monitoring node 3921.0 that indicates the failure/outage of the initially assigned executing node 3922.0. This failure detection 4022 can be based on a communication received from the initially assigned executing node 3922.0 and/or can be based on determining loss of connectivity with the initially assigned executing node 3922.0 (e.g. based on a status response not being received from initially assigned executing node 3922.0, for example, within a predetermined timeout period, such as in multiple poll cycles, and/or based on other determination of loss of connectivity). The initially assigned executing node 3922.0 optionally fails/loses connectivity prior to its completion of the task, or after its completion of the task but prior to status indicating completion of the task being communicated to the initially assigned monitoring node 3921.0 in corresponding status data in response to a poll.

As illustrated in the example of FIG. 30A, a reassignment notification 4031 (e.g. a reassignTaskOwner instruction or other request/communication) is sent by initially assigned monitoring node 3921.0 to leader node 37 in response to the executing node failure detection 4022 received/determined by initially assigned monitoring node 3921.0. As illustrated in FIG. 30A, an assignment notification 4012.1 (e.g. a taskOwnerModified notification and/or other notification/communication) is sent from leader node 37 to initially assigned monitoring node 3921.0 in response to the leader node 37 receiving/processing the reassignment notification 4031. This exchange of reassignment request 4031 and assignment notification 4012.1 can be implemented to facilitate updating of the task execution node from the initially assigned execution node 3922.0 a newly assigned execution node 3922.1.

The reassignment request 4031 can optionally indicate a request that the task execution node be reassigned, where the leader node 37 selects the newly assigned execution node 3922.1 and communicates the newly assigned execution node 3922.1 to the initially assigned monitoring node 3921.0 in assignment notification 4012.1. Alternatively, the initially assigned monitoring node 3921.0 selects the newly assigned execution node 3922.1 themselves, where the reassignment request 4031 can optionally indicate this selected initially assigned monitoring node 3921.0 to update assignment data maintained by the leader node 37/metadata storage cluster in a corresponding consensus state accordingly, where the assignment notification 4012.1 indicates confirmation of the updated assignment.

As illustrated in FIG. 30A, the initially assigned monitoring node 3921.0 sends one or more polls 3923 (e.g. as pollTask instructions and/or other requests/communications) to the newly assigned executing node 3922.1 assigned as the task monitoring node (e.g. node02 of the plurality of nodes of the database system 10) for the given task x in response to receiving/processing the assignment notification 4012.1. While not illustrated in FIG. 30A, one or more responses that include task execution status data 3924 can be sent by the newly assigned executing node 3922.1 back to the initially assigned monitoring node 3921.0 in response to the one or more polls 3923, for example, as illustrated in FIG. 29B, where the initially assigned monitoring node 3921.0 updates current status data for the task's execution accordingly as discussed in conjunction with FIGS. 29A-29E.

The newly assigned executing node 3922.1 can initiate/partially execute the task over a period of time as polls are received over time, for example, based on the newly assigned executing node 3922.1 initiating execution of the task in response to receiving a first poll 3923. The newly assigned executing node 3922.1 can execute the task via some or all features and/or functionality of FIGS. 29C and/or 29D, and/or via implementing a database task performance module 2740. The newly assigned executing node 3922.1 can start execution of the task from the beginning due to the initial assigned executing node 3922.0 failing, where some or all of the task is thus re-executed by the newly assigned executing node 3922.1. Alternatively, the newly assigned executing node 3922.1 can start execution of the task from a saved checkpoint, for example, as indicated in the current status data for the task, denoting how much of the task was completed so far, if this progress can be started from this point despite being performed by this newly assigned executing node 3922.1.

As illustrated in FIG. 30A, a monitoring node failure detection 4021 is received/determined by leader node 37 that indicates the failure/outage of the initially assigned monitoring node 3922.1. This failure detection 4021 can be based on a communication received from the initially assigned monitoring node 3921.0 and/or can be based on determining loss of connectivity with the initially assigned monitoring node 3921.0 (e.g. based on not being online, the leader node not receiving periodic health notifications from the initially assigned monitoring node 3921.0 within a predetermined time window, or connectivity with initially assigned monitoring node 3921.0 otherwise being determined to be lost).

As illustrated in the example of FIG. 30A, the leader node 37 generates assignment data assigning a newly assigned monitoring node 3921.1 as the task monitoring node for the given task x in response to the failure detection 4021. The leader node 37 can communicate this assignment data/corresponding task information for task x to newly assigned monitoring node 3921.1 via a new assignment notification 4011.1 (e.g. an adminOwnerModified instruction and/or other request/communications).

As illustrated in the example of FIG. 30A, the newly assigned monitoring node 3921.1 sends one or more polls 3923 (e.g. as pollTask instructions and/or other requests/communications) to the executing node 3922.1 for the given task x in response to receiving/processing the assignment notification 4011.1. For example, the newly assigned monitoring node 3921.1 determines assignment data indicating the newly executing node 3922.1 as the task execution node for the given task x based on being indicated in the assignment notification 4011.1 and/or in state data indicating that the task is already being executed by this newly executing node 3922.1.

While not illustrated in FIG. 30A, one or more responses that include task execution status data 3924 can be sent by the newly assigned executing node 3922.1 back to the newly assigned monitoring node 3921.1 in response to the one or more polls 3923, for example, as illustrated in FIG. 29B, where the initially assigned monitoring node 3921.0 updates current status data for the task's execution accordingly as discussed in conjunction with FIGS. 29A-29E.

In particular, the newly assigned executing node 3922.1 sends these responses back to the newly assigned monitoring node 3921.1 based on the polls being received from the newly assigned executing node 3922.1 rather than the initially assigned executing node 3922.0. The newly assigned executing node 3922.1 optionally does not restart/alter its execution of the task despite the change in the admin node, where execution continues by the newly assigned execution node 3922.1 seamlessly over this change in task monitoring node, where the only change is starting to send status data to the newly assigned task monitoring node 3921.1 rather than the initially assigned task monitoring node 3921.0 due to the polls starting to be received from the newly assigned task monitoring node 3921.1 rather than the initially assigned task monitoring node 3921.0.

As illustrated in the example of FIG. 30A, the newly assigned executing node 3922.1 sends a task complete notification 4016 (e.g. a taskComplete notification/communication). The task complete notification 4016 can be included in execution status data 3924 in response to a poll, denoting the task status as being complete. Alternatively, rather than waiting for a poll to notify the newly assigned task monitoring node 3921.1 of the task completion, the newly assigned executing node 3922.1 sends the task complete notification 4016 upon completion of the task automatically. In other embodiments, the task is optionally cancelled, for example, As illustrated in FIG. 30A, the newly assigned monitoring node sends a current status update 3914 (e.g. an update-TaskStatus instruction, or other request/communications) in response to receiving the task complete notification 4016. The current status update 3914 can denote the completion of the task status, for example, to update the state data for the task x accordingly as discussed in conjunction with FIG. 29B.

While not depicted, the newly assigned monitoring node 3921.1 optionally sends a request/instruction to the newly assigned executing node 3922.1 to delete its task result/other task data for the task based on the newly assigned monitoring node sending the current status update 3914 and/or confirming the current status update 3914 is reflected in the state data 3904 accordingly, where the cached result is deleted by the newly assigned executing node 3922.1 from its memory resources based on receiving this instruction from the newly assigned monitoring node 3921.1.

In other tasks executions, the task is optionally cancelled by the task execution node, for example, in response to a cancellation request as discussed previously and/or in response to the execution node losing communication with its admin node as discussed previously.

In other tasks executions, only the assigned admin owner node encounters an outage/failure, and a same, initially assigned task owner node carries out the entirety of the task execution via communication with multiple admin owner nodes. In other tasks executions, only the assigned task owner node encounters an outage/failure, and a same, initially assigned admin owner node carries out the entirety of the task execution via communication with multiple task owner nodes. In other tasks executions, neither the assigned task owner node nor the assigned encounters an outage/failure, and a same, initially assigned admin owner node, task owner node pair jointly carries out the entirety of the task execution via communication between each other.

In other tasks executions, multiple assigned admin owner nodes encounter failures, where a task owner node (or multiple, if task owner nodes also encounter failures) communicate with three or more admin owner nodes over time based on two or more reassignments of admin owner nodes in response to two or more failures of admin owner nodes. In other tasks executions, multiple assigned task owner nodes encounter failures, where an admin owner node (or multiple, if admin owner nodes also encounter failures) communicate with three or more task owner nodes over time based on two or more reassignments of task owner nodes in response to two or more failures of task owner nodes.

Figure 30B:
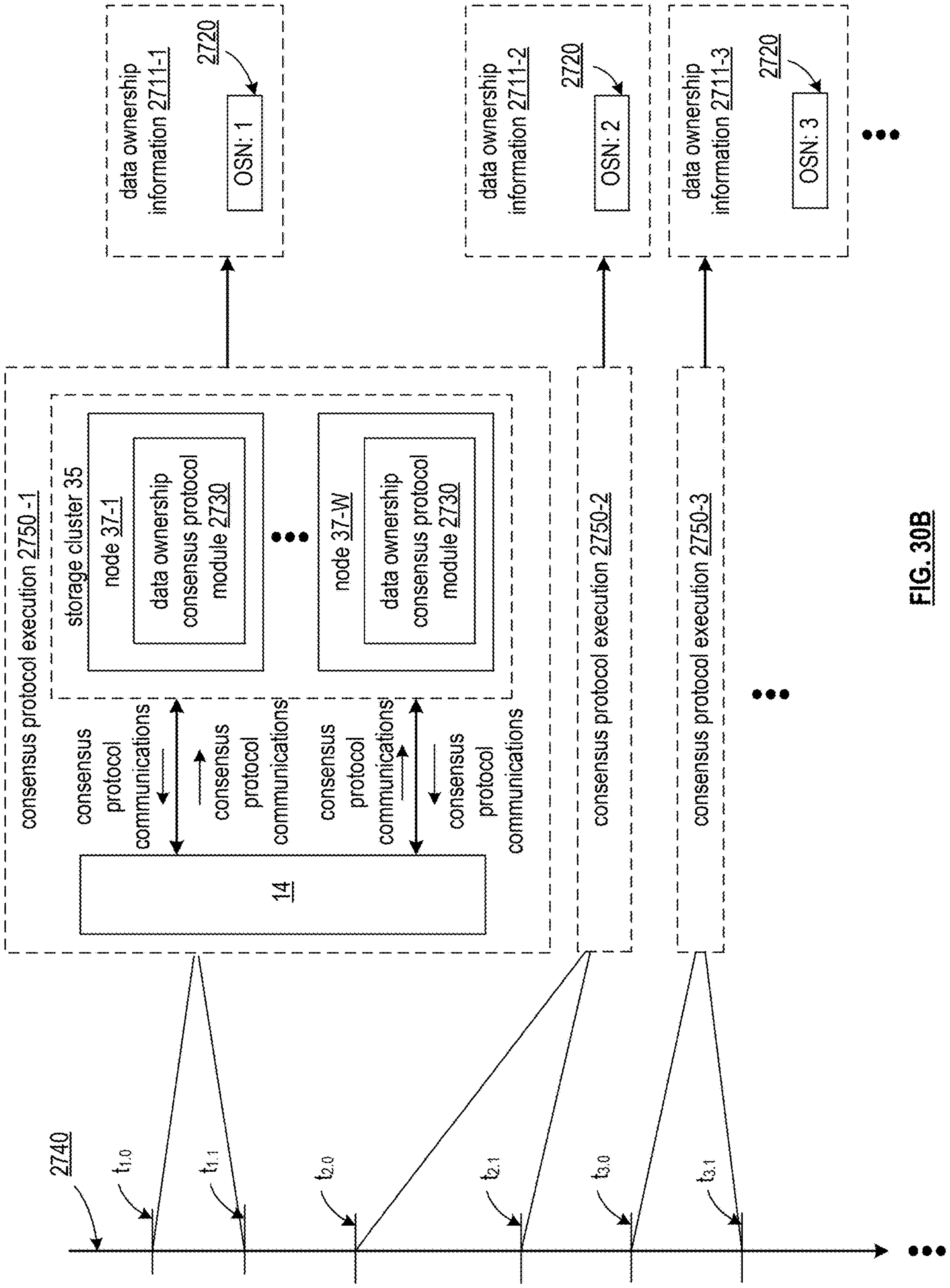
FIG. 30B illustrates a timeline of a plurality of consensus protocol executions in accordance with various embodiments.
Figure 30C:
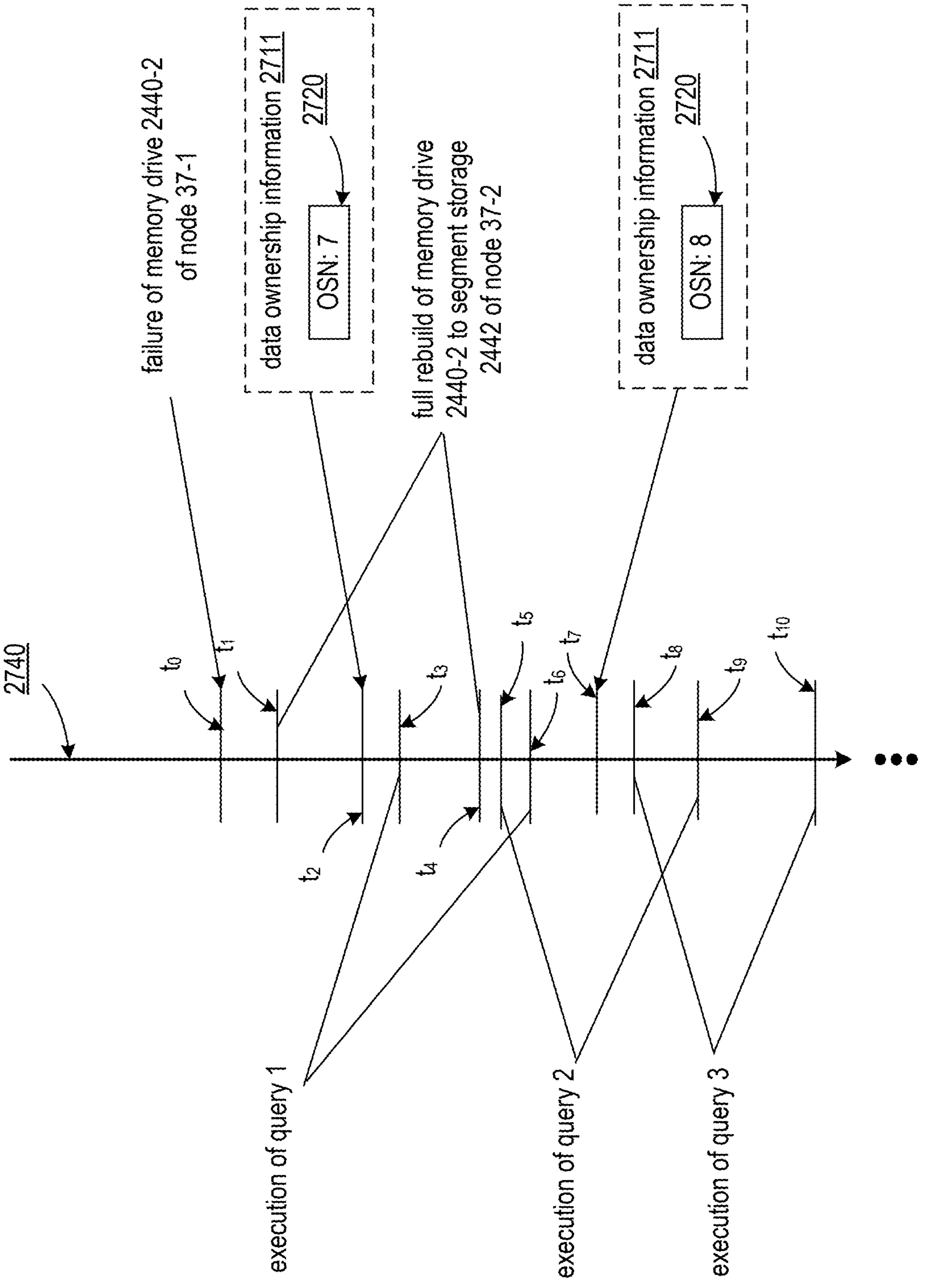
FIG. 30C illustrates an example timeline of execution of a plurality of queries in accordance with various embodiments.

FIGS. 30B and 30C illustrate methods for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30B and/or the steps of FIG. 30C. In particular, a node 37 can participate in some or all steps of FIG. 30B and/or 30C based on being assigned as a task monitoring node for one or more tasks being executed by the database system 10, and/or based on being assigned as a task execution node for one or more tasks being executed by the database system 10. Some or all of the method of FIG. 30B and/or 30C can be performed by nodes executing a query in conjunction with a query execution, for example, via one or more nodes 37 implemented as nodes of a query execution module 2504 implementing a query execution plan 2405, where one or more nodes implement operator scheduling modules 2815. Some or all of the steps of FIG. 30B and/or 30C can optionally be performed by a leader node a metadata storage cluster and/or one or more follower nodes of the leader node, in accordance with some or all features and/or functionality discussed in conjunction with FIGS. 27A-27J. Some or all of the steps of FIG. 30B can optionally be performed by any other processing module of the database system 10. Some or all of the steps of FIG. 30B can be performed to implement some or all of the functionality of the database system 10 as described in conjunction with FIGS. 29A-29E and/or 30A, for example, by implementing some or all of the functionality of system metadata management system 2702, task monitoring node 2921, and/or task execution node 2922. Some or all steps of FIG. 30B and/or 30C can be performed can be performed in accordance with other embodiments of the database system 10 and/or nodes 37 discussed accordance with other embodiments of the database system 10 and/or nodes 37 discussed herein.

Some or all steps of FIG. 30B and/or 30C can be performed in conjunction with performing some or all steps of FIG. 29E, and/or can be performed in conjunction with other method steps described herein. For example, some or all steps of FIG. 30B and/or FIG. 30C are performed in executing some or all of step 2978 in conjunction with executing a corresponding task, where at least one additional node beyond the first and second node are utilized to execute the task based on reassignment of the first node and/or the second node during execution.

Some or all steps of FIG. 30B can be performed by database system 10 in conjunction with performing some or all steps of FIG. 30C. Some or all steps of FIG. 30B can be performed by database system 10 without performing steps of FIG. 30C, and/or Some or all steps of FIG. 30C can be performed by database system 10 without performing steps of FIG. 30B.

For example, some or all steps of FIG. 30B can be performed to handle the case of failure of a task owner node (e.g. task execution module 2922) in executing a given task, and/or some or all steps of FIG. 30C can be performed to handle the case of failure of an admin owner node (e.g. task monitoring module 2921) in executing a given task. While FIGS. 30B and 30C specify execution of different tasks by different pairs of initial nodes, some or all functionality of FIGS. 30B and 30C can be performed in executing a same task (e.g. in the case where failure is encountered for both an assigned admin owner node and assigned task owner node for a given task).

Step 3082 includes sending, via a first initial task monitoring node of a plurality of nodes, a first plurality of polls to a first initial task execution node of the plurality of nodes based on the first initial task monitoring node and the first initial task execution node being initially assigned to execute a first task. Step 3084 includes initiating, via the first initial task execution node, execution of the first task during a first temporal period based on receiving a first one of the first plurality of polls.

Step 3086 includes detecting, via the first initial task monitoring node, failure associated with the first initial task execution node based on a final one of the first plurality of polls. Step 3088 includes sending, via the first initial task monitoring node, a second plurality of polls to the new task execution node during a second temporal period strictly after the first temporal period based on execution of the task being reassigned to the new task execution node in response to detection of the failure associated with the first initial task execution node;

Step 3090 includes initiating, via the new task execution node, execution of the first task during the second temporal period based on receiving a first one of the second plurality of polls. Step 3092 completing, via the new task execution node, execution of the first task based on initiating execution of the first task during the second temporal period. In various examples, the first task is completed by the new task execution node during the second temporal period.

Step 3081 includes sending, via a second initial task monitoring node of the plurality of nodes, a third plurality of polls to a second initial task execution node of the plurality of nodes based on the second initial task monitoring node and the second initial task execution node being initially assigned to execute a second task. In various examples, the second initial task monitoring node is distinct from the first initial task monitoring node. In various examples, the second initial task execution node is distinct from the first initial task execution node.

Step 3083 includes initiating, via the second initial task execution node, execution of the second task during a third temporal period based on receiving a first one of the third plurality of polls. Step 3085 includes maintaining, via the second initial task monitoring node, current task data for the second task based on, during the fourth temporal period, the new task monitoring node of the plurality of nodes receiving a plurality of task status data from the second initial task execution node in response to the third plurality of polls. In various examples, the current task data is updated during the third temporal period based on at least one status change indicated in the plurality of task status data.

Step 3087 includes encountering, via the second initial task monitoring node, a second failure. Step 3089 includes sending, via a new task monitoring node of the plurality of nodes, a fourth plurality of polls to the second initial task execution node during a fourth temporal period strictly after the third temporal period based on monitoring of the task being reassigned to the new task monitoring node in response to detection of the second failure associated with the first initial task monitoring node.

Step 3091 includes maintaining, via the new task monitoring node of the plurality of nodes the current task data for the second task based on, during the fourth temporal period, the new task monitoring node of the plurality of nodes receiving a second plurality of task status data from the second initial task execution node in response to the fourth plurality of polls. In various examples, the current task data is further updated during the fourth temporal period based on at least one additional status change indicated in the second plurality of task status data.

Step 3093 includes completing, via the second initial task execution node, execution of the second task during the fourth temporal period based on initiating execution of the first task during the third temporal period.

In various examples, the method of FIG. 30B and/or 30C further includes maintaining, via the first initial task monitoring node, current task data for the first task based on: during the first temporal period, the first initial task monitoring node receiving a first plurality of task status data from the initial task execution node in response to the first plurality of polls, where the current task data is updated during the first temporal period based on at least one first status change indicated in the first plurality of task status data; and/or during the second temporal period, the first initial task monitoring node of the receiving a second plurality of task status data from the new task execution node in response to the second plurality of polls, where the current task data is further updated during the second temporal period based on at least one second status change indicated in the second plurality of task status data.

In various examples, the detection of the failure associated with the first initial task execution node is based on one of: a failure status indicated in a corresponding final one of the first plurality of task status data received in response to the final one of the first plurality of polls; and/or no task status being received in in response to the final one of the first plurality of polls within a predetermined timeout period.

In various examples, the current task data for the first task indicates an execution progress checkpoint based on execution progress during the first temporal period, and/or the new task execution node initiates execution of the first task starting from the execution progress checkpoint.

In various examples, the method of FIG. 30B and/or 30C further includes: encountering, via the first initial task monitoring node, a second failure prior to the new task execution node completing the execution of the first task; sending, via a new task monitoring node of the plurality of nodes, a third plurality of polls to the new task execution node during a third temporal period strictly after the second temporal period based on monitoring of the task being reassigned to the new task monitoring node in response to detection of the second failure associated with the first initial task monitoring node; and/or maintaining, via the new task monitoring node, the current task data for the first task based on, during the second temporal period, the new task monitoring node of the plurality of nodes receiving a third plurality of task status data from the new task execution node in response to the third plurality of polls, where the current task data is further updated during the third temporal period based on at least one third status change indicated in the third plurality of task status data. In various examples, the new task execution node completes execution of the first task in the third temporal period.

In various examples, the method of FIG. 30B and/or 30C further includes: generating, via a leader node of the plurality of nodes, initial monitoring node assignment data assigning the first initial task monitoring node to perform a task monitoring role for execution of the first task based on selecting the first initial task monitoring node from the plurality of nodes to perform the task monitoring role for the execution of the first task, where the first initial task monitoring node sends the first plurality of polls based on receiving the initial monitoring node assignment data from the leader node; and/or generating, via the leader node, new monitoring node assignment data assigning the new task monitoring node of the plurality of nodes to perform the task monitoring role for execution of the first task based on selecting the new task monitoring node from the plurality of nodes to perform the task monitoring role for the execution of the first task in response to the detection of the second failure associated with the first initial task monitoring node, where the new task monitoring node sends the third plurality of polls based on receiving the new monitoring node assignment data from the leader node.

In various examples, the leader node performs a leader node role in a metadata storage cluster that includes as set of nodes that includes the first initial task monitoring node and the new task monitoring node. In various examples, the leader node generates both the initial monitoring node assignment data and the new monitoring node assignment data based on selection of nodes from only the set of nodes of the metadata storage cluster to perform the task monitoring role.

In various examples, the method of FIG. 30B and/or 30C further includes: generating, via the first initial task execution node, initial execution node assignment data assigning the first initial task execution node to perform a task execution role for execution of the first task based on selecting the first initial task execution node from the plurality of nodes to perform the task execution role for the execution of the first task; and/or generating, via the first initial task execution node, new execution node assignment data assigning the new execution node to perform the task execution role for execution of the first task based on selecting the new task execution node from the plurality of nodes to perform the task execution role for the execution of the first task in response to the detection of the failure associated with the first initial task execution node.

In various examples, a first task execution time span that includes the first temporal period and the second temporal period is overlapping with a second task execution time span that includes the third temporal period and the fourth temporal period.

In various examples, the method of FIG. 30B and/or 30C further includes: sending, via a second initial task monitoring node of a plurality of nodes, a third plurality of polls to a second initial task execution node of the plurality of nodes based on the second initial task monitoring node and the second initial task execution node being initially assigned to execute a second task, where the second initial task monitoring node is distinct from the first initial task monitoring node, and/or where the second initial task execution node is distinct from the first initial task execution node; initiating, via the second initial task execution node, execution of the second task during a third temporal period based on receiving a first one of the third plurality of polls; determining, via the second initial task execution node, that an expected subsequent poll has not been received after a final one of the third plurality of polls within a predetermined timeout period; and/or cancelling, via the second initial task execution node, execution of the second task based on the expected subsequent poll not being received after the final one of the third plurality of polls within the predetermined timeout period. In various examples, the third plurality of polls are sent in conjunction with a predetermined time interval, and wherein the predetermined timeout period is based on the predetermined time interval.

In various embodiments, any one of more of the various examples listed above are implemented in conjunction with performing some or all steps of FIG. 30B and/or 30C. In various embodiments, any set of the various examples listed above can be implemented in tandem, for example, in conjunction with performing some or all steps of FIG. 30B and/or 30C.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29E, for example, in conjunction with further implementing any one or more of the various examples described above.

In various embodiments, the operational instructions, when executed by the at least one processor, cause the database system to: send, via a first initial task monitoring node of a plurality of nodes, a first plurality of polls to a first initial task execution node of the plurality of nodes based on the first initial task monitoring node and the first initial task execution node being initially assigned to execute a first task; initiate, via the first initial task execution node, execution of the first task during a first temporal period based on receiving a first one of the first plurality of polls; detect, via the first initial task monitoring node, failure associated with the first initial task execution node based on a final one of the first plurality of polls; send, via the first initial task monitoring node, a second plurality of polls to the new task execution node during a second temporal period strictly after the first temporal period based on execution of the task being reassigned to the new task execution node in response to detection of the failure associated with the first initial task execution node; initiate, via the new task execution node, execution of the first task during the second temporal period based on receiving a first one of the second plurality of polls; and/or complete, via the new task execution node, execution of the first task based on initiating execution of the first task during the second temporal period.

In various embodiments, the operational instructions, when executed by the at least one processor, cause the database system to: send, via a second initial task monitoring node of the plurality of nodes, a third plurality of polls to a second initial task execution node of the plurality of nodes based on the second initial task monitoring node and the second initial task execution node being initially assigned to execute a second task; initiate, via the second initial task execution node, execution of the second task during a third temporal period based on receiving a first one of the third plurality of polls; maintain, via the second initial task monitoring node, current task data for the second task based on, during the fourth temporal period, the new task monitoring node of the plurality of nodes receiving a plurality of task status data from the second initial task execution node in response to the third plurality of polls, where the current task data is updated during the third temporal period based on at least one status change indicated in the plurality of task status data; encounter, via the second initial task monitoring node, a second failure; send, via a new task monitoring node of the plurality of nodes, a fourth plurality of polls to the second initial task execution node during a fourth temporal period strictly after the third temporal period based on monitoring of the task being reassigned to the new task monitoring node in response to detection of the second failure associated with the first initial task monitoring node; maintain, via the new task monitoring node of the plurality of nodes the current task data for the second task based on, during the fourth temporal period, the new task monitoring node of the plurality of nodes receiving a second plurality of task status data from the second initial task execution node in response to the fourth plurality of polls, wherein the current task data is further updated during the fourth temporal period based on at least one additional status change indicated in the second plurality of task status data; and/or complete, via the second initial task execution node, execution of the second task during the fourth temporal period based on initiating execution of the first task during the third temporal period.

FIGS. 30A-30F illustrate embodiments where the segment scheduling module 2410 of a node 37 utilizes data ownership information to determine the segment sets 2418 for the set of queries 2405 in the query set 2415. The embodiments illustrated in 30A-30F can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The embodiments of node 37 discussed in conjunction with FIGS. 30A-30F can be utilized to implement any other nodes 37 of database system 10 discussed herein.

As discussed previously, multiple nodes 37, such as a particular group of nodes in a same storage cluster 35, can generate query resultants for the same query, where the query resultants generated by a storage cluster of nodes 37 in series and/or parallel to ultimately generate the full resultant of the query. For a given query, a full set of segments stored across and/or accessible by the storage cluster of nodes 37 executing the query is required. To ensure that the final query result generated via the combined efforts of this storage cluster 35 is correct, each one of the set of segments must be processed. Furthermore, each one of the set of segments must be processed exactly once to ensure that corresponding rows are not duplicated, which could affect the final resultant of the query. Therefore, for a given query, each segment must be retrieved and/or processed by exactly one node in the storage cluster 35, such as exactly one node at an IO level of a query execution plan.

To ensure that each segment of a query is processed exactly once, all nodes 37 of a storage cluster 35 can store and/or access data ownership information 2711. An example embodiment of the information included in data ownership information 2711 is depicted in FIG. 30A. These nodes responsible for storing data ownership information 2711 can include all nodes 37 in a group of nodes that are included in an IO level of a query execution plan, and/or that are otherwise responsible for performing read steps to read rows in facilitation of query execution. For example, if the storage cluster 35 includes 5 computing devices as illustrated in the example of FIG. 6, and if each computing device includes 4 nodes all illustrated in the example of FIG. 7, the storage cluster can include a set of 20 nodes. The data ownership information can include a plurality of node segment sets 2718 for the corresponding plurality of nodes in the storage cluster. As illustrated in FIG. 30A, a plurality of nodes 37-1-37-W of the storage cluster can each have a corresponding node segment set 2718 of a corresponding plurality of node segment sets 2718-1-2718-W. Each node segment set can indicate the full set of segments that are owned by the segment. As used herein, a node's "ownership" of a segment corresponds to a node being assigned to read and/or process this segment in accordance with processing queries and/or that the node is otherwise responsible for retrieval, recovery, and/or processing of the corresponding segments in its execution of queries in its query set 2405.

Each node segment set 2718 can further indicate whether the corresponding node is responsible for processing these segments as virtual or physical segments. Some or all the segments in a node segment set 2718 for a particular node can be physical segments that are directly accessible by the node via its segment storage 2442. Some or all of the segments in a node segment set 2718 for a particular node can be virtual segments that are accessible via a recovery scheme. Thus, a node's "ownership" of some segments can correspond to virtual segments that are not stored by the node in its own segment storage 2442.

In the example presented in FIG. 30A, node 37-1 owns a plurality of segments that include segments 1, 2, 3, 4, 5, 6, X, Y, and Z; node 37-2 owns a plurality of segments that include segments 7-15; and node 37-W owns a plurality of segments that include segments 16-24. These segment numbers are included to label the segments, and do not necessarily indicate any ordering of these segments. In this example, the node segment set of node 37-1 indicates segments 3, 4, and Y are owned by node 37-1 virtual segments, and the node segment set of node 37-2 indicates segments 9, 10, and 11 are owned by node 37-2 as virtual segments.

The nodes 1-W can process their queries by generating corresponding segment sets 2418 of incoming queries. In particular for a given query 2405 to be processed by a node 37, it can determine the corresponding segment set 2418 to include all required segments for the given query that are owned by the node as indicated by the data ownership information 2711, and only the required segments for the given query that are owned by the node the data ownership information 2711. The node can further determine whether each particular segment in the segment set is to be processed as a physical or virtual segment based upon its corresponding indication in the data ownership information 2711.

The data ownership information 2711 can indicate, in exactly one node segment set 2718, each one of the full set of segments owned by the corresponding storage cluster 35, such as the full set of segments that are stored by the storage cluster and/or the full set of segments the corresponding storage cluster is responsible for. Thus, the plurality of node segment sets of a storage cluster's data ownership information 2711 can be mutually exclusive and collectively exhaustive with regards to the full set of segments owned by the corresponding storage cluster 35. In some cases, not all of the storage cluster's full set of segments are currently stored by the storage cluster 35, for example, where they are only recoverable as virtual segments due to the corresponding physical segments being unavailable.

The data ownership information 2711 can correspond to a particular storage cluster 35 and can include node segment sets for every one of its node 37-1-37-W, such as a distinct set of 20 nodes. Each storage cluster of a plurality of different storage clusters in the database system 10, such as the plurality of storage clusters 35-1-35-*z*, can each have its own corresponding data ownership information for its own corresponding set of nodes. Queries can be processed by nodes of a single storage cluster 35 and/or via nodes of multiple storage clusters 35, for example, if they include segments in data ownership information 2711 of different storage clusters. Thus, to maintain query correctness across multiple storage clusters, the plurality of full sets of segments of the corresponding plurality of storage clusters can be mutually exclusive and collectively exhaustive with regards to all segments that are stored and/or recoverable by the database system 10 as a whole.

The portion of data ownership information 2711 accessible by a particular node can indicate only the proper subset of the full set of segments stored nodes in the storage cluster that are owned by the particular node. For example, each node 37-1-37-W may store, access, and/or be able to determine its own node segment set 2718. In such cases, the particular node may not have knowledge of which other nodes 37 in the storage cluster 35 store particular other segments that aren't owned by the particular node. Alternatively, as the particular node 37 may need to access segments stored by particular other nodes as part of a recovery scheme utilized in processing virtual segments of a node segment set, each node 37 in the storage cluster can store, access, and/or otherwise determine the some or all of the full data ownership information 2711.

In this example presented in FIG. 30A, node 37-1 can be implemented by the node 37 illustrated in FIG. 30B. The data ownership information 2711 is utilized by the segment scheduling module 2410 of node 37-1 to determine that segments 1, 2, 3, 4, 5, 6, X, Y, and Z are to be processed in queries accordingly, if required by particular queries 2405 in the node's query set 2415. For example, this node 37-1 determines its segment set 2418 for query 2 includes segment 3, segment 5, and segment Y in response to first determining a full set of segments required for execution of query 2, and by next determining its own segment set 2418 as a proper subset of this full set of segments required for execution of query 2, where other segments in this full set of segments required for execution of query 2 are processed by other nodes in the storage cluster 35. In particular, segments 3, 5 and Y are identified in this proper subset because they are included in the full set of segments required for execution of query 2, and are further included in node 37-1's node segment set 2718. Even if node 37-1 determines that other segments, such as segment 7, is required for execution of query 2, segment 7 will not be included in node 37-1's segment set 2418 for query 1 because it is not owned by the node, and will instead be processed by node 37-2 in accordance with query 2.

Continuing with this example, node 37-1's segment set indicates segments 1, 2, 5, 6, X, and Z are to be processed as physical segments, and that segments 3, 4, and Y are to be processed as virtual segments. This can be due to the data ownership information 2711 being determined in response to and/or during the outage of memory drive 2440-2 that stores segments 3, 4, and Y. For example, a previous version of data ownership information determined before the outage of memory drive 2440-2 may have indicated that segments 3, 4, and Y were owned by node 37-1 as physical segments due to their availability in segment storage.

Thus, the data ownership information 2711 can change over time, where updated versions of the data ownership information 2711 can be generated and utilized, for example, over one or more ones of the plurality of sequential time slices. In particular, data migration within the storage cluster or between different storage clusters, drive outages, or other changes in availability of particular segments can cause segments in full set of segments in a storage cluster to change ownership in different versions of the data ownership information over time; to change from being owned by the same or different node as a virtual or physical segment in different versions of the data ownership information over time; to include new segments added to the storage cluster, for example, as new data to the database system 10 and/or as migrated data from a different storage cluster, in different versions of the data ownership information over time; to drop the inclusion of segments removed from the storage cluster, for example, based on being migrated data to a different storage cluster and/or being deleted from the database system entirely, in different versions of the data ownership information over time; and/or to otherwise change over time.

Alternatively, the same storage cluster 35 will always maintain ownership of its full set of segments over time to guarantee consistency across multiple storage clusters while not requiring any coordination across multiple storage clusters, where changes in a storage cluster's data ownership information only includes changes in distribution of ownership across nodes within the storage cluster of its fixed full set of segments. In particular, as each single storage cluster stores all segments within each segment group for segments stored by the storage cluster, ownership of unavailable segments of the storage cluster can be maintained as virtual segments assigned to nodes in the storage cluster for recover via retrieval of other segments 1-K from other nodes 1-K in the same storage cluster.

Each version of the data ownership information 2711 can be tagged or otherwise be associated with a corresponding ownership sequence number (OSN) 2720. As illustrated in FIG. 30A, the data ownership information 2711 is tagged with OSN 7, for example, to indicate that it is the seventh version of the data ownership information 2711, where the OSN increments with each corresponding updated version of the data ownership information 2711 over time. Alternatively, the OSN can be any unique identifier that distinguishes the corresponding version of data ownership information 2711 from other versions.

Rather than necessitating global coordination and/or single entity responsible for assignment and sharing of data ownership information as new versions are generated over time, each new version of the data ownership information of a particular storage cluster 35 can be generated via a consensus protocol, which can be executed by some or all nodes 37 in a storage cluster participating in the consensus protocol, where the shared state mediated via the consensus protocol indicates the most updated ownership information. This mechanism improves database systems by guaranteeing consistency of data ownership information across nodes for usage in queries while not requiring global coordination.

For example, as illustrated in FIG. 30B, a plurality of consensus protocol executions 2750 can be performed via the nodes 37-1-37-W in a storage cluster 35 over time to generate a corresponding plurality of versions of data ownership information 2711. For example, as illustrated by timeline 2740, a first consensus protocol execution 2750-1 can be mediated across nodes in the storage cluster during timespan $t_{1.0}$-$t_{1.1}$ to generate a corresponding first version of data ownership information 2711-1. For example, the first consensus protocol execution 2750-1 can be initiated at time $t_{1.0}$ by one or more nodes in the storage cluster 35, and the first consensus protocol execution 2750-1 can be completed, for example, where some or all nodes in the storage cluster have determined and/or can access the resulting data ownership information 2711-1, at $t_{1.1}$. At some time after $t_{1.1}$, or perhaps instead at some time before the first the first consensus protocol execution 2750-1 is complete but after the first consensus protocol execution 2750-1 is initiated, a second consensus protocol execution 2750-2 can be mediated across the nodes in the storage cluster 35 to generate to generate a corresponding second version of data ownership information 2711-2 during timespan $t_{2.0}$-$t_{2.1}$. Similarly, a third consensus protocol execution 2750-3 can be mediated across the nodes in the storage cluster 35 to generate to generate a corresponding third version of data ownership information 2711-3 during timespan $t_{3.0}$-$t_{3.1}$, and this process can continue over time where consensus protocol executions 2750 are performed to generate corresponding data ownership information 2711 over time. Data ownership information 2711-1, 2710-2, and 2710-3 are tagged with their respective OSNs 2720 with values of 1, 2, and 3, respectively, or otherwise indicating the ordering of the revision with respect to the other revisions.

As discussed herein, consider the times $t_{1.1}$, $t_{2.1}$, $t_{3.1}$, . . . , $t_{i.1}$ of timeline 2740 as the times where the resulting corresponding versions of data ownership information 2711-1, 2710-2, 2710-3, . . . 2710-*i*, respectively, are available for utilization by the nodes 37 in the storage cluster for query execution as a result of consensus protocol executions 2750-1, 2750-2, 2750-3, . . . , 2750-*i* being completed across the set of nodes in the storage cluster 35, where i is any ith iteration of executing the consensus protocol to generate a corresponding ith version of the data ownership information 2711. The OSN for any ith version of the data ownership information can be tagged with a respective OSNs 2720 indicating that the version is the ith version in the ordering, for example, where the value of the OSN 2720 is equal to or otherwise indicates the value of i.

As illustrated in FIG. 30B, the consensus protocol can be executed via consensus protocol communications generated by nodes 37 and/or received and processed by nodes 37. For example, each node can implement a data ownership consensus module 2730, for example, by utilizing at least one processing module of the node. The data ownership consensus module 2730 can be utilized by each corresponding node 37 to generate consensus protocol communications in accordance with the storage cluster's execution of the current consensus protocol for transmission to one or more other nodes in the storage cluster in accordance with the storage cluster's execution of the current consensus protocol, for example, via system communication resources 14. The data ownership consensus module 2730 can be utilized by each corresponding node 37 to receive and/or process consensus protocol communications, generated by other nodes in the storage cluster 35 in accordance with the storage cluster's execution of the current consensus protocol. The consensus protocol can be a leader-mediated consensus protocol. Execution of the consensus protocol can include election or other determination of a leader by one or more nodes, voting by one or more nodes, and/or ultimately arriving at a consensus based on the voting by the one or more nodes to generate and/or communicate the resulting data ownership information.

One or more nodes can initiate a revision of the data ownership information 2711 by initiating a new execution of the consensus protocol, for example, in response to determining a changed data storage condition such as a drive outage, a full rebuild of data being completed, a migration being initiated or completed, current or scheduled upcoming data unavailability, or another change. Alternatively or in addition, new executions of the consensus protocol to generate revised data ownership information 2711 can occur at scheduled and/or predetermined times.

Because data ownership information is local only to a particular storage cluster 35, each storage cluster of a small number of nodes can execute the consensus protocol amongst themselves, rather than requiring consensus or other coordination across all nodes in the database system. Each of the storage clusters in the plurality of storage clusters 35-1-35-*z* can independently generate their own iterative revisions of their own data ownership information over time in their own timeline 2740, where at any given point in time, different storage clusters may have independently generated a different number of revisions of their data ownership information. This improves database systems by ensuring that the execution of the consensus protocol remains scalable, where only local coordination is required to determine data ownership information, while ensuring that all segments across different storage clusters 35 has consistent ownership information.

As revised data ownership information is determined by particular nodes over time, most recent versions of the data ownership information 2711 can be implemented to execute incoming queries. However, if the node were to immediately adopt the most recent data ownership information for segment processing in executing queries in query set 2415, queries could be processed improperly. In particular, as an individual node executes a query over a span of time, if the node changes its segment set determined for the query based on a more recent versions of the data ownership information 2711 mid-execution, some segments needed for execution of the query across all nodes can be missed and/or duplicated. Furthermore, multiple nodes can be executing the same query within slightly different time spans based on their own segment scheduler module's initiation of execution of a particular query. Alternatively or in addition, the most recent data ownership information can be received and/or determined by the different nodes at slightly different times. As global coordination is not utilized and as nodes independently execute queries via the segments they determine to own, a mechanism to ensure all nodes execute each given query with the same data ownership information is required.

FIGS. 30C-30F illustrate an example of an embodiment of the present invention where nodes in a storage cluster utilize OSNs 2720 tagged to and/or determined for each query 2405 in the query set 2415 to determine which corresponding one of a plurality of data ownership information versions 2710 generated via the storage cluster's execution of the consensus protocol over time will be utilized to determine the corresponding segment set 2418 for each query 2405.

FIG. 30C illustrates a particular example of timeline 2740 to illustrate the temporal relation between a series of events occurring at particular points in time and/or time spans $t_0$-$t_{10}$. At a point in time $t_2$, data ownership information 2711 with OSN 7 is generated. For example, the execution of the consensus protocol can be completed at time $t_2$ to render the resulting data ownership information. This particular version of the data ownership information may have been generated in response to a failure of memory drive 2440-2 of node 37-1 at time to. In this example, node 37-1 may have initiated the consensus protocol shortly after time to in response to detecting the failure and/or before time to in response to this outage being scheduled. Alternatively or in addition, another node 37 in the storage cluster may have detected the failure of the memory drive, for example, based on failing to retrieve data stored in this memory drive as part of a recovery scheme for recovering one of their owned virtual segments. Alternatively, the storage cluster may have otherwise determined to generate data ownership information 2711 with OSN 7 in response to this failure.

Figure 30D:
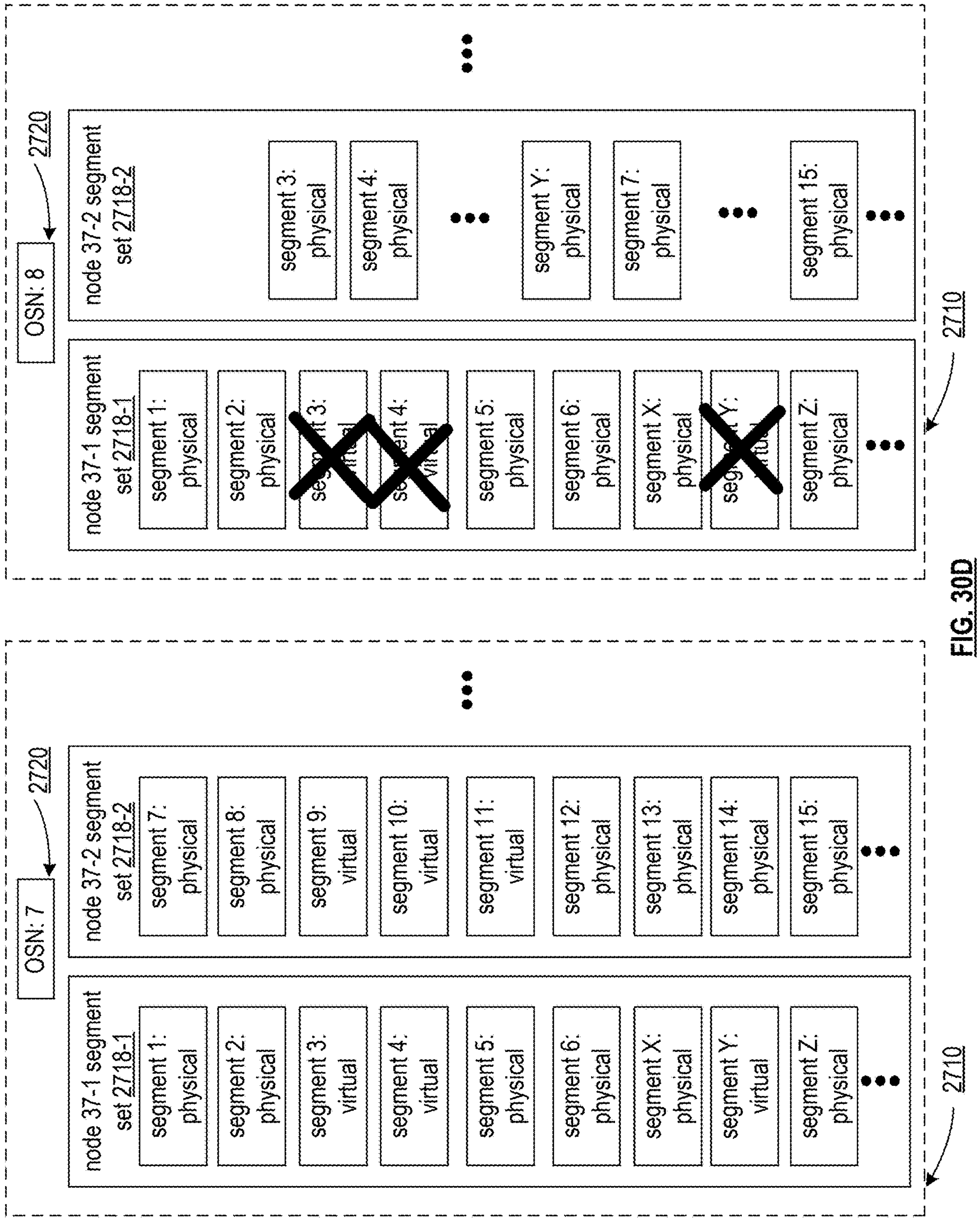
FIG. 30D illustrates an example embodiment of multiple versions of data ownership information in accordance with various embodiments.

This failure of memory drive 2440-2 can correspond to the particular example discussed in conjunction with FIG. 30B, where data ownership information 2711 with OSN 7 indicates that node 37-1 maintains ownership of some or all of the segments of memory drive 2440-2, but the designation has changed to virtual segments as these segments are unavailable as physical segments. The data ownership information 2711 with OSN 7 of this example is illustrated in FIG. 30D. In particular, segments 3, 4, and Y, which were stored on 2440-2 of 37-1, are indicated as virtual segments, for example, changing from designation as physical segments owned by 37-1 in prior data ownership information 2711 with OSN 6.

Timeline 2740 of FIG. 30C indicates a span of time in which a full a rebuild of the memory drive 2440-2 of node 37-1 takes place to recover and store some or all segments of memory drive 2440-2 as physical segments in one or more memory drives of the segment storage of another node 37-2. For example, this is initiated at time $t_1$, for example, based on determining of the memory drive 2440-2 failed at time to. The execution of the consensus protocol for the data ownership information of OSN 7 may have been initiated before or after this full rebuild began. However, as the full rebuild is lengthy and/or because the full rebuild was not completed when the initiation of data ownership the consensus protocol for generating the data ownership information of OSN 7 occurred, the data ownership information of OSN 7 reflects that these segments are not available physically and assigns ownership as virtual segments.

Timeline 2740 also illustrates that after the full rebuild of memory drive 2440-2 is completed, a next version of data ownership information 2711 is generated, tagged to OSN 8. For example, the execution of the consensus protocol for this next version can be completed at time $t_7$ to render the resulting data ownership information. In this example, node 37-2 or another node of the storage cluster may have initiated this consensus protocol shortly after time $t_4$ in response to determining the full rebuild is completed and/or that the corresponding segments are again available as physical segments.

Data ownership information 2711 of OSN 8 reflects the availability of these segments as physical segments of segment storage 2442 of node 37-2 by indicating assignment of some or all of these newly rebuilt segments to node 37-2 as physical segments. For example, as illustrated in FIG. 30D, the data ownership information 2711 with OSN 8 indicates that segments 3, 4, and Y have been added to node 37-2's node segment set 2718-2 as physical segments. Furthermore, as segments cannot be owned by multiple nodes, these segments are removed from node 37-1's node segment set 2718-1. The "X"s indicated in FIG. 30D serve to illustrate the prior inclusion of these segments in node segment set 2718-1 of data ownership information 2711 with OSN 7 have been removed in the next revision, where segments 3, 4, and Y are not included in the node segment set 2718-1 of the data ownership information 2711 with OSN 8.

This example serves to illustrate how the tagging of OSNs to particular queries can ensure that, despite this timeline of changing data availability circumstances that could lead to confusion regarding which segments are owned by a node at particular times and more specifically, for different queries being executed by the node at the same time. This improves database systems by ensuring that, despite different concurrently running queries at a given time by a given node, and despite the concurrent, independent execution of each concurrently running query across multiple nodes in the storage cluster, query accuracy of every query is guaranteed because all nodes will utilize the same data ownership information for any given query, even if different ownership information is utilized at a particular time for different, corresponding concurrently running queries. Thus, different queries with different OSNs can be safely running in parallel by each of a set of multiple nodes.

A first query, query 1, can be executed by the storage cluster 35 from time $t_3$-$t_6$. Time $t_3$ can correspond to a time at which query 1 was received and/or at which at least one node initiated a partial execution of query 1. Time $t_6$ can correspond to a time at which execution of query 1 by all nodes in the storage cluster assigned to execute query 1 has completed. While execution spans of different nodes in the storage cluster may be different based on their own implementation of their segment scheduling module 2410, for the purposes of this example, assume that the time frame that both particular nodes 37-1 and 37-2 executed query 1 started between $t_2$ and $t_4$ and ended between $t_5$ and $t_7$.

A second and third query can similarly be executed by the storage cluster from times $t_5$-$t_9$ and times $t_8$-$t_{10}$, respectively. Again, for purposes of this example, assume that the time frame that both particular nodes 37-1 and 37-2 executed queries 2 and 3 started and ended substantially close to these times relative to other points illustrated in the timeline 2740 of this example. Also note that as illustrated, the execution of queries 1, 2, and 3 is overlapping, to reflect the concurrent execution of multiple queries implemented by the storage cluster and to further reflect the concurrent execution of multiple queries implemented by each node 37 in the storage cluster.

Figure 30E:
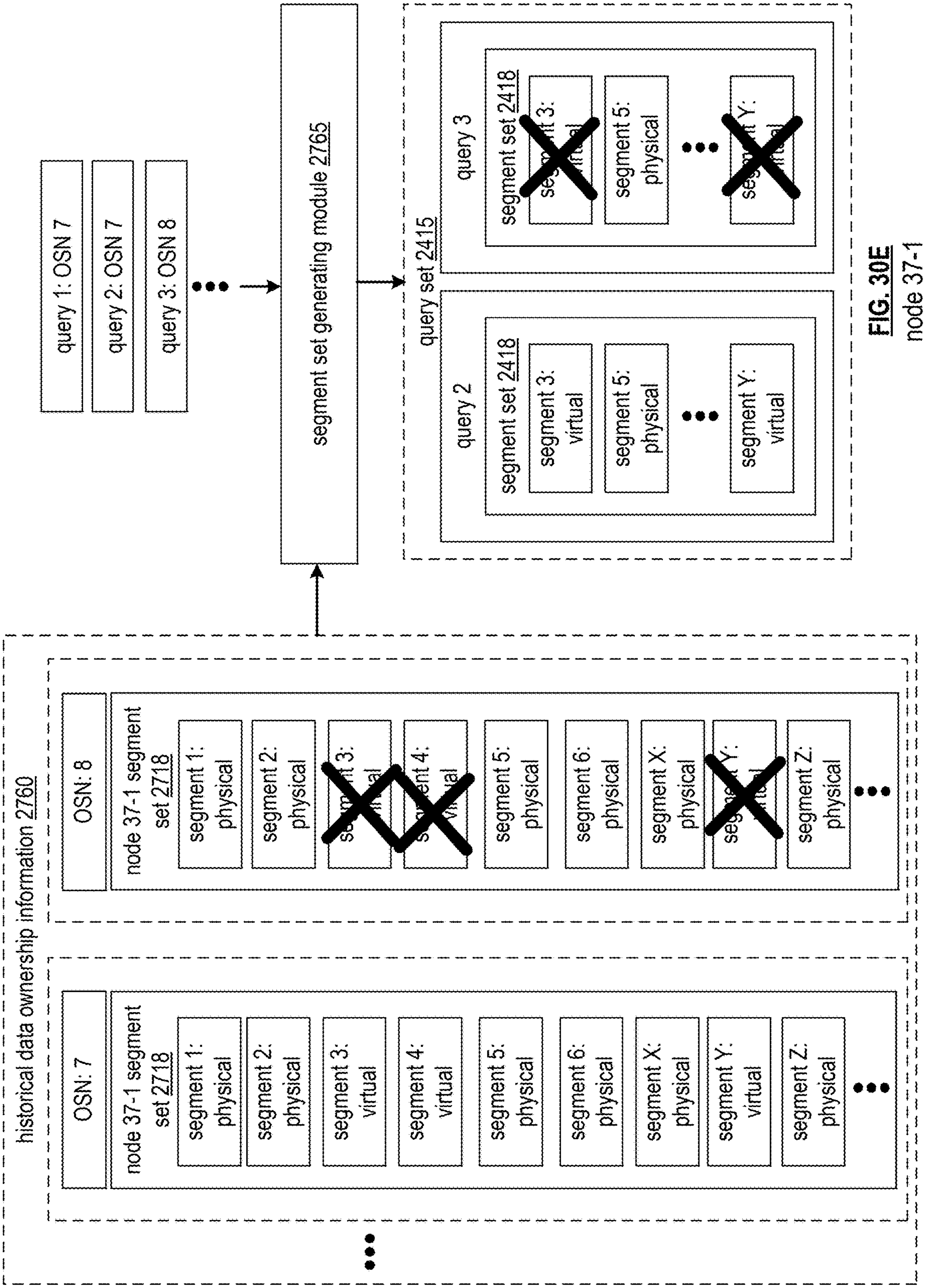
FIGS. 30E and 30F are schematic block diagrams of an embodiment of two example node that implement a segment set generating module in accordance with various embodiments.
Figure 30F:
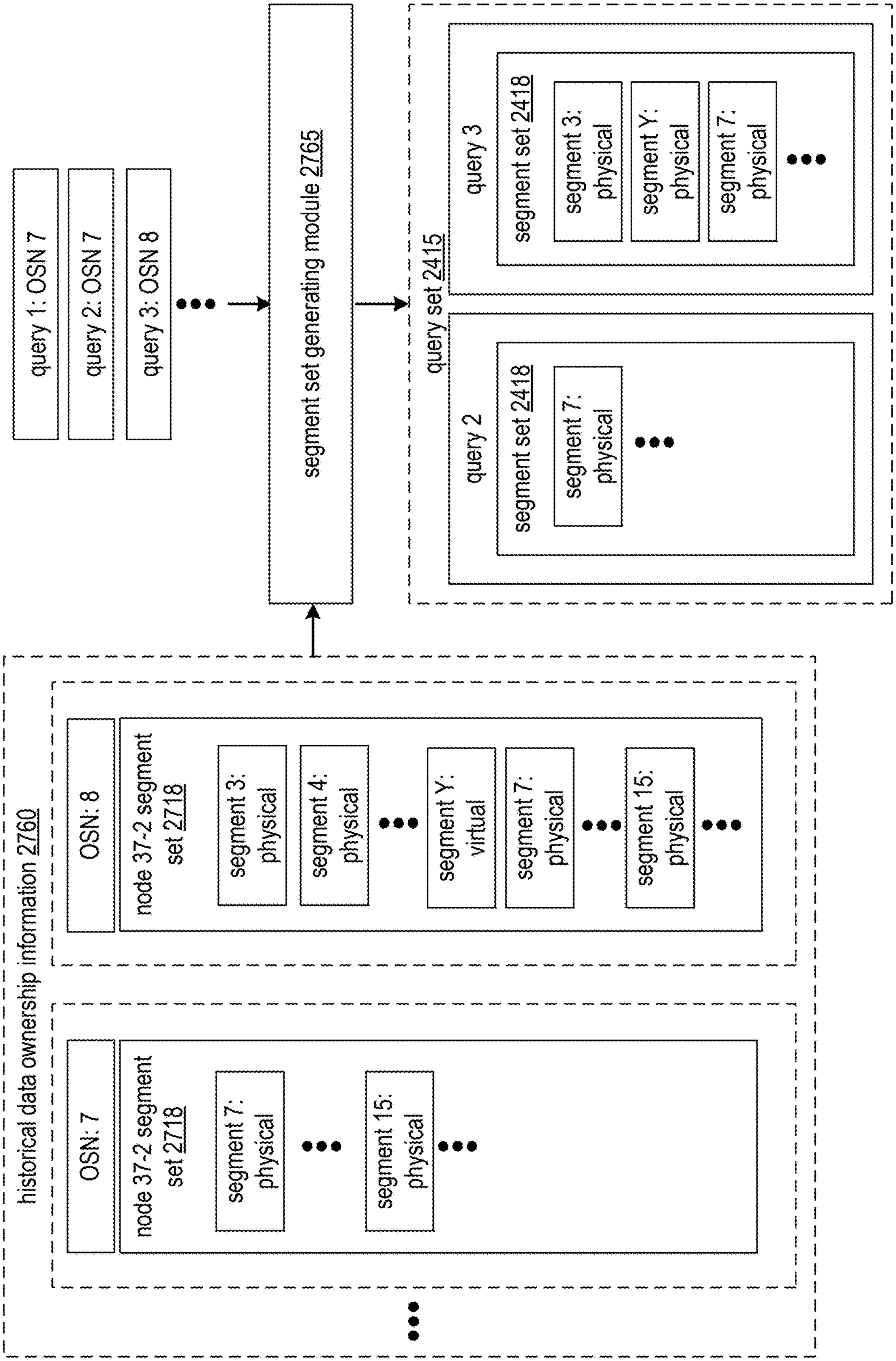

The execution of these queries by node 37-1 in accordance with determined OSNs for these queries is reflected in FIG. 30E, and the execution of these queries by node 37-1 in accordance with determined OSNs for these queries is reflected in FIG. 30F. FIGS. 30E and 30F illustrate nodes 37-1 and 37-2, respectively, that each implement a segment set generating module 2765. The segment set generating module 2765 can be implemented by any node 37 in the database system 10, for example, implemented by the segment scheduling module 2410 of the node and/or otherwise implemented utilizing at least one processing module of the node. The segment set generating module 2765 can be operable to generate some or all segment sets 2418 for corresponding queries 2405 of query set 2415 of the node that is utilized by a segment scheduling module to generate segment processing selection data dictating the ordering in which segments of different queries will be processed by the node. The segment set generating module 2765 can be operable to update this query set 2415 as new queries are received for execution over time, where segment sets 2418 for each incoming query 2405 are generated by the segment set generating module 2765 for inclusion in query set 2415.

In particular the segment set generating module 2765 can determine the segment set for each incoming query based on the OSN assigned to and/or determined for each incoming query. For a given query with a corresponding tagged OSN, segment set generating module 2765 can access its node segment set 2718 in the data ownership information 2711 with the corresponding OSN. In particular, each node can access locally stored, retrievable, or otherwise determinable historical data ownership information 2760 that indicates a plurality of versions, such as a subset of all versions over time corresponding to the most recent versions still determined to be relevant and/or all versions historically. Alternatively, if incoming queries are assigned an OSN tag for the most recent data ownership information 2711, only the most recent data ownership information 2711 need be stored and/or retrievable, as the necessary information for prior data ownership information 2711 with prior OSNs can be already reflected in previously generated segment sets 2418 for other queries still being executed in accordance with older data ownership information 2711.

While not illustrated, the historical data ownership information can be represented as a plurality of (segment, OSN) pairs for the node. The segments of the node's node segment set 2718 in the data ownership information for a given OSN can be each be indicated in a corresponding set of (segment, OSN) pairs with the given OSN. In executing a query tagged with a given OSN, only segments included (segment, OSN) pairs that reflect the corresponding OSN are utilized. Thus, the node segment set for a given OSN is derived from and/or represented as all of segments included in the node's (segment, OSN) pairs with the given OSN.

The particular node segment set 2718 in the data ownership information 2711 with the OSN tagged to an incoming query can be utilized to generate the segment set 2418 for this incoming query. In particular, the segment set 2418 of this incoming query must be a subset of the node segment set 2718 of the data ownership information 2711 with an OSN that matches that of the incoming query or otherwise compares favorably to the incoming query. In some cases, the segment set 2418 of this incoming query is only a proper subset of the corresponding node segment set 2718, for example, based on one or more nodes being determined not to be necessary to process the query and/or not being included in the query domain of the query. Filtering the node segment set 2718 to generate the corresponding segment set 2418 can include extracting information from the query itself to determine which particular proper subset of segments are required.

The OSN 2720 assigned to each query can be received by the node 37 in conjunction with receiving a request to execute the query and/or can be received in conjunction with the query itself, for example, where the OSN is generated by another entity of the database system 10 and/or of the corresponding storage cluster 35 and is sent to and/or accessible by all nodes executing the query in conjunction with information regarding the query for execution itself. The OSN of a given query can be alternatively determined by each node based on the query, for example, by comparing a timestamp of the query to timestamps associated with each of the plurality of versions, and selecting the most recent one of the plurality of OSN versions that has a corresponding timestamp indicating it was generated prior to the query and/or indicating it can be utilized on incoming queries after a particular point in time, such as $t_{i,1}$. The node can alternatively perform another deterministic function on a given query to determine the OSN assigned to the given query.

The mechanism utilized by a node to determine a query's OSN can be the same for all nodes in the storage cluster 35 to ensure that a given query executed by multiple nodes in the storage cluster 35 will assign a node the same OSN, thus ensuring a correct query result as each required segments will be read by a corresponding node, and as each required segment will be read by only one node.

Furthermore, if multiple storage clusters are required for execution of a query, nodes in different clusters will thus assign a given query different OSNs for corresponding different data ownership information of their storage cluster. However, despite different storage clusters being on different revisions of their data ownership data and mediating their data ownership data separately, query correctness can still be guaranteed where each required segment is read once and exactly once so long as nodes in the same storage cluster each utilize the same one of their revised data ownership information 2711 for the query, and so long as each storage cluster maintains ownership of their own fixed, full set of nodes in their set of revisions over time.

The generation of segment sets 2418 based on an OSN determined for the query to adhere to a corresponding version of the data ownership information ensures that a particular version of the data ownership information is used by every node in the storage cluster for execution of the query, and persists for the life of the query regardless of new versions of the data ownership information that are determined while the query is executing and/or regardless of changes in storage circumstances while the query is executing.

In particular, in this example, all nodes in the storage cluster, including nodes 37-1 and 37-2, determine to execute query 1 by utilizing the data ownership information with OSN 7, to execute query 2 by utilizing the data ownership information with OSN 7, and to execute query 3 utilizing the data ownership information with OSN 8. These determination of OSNs tagged to each query can be based on determining that the most recent OSN when each query was received and/or began executing. Queries 1 and 2 were received and/or began executing with data ownership information with OSN 7 being the most recent, as illustrated in timeline 2740 of FIG. 30C, and are tagged with OSN accordingly. The data ownership information was updated to the data ownership information with OSN 8 prior to receiving and/or initiating execution of query 3, so query 3 can be tagged to OSN 8.

Despite the full rebuild of segments of memory drive 2440-2 during query 1's execution, all nodes will maintain utilization of OSN 7 for the entirety of query 1's execution, and thus virtual segments of this memory drive will still be utilized by node 37-1 for the entirety of query 1's execution, and node 37-2 will not utilize these segments, despite being rebuilt and available to node 37-2, for its own execution of query 1.

Assume in this example that queries 2 and 3 require utilization of identical segments, and thus, if executed by the same node with the same OSN, would have identical segment sets 2418 for that node. However, in this example, each of these queries are tagged to different OSNs, and thus have different segment sets. As illustrated in FIG. 30E, for query 2, node 37-1 utilizes a segment set 2418 with segments 3, 4, and Y included as virtual segments, but these segments are not included in node 37-1's segment set 2418 for query 3, based on these nodes being included in node 37-1's node segment set 2718 for OSN 7, but not OSN 8, and based on query 2 being executed under OSN 7 and query 3 being executed under OSN 8.

Meanwhile, as illustrated in FIG. 30F, for query 2, node 37—utilizes a segment set 2418 that does not include segments 3, 4, and Y, but these segments are not included in node 37-2's segment set 2418 for query 3, based on these nodes being included in node 37-2's node segment set 2718 for OSN 8, but not OSN 7, and based on query 2 being executed under OSN 7 and query 3 being executed under OSN 8. In particular, despite segments 3, 4, and Y being available as physical segments to node 37-2 prior to query 2 being executed, these segments are not utilized for execution of query 2 because it is tagged to OSN 7 as the new data ownership information is not yet generated. Furthermore, despite the new ownership information with OSN 8 being generated during query 2's execution, both node's 37-1 and 37-2, as well as all other nodes in the storage cluster, will maintain utilization of OSN 7 for query 2 for the remainder of query 2's execution. Finally, note that in a period temporal period that includes the time span from $t_8$-$t_9$, nodes 37-1 and 37-2 are each concurrently executing multiple queries by utilizing different OSNs for these multiple queries during this temporal, where query 2 is being executed during the time span from $t_8$-$t_9$ utilizing prior data ownership information with OSN 7, and where query 3 is concurrently being executed during the time span from $t_8$-$t_9$ utilizing updated data ownership information with OSN 8.

Figure 30G:
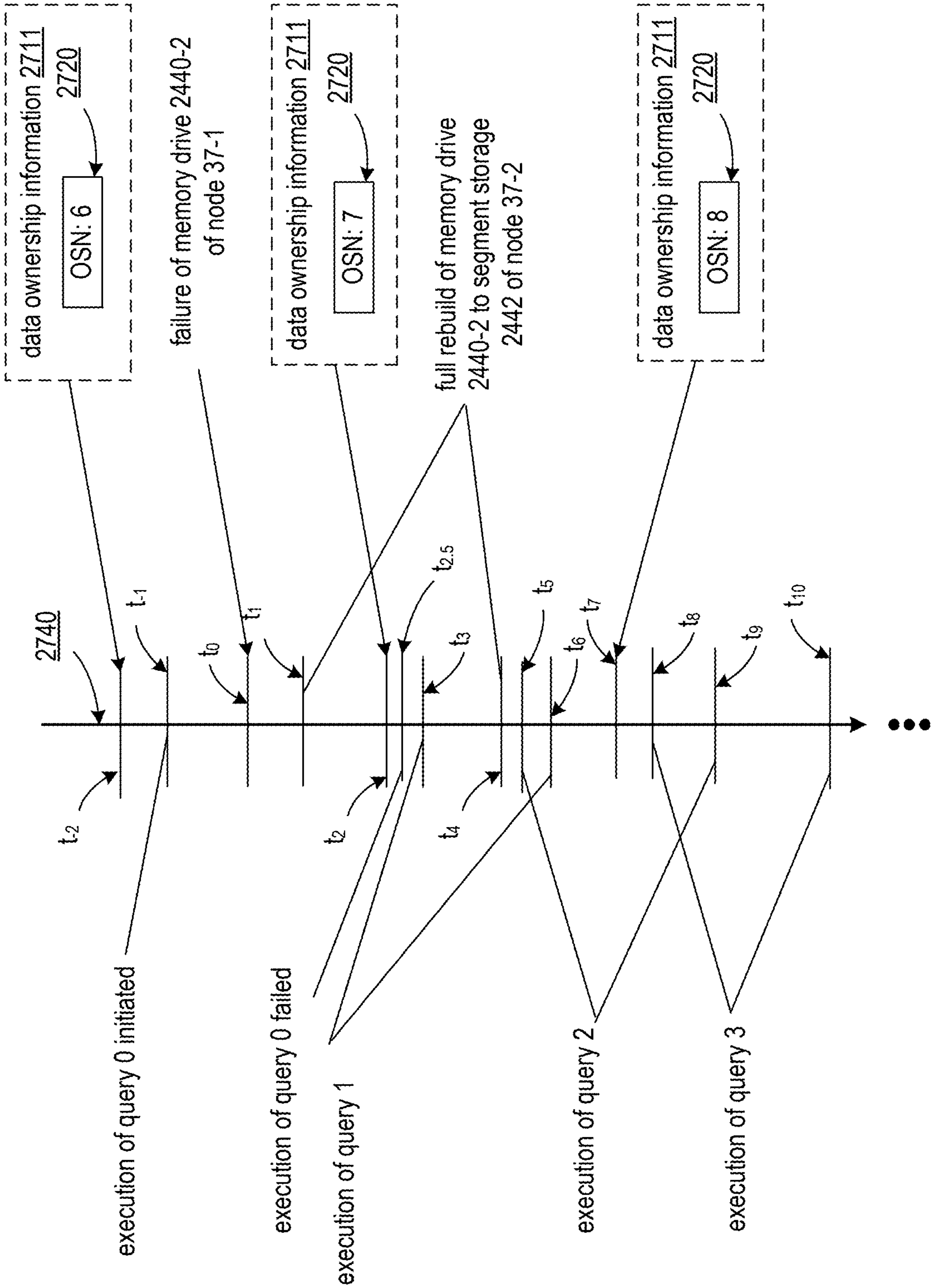
FIG. 30G illustrates an example timeline of execution of a plurality of queries in accordance with various embodiments.
Figure 30H:
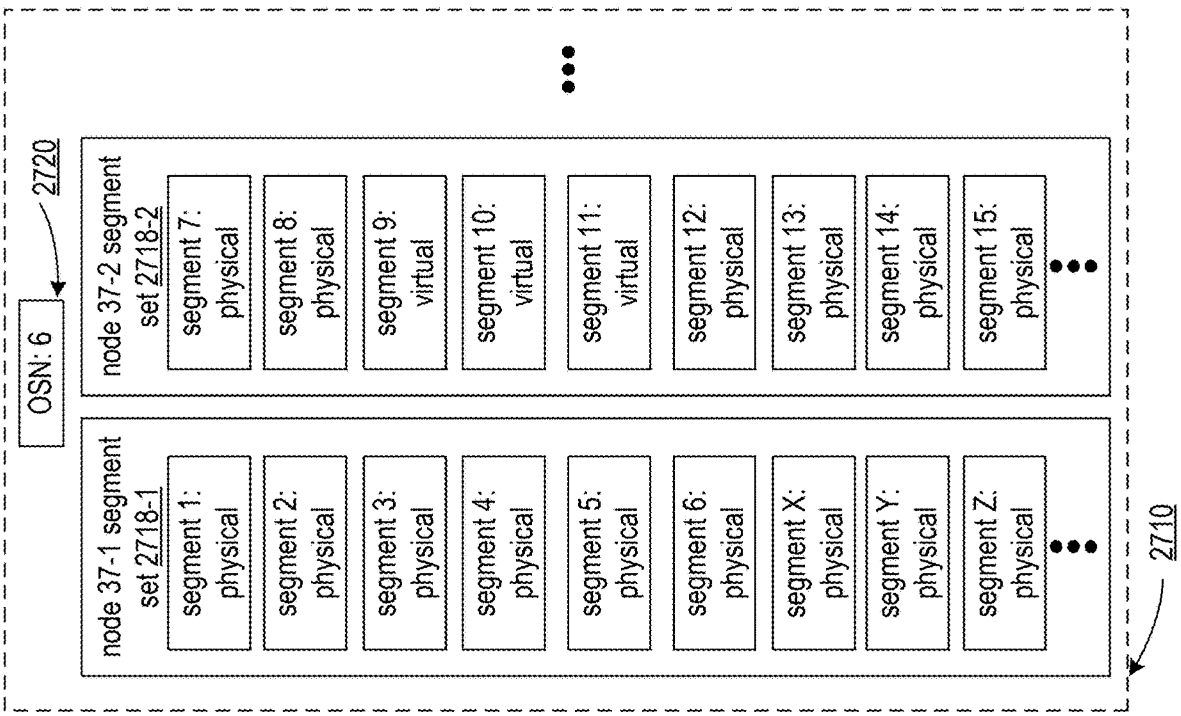
FIG. 30H illustrates an example embodiment of a version of data ownership information in accordance with various embodiments.
Figure 30I:
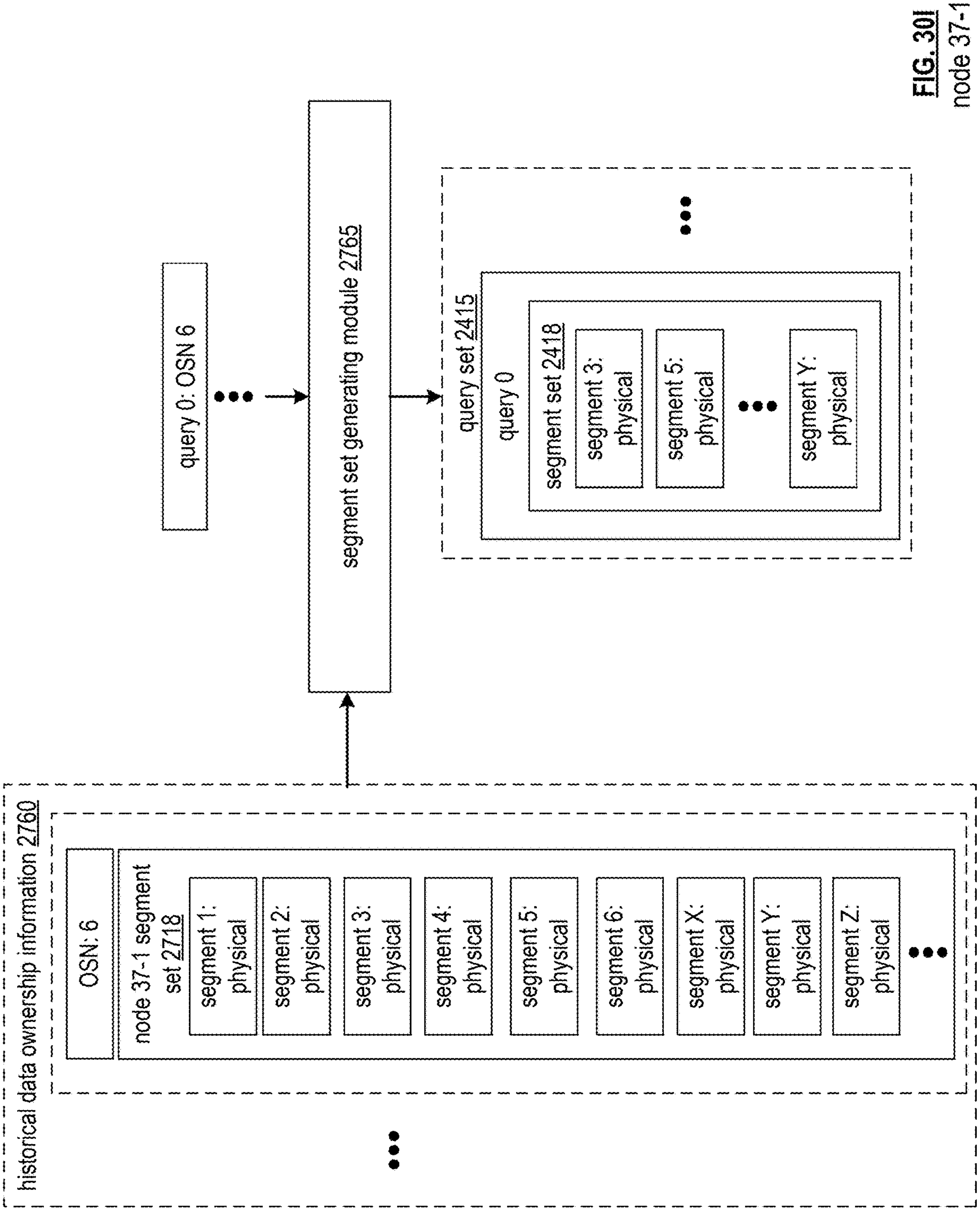
FIGS. 30I and 30J are schematic block diagrams of an example embodiment a node that implement a segment set generating module in accordance with various embodiments.

FIGS. 30G-30J illustrate an extension of the example of FIGS. 30C-30F. As illustrated in FIG. 30G prior to $t_0$, data ownership information 2711 with OSN 6 is determined at $t_2$, and where a query 0 is initiated at $t_1$ utilizing OSN 6. Data ownership information 2711 with OSN 6 is illustrated in FIG. 30G. In particular, node 37-1 owns segments of memory v, including segments 3, 4, and Y, as physical segments, for example, based on the storage cluster determining, during execution of the corresponding consensus protocol, that these nodes are available as physical segments stored in memory drive 2440-2 of node 37-1's segment storage 2442, based on the failure at to not having yet occurred. As illustrated in FIG. 30I, node 37-1 generates the segment set for query 0 in accordance with OSN 6, where segments 3 and Y are included as physical segments.

However, due to the failure of memory drive 2440-2, for example, prior to retrieval of segment 3 or segment Y by node 37-1 to execute query 0, the node 37-1 indicates failure in continuing to execute query 0. This can be communicated across the storage cluster and/or the database system to halt other executions by other nodes of query 0 or to otherwise not return a resultant of the query due to the execution of query 0 by node 37-1 failing. The time of failure is indicated in timeline 2740 as $t_{2.5}$, but can alternatively be any time after to. In general, nodes 37 can abort and/or indicate failure of any queries they execute that cannot be executed in accordance with the data ownership information assigned to them. In particular, in this example, node 37-1 has already determined new data ownership information OSN 7 prior to this error occurring. However, rather than attempting to continue execution the query via utilization of the virtual segments indicated in OSN 7, execution of the query is aborted, as utilization of OSN 7 mid-query can cause other conflicting ownership problems that could render the query incorrect, and/or the correctness of the query resultant is not guaranteed if the node were to change data ownership information version being utilized for the query after its begun executing under a prior version.

In this example, query 1 can correspond to a re-execution of query 0, and thus query 0 can be re-executed as query 1 by the nodes in the storage cluster based on receiving the updated data ownership information 2711 and based on execution of query 0 previously being aborted. Query 0 is re-executed as query 1 in accordance with OSN 7. This is acceptable, as all nodes in the storage cluster will re-execute query 0 as query 1 under the same data ownership information, and execution of query 1 under OSN 7 is maintained by all nodes including node 37-1 for the duration of query 1's execution.

Figure 30J:
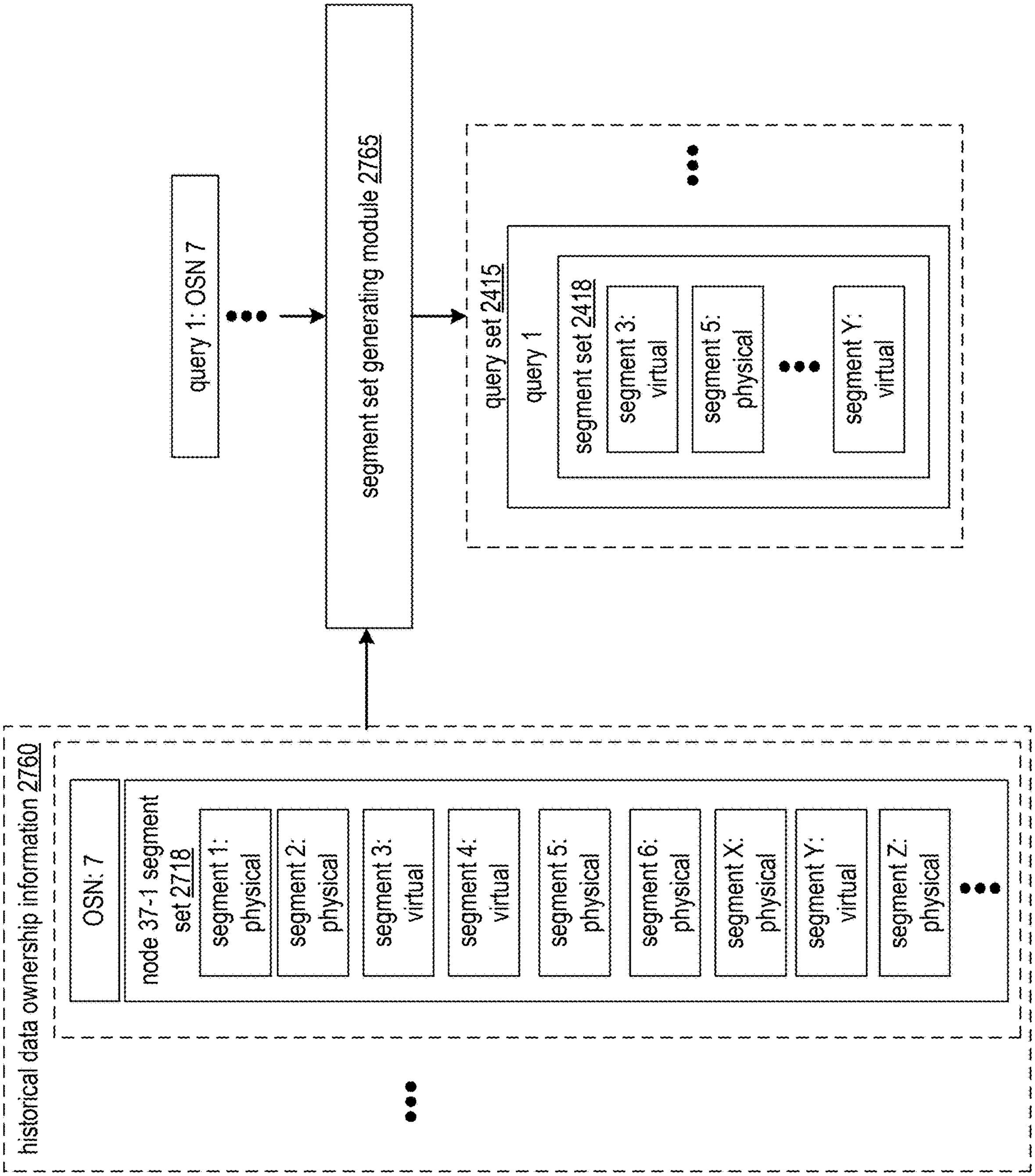

As illustrated in FIG. 30J, query 1 is determined to be executed by node 37-1 and is tagged to OSN 7. Query 1 is included in the query set with segments 3 and Y indicated as virtual segments based on the data ownership information of OSN 7. As segments 3 and Y can be recovered via the recovery scheme in response to being indicated for processing as virtual segments, in this example, execution of query 1 does not fail and its execution is completed at time $t_6$. Thus, query 0 is ultimately executed by the storage cluster when it is re-executed as query 1 with the data ownership information of OSN 7.

In various embodiments, a node of a computing device has at least one processor and memory that stores executable instructions that, when executed by the at least one processor, cause at least one processing module of the node to determine first data ownership information via participation in a first execution of a consensus protocol mediated with a plurality of other nodes in a storage cluster that includes the node. The first data ownership information indicates a first ownership sequence number. The first data ownership information further indicates the node's ownership of a first subset of a set of segments, where the set of segments is in a segment group stored by the plurality of nodes in the storage cluster. The executable instructions, when executed by the at least one processor, further cause the least one processing module of the node to determine second data ownership information via participation in a second execution of the consensus protocol mediated with the plurality of other nodes in the storage cluster. The second data ownership information indicates a second ownership sequence number that is different from the first ownership sequence number. The second data ownership information further indicates the node's ownership of a second subset of the set of segments, and where a set difference between the first subset and the second subset is non-null. The at least one processing module of the node receives a first query for execution and determines an ownership sequence number tag for the first query that indicates the value of the first ownership sequence number. The at least one processing module of the node facilitates execution of the first query by utilizing the first subset of the set of segments based on determining the ownership sequence number tag of the first query indicates the value of the first ownership sequence number.

Figure 30K:
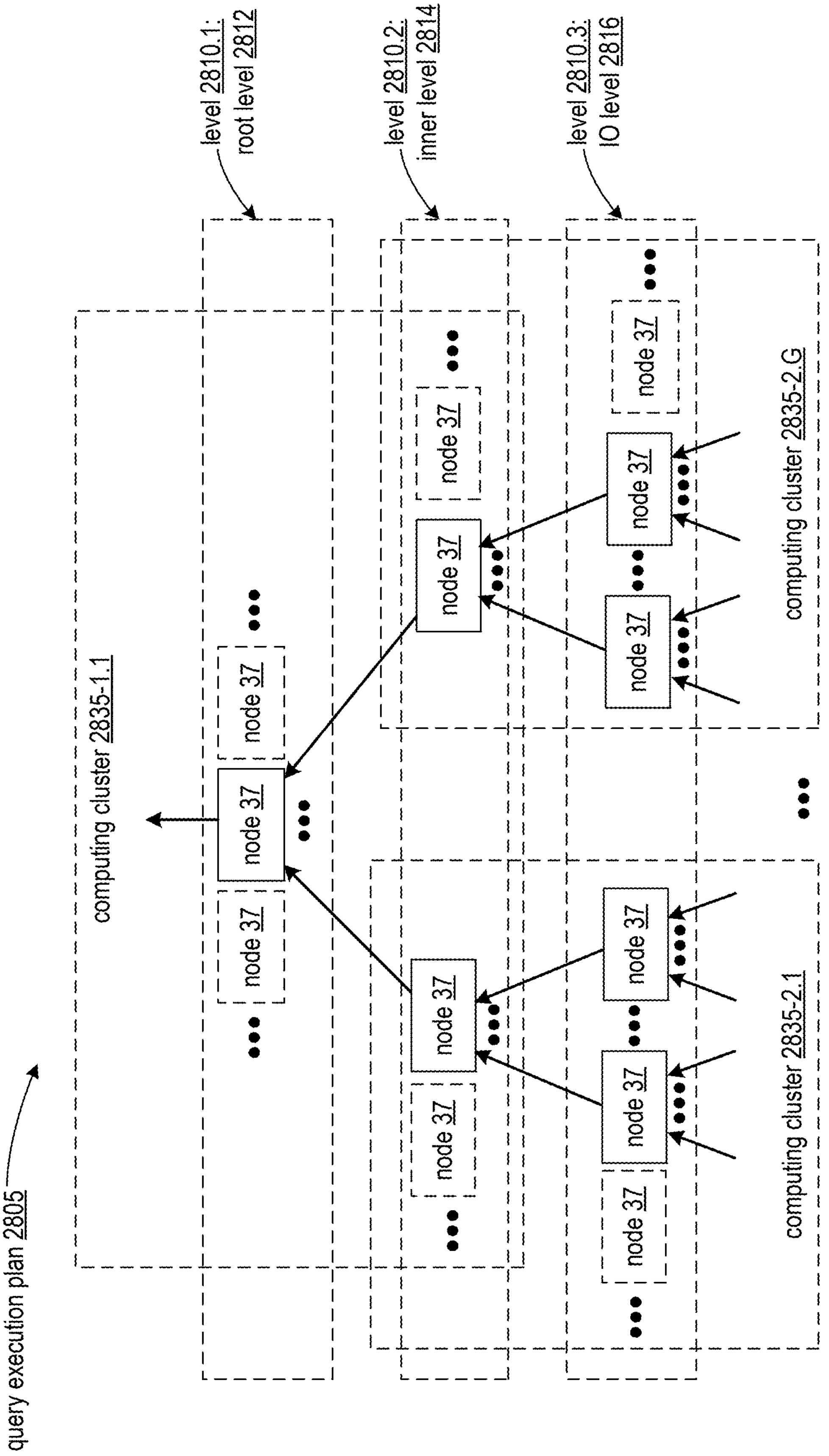
FIG. 30K is a schematic block diagram of an embodiment of multiple computing clusters utilized to implement a query execution plan in accordance with various embodiments.

FIG. 30K illustrates an embodiment where the query execution plan is segregated into a plurality of computing clusters 2835, illustrating a subset of possible sets of nodes from each computing cluster that are selected to process a given query. In this illustration, nodes 37 with a solid outline are again nodes involved in executing the given query. Nodes 37 with a dashed outline are again other nodes that are not involved in executing the given query, but could be involved in executing other queries in accordance with their level of the query execution plan in which they are included.

A computing cluster 2835 can be similar to storage clusters 35 and can include a set of possible nodes that can operate in accordance with at least two levels of the query execution plan. A computing cluster 2835 can include some or all nodes of exactly one storage cluster 35. A computing cluster 2835 can include some or all nodes of multiple storage clusters 35. For example, a computing cluster 2835 can correspond to a "sub-tree" of query execution plan, corresponding to the possible set of child nodes and corresponding possible set of parent nodes each child node will select a single node from to process their resultants. In this example, each computing cluster includes exactly two levels: a lower level corresponding to possible child nodes of the computing cluster and an upper level corresponding to possible parent nodes of the computing cluster. The computing cluster can be implemented as a virtual machine computing cluster, for example which each node in the cluster implemented as a virtual machine processing different queries in accordance with their selected level.

The set of computing clusters illustrated in FIG. 30K can be utilized to implement an entire, three level query execution plan 2805 with level 2810.1 implemented as root level 2812, with level 2810.2 implemented as the single inner level 2814, and with level 2810.3 implemented as the IO level 2810.3. Alternatively, if the query execution plan 2805 includes more than three levels, these computing clusters can correspond to a subset of the query execution plan's full set of computing clusters. In particular, an additional set of computing clusters can include corresponding subsets of nodes of level 2810.3 their corresponding upper level of possible parent nodes for corresponding possible child nodes of a subsequently lower level than level 2810.3. Alternatively or in addition, an additional computing cluster can include all possible parent nodes of computing cluster 2835 as possible child nodes, as well as possible parent nodes of one or more additional computing clusters 2835-1.2-2835-

1.N with upper levels at level 2810.1 and lower levels at level 2810.2 as additional possible child nodes. This additional computing cluster could include its own set of possible parent nodes in the next higher level than level 2810.1. Any number of levels of the query execution plan can thus be implemented by corresponding computing clusters of the sub-trees. The query execution plan 2805 can be implemented via some or all features and/or functionality of query execution plan 2405.

For each given computing cluster 2835, for a given query, some or all possible child nodes, corresponding to nodes in the lower level of the computing cluster, will be assigned to process the query. The nodes with the solid outline at the lower level of each computing cluster 2835 correspond to the selected subset of possible child nodes executing the given query for the corresponding computing cluster 2835. For example, if the lower level of the computing cluster is the IO level 2816 of the query execution plan, the child nodes generate resultants by performing row reads. This example is illustrated by illustrated computing clusters 2835-2.1-2835-2.G that includes a set of nodes from level 2810.2 as possible parent nodes and includes a set of nodes from level 2810.3 as possible child nodes, where level 2810.3 in this example is the IO level.

As another example, if the lower level of the computing cluster is an inner level 2814 of the query execution plan, the child nodes receive resultants as input from child nodes of another, subsequently lower, computing cluster by being selected as the parent node for the subsequently lower computing cluster for the given query, gather these resultants, and generate their own resultant. This example is illustrated by illustrated computing cluster 2835-1.1 that includes a set of nodes from level 2810.1 as possible parent nodes and includes a set of nodes from level 2810.2 as possible child nodes. In this example, level 2810.1 can be the root level, as illustrated, or can be an inner level that is higher than inner level 2810.2.

As illustrated, for each computer cluster 2835, exactly one node at the upper level receives resultants from nodes at the lower level. Thus, for an execution of a given query by a given computing cluster 2835, every participating node at the lower level is operable to select, for example without global coordination, the same, single node at the upper level that will process their resultant as a selected parent node from the plurality of possible parent nodes included in the upper level. Each participating node at the lower level thus sends their resultants to this same selected parent node. The selected parent node for each illustrated computing cluster in FIG. 30K for executing the given query corresponds to the one node in the computing cluster's upper level that has a solid outline, selected over the other nodes in the computing cluster's upper level with dashed outlines. In some embodiments, if the upper level of computer cluster 2835 is the root level, the same single node is selected for every query, where the set of possible parent nodes includes exactly one node.

Alternatively or in addition, for execution of a given query by a given computing cluster 2835, each possible node at the lower level is operable to determine whether or not it is participating in the given query. In some embodiments, all nodes at the lower level that receive resultants from its own child nodes, for example, in accordance with a different computing cluster, is automatically determined to be participating at the lower level to ensure these resultants continue to be processed. In such embodiments, all nodes at the lower level that do not receive resultants from its own child nodes, for example, in accordance with a different computing cluster selecting a different parent node, is automatically determined to not participate at the lower level, as it has no resultants as input. In cases where the nodes at the lower level are nodes at the IO level, every node included in or otherwise assigned to the lower can determine to participate at the lower level for any given query. For example, every computing cluster with its lower level as the IO level, such as computing clusters 2835-2.1-2835-2.G in FIG. 30K, can determine that every node at the lower level is responsible for performing row reads, for example, in accordance with data ownership information 2711.

As discussed previously, it is desirable for nodes 37 to operate independently without global coordination. Utilizing inter-coordination between only nodes within the same computing cluster can aid in reducing global coordination. As illustrated in FIG. 30K, each computing cluster with the same upper and lower level, such as computing clusters 2835-1.1-2835-1.G, can include mutually exclusive sets of nodes as possible nodes in their respective upper and lower levels. Thus, each of these computing clusters 2835-1.1-2835-1.G can independently coordinate the mechanism for selecting a single parent node to which participating child nodes will send their resultants. To further reduce global coordination, in some embodiments, no computing clusters have overlapping sets of nodes. As a particular example, in embodiments with exactly the three levels as illustrated in FIG. 30K, only computing clusters 2835-2.1-2835-2.G are required, and computing cluster 2835-1.1. is not implemented. In such embodiments, the root level includes exactly one node that all nodes are predetermined to send resultants to for every query. In such embodiments, every computing cluster in the database system 10 can be mutually exclusive. In some cases, the database system 10 can implement multiple query execution plans 2805 for different queries, for example, operating on different, distinct sets of data stored by the corresponding distinct set of nodes at each query execution plan 2805's IO level. Alternatively, the database system implements the single query execution plan 2805 for all queries.

Each computing cluster can include the same or different number of total possible nodes across each of its levels. A computing cluster can include the same or different number of possible nodes for some or all of its levels as other computing clusters that include these same levels. Each computing cluster can include the same or different number of levels. For a given query, each selected parent node across different computing clusters at the same level can receive resultants from the same or different number of child nodes. A same or different number of child nodes can be participating in a given query in different computing clusters. Computing clusters that include the lower level as the IO level can include the same or different number of nodes at the IO level. In some cases, all nodes at the IO level and/or all available nodes at the IO level in every one of these computing clusters that include the lower level as the IO level can be included to implement every query. In some cases, at least one node at the IO level of at least one computing cluster will not be selected to perform row reads for some queries.

Figure 30L:
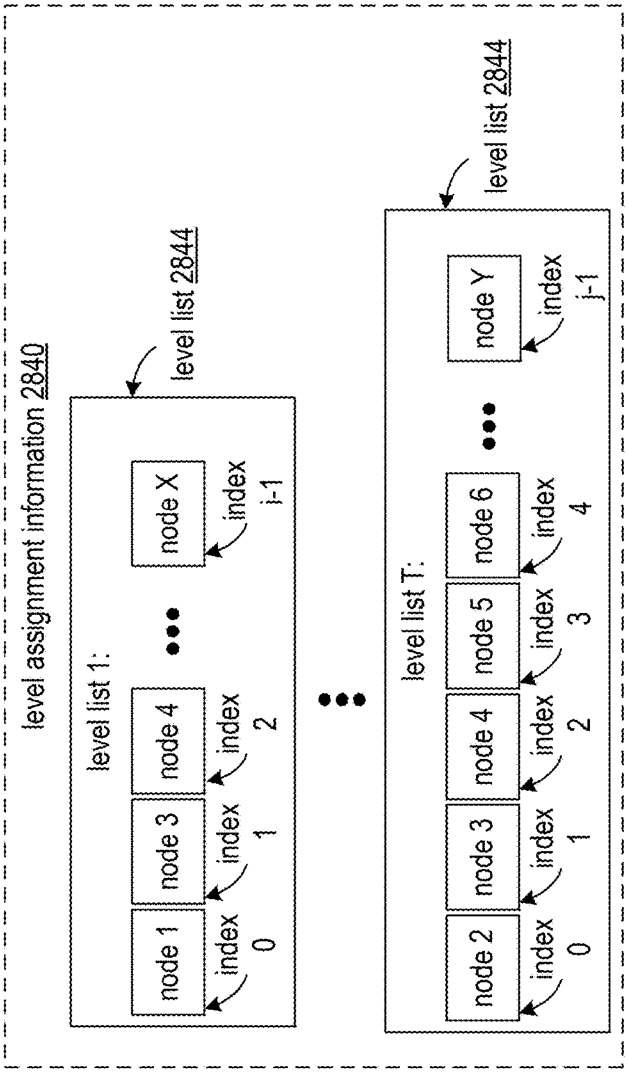
FIGS. 30L and 30M illustrate embodiments of level assignment information in accordance with various embodiments.
Figure 30M:
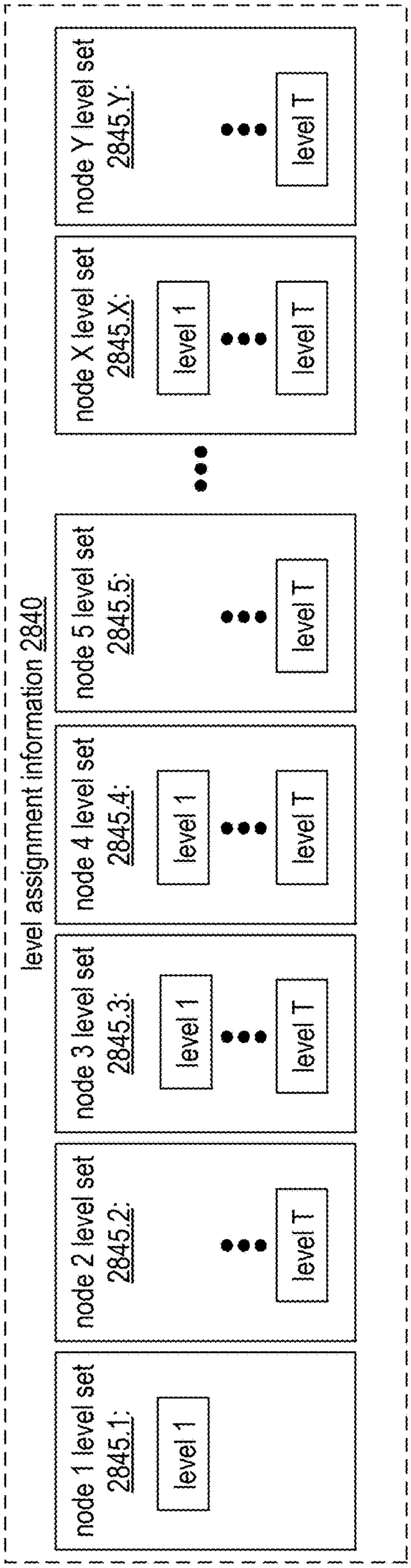

As illustrated in FIGS. 30L and 30M, each computing cluster 2835 can have corresponding level assignment information 2840. The level assignment information 2840 can be utilized by corresponding nodes in the computing cluster 2835 to determine which levels of the computing cluster 2835 it is assigned to for participation in some or all queries. In particular, the level assignment information 2840 can indicate a cluster-level mapping that indicates assignment of each of a plurality of subsets of the plurality of levels of the computing cluster 2835 to a corresponding one of the set of nodes. A node assigned to a particular level in the level in the level assignment information is included as in the set of possible nodes for that level, where its participation in a given query can be determined based on the query itself and/or based on whether the level is a root level, inner level, or IO level, As illustrated in FIG. 30L, the level assignment information 2840 can include, can be represented as, and/or can otherwise indicate a plurality of T level lists 2844-1-2844-T, corresponding to a plurality of levels of the computing cluster 2835. For example, if a computing cluster only includes an upper level and a lower level, level list 1 can correspond to the level list for the upper level, and level list T can correspond to the level list for the lower level, where T is equal to two. In other embodiments, T can include more than two levels for a corresponding computing cluster than includes nodes in more than two levels of the query execution plan. Each level lists includes a subset of nodes in the computing cluster that are assigned to the corresponding level as a possible node in the set of possible nodes for the level.

In this example, level list 1 includes a list of i nodes that includes node 1, node 3, node 4, and node X. Level list 1 has corresponding indices 0-($i$−1), where node 1 is at index 0 of the list, node 3 is at index 1 of the list, node 4 is at index 2 of the list, and node X is at index i−1 of the list. Level list T includes a list of j nodes that includes node 2, node 3, node 4, node 5, and node Y. In this example, level list T does not include node 1. For example, if level list T corresponds to the IO level of the query execution plan 2805, level list T can include every node in the computing cluster 2835 and/or every available node in the computing cluster 2835 that has access to segment storage 2442 and/or that is included in a corresponding storage cluster 35 belonging to the computer cluster 2835. For example, node 1 is not included in level list T because it does not include or have access to segment storage 2442 and/or is not included in any storage clusters 35. In some embodiments, each of a computing cluster's level lists 2844 can include any number of nodes. For example, i can be greater than j, less than j, or equal to j.

The level lists 2844 of level assignment information can indicate, can be utilized to derive, and/or can be derived from a plurality of node level sets 2845.1-2845.Y. This is illustrated in FIG. 30M, which depicts identical level assignment information as the example of FIG. 30L in a different fashion. As illustrated in FIG. 30M, the level assignment information 2840 can include, can be represented as, and/or can otherwise indicate this set of node level sets 2845.1-2845.Y. Each node in the computing cluster 2835 has a node level set 2845 that can include one or more levels to which the node is assigned for the computing cluster 2835 as a possible node, or can indicate the node is assigned to no levels of the computing cluster 2835.

Figure 31A:
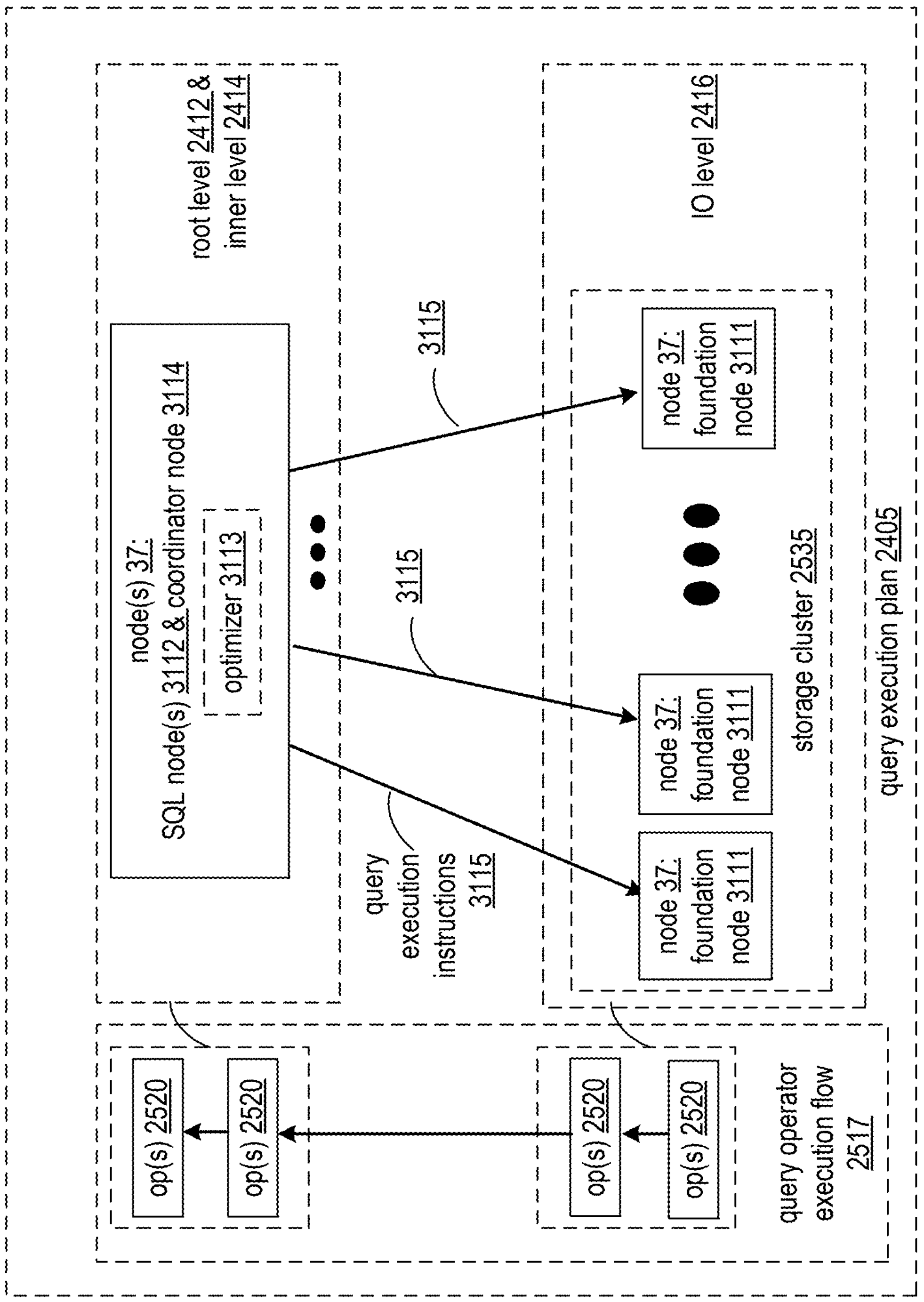
FIGS. 31A-31C illustrate example topologies of a plurality of nodes implementing a query execution plan in accordance with various embodiments.
Figure 31B:
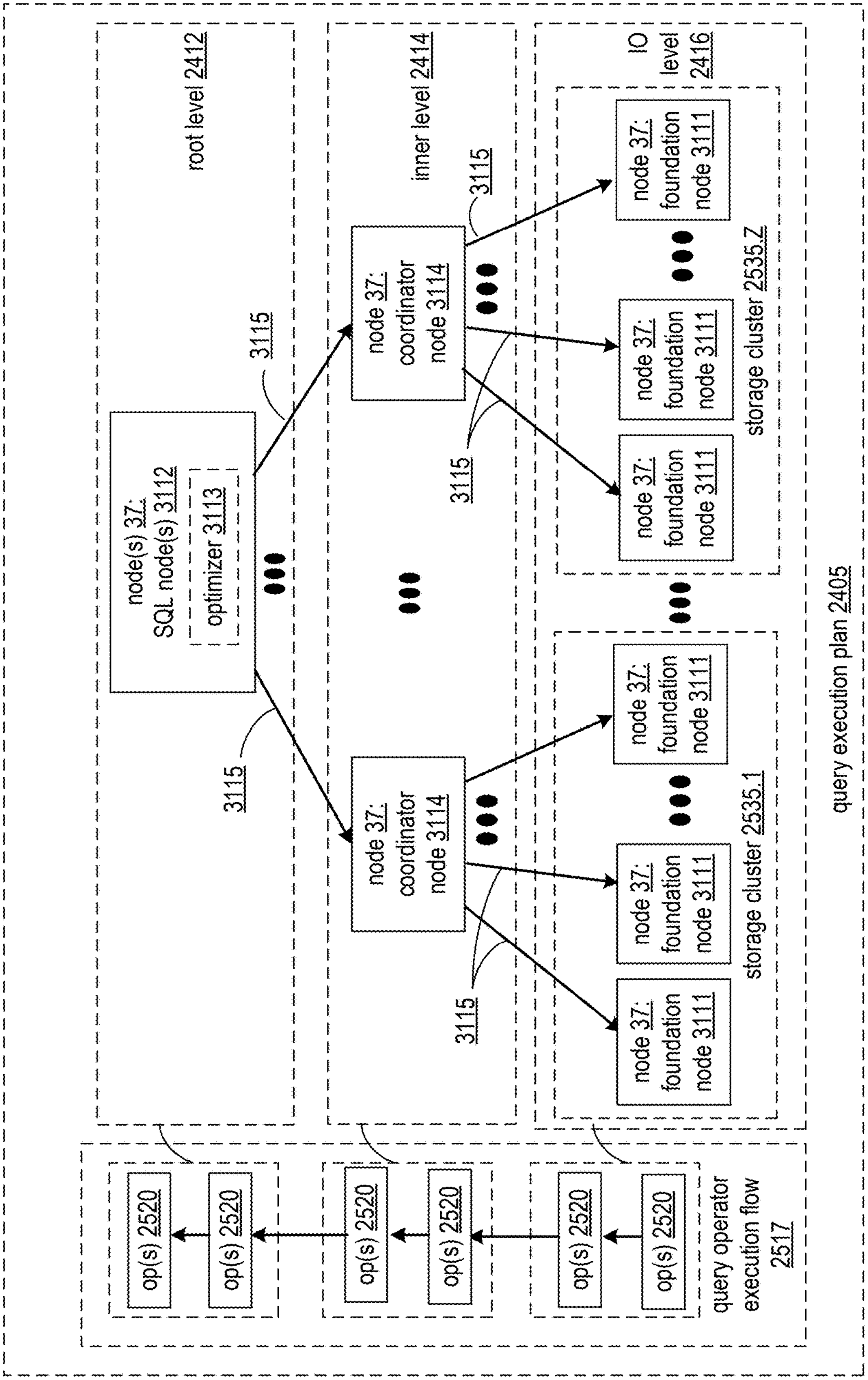
Figure 31C:
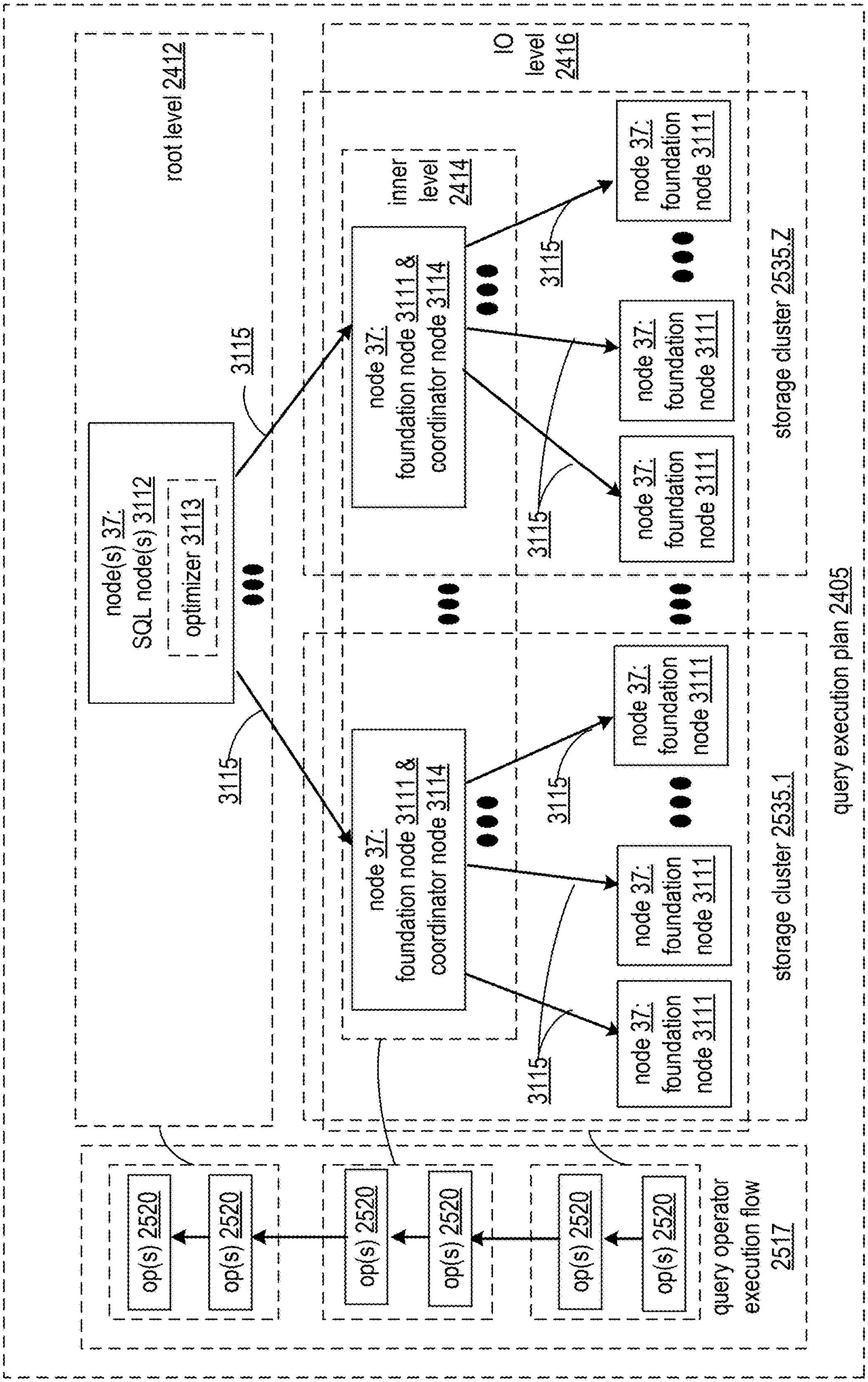

FIGS. 31A-31C illustrate various embodiments of implementing query execution plan 2405 to execute a query via a query execution module 2504. Some or all features and/or functionality of FIGS. 31A-31C can implement some or all features and/or functionality of query execution plan 2405 of FIG. 24A and/or can implement any embodiment of a query execution plan 2405, any embodiment of executing a query via query execution module 2504, and/or any query execution described herein.

As illustrated in FIGS. 31A-31C, a single SQL node 3112 (or optionally multiple SQL nodes) at a root level 2412 can coordinate query execution via communicating query execution instructions 3115 downstream (e.g. to a subsequent lower level). The SQL node 3112 can be implemented as the root node of the root level 2412.

In some embodiments, the SQL node 3112 generates/determines the query operator execution flow 2517 to be executed via the query execution plan 2405 (e.g. based on selecting/arranging/optimizing the arrangement of operators 2520 of the query operator execution flow 2517 via an optimizer 3113) to generate the query execution instructions 3115 reflecting the generated query operator execution flow 2517. The SQL node 3112 can otherwise communicate query execution instructions 3115 to nodes at the immediately lower level accordingly (e.g. even if generated by a separate entity).

Each node 37 can propagate received instructions 3115 to its own child nodes at subsequently lower levels, until all nodes at an IO level 2416 receive query execution instructions 3115 (e.g. the full instructions, 3115, or a relevant portion of the instructions 3115). The query execution instructions 3115 can indicate a portion of operator execution flow 2517 for execution by nodes at the corresponding level (e.g. one or more operators of a query operator execution flow 2433 for execution by the node 37) and/or can indicate other portions (e.g. lower) portions of operator execution flow 2517 for execution by nodes at lower levels, to be communicated to these lower level nodes in conjunction with executing the query.

Each level can be included in a given computing cluster ("VM cluster") of nodes, for example, implementing some or all features and/or functionality as computing cluster 2835 as disclosed by U.S. Utility application Ser. No. 16/778,194. This can include identifying/coordinating which nodes are assigned to which level for a given query (e.g. based on level assignment information and/or level participation determination module). Such coordination is optionally performed by/via communication with a coordinator node 3114.

In some embodiments, the possible node/level assignments are made in the system when a VM Cluster object is created in metadata (e.g. metadata mediated via a consensus protocol 3100). In some embodiments, this can happen in two places: (1) whenever a SQL node is added (including the initial SQL node). This node is a VM cluster of size one; or (2) Whenever a foundation cluster is added (including the first one). This VM cluster can be comprised of the same set of nodes in the corresponding storage cluster 2535 of foundation nodes 3111 ("foundation cluster"). In some embodiments, the supported levels can be added as part of metadata manipulation, for example, via implementing some or all logic in the example code below for "addClusterAction.cpp":

```
vmCluster->mutable_cluster_info( )->set_name(
   this->state( )->m_newCluster->cluster_info( ).name( ) + "-vm");
vmLevel = vmCluster->mutable_cluster_info( )->mutable_vm_info( )->add_levels( );
vmLevel->set_level(3U);
```

While not illustrated, the operator execution flow 2517 executed via the query execution plans 2405 of FIGS.

31A-31C can include any arrangement of operators in any combination of parallelized and serialized tracks as discussed herein. However, lower levels can be required to execute portions of the operator execution flow 2517 that are strictly serially before other portions of the operator execution flow 2517 executed by higher levels of the operator execution flow 2517. Some operators can optionally be executed via a shuffle operation via a shuffle node set of nodes (e.g. within in a given storage cluster), for example, as discussed in conjunction with FIG. 25E.

While not illustrated, this downward propagation of query execution instructions 3115 to render execution of the query can render the upwards propagation of respective resultants (e.g. the partial resultants generated by respective nodes via their own participation in the query) to parent nodes 37 for processing at their respective levels to ultimately render the final resultant generated by a root node as discussed in conjunction with FIG. 24A and/or a described in conjunction with implementing any embodiment of query execution plan described herein.

While FIGS. 31A-31C all illustrate coordination of a query across multiple nodes of a query execution plan 2405, different ones of the FIGS. 31A-31C illustrate query execution plans 2405 with different topologies of nodes. The different topologies presented in FIGS. 31A-31C can have different benefits and/or drawbacks for some or all different types of queries executed via database system 10. Various different queries executed via database system 10 over time can be executed via the same or different type of topology. For example, all queries are executed via a same or similar topology as illustrated in only one of the FIGS. 31A-31C. As another example, some queries are executed via a same or similar topology as illustrated in one of the FIGS. 31A-31C, and/or other queries are executed via a same or similar topology as illustrated in one or more of the other FIGS. 31A-31C. As another example, some queries are executed via a same or similar topology as illustrated in one or more of the FIGS. 31A-31C, and/or other queries are executed via a different topology different from all of the FIGS. 31A-31C. As another example, all queries are executed via a different topology different from all of the FIGS. 31A-31C.

In some embodiments, database system 10 executes queries (e.g. based on being requested via a requesting entity or otherwise being scheduled/determined for execution) by generating a query execution plan 2405 ("query plan"), and then by executing the plan, for example, as discussed in conjunction with at least FIG. 24A. The query plan can consist of a tree of logical operators (e.g. query operator execution flow 2517), and the plan is passed down along tree of nodes (E.g. the nodes participating in the query execution plan 2405). These operators (e.g. operators 2520) may perform internal operations within the node or may involve network communication with nodes above or below in the query tree. At the leaves of the tree, there are foundation nodes 3111 ("Foundation/LTS" nodes) that are operable execute in-memory instances of "pipeline IO operators" from the plan, which read data off of its drives and process the data. The foundation nodes 3111 can be implemented as IO level nodes participating in at least the IO level 2416 of the query execution plan 2405.

In some embodiments, the corresponding query tree implemented via levels of the query execution plan includes three or more levels of execution. Each level can fans-in data from the level below it. The root level 2412 (Level 1) can execute executes where a corresponding optimizer 31113 runs (e.g. implemented via. a SQL node 3112), and there is optionally exactly one node at this level for a given query. After 1 or more intermediary levels, the leaf level 2416 of execution can be where IO against disk and/or network data takes place (e.g. read: IO for rows from tables).

In some embodiments, the number of levels in a query can be fixed by system configuration and can assumed to be constant. In some embodiments, a three-level query can be sufficient for installations with fewer than a threshold number of nodes (e.g. 1,000 nodes). Which nodes and which levels they execute for a given query can be controlled by metadata in the system configuration, as well as by consensus-driven "compute configuration" mediated by a group of nodes acting together in accordance with a consensus protocol.

In some embodiments, database system 10 scales by increasing the number of these Foundation nodes because the data is ultimately stored there and read in parallel to the other nodes (e.g. due to new data being added over time, and/or datasets against which queries are to be executed growing larger and larger and being stored across greater numbers of segments requiring storage resources of more nodes 37).

In some embodiments, this scaling can cause multiple obstacles to efficient query execution. For example, in some embodiments, foundation nodes 3111 are each part of a storage cluster 2535, which maintains a shared consensus protocol 3100, for example, to provide fault tolerance and/or linearity of events. The consensus protocol can become decreasingly viable as more nodes are added to the storage cluster 2535 because more nodes have to participate in the consensus. In some embodiments, roughly 20 foundation nodes are feasible in a single foundation/storage cluster. In other embodiments, storage clusters can be configured via/can be constrained by/can be optimal in cases where 20, or a different maximum number of nodes, are included in the storage cluster. In some embodiments, coordinating an increasing number of foundation nodes without expanding the depth of the query tree can mean there is some node(s) in the query tree that is going to eventually become a limiting factor.

FIG. 31A illustrates a query execution plan 2405 implemented via a corresponding topology that implements foundation nodes 3111 in a single cluster. In some embodiments the single-cluster query execution plan implementation of FIG. 31A, a larger number of foundation nodes 3111 at the IO level 2416 ("level 3") can render an increasingly large coordination effort the SQL nodes 3112 have.

In some embodiments, the number of SQL nodes at the root level 2412 is optionally irrelevant because only a single node 37 at the root level 2412 ("level 1") is chosen to start a query, so only one SQL node 3111 is ever relevant for any given query. Different queries executed in overlapping or non-overlapping time frames can be coordinated via same or different SQL nodes 3112 of the root level 2412.

In the query execution plan 2405 of FIG. 31A, the root level 2412 and inner level 2414 ("level 1" and "level 2") are practically identical. This can be effectively considered as a 2-level system. This topology of FIG. 31A where a same one or more nodes is implementing both level 1 and level 2, with a third level 3 below it, can be denoted as a topology $\{1, 2\} \rightarrow \{3\}$. The SQL node is thus considered a coordinator node 3114 based on this top level node acting at level 2 and coordinating with all foundation nodes 3111.

In some embodiments, the single cluster embodiment of FIG. 31A presents problems when the system scales. FIGS. 31B and 31C present embodiment that support query execution via multiple clusters 2535. In particular, the issue of storage cluster efficiency decreasing as the number of nodes increases can be resolved based on creating multiple storage clusters. This can be helpful in scaling to larger numbers of nodes, as coordination only need occur within a cluster, which can maintain a threshold/reasonable number of nodes. Nodes participating in any storage cluster can benefit from the fault tolerance provided by that specific storage cluster, and no other fault tolerance or linearity is needed across clusters from the perspective of a query.

In some embodiments, multiple foundation clusters 2535 can be deployed in in a "cluster of clusters" configuration. In such cases, a single coordination node at level 2 is not ideal, as this single level 2 node would need to act as a fan-in target for all foundation nodes, as they are added, and would act as a scalability limiting factor.

In some embodiments, rather than implementing a single coordination actor, as in the case of the topology with a SQL node 3112 acting as the coordinator of the foundation nodes 3111 as illustrated in of FIG. 31A, scaling to multiple independent clusters can be achieved based on introducing a level of nodes that simply act as coordinators for the query execution tree. This can even involve dedicated nodes whose only job is to coordinate with the "lower" (higher numbered) levels.

Such an embodiment is illustrated in FIG. 31B, where database system 10 is implemented to deploy a topology {1}→{2}→{3}. In such embodiments, more level 2 "coordinator" nodes 3114 may be added to offset the coordination complexity of managing more "leaf" level 3 foundation nodes. In some embodiments, this can also feasibly result in a limitation of coordination complexity when there are too many storage clusters for any number of level 2 nodes to handle, but in that case, the a database system user entity/requesting entity/storage entity can optionally move their system to a topology with even more intermediary query execution levels, such as {1}→{2}→{3}→{4} where level 4 is where the Foundation nodes 3111 execute, and so forth.

In some embodiments, the coordinator nodes 3114 of FIG. 31B are implemented as dedicated level 2 nodes, with one coordinator nodes 3114 per foundation cluster 2535. In some embodiments, this dedicated node can act as the local coordinator (e.g. for its cluster) for all queries, and the other nodes in the cluster will only act as level 2 should it be unavailable. This can be ideal in larger engagements with larger numbers of nodes and/or larger numbers of clusters.

In some embodiments, implementing the dedicated level 2 coordinator nodes 3114 of FIG. 31B can be considered overkill when database system 10 has as smaller number of storage clusters. In some embodiments, it can be more ideal to reduce the need for additional hardware of implementing these dedicated nodes. To achieve this, the coordination effort can be pushed down into the storage cluster itself.

Such an embodiment is illustrated in FIG. 31C, where database system 10 is implemented to deploy a topology {1}→{2, 3}. This embodiment can be implemented via embodiments of database system 10 having multiple clusters, via the "cluster of clusters" configuration. In the topology of FIG. 31C, foundation clusters 2535 can be configured to each run level 2 of the query, where the SQL nodes run only level 1. In this topology, for a given query, exactly one node, per foundation cluster, can run level 2, acting as a "local coordinator" (e.g. based on being implemented as one of many coordinator nodes 3114 at the corresponding level 2414).

In such embodiments, a single node 37 is chosen out of each storage cluster 2535 to run "level 2" of the query execution plan for a given query, where this selected node coordinates the rest of the level 3 execution with the other nodes 37 within its cluster. This way, "level 1" only has to coordinate with each storage cluster as a single unit, and each storage cluster's level 2 node for a query only has to coordinate with the other nodes in the cluster.

The {1}→{2, 3} of FIG. 31C can be implemented to avoid {1}→{3} coordination, ensuring the top level SQL node 3112 need not coordinate with all foundations nodes 3111 across all clusters. In some embodiments, every node at the foundation layer can be configured to be able to run both level 2 and level 3 in any given query. This means that no single Foundation node 3111 is responsible for taking the brunt of both the level 2 query coordination for its cluster and its own level 3 IO effort across multiple queries being run (e.g. concurrently and/or over time). Thus, given multiple queries, nodes in a storage cluster can be implemented to "take turns" being the level 2 coordinator (e.g. in a round robin fashion, turn-based fashion, or other selection rendering uniform distribution of selection across all nodes in the cluster over time and/or within a given time frame where multiple queries are executed), and/or can be selected based on balancing workload (e.g. accounting for: any nodes taking longer than usual to execute its queries; some nodes currently having more tasks currently being executed than others; nodes having poor health; nodes scheduled to undergo an outage, etc.). In some embodiments, it ultimately doesn't matter which nodes run as the level 2 node of a query as long as it is (1) only one node per cluster for a given and/or (2) no single foundation node is favored over multiple queries, lest the node becoming overworked.

In some embodiments, during a given time frame where multiple queries (e.g. including query 1 and query 2) are running concurrently, a set of node of a given storage participating in executing of the multiple queries includes all foundation nodes 3111 of a given storage cluster 2535, based on all participating at level 3. Furthermore, during this time frame, a first node 1 can be acting as the coordinator node 3114 of level 2 of query 1, in addition to its level 3 duties for both query 1 and query 2. Meanwhile. also during this time frame, a second node 2 can be acting as the coordinator node 3114 of level 2 of query 2, in addition to its level 3 duties for both query 1 and query 2.

In some embodiments, since nodes at each level (e.g. each VM cluster) know which clusters are downstream of itself, there is no centralized coordination of level 3 (foundation nodes) required at Level 1. The decision of which node to run level 2 can be made at level 2, for example, randomly and/or in a turn-based fashion, before the execution of the query, for example, in a "probe" phase. In some embodiments, the plan for level 3 is also made at level 2. Thus, the level 1 node of a query only ever has to communicate with a single node per cluster (level 2) and therefore achieve scalability by avoiding interaction with most nodes on the system.

In some embodiments, a scalability limitation can be based on the number of storage clusters the system has (e.g. based on workload of customers of database system; based on number of nodes required to store segments based on the number of rows of one or more datasets of one or more data suppliers against which queries are to be executed, etc.). For example, the topology of FIG. 31C can be less ideal in cases where there is a much larger number of storage clusters (e.g. more than 5; more than 10; more than 20; or more than another threshold number). However, this embodiment of FIG. 31C can be ideal in cases where database system 10 has less than a threshold total number of clusters (e.g. 5, 10, 20 or any other number), or less than a threshold number of clusters storing one or more given datasets against which a given set of queries is to be executed.

In some embodiments the topology implemented by database system 10 can be modified (e.g. to deploy an even more complex query execution topology at the expense of more nodes). For example, the topology utilized can change over time based on more data being added to the system, where more nodes are required for storage and more corresponding storage clusters are thus created. Such configuration and/or changes in topology of query execution can be per-customer (e.g. per requesting entity executing queries and/or per data supplier supplying data stored by the data system 10, where different datasets/queries corresponding to different customers have different topologies implemented for respective query execution against respective datasets). Such configuration and/or changes in topology of query execution can be based on other reason (e.g. per query based on how many clusters the underlying data spans, etc.). Such topology configuration and/or corresponding changes per-customer/per-query/etc. can be configured via user input, for example via an administrator, via a corresponding requesting entity, and/or via another user. Such topology configuration and/or corresponding changes per-customer/per-query/etc. can be configured automatically, for example via database system 10 based on identifying a most efficient topology based on current condition, number of nodes in the system, the query type, how many nodes/storage clusters the data against which the query is to be executed spans, how many nodes/storage clusters store data of a given dataset or a given customer, etc. A corresponding optimization algorithm, trade-off, and/or corresponding heuristics to evaluate can be automatically identified and/or configured via user input.

In some embodiments, multiple instances ("installations") of database system 10 are implemented (e.g. for different users/customers such as requesting entities and/or different data providers, for example, in the same or different physical location, utilizing shared or distinct processing and/or memory resources (e.g. shared or distinct sets of computing devices 18 implementing shared or distinct sets of nodes 37). The multiple instances can be implemented to support multiple query execution plan topologies (e.g. two or more of the topologies of FIGS. 31A-31C). In some embodiments, database system 10 is operable to differentiate which topology to use in a given installation. For example, if the installation is going to consist of a single foundation cluster, the {1,2}→{3} topology of FIG. 31A is selected, while if the installation is going to consist of multiple foundation clusters, the {1}→{2,3} topology of FIG. 31C is selected.

In some embodiments, database system 10 does not know in advance whether a corresponding user/customer is going to use one or the other. In some embodiments, the corresponding user can be required to configure which topology to utilize, for example, via user input. In some embodiments, this is accomplished during system bootstrap time. For example, bootstrapping initial system can involve launching a protocol/function (e.g. rolehostd) with a corresponding bootstrap argument (e.g. initialSystem=true). This can be implemented to cause the initial system to be created and/or a vm cluster to be created. In some embodiments, the bootstrap argument can be configured to indicate which topology to implement. (e.g. initialSystem=true selects configuration of a {1}→{2,3} of topology of FIG. 31C; and/or initialSingleClusterSystem=true selects configuration of a {1,2}→{3} topology of FIG. 31A. For example, a user wishing optimal performance on a single-cluster system can bootstrap via initialSingleClusterSystem.

In some embodiments, this user-specified configuration is not required, where the system will still function, just perhaps not as efficiently for some queries. In some embodiments, the first foundation cluster added into an initialSingleClusterSystem will run only level 3. In some embodiments, The second foundation cluster added to the same system will cause a change to the existing clusters to update their topology.

In some embodiments, it is acceptable for a system undergoing a topology change (e.g. due to the addition of a second foundation cluster) to require a complete restart of all nodes. In some embodiments, queries are allowed to fail until this is done (E.g. will be re-run on the new topology once the transition to the new topology is complete and nodes are back online).

In some embodiments, when a second foundation cluster is added to the system and the topology changes accordingly, a response is generated and sent back to the end user, for example, indicating a warning that a restart is required and/or that queries will fail during this time In some embodiments, the response back to the end user is implemented via some or all of the following:

```
> CREATE CLUSTER foundation02
TYPE=lts PARTICIANTS (....);
0 rows modified
```

Figure 31D:
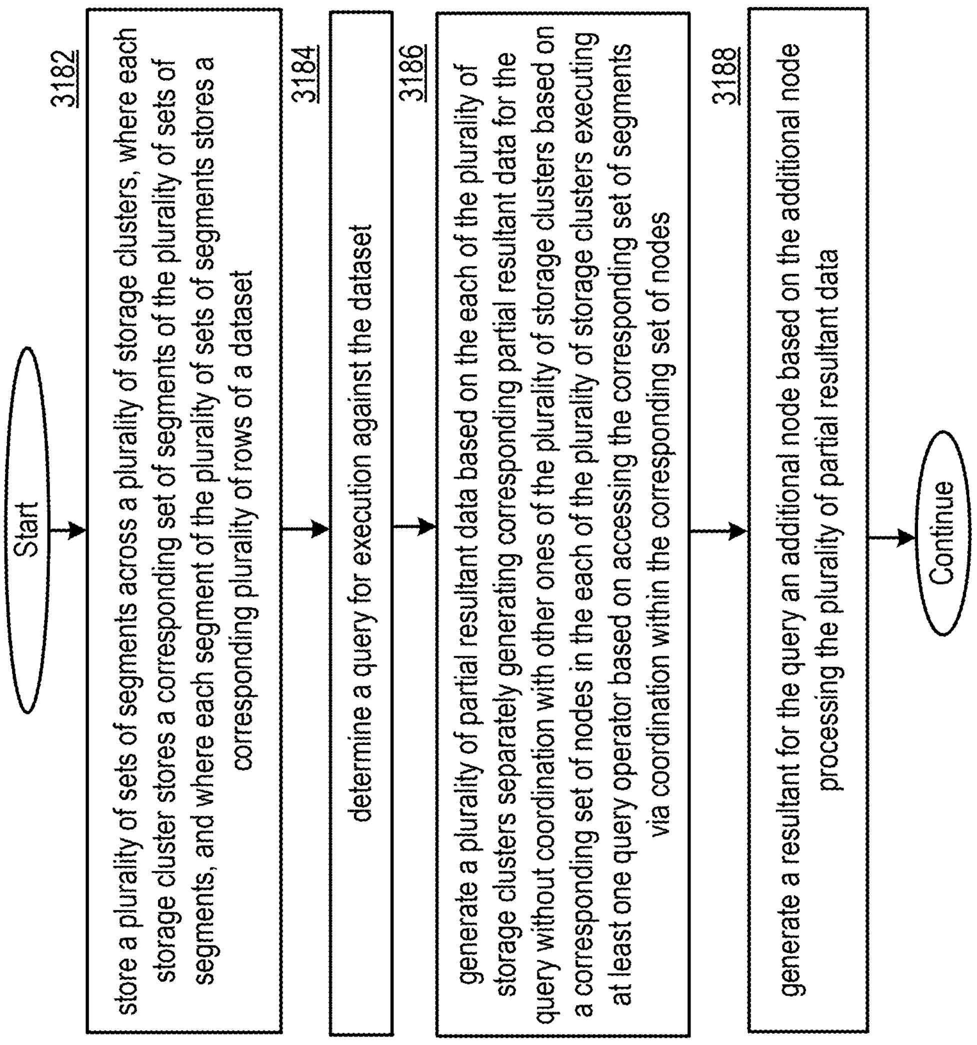
FIG. 31D is a logic diagram illustrating a method for execution in accordance with various embodiments.

Warning: A complete system restart must be executed before queries will properly execute after adding this cluster FIG. 31D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31D. For example, a node 37 can participate in some or all steps of FIG. 31D based on participating in consensus protocols to mediate consensus data with other nodes 37. Some or all of the method of FIG. 31D can be performed by nodes executing a query in conjunction with a query execution, for example, via one or more nodes 37 implemented as nodes of a query execution module 2504 implementing a query execution plan 2405. Some or all of the steps of FIG. 31D can optionally be performed by any other processing module of the database system 10. Some or all of the steps of FIG. 31D can be performed to implement some or all of the functionality of the database system 10 as described in conjunction with FIGS. 31A-31C, for example, by implementing some or all of the functionality of nodes 37 and/or of query execution plan 2504, for example, having a same or similar topology as illustrated and discussed in conjunction with FIG. 31C. Some or all of the steps of FIG. 31D can optionally be performed by a leader node and/or one or more follower nodes of the leader node, in accordance with some or all features and/or functionality discussed in conjunction with FIGS. 27A-27J. Some or all steps of FIG. 31D can be performed, via one or more nodes, based on accessing segments as dictated by data ownership information and/or by participating in query execution as dictated by level assignment information, for example, in accordance with some or all features and/or functionality discussed in conjunction with FIGS. 30A-30M. Some or all steps of FIG.

31D can be performed by database system 10 in accordance with other embodiments of the database system 10 and/or nodes 37 discussed herein.

Step 3182 includes storing a plurality of sets of segments across a plurality of storage clusters. In various examples, each storage cluster stores a corresponding set of segments of the plurality of sets of segments. In various examples, each segment of the plurality of sets of segments stores a corresponding plurality of rows of a dataset.

Step 3184 includes determining a query for execution against the dataset. Step 3186 includes generating a plurality of partial resultant data based on the each of the plurality of storage clusters separately generating corresponding partial resultant data for the query without coordination with other ones of the plurality of storage clusters based on a corresponding set of nodes in the each of the plurality of storage clusters executing at least one query operator based on accessing the corresponding set of segments via coordination within the corresponding set of nodes. Step 3188 includes generating a resultant for the query an additional node based on the additional node processing the plurality of partial resultant data.

In various examples, the additional node is separate from all corresponding sets of nodes of all of the plurality of storage clusters.

In various examples, the coordination within the corresponding set of nodes is based on assigning one of corresponding set of nodes in the each of the plurality of storage clusters as a coordinator node for the query. In various examples, the coordinator node coordinates execution of the at least one query operator by all of the corresponding set of nodes in the each of the plurality of storage clusters based on communicating corresponding query execution instructions to all other nodes of the corresponding set of nodes.

In various examples, the coordinator node only communicates the corresponding query execution instructions to other nodes within the each of the plurality of storage clusters. In various examples, none of the other nodes in the each of the plurality of storage clusters receive the corresponding query execution instructions from nodes outside of the each of the plurality of storage clusters.

In various examples, the coordinator node communicates the corresponding query execution instructions to the other nodes based on receiving corresponding instructions from the additional node.

In various examples, assigning the one of corresponding set of nodes as the coordinator node for the query is based on selecting the one of corresponding set of nodes from the corresponding set of nodes based on applying at least one of: a turn-based scheme, a random selection scheme; or a load balancing scheme.

In various examples, the method further includes determining a second query for execution against the dataset. In various examples, the method further includes generating a second plurality of partial resultant data based on the each of the plurality of storage clusters separately generating corresponding second partial resultant data for the second query without coordination with other ones of the plurality of storage clusters based on the corresponding set of nodes in the each of the plurality of storage clusters executing at least one second query operator based on accessing the corresponding set of segments via coordination within the corresponding set of nodes for executing the second query. In various examples, the coordination within the corresponding set of nodes for executing the second query is based on assigning a second one of the corresponding set of nodes in the each of the plurality of storage clusters as a second coordinator node for the second query. In various examples, the second one of the corresponding set of nodes is different from the one of the corresponding set of nodes for at least one of the plurality of storage clusters. In various examples, the method further includes generating a second resultant for the second query via a second additional node based on the additional node processing the plurality of partial resultant data.

In various examples, the second additional node is the same as the additional node. In various examples, the additional node is separate from the second additional node. In various examples, a corresponding computing cluster includes a set of possible top level nodes that include the additional node and the second additional node.

In various examples, the at least one of the plurality of storage clusters coordinates execution of the query during a first temporal period. In various examples, the at least one of the plurality of storage clusters coordinates execution of the second query during a second temporal period. In various examples, the second temporal period is overlapping with the first temporal period based on concurrent execution of the second query and the query. In various examples, the second one of the corresponding set of nodes is the same as the one of the corresponding set of nodes for another at least one of the plurality of storage clusters.

In various examples, the at least one query operator includes an IO operator. In various examples, each node in the corresponding set of nodes in the each of the plurality of storage clusters executes the IO operator based on: generating at least one IO pipeline for accessing at least one segment stored by the each node; and/or executing the at least one IO pipeline.

In various examples, executing the at least one IO pipeline includes emitting a filtered subset of rows included in the at least one segment based on identifying only rows included in the at least one segment that satisfy at least one query predicate of the query.

In various examples, executing the at least one IO pipeline includes accessing at least one index structure stored by the at least one segment. In various examples, the at least one index structure indexes at least one column of the dataset.

In various examples, the method further includes generating a query execution plan for the query indicating an arrangement of a plurality of operators for execution across a plurality of nodes participating in the query execution plan in accordance with a plurality of levels. In various example, the arrangement of the plurality of operators includes the at least one query operator serially before at least one second query operator. In various examples, the corresponding set of nodes in the each of the plurality of storage clusters execute the at least one query operator in accordance with participating at a leaf level of the plurality of levels. In various examples, exactly one node in the each of the plurality of storage clusters further executes the at least one second query operator in accordance with participating at an inner level of the plurality of levels to generate the corresponding partial resultant data.

In various examples, the corresponding set of nodes in the each of the plurality of storage clusters executes the at least one query operator in accordance with participating at the leaf level of the plurality of levels to generate a corresponding sub-resultant. In various examples, the exactly one node executes the at least one second query operator based on processing a plurality of sub-resultants generated by the corresponding set of nodes. In various examples, one of the plurality of sub-resultants is generated by the exactly one node.

In various examples, the arrangement of the plurality of operators further includes at least one third query operator serially after the at least one second query operator. In various examples, the additional node executes the at least one third query operator in accordance with participating at a top level of the plurality of levels to generate the resultant for the query.

In various examples, the additional node generates the query execution plan. In various examples, the additional node sends cluster execution instructions to the exactly one node of the each of the plurality of storage clusters indicating execution of the at least one query operator and the at least one second query operator by the each of the plurality of storage clusters. In various examples, the exactly one node communicates query execution instructions to other ones of the corresponding set of nodes indicating execution of the at least one the at least one query operator.

In various examples, the coordination within the corresponding set of nodes is in accordance with a consensus protocol mediated between the corresponding set of nodes. In various examples, different ones of the plurality of storage clusters separately mediate a corresponding consensus protocol. In various examples, the consensus protocol mediated between the corresponding set of nodes facilitates fault tolerance within the each of the plurality of storage clusters.

In various examples, the plurality of sets of segments includes a plurality of segment groups. In various examples, each of the plurality of segments belongs to a corresponding segment group of the plurality of segment groups. In various example, each corresponding segment group of the plurality of segment groups is generated to include a corresponding set of multiple segments of the plurality of sets of segments configured for fault tolerance within the corresponding segment group. In various examples, all segments included in any given segment group of the plurality of segment groups are included in a same set of segments of the plurality of sets of segments. In various examples, all segments included any given segment group of the plurality of segment groups are stored via nodes of a same storage cluster. In various examples, each different segment included any given segment group of the plurality of segment groups are stored via a different corresponding node of the set of nodes included in the same storage cluster.

In various embodiments, any one of more of the various examples listed above are implemented in conjunction with performing some or all steps of FIG. 31D. In various embodiments, any set of the various examples listed above can be implemented in tandem, for example, in conjunction with performing some or all steps of FIG. 31D.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 31D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 31D, for example, in conjunction with further implementing any one or more of the various examples described above.

In various embodiments, the operational instructions, when executed by the at least one processor, cause the database system to: store a plurality of sets of segments across a plurality of storage clusters, where each storage cluster stores a corresponding set of segments of the plurality of sets of segments, and/or where each segment of the plurality of sets of segments stores a corresponding plurality of rows of a dataset; determine a query for execution against the dataset; generate a plurality of partial resultant data based on the each of the plurality of storage clusters separately generating corresponding partial resultant data for the query without coordination with other ones of the plurality of storage clusters based on a corresponding set of nodes in the each of the plurality of storage clusters executing at least one query operator based on accessing the corresponding set of segments via coordination within the corresponding set of nodes; and/or generate a resultant for the query an additional node based on the additional node processing the plurality of partial resultant data.

Figure 32A:
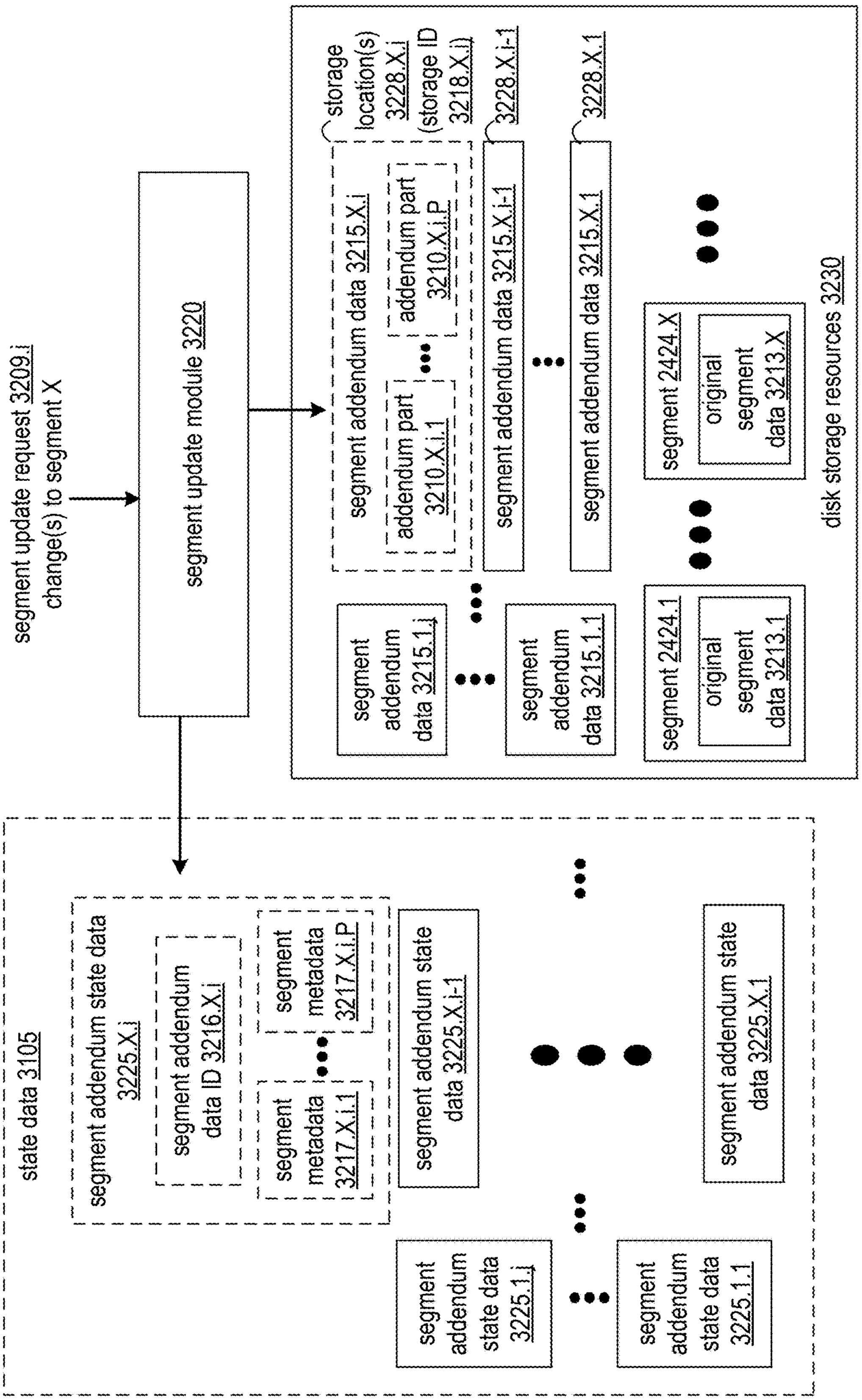
FIG. 32A is a schematic block diagrams of a segment update module that generates segment addendum data for storage in disk storage resources and updates state data accordingly in accordance with various embodiments.
Figure 32B:
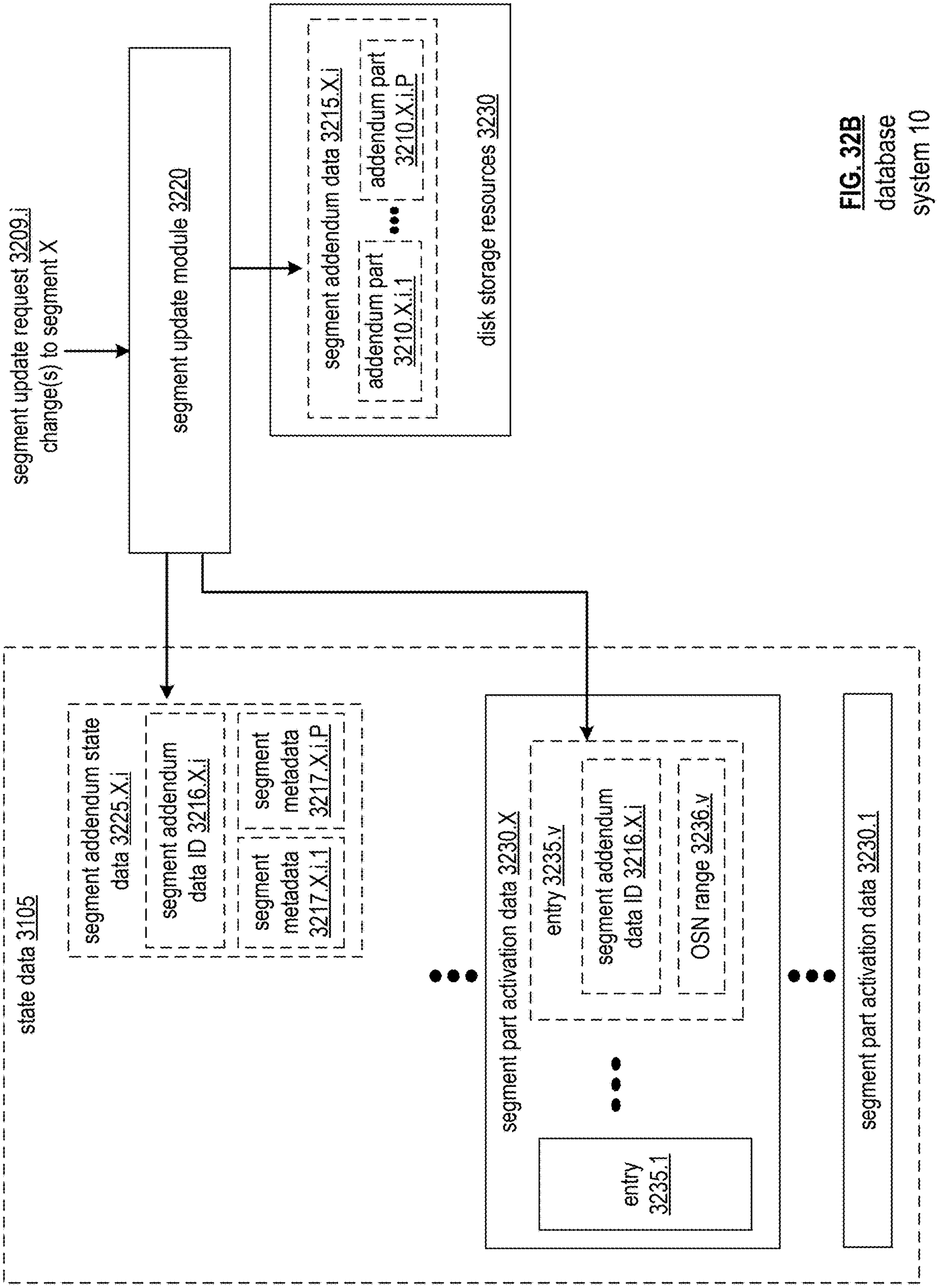
FIG. 32B is a schematic block diagram of a segment update module that updates segment part activation data based on generating segment addendum data in accordance with various embodiments.
Figure 32C:
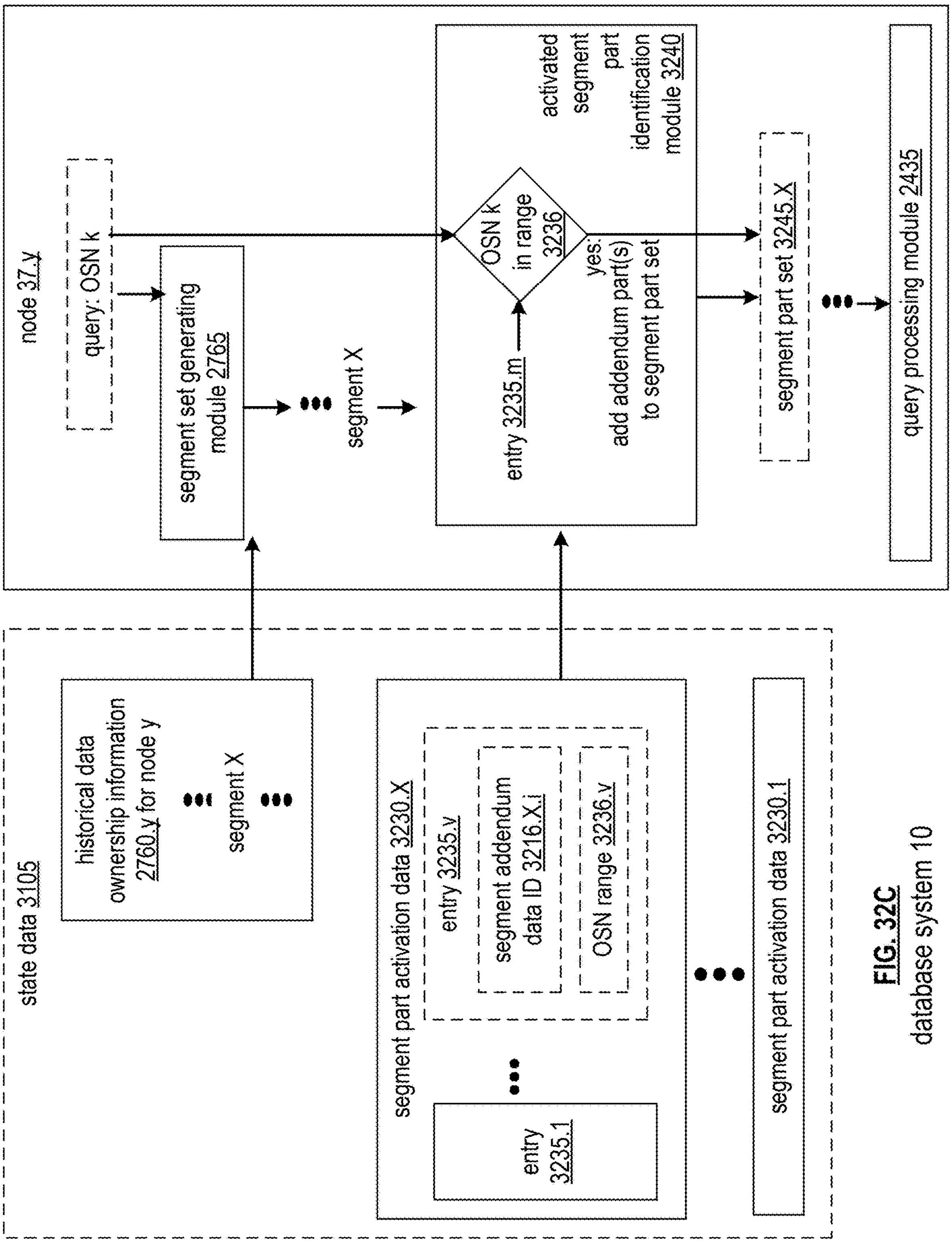
FIG. 32C is a schematic block diagram of a node that executes a query based on identifying a segment part set utilizing segment part activation data in accordance with various embodiments.

FIGS. 32A-32C illustrate embodiments of a database system 10 operable to generate and track addendum parts 3210 denoting changes to segments 2424 for use in query execution for applicable queries (e.g., with applicable OSNs reflecting the queries were requested at/after a time the respective change was implemented). Some or all features and/or functionality of the database system 10 of FIGS. 32A-32C can implement any embodiment of database system 10 described herein.

In some embodiments of database system 10, a given segment 2424 and/or given record 2422 (row) can require updating. For example, a requesting entity, administrator, or other user may wish to change a row or segment after it has been created. As another example, an automated process of database system 10 and/or an external computing device can automatically determine to change a segment or row after being created, for example, based on detecting a corresponding condition denoting the segment or row be changed. For example, such changes indicated via a user or automated process can include deletion of one or more rows, adding a new index to a segment to improve query performance, or other changes.

In some embodiments, addendum parts 3210 can be implemented as a construct to add additional information to a segment after it has been originally loaded. Addendum parts 3210 can be managed, for example, in cases of implementing many concurrent queries, OSNs, segment moves, and other storage cluster operations.

In some embodiments, addendum parts 3210 correspond strictly to deletes of rows from segments, where addendum parts as described herein can be interchangeably referred to as "delete parts", particular in the case where an addendum part is implemented to update the segment to delete rows from the segment. In other embodiments, addendum parts 3210 correspond to other types of updates to a corresponding segment.

In some embodiments, addendum parts 3210 correspond to deletes of rows/other updates to rows of segments 2424. In some embodiments, alternatively or in addition to addendum parts being implemented to indicate changes to segments 2424, at least some addendum parts 3210 can be implemented to indicate changes to pages 2515. For example, addendum parts 3210 can be generated to indicate changes to both changes or segments, where a given addendum part 3210 indicates changes to one corresponding segment or one corresponding page, and where another given addendum part 3210 indicates changes to another one corresponding segment or another one corresponding page.

As a particular example, one addendum part 3210 indicates changes to a segment 2424, such as a set of rows deleted from the segment 2424, while another one addendum part 3210 indicates changes to a page 2515, such as a set of rows deleted from the page 2515.

In some embodiments, generation of and/or applying of addendum parts 3210 can be implemented via storage protocol implementation of a read-modify-write approach, for example, to ensure that only one active delete part is present for a given OSN for a given segment. In some embodiments, it is possible to have multiple delete parts for a segment on disk and in the cluster state, for example, with different identifiers and/or stored in different files.

FIG. 32A illustrates an embodiment of database system 10 that implements a segment update module 3220 implemented to generate segment addendum data 3215 for storage in disk storage resources 3230, and further implemented to update state data 3105 to indicate segment addendum state data 3225 accordingly.

Logical addendum parts 3210 can be represented in an external table of contents (TOC) (e.g. segment addendum data 3215) in the storage cluster consensus state (e.g. state data 3105 mediated via consensus protocol 3100). The external TOC can be considered essentially synonymous with addendum parts 3210: an external TOC can represent a collection of one or more addendum parts. An external TOC can be conceptualized as a collection of segment parts, created as part of a single transaction, that were written to a single file on disk. The external TOC can be represented in the consensus state by a segment addendum data identifier 3216 (e.g. a corresponding UUID identifier/corresponding name), and/or a lightweight set of metadata 3217 about each segment part in the external TOC. While the addendum parts 3210 of external TOC can be implemented as being added after the original as described in conjunction with FIGS. 32A-32C, in some embodiments, external TOCs can optionally be written at segment load time.

In some embodiments, stored segments can be tracked on anode by node basis and/or can represent what the consensus state views each node to be storing on disk. The stored segments can be implemented to track a map of TOC name to a TOC storage ID, which can identify the file name in which a stored segment is storing each logical external TOC on disk. Upon creation of a new stored segment, either through rebuild or the creation of virtual segments, a corresponding storage cluster can create new TOC storage ID entries for each TOC name for the follower to store external TOC parts in.

As illustrated in FIG. 32A, in response to a segment update request 3209.*i* indicating changes to a given segment 2424.X, a segment update module 3220 can be implemented via processing and/or memory resources of database system 10 (e.g. by one or more nodes 37, for example, in accordance with the consensus protocol 3100) to apply the update. This can include generating segment addendum data 3215.X.i (e.g. a corresponding external TOC reflecting the changes for the given segment) indicating a set of one or more addendum parts 3210.X.i.1-3210.X.i.P corresponding to the changes to segment 2424.X (e.g. changes to one or more segment parts of segment 2424.X) indicated in segment update request 3209.*i*. The segment addendum data can be stored separately from the original segment data 3213.X of the corresponding segment 2424.X in one or more storage locations 3228.X.i having a storage ID 3218.X.i. (e.g. the original segment data 3213 and segment addendum data 3215 for the given segment X are stored upon the same or different node 37; are within the same or different memory drive 2425; etc.).

The respective segment 2424.X can further have additional segment addendum data 3215.X.1-3215.X.i-1 that were generated previously, as changes to the segment X are made over time. Different segment addendum data 3215.X.1-3215.X.i of the given segment 2424.X can be stored in a respective set of storage locations 3228.X.1-3228.X.i (e.g. upon the same or different node 37; within the same or different memory drive 2425; etc.). Other segments 2424 (e.g. segment 2424.1; 2424.2; etc.) stored by a given storage cluster 2535 can be similarly updated over time and have segment addendum data stored. The various segment addendum data can be reflected in state data 3105 (e.g. mediated via the consensus protocol 3100 via nodes 37 in the respective storage cluster 2535). The segment update module 3220 can further process a given segment update request 3209.*i* by further generating segment addendum state data 3225.X.i for inclusion in state data 3105 indicating the corresponding segment addendum data 3215.X.i that is generated and stored for this corresponding update request 3209.*i*. The segment addendum state data 3225.X.i can indicate a segment addendum data ID 3216.X.i denoting the corresponding segment addendum data 3215.X, as well as set of segment metadata 3217.X.i.P-3217.X.i.1 for the set of addendum parts 3210.X.i.1-3210.X.i.P. This metadata can optionally be implemented in a same or similar as metadata for segment parts of original segment data 3213.X of segment 2424 indicated in state data. This metadata can indicate which segment parts the addendum parts replace/update; can indicate the storage location 3228 and/or storage ID 3218 for the respective part; can indicate how the addendum part is replicated/parity stored across other segments in the same segment group for fault tolerance, and/or can indicate other information. The storage location 3228 and/or storage ID 3218 for a given segment can be stored within the given segment, can be stored in metadata for the given segment, and/or can be stored in the segment addendum state data 3225.

FIG. 32B illustrates a segment update module 3225 that further updates segment part activation data 3230 in response to updating segment addendum data 3215 as illustrated in FIG. 32A This can include generating at least one new entry 3235.*v* of the segment part activation data 3230.X (e.g. of a corresponding vector) for the given segment to reflect this ith change. The entry can indicate the segment addendum data ID 3216.X.i utilized to identify the respective segment addendum data 3215.X.i, as well as an OSN range 3236.*v*, specifying which OSNs this addendum is to be applied.

In some embodiments, segments 2424 have "placements" which define activation/ownership of the segment in the consensus state (e.g. as denoted in multiple data ownership information 2711 across multiple OSNs), for example, defining in the consensus state, for every OSN, which node is responsible for serving the segment in queries and/or whether the segment is on disk or virtual, for example, as discussed in conjunction with FIGS. 30A-30M.

For external TOCs, segment part placements can be utilized to describe the lifetime of an external TOC. For each placement of a segment, track a vector of placed segment parts (e.g., segment part activation data 3230) containing OSN ranges 3236.3236 and/or the identifier for the TOC name that the OSN range relates to (e.g. segment addendum data ID 3216.X.i) These vectors can act as exclusion vectors—a placed segment part is only added to the vector if it is not present for the entire OSN range of the parent segment/segment group placement. In some embodiments, each index of the vector corresponds to a given segment part, where some entries are not populated with entries entry 3235 based the segment part not being modified from the original segment part.

For example, if the valid OSN range of the parent segment is [0, inf), and an addendum part is created in OSN X, the valid OSN range of the addendum part is [X, inf) (e.g. where "inf" denotes infinity, or an unbounded upper maximum OSN). Any queries running on an OSN<X should not read the addendum part, and any queries running on an OSN>=X should read the addendum part. Since the OSN range of the segment part is not present for the entire OSN range of the parent segment, we must add a placed segment part containing the TOC name for the addendum part and an OSN range of [X, inf). Once the cluster's consensus state advances such that the effective OSN range of the parent segment is now [X, inf), the placed segment part should be cleaned up. In the event that a new external TOC is added that subsumes the original addendum part, two placed segment parts can be added to the consensus state—(1) a placed segment part describing the valid OSN range of the original part ending in the OSN in which the new part was created and/or (2) a placed segment part describing the valid OSN range of the new part, starting at the OSN in which the new part was created and ending in inf.

In some embodiments, upon receiving new placed segment parts, a follower node can send the OSN information for each placed segment part to its segment service, which can be implemented as a component used to manage all activated segments and segment parts. The segment service can track all OSN ranges for all segments and segment parts, and can be implemented as a component from which IO operators request lists of segments from.

FIG. 32C illustrates execution of a query by a given node 37 based on identifying one or more segment part sets based on accessing segment part activation data 3230, as well as historical data ownership information 2760 as discussed previously.

In some embodiments, when an IO operator requests a segment for a given OSN, the segment service can go through the segment and compare the OSN against every part existing in the segment. If a part does not have a placed segment part, then it is assumed to be valid for every OSN in which the segment is served, and can just be included in the returned segment. If some part has a placed segment part and the OSN requested is not present in the placed segment part's OSN range, the part is not valid in the OSN requested and the segment service should simply omit the part in the returned segment. Thus, the IO operators do not need to be aware of the concept of addendum parts—they just receive a segment to emit to the query, containing only valid, consistent data for the specific OSN requested.

As illustrated in FIG. 32C, the given node 37.*y* can execute a given query having OSN of value k based on implementing segment set generating module 2735 to identify a set of segments owned by the node for OSN k (e.g. in the corresponding data ownership information 2711 having OSN k as discussed previously). For each given segments owned by the node 37.*y*, the node can implement an activated segment part identification module 3240 to identify a corresponding segment part set 3245 for the segment that the node should access for the given query, based on applying only the appropriate addendum parts and/or original parts based on the OSN ranges 3236 of the segment part activation data 3230 for the given segment. Furthermore, segment parts not identified in the segment part activation data 3230 can be identified, based on inherently having an unbounding OSN range 3236 (e.g. due to not having been modified since the first OSN or since the least recent OSN that is still relevant).

Figure 32D:
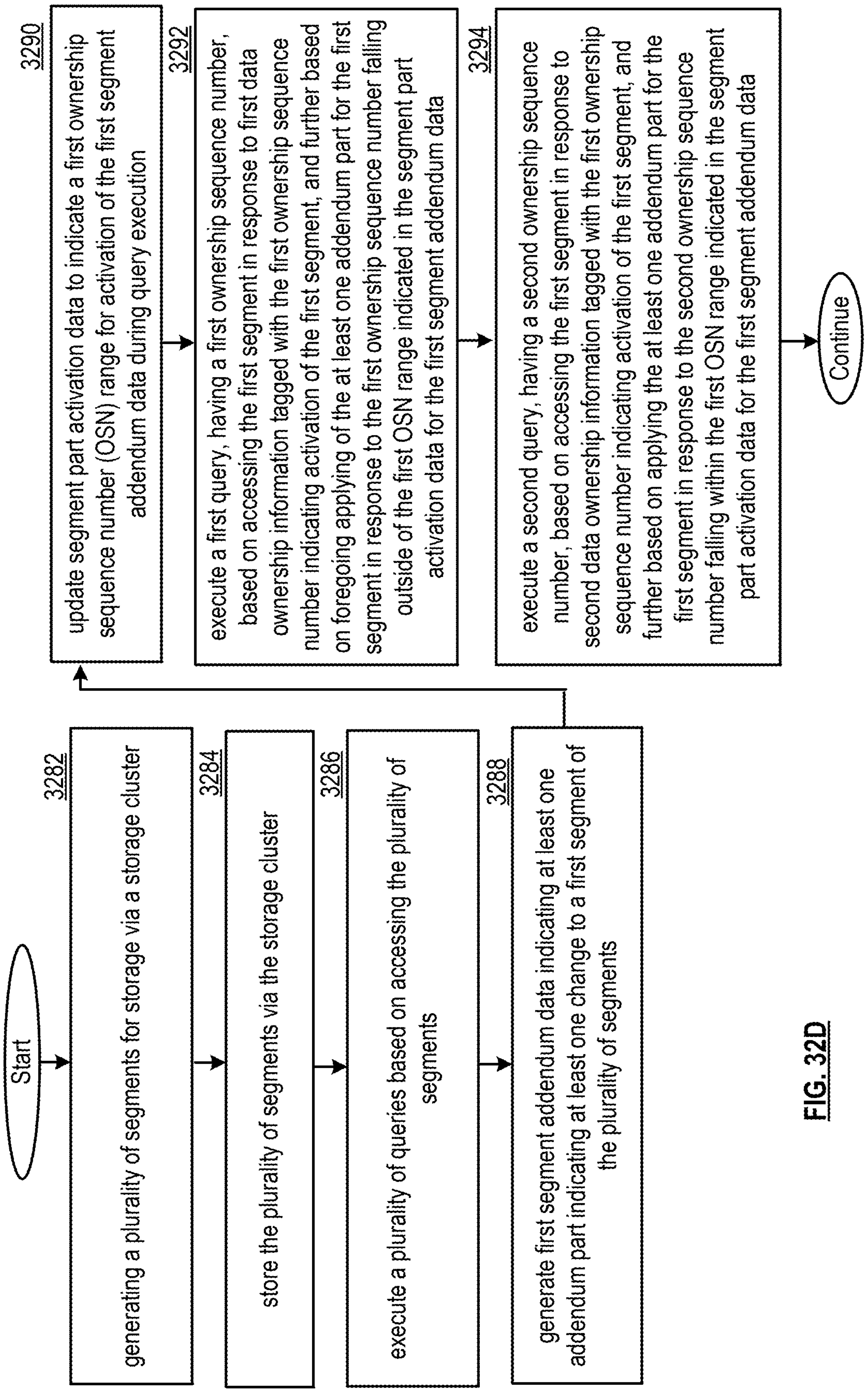
FIG. 32D is a logic diagram illustrating a method for execution in accordance with various embodiments.

FIG. 32D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32D. For example, a node 37 can participate in some or all steps of FIG. 32D based on participating in consensus protocols to mediate consensus data with other nodes 37. Some or all of the method of FIG. 32D can be performed by nodes executing a query in conjunction with a query execution, for example, via one or more nodes 37 implemented as nodes of a query execution module 2504 implementing a query execution plan 2405. Some or all of the steps of FIG. 32D can optionally be performed by any other processing module of the database system 10. Some or all of the steps of FIG. 32D can be performed to implement some or all of the functionality of the database system 10 as described in conjunction with FIGS. 32A-32C, for example, by implementing some or all of the functionality of segment update module 3220 to generate segment addendum data 3215, to update segment part activation data accordingly to indicate an OSN range for the segment addendum data 3215, and/or to execute queries based on accessing segment addendum data 3215 having OSN ranges in which the OSN of the query falls within. Some or all of the steps of FIG. 32D can optionally be performed by a leader node and/or one or more follower nodes of the leader node, in accordance with some or all features and/or functionality discussed in conjunction with FIGS. 27A-27J. Some or all steps of FIG. 32D can be performed, via one or more nodes, based on accessing segments as dictated by data ownership information and/or by participating in query execution as dictated by level assignment information, for example, in accordance with some or all features and/or functionality discussed in conjunction with FIGS. 30A-30M. Some or all steps of FIG. 32D can be performed by database system 10 in accordance with other embodiments of the database system 10 and/or nodes 37 discussed herein.

Step 3282 includes generating a plurality of segments for storage via a storage cluster. Step 3284 includes storing the plurality of segments via the storage cluster. Step 3286 includes executing a plurality of queries based on accessing the plurality of segments.

Step 3288 includes generating first segment addendum data indicating at least one addendum part indicating at least one change to a first segment of the plurality of segments. Step 3290 includes updating segment part activation data to indicate a first ownership sequence number (OSN) range for activation of the first segment addendum data during query execution. Step 3292 includes executing a first query, having a first ownership sequence number, based on accessing the first segment in response to first data ownership information tagged with the first ownership sequence number indicating activation of the first segment, and further based on foregoing applying of the at least one addendum part for the first segment in response to the first ownership sequence number falling outside of the first OSN range indicated in the segment part activation data for the first segment addendum data. Step 3294 includes executing a second query, having a second ownership sequence number, based on accessing the first segment in response to second data ownership information tagged with the first ownership sequence number indicating activation of the first segment, and further based on applying the at least one addendum part for the first segment in response to the second ownership sequence number falling within the first OSN range indicated in the segment part activation data for the first segment addendum data.

In various examples, steps 3282, 3284, and/or 3286 are performed during a first temporal period. In various examples, 3288, 3290, 3292, and/or 3294 are performed during a second temporal period strictly after the first temporal period.

In various examples, the method further includes generating the first data ownership information to indicate assignment of each of the plurality of segments for access by exactly one of a plurality of nodes of a storage cluster. In various examples, the method further includes generating the second data ownership information to indicate updated assignment of the each of the plurality of segments for access by the exactly one of the plurality of nodes of the storage cluster.

In various examples, the second data ownership information indicates assignment of at least one segment of the plurality of segments to a different node in the second data ownership information that is different from a prior node to which the at least one of the plurality of segments is assigned in the first data ownership information. In various examples, the second data ownership information indicates assignment of at least one segment of the plurality of segments for access via a different access type that is different from a prior access type to which the at least one of the plurality of segments is assigned for access in the first data ownership information. In various examples, the different access type and the prior access types are different ones of a set of access types that includes: a physical segment access type; or a virtual segment access type.

In various examples, the first data ownership information is generated at a first time in accordance with a consensus protocol mediated via the plurality of nodes of the storage cluster. In various examples, the second data ownership information is generated at a second time after the first time in accordance with a consensus protocol mediated via the plurality of nodes of the storage cluster.

In various examples, the first OSN of the first data ownership information has a first integer value. In various examples, the second OSN of the second data ownership information has a second integer value. In various examples, the second integer value is greater than the first integer value based on the second data ownership information being more recent than the first data ownership information.

In various examples, the first OSN range indicates a minimum OSN corresponding to oldest data ownership information for which the at least one addendum part is active. In various examples, the minimum OSN is strictly greater than the first OSN. In various examples, the minimum OSN is less than or equal to the second OSN.

In various examples, updating the segment part activation data is based on: determining a most recent OSN for most recent data ownership information; and/or setting the minimum OSN for the first segment addendum data as a most recent OSN for most recent data ownership information. In various examples, the second data ownership information is generated after updating the segment part activation data for the first segment addendum data.

In various examples, the method further includes, based on generating the first segment addendum data, updating state data. In various examples, the state data is updated to include: a segment addendum identifier identifying the first segment addendum data; and/or a set of segment part metadata for the at least one addendum part. In various examples, the state data indicates a plurality of segment addendum data each having a corresponding segment addendum identifier and a corresponding set of segment part metadata.

In various examples, the segment part activation data includes a first vector that includes a first set of entries. In various examples each entry of the first set of entries indicates a segment addendum identifier for a corresponding segment addendum data of the plurality of segment addendum data; and/or a corresponding OSN range.

In various examples, each of a plurality of segment part activation data corresponds to a corresponding one of the plurality of segments. In various examples, the each of the plurality of segment part activation data includes a corresponding vector indicating a set of segment addendum data for the corresponding one of the plurality of segments and a corresponding set of OSN ranges.

In various examples, the first segment includes a plurality of original parts. In various examples, the at least one addendum part indicates an update of at least one of the plurality of original parts. In various examples, the first set of entries of the first vector indicate updates to a first proper subset of the plurality of original parts that includes the at least one of the plurality of original parts. In various examples, the first set of entries of the first vector does not indicate any entries denoting updates for any of a second proper subset of the plurality of original parts based on the second proper subset of the plurality of original parts not having been updated via any addendum parts. In various examples, the proper subset of the plurality of original parts and the second proper subset of the plurality of original parts are mutually exclusive and collectively exhaustive with respect to the plurality of original parts.

In various examples, executing the first query is further based on applying of each of the second proper subset of original parts of the first segment in response to the first vector not indicating the any entries denoting updates for any of the second proper subset of the plurality of original parts. In various examples, executing the second query is further based on applying of each of the second proper subset of original parts of the first segment in response to the first vector not indicating the any entries denoting updates for any of the second proper subset of the plurality of original parts.

In various examples, updating the segment part activation data to indicate the first segment addendum data includes updating the first vector to include an entry that indicates: the segment addendum identifier for the segment addendum data; and/or the first OSN range.

In various examples, during the second temporal period, the first OSN range for activation of the first segment addendum data is lower-bounded via a minimum OSN and has an unbounded upper bound. In various examples, the method further includes, during a third temporal period strictly after the second temporal period: generating second segment addendum data indicating at least one additional addendum part indicating at least one additional change to the first segment of the plurality of segments; and/or further updating the segment part activation data. In various examples, further updating the segment part activation data is based on: indicating a second OSN range for activation of the second segment addendum data during query execution having a second minimum OSN and the unbounded upper bound; and/or updating the first OSN range to be upper-bounded by a first maximum OSN based on the second minimum OSN. In various examples, the first maximum OSN is one less than the second minimum OSN.

In various embodiments, any one of more of the various examples listed above are implemented in conjunction with performing some or all steps of FIG. 32D. In various embodiments, any set of the various examples listed above can be implemented in tandem, for example, in conjunction with performing some or all steps of FIG. 32D.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 32D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 32D, for example, in conjunction with further implementing any one or more of the various examples described above.

In various embodiments, the operational instructions, when executed by the at least one processor, cause the database system to, during a first temporal period: generate a plurality of segments for storage via a storage cluster; store the plurality of segments via the storage cluster; and/or execute a plurality of queries based on accessing the plurality of segments. In various embodiments, the operational instructions, when executed by the at least one processor, further cause the database system to, during a second temporal period strictly after the first temporal period: generate first segment addendum data indicating at least one addendum part indicating at least one change to a first segment of the plurality of segments; update segment part activation data to indicate a first ownership sequence number (OSN) range for activation of the first segment addendum data during query execution; execute a first query, having a first ownership sequence number, based on accessing the first segment in response to first data ownership information tagged with the first ownership sequence number indicating activation of the first segment, and further based on foregoing applying of the at least one addendum part for the first segment in response to the first ownership sequence number falling outside of the first OSN range indicated in the segment part activation data for the first segment addendum data; and/or execute a second query, having a second ownership sequence number, based on accessing the first segment in response to second data ownership information tagged with the first ownership sequence number indicating activation of the first segment, and further based on applying the at least one addendum part for the first segment in response to the second ownership sequence number falling within the first OSN range indicated in the segment part activation data for the first segment addendum data.

Figure 33A:
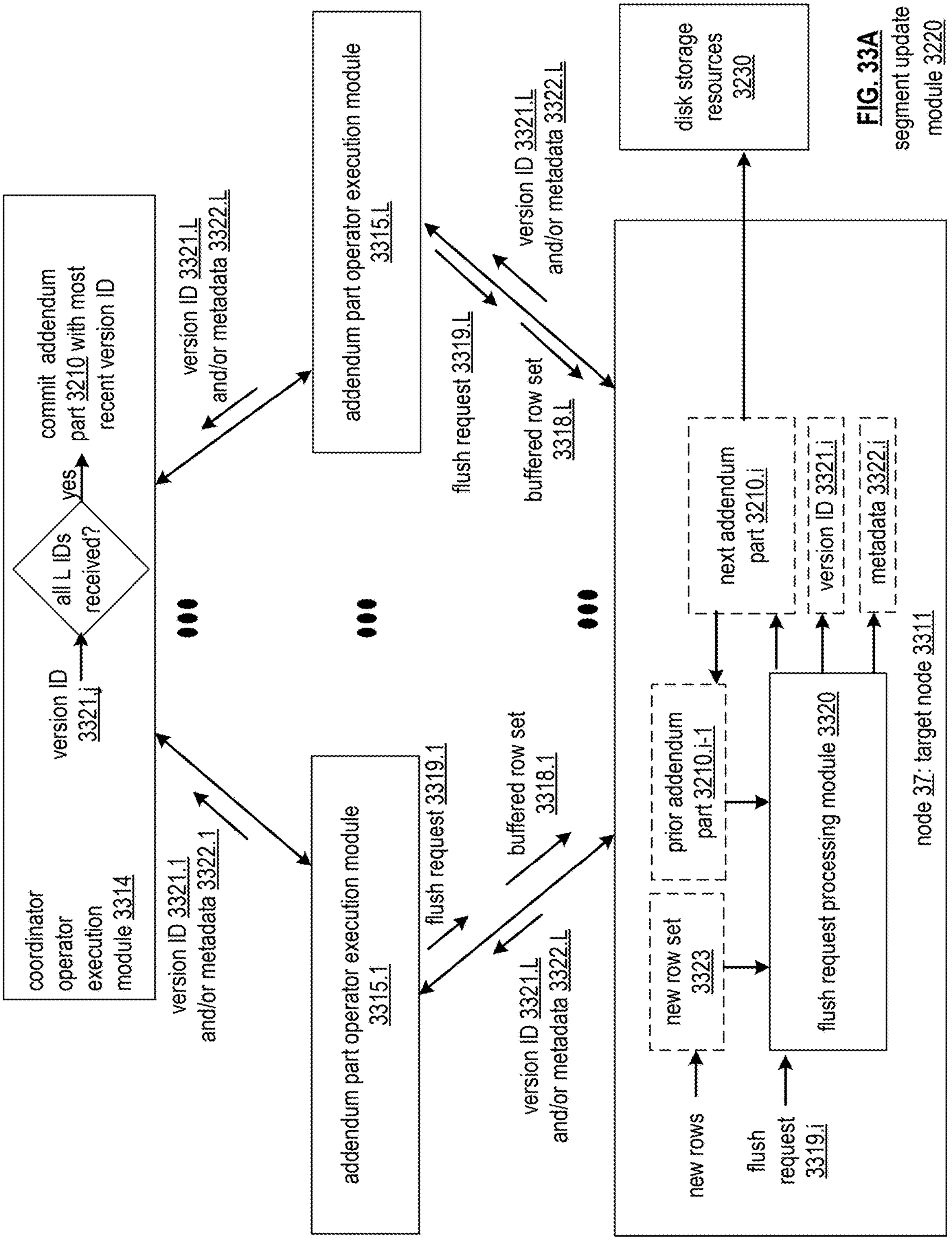
FIG. 33A is a schematic block diagram of a segment update module implemented via a coordinator operator execution module, a plurality of addendum part operator execution modules, and/or a target node.
Figure 33B:
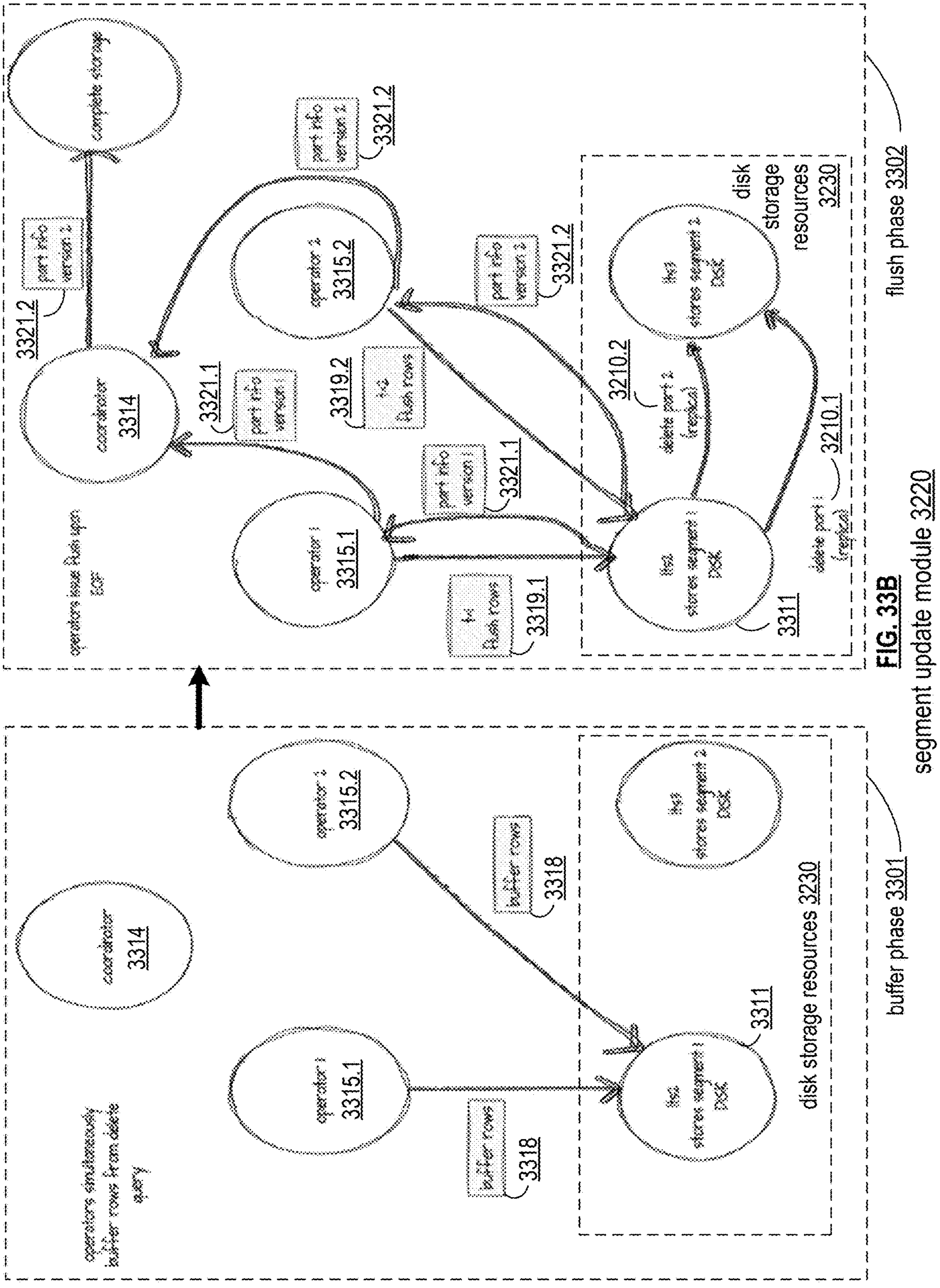
FIG. 33B is a schematic block diagram of a segment update module implemented via a buffer phase and a flush phase.

FIGS. 33A-33B illustrate embodiments of a database system 10 that implements a segment update module 3220 to generate addendum parts 3210 for a segment 2424 via a distributed query transaction implemented via a coordinator operator execution module 3314 communicating with via a plurality of addendum part query operator execution modules 3315 that each communicate with a target node 37, where the target node generates addendum parts 3210 from the buffered row sets 3318. Some or all features and/or functionality of database system 10 of FIG. 33A-33B can implement any embodiment of database system 10 described herein.

Some or all features and/or functionality of the segment update module 3220 of FIGS. 33A-33B can implement some or all features and/or functionality of the segment update module 3220 of FIGS. 32A-32C. Some or all features and/or functionality of coordinator operator execution module 3314 and/or of each addendum part query operator execution modules 3215 can be implemented via query execution modules 3215 executing respective operators as discussed in conjunction with FIG. 24J (e.g. in conjunction with execution of a corresponding query via a corresponding operator execution flow 2517 indicating a corresponding arrangement of operators implemented via coordinator operator execution module 3314 and/or of each addendum part query operator execution modules 3215). Some or all features and/or functionality of disk storage resources 3230 of FIG. 33A-33B can be implemented via disk storage resources 3230 of FIG. 33B. Some or all features and/or functionality of disk storage resources 3230 of FIG. 33A-33B can be implemented via one or more nodes 37 (e.g. one or more memory drives 2425 of one or more nodes 37 of a storage cluster 2535) and/or can be implemented via segment storage system 2508. Some or all features and/or functionality of coordinator operator execution module 3314, of each addendum part query operator execution modules 3215, and/or of disk storage resources 3230 can be implemented via one or more nodes 37 (e.g. one or more same or different nodes implement the coordinator operator execution module 3314, each addendum part query operator execution modules 3215, disk storage resources 3230, and/or target node 3311.

In some embodiments, storage nodes (e.g. foundation nodes 3111) can be implemented to store rows for queries in segments 2424. Addendum part operators (e.g. deleteOperatorInstance_t operators) can be implemented via addendum part operator execution modules 3315 to receive rows from one or more storage nodes 3111 and send them back to the storage cluster 2535 for creation of the addendum parts (e.g. based on each implementing a buffer of disjoint node IDs and/or global row IDs to be deleted). There can be a single addendum part coordinator operator (e.g. a deleteCoordinatorOperatorInstance_t, based on being implemented as delete operators in conjunction with generating delete parts), for example, implemented via a coordinator operator execution module 3314 that manages the entire operation (e.g. a corresponding delete operation) and commits all addendum parts to each storage cluster created as a part of the query. The coordinator operator execution module 3314 send corresponding query instructions and/or a corresponding query ID to the addendum part operator execution modules 3315 and/or eventually to the storage clusters (e.g. the "operation ID"). The coordinator operator execution modules 3314 can optionally be implemented via a corresponding coordinator node 3114.

In some embodiments, when distributing query work across a distributed system of query execution nodes 37, a single storage node may serve rows from a single segment to multiple different addendum part query operators. The final addendum part created for the segment for the query transaction can be required to contain every row that was served in the query exactly once, in addition to any subsumed addendum parts that may have already existed for that segment. However, the storage cluster 235 that includes this query execution nodes 37 can be unaware of the query infrastructure, for example, in that it has no idea how many addendum part query operators there are, Furthermore, all operators can be implemented to send rows at the same time, and the storage cluster 2535 can be further unaware when the addendum part query operators are done sending new rows to add to the addendum part.

In some embodiments, such concerns can be addressed via implementing some or all features and/or functionality of FIGS. 33A-33B to enable a storage cluster 2535 to reliably and/or correctly create addendum parts 3210 containing all rows present in an addendum part query, for example, regardless of the number of addendum part operators, regardless of the order in which the rows are presented to the storage cluster by the many operators, and/or regardless of the order in which the operators EOF (e.g. reach end of file for processing of respective rows).

A storage node (e.g. a single foundation node 3111 of the respective cluster 2535) can be selected to serve as the target node 3311 for the operation. For example, For any segment, all delete operators of a delete operation can communicate directly with the target storage node. This target node 3311 can be chosen on a per segment basis, where different addendum parts generated for different segments are achieved via execution of a corresponding query transaction via a different selected target node 3311. The target node 3311 determined by the storage node that originally sent the row to the operator, and/or can be selected as the storage node that originally sent the row to the operator. In some embodiments, the target node 3311 can be a node storing the respective segment 2424 having an addendum part generated and/or can be selected as the node assigned to the segment 2424 in current segment ownership information (e.g. physically or virtually). While all operators may talk to all storage nodes, the deletion messages for a given segment will always target the same, single, foundation node chosen by the following process. It can be required that every addendum part operator choose exactly the same target for each segment. In some embodiments, if any point an operator is unable to communicate with the selected target node, the query fails, for example, due to not being able to guarantee that every operator is connected to the target node.

FIG. 33A illustrates an example of executing a query transaction (e.g. to implement segment update module 3220 to generate an addendum part 3210 for a segment 2424 via multiple parallelized operators implemented via addendum part operator execution modules 3315.1-3315.L. In some embodiments, all operators implemented via a corresponding addendum part operator execution modules 3315 of a set of addendum part operator execution modules 3315.1-3315.L can go through two phases—a buffer phase 3301 and a flush phase 3302. FIG. 33B illustrates an example of performing a corresponding query transaction of FIG. 33A via the a buffer phase 3301 and a flush phase 3302.

During the buffer phase, an operator can buffer all rows sent to it back to the target storage node, for example, as a corresponding buffered row set 3318, The target storage node 3311 can track a set of buffered rows for the segment that it receives concurrently from multiple operators for a single query. For example, the target storage node 3311 received portions of buffered row sets 3318.1-3318.L over time, not being in any particular order, and adds them to a new row set 3323 as they are received.

In some embodiments, upon receiving rows during a delete query, for each segment, an operator execution module 3315 (E.g. implementing a deleteOperatorInstance_t) can forward these rows to the target storage node. The deleteOperatorInstance_t can emit a request (e.g. a tryBufferDeletedRowsForSegmentsReques message) to a target node to ask it to buffer deleted rows. This message can contain the segments/row ids, etc. and/or the operation id (query uuid). The target node 3311 can process the request (e.g. via a network RPC action that processes the request, such as a onTryBufferDeletedRowsForSegmentsAction). This can include asynchronously capturing the buffered rows into a new data structure stored on the protocol state representing the delete operation (e.g. implemented via the new row set 3323). The data structure can be implemented via a map of queryId→segmentGroup→idaOffset→deleteOperation to enable unique identification of the set of buffered rows for a given segment for a given query (e.g. in the case multiple query transactions are executed via a given target node 3311 and/or in the case multiple segments have corresponding addendum parts generated via a given target node 3311). In some embodiments, this structure can asynchronously buffer the rows in memory on the protocol state (e.g. in state data 3105). In other embodiments, this structure can store the rows in other ways, such as flushing to disk, etc.

Once an operator has received EOF for all rows for the query, it can enter the flush phase 3302 and can send a flush request 3319 to the target. Upon receiving a given flush request 3319.*i*, the target storage node 3311 can take all buffered rows at the time of the flush (e.g. currently in the new row set 3323) combine them with any subsumed existing addendum part (e.g. addendum part 3210.*i*−1 if this is not the first flush request that was received, and/or if this was the first flush request received, optionally does not combine with any existing addendum part or combines with an existing addendum part created prior to the respective query transaction), and/or write the combination to a new addendum part 3210.*i* to disk storage resources 3230. This can include storing the new addendum part 3210.*i* in disk storage of the respective node 37 and/or can include replicate the part 3210.*i* out to some or all other nodes 37 rest of the storage cluster, for example, according to availability requirements. The target node 3311 can assign the given addendum part 3210.*i* a version number 3321.*i*, and can send back the version number version number 3321.*i* and/or other metadata 3322.*i* about the addendum part 3210.*i* to the requesting operator that sent the respective flush request 3319.*i*. This operator can then forward this version number 3321.*i* and/or metadata 3322.*i* to the coordinator operator. The new row set 3323 can optionally reset, for example, where the new row set 3323 optionally only tracks rows received since the most recent addendum part was generated 3210, indicating only rows not yet included in an addendum part 3210. As subsequent flush requests 3319 (e.g. 3319.*i*+1) are received from other operators in the set, the target node can perform this same process from the new row set 3323 and the prior addendum part 3319.*i* until all L flush requests are processed. The version ID 3321.*i*+1 can be incremented from a prior version ID 3321.*i* (e.g. a respective numeric value increases) to denote the addendum part 3210.*i*+1 having version ID 3321.*i*+1 is more recent than version ID 3321.*i* having version ID 3321.*i*.

In some embodiments, upon EOF for a given query transaction (e.g. delete query), an operator execution module 3315 (e.g. deleteOperatorInstance_t) can tell the target storage node to flush the buffered rows to a delete part on disk.

After writing out the delete part, the target storage node can send the delete part to one or more other nodes, for example, that required to store the delete part replicas. In some embodiments, a request message (e.g. tryFlushDeletedRowsForSegmentsRequest) is emitted to by the operator execution module 3315 to one or more the target nodes, containing the operation/query uuid. In some embodiments, a network RPC action (.g. onTryFlushDeletedRowsForSegmentsAction) processes the flush request via execution of a flush operation. Execution of a flush operation by the target node can include implementing some or all of the following logic:

1. find the buffered, deleted rows for all segments in the operation from the protocol state.
2. create an addendum part ("delete part")
   a. If the segment has no delete part, this is the first one (e.g. at version '1')
   b. If the segment has a delete part at version X, then it must be accessed/retrieved
   i. If this operation has not created a previous delete part, then get the existing delete part from the state data 3105 (e.g. Raft state), if it exists. This can include retrieving it over the network if serving virtual segments
   ii. If this operation has already issued a flush, then use that delete part
   iii. Either way, build a new delete part that is the union of that delete part plus the buffered rows at version X+1
3. replicate the part to all requisite peers (e.g. via onAllocateLocalStorage and/or onPutSegmentData) a. Requisite peers can be implemented a set of nodes (e.g. of size parity_width+1) chosen to store the delete replica parts. The requisite peers can be selected to determine information dispersal algorithm (IDA) offsets that should be associated with the delete replica parts. This can include finding the nodes storing versions of the associated IDA offsets (e.g. intact disk) to send the replica parts. This can be based on identifying peer nodes storing peer segments of the given segment (e.g. other segments generated in the same segment group and having corresponding parity data/replicated segment parts enabling recreating of segments within the segment group utilizing other segments in the segment group.
   b. For a given delete operation for a segment, at least one node can be required to store the delete part for the operation to succeed. Because one delete part is created in 2. b.iii, the flush operation does not necessarily care whether or not the replication requests succeed or not.
4. send the version number X+1, the part name, and/or all the part information needed for the deleteCoordinatorOperatorInstance_t to issue onCompleteStorage to the deleteOperatorInstance_t (e.g. The set of nodes/ida offsets that should store this new part, part hash, part size, etc.)

Note that while this example depicts the target node 3311 processing flush requests in order by respective addendum part operator execution modules, the set of addendum part operator execution modules 3315.1-3315.L can EOF and send corresponding flush requests in any order, which can be the same or different from an order by which the set of addendum part operator execution modules 3315.1-3315.L initiate sending of their respective row sets 3318.1-3318.L.

In some embodiments, it is possible for another operator to come in and buffer rows after an earlier operator issues its flush request, either while the flush is executing or fully after the flush is executed. Those rows should not be included in the flushed addendum part. Instead, when the subsequent flush request comes from the later operator, the target storage node can combine the intermediate addendum part it wrote from the first flush request with the newly buffered rows to create an updated addendum part, with a higher version number.

In some embodiments, If two flush requests are received with no newly buffered rows in between (e.g. a second flush would end up with exactly the same addendum part), the target can then just return the same version number and metadata back to both operators.

In some embodiments, When all operators have executed their buffer and flush phases and have sent all version numbers about every part created back to the coordinator, the coordinator must search through all version numbers created for a segment and pick the latest version. This version can be guaranteed to contain the correct set of rows for the query from all operators. The coordinator operator execution module can send the metadata for this latest part to the storage cluster to commit the operation and addendum part for the segment.

Consider the following example: the target node 3311 receives the first row from operator execution module 3315.3 at a first time; starts receiving rows from operator execution module 3315.2 at a second time after the first time; receives a flush request 3319 from the operator execution module 3315.2 at a third time after the second time, prior to receiving any other flush requests 3319, and generates a first addendum part 3210 with a lowest-valued (e.g. oldest) version ID 3321 from all rows received so far (e.g. from some subset of the L operators, which optionally includes less than L operators if one or more operators have not yet sent rows); receives a flush request 3319 from the operator execution module 3315.3 at a fourth time after the third time and generates a second addendum part 3210 with a second-lowest-valued (e.g. second oldest) version ID 3321 based on applying the first addendum part 3210 and any rows received since the first addendum part (from some or all operators except operator execution module 3315.2, which has already finished sending rows), and so on. Note that depending on network lag, other conditions, the coordinator operator execution module 3314 optionally does not receive the version IDs/metadata in the order they are created (e.g. possibly receives second-lowest-valued version ID 3321 from operator execution module 3315.3 before receiving lowest-valued version ID 3321 from operator execution module 3315.2, but can still distinguish which respective addendum part is newest once all L version IDs 3321 are received, regardless of the ordering in which they are received).

In some embodiment, the data structure holding the buffered rows and/or responsible for flushing the delete part to disk can handle interleaved sequences of buffer/flush. For example:

1. Operator instance A invokes tryBufferDeletedRowsForSegmentsRequest and this action completes.
2. Operator instance A invokes tryFlushDeletedRowsForSegmentsRequest and this action is ongoing
   a. Async work is undertaken to read/build/replicate, etc to create X+1 from X
3. Operator instance B invokes tryBufferDeletedRowsForSegmentsRequest while (2) is still ongoing. (2) is now processing stale information.
4. Operator instance B invokes tryFlushDeletedRowsForSegmentsRequest while (2) is still ongoing. It is not correct to use X as the starting point for this flush. the final result will need to be version X+2 that is a union of the buffered rows from (3) and X+1

In some embodiments, reference counting is implemented to avoid repetitively flushing data to disk and/or rewriting part files. For example, Each time a new operator sends a node buffered rows, increment the reference counter. Upon a flush request, the reference counter can be decremented. In some embodiments, if the reference counter is 0, then the rows can be flushed to disk, and the operator can be notified immediately. If the reference counter is not 0, processing can include waiting to flush until the reference counter is 0 and/or notifying the operator when the rows have been successfully flushed.

The coordinator operator execution module 3314 (e.g. deleteCoordinatorOperatorInstance_t) can commit the addendum part 3210 with the most recent version ID 3321.*i* once all L version IDs have been received (e.g. after all delete parts have been created and successfully flushed to disk). This can include updating state data 3105 to indicate the addendum part 3210 and/or activating the addendum part 3210 for use in query execution, for example, via some or all features and/or functionality of FIGS. 32A-32C.

Committing the addendum part can include executing a complete storage function (e.g. onCompleteStorage) against the storage cluster 2535 via an appendSegmentRequest, where the coordinator operator execution module 3314 uses the version numbers 3321 to determine the most recent part for every segment.

In some embodiments, the complete storage function is executed once per delete operation from a delete coordinator after all segments have stored their delete parts (e.g. similarly to committing storage scope in applying a CTAS function via database system 10). Once the delete should be committed, a deleteCoordinatorOperatorInstance_t can call onCompleteStorage using the append request. Each append request can contain all the information needed for the addendum parts and the copies, as well as the node locations.

Executing the complete storage function can include creating externalToc_t objects in a rebuildableSegment_t for the actual IDA offset the part is for, as well as copy externalToc_t objects in each of the rebuildableSegment_t's for the associated IDA offsets. This can include adding an entry for the new tocName (e.g. identifier of the addendum part) into the externalTocMap on the storedSegment_t for every stored segment for each IDA offset modified. In some embodiments, any stored segment that is not the one modified by the delete operation can be marked as DAMAGED. A rebuilding segment can be created or each segment marked as DAMAGED, for example, so that the nodes automatically pick up the new addendum parts. For virtual segments, the virtual segment can be marked as deletable and/or a new one can be created.

Executing the complete storage function can include add the addendum part to the placedSegmentParts to be placed in a new OSN via the ownershipUpdater_t in via a placeAddendumSegmentPart function, for example, via updating segment part activation data 3230 as discussed in conjunction with FIG. 32B. This can include adding a placedSegmentPart to the back of the vector with an OSN range of either [newOSN, OSN_INFINITY) if a placed addendum part of the same type (e.g., DELETE) for this segment does not already exist, or [newOsn, oldPlacedOsnEnd) if a placed addendum part for this segment already exists. If there is an existing part already (found via findActivePart( )), onCompleteStorage will also need to update the end OSN for old part to be newOsn. It can also be possible when adding a new addendum part that there will be an existing addendum part in the state that has had its placedSegmentPart trimmed. When adding a new addendum part, the existing addendum part is optionally no longer present for the entire OSN range of the segment and therefore will need a new placedSegmentPart entry alongside the new addendum part. This can include changing any place where we set a finite end OSN for a placed segment group to also go through any placed addendum parts and set the end OSN to the same finite end OSN (e.g. onDeleteTableSegments and possibly other places). This can include updating all addendum parts, regardless of part type.

Figure 33C:
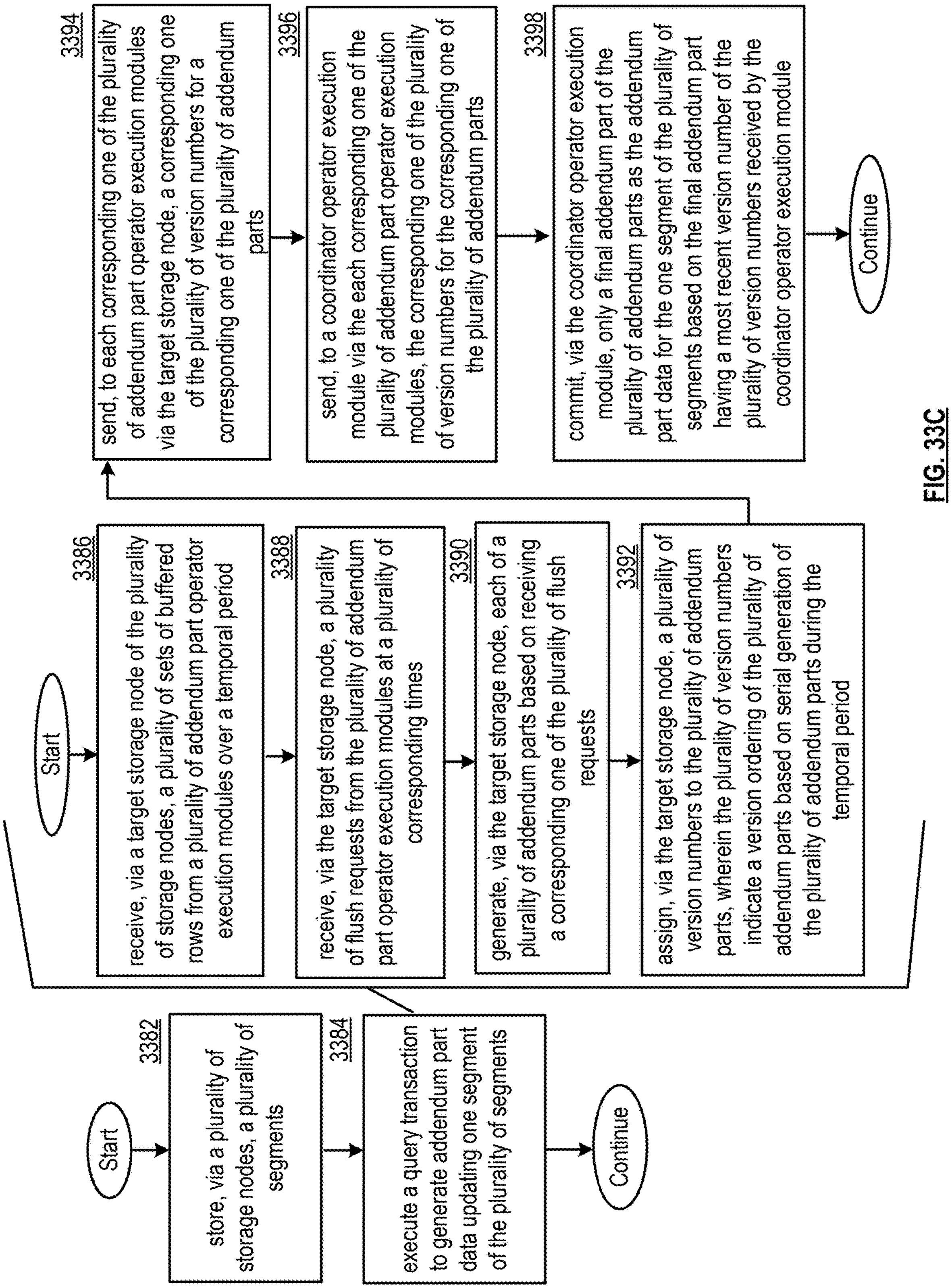
FIG. 33C is a logic diagram illustrating a method for execution in accordance with various embodiments.

FIG. 33C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 33C. For example, a node 37 can participate in some or all steps of FIG. 33C based on participating in consensus protocols to mediate consensus data with other nodes 37. Some or all of the method of FIG. 33C can be performed by nodes executing a query in conjunction with a query execution, for example, via one or more nodes 37 implemented as nodes of a query execution module 2504 implementing a query execution plan 2405. Some or all of the steps of FIG. 33C can optionally be performed by any other processing module of the database system 10. Some or all of the steps of FIG. 33C can be performed to implement some or all of the functionality of the database system 10 as described in conjunction with FIGS. 33A-33B, for example, by implementing some or all of the functionality of segment update module 3220 to generate addendum parts 3210 via a target node 3311 and/or a plurality of addendum part operator execution modules 3315. Some or all of the steps of FIG. 33C can optionally be performed by a leader node and/or one or more follower nodes of the leader node, in accordance with some or all features and/or functionality discussed in conjunction with FIGS. 27A-27J. Some or all steps of FIG. 33C can be performed, via one or more nodes, based on accessing segments as dictated by data ownership information and/or by participating in query execution as dictated by level assignment information, for example, in accordance with some or all features and/or functionality discussed in conjunction with FIGS. 30A-30M. Some or all steps of FIG. 33C can be performed by database system 10 in accordance with other embodiments of the database system 10 and/or nodes 37 discussed herein.

Step 3382 includes storing, via a plurality of storage nodes, a plurality of segments. Step 3384 includes executing a query transaction to generate addendum part data updating one segment of the plurality of segments.

Performing step 3384 can include some or all of steps 3386-3398. Step 3386 includes receiving, via a target storage node of the plurality of storage nodes, a plurality of sets of buffered rows from a plurality of addendum part operator execution modules over a temporal period. Step 3388 includes receiving, via the target storage node, a plurality of flush requests from the plurality of addendum part operator execution modules at a plurality of corresponding times.

Step 3390 includes generating, via the target storage node, each of a plurality of addendum parts based on receiving a corresponding one of the plurality of flush requests. In various examples, the plurality of addendum parts are generated serially within the temporal period based on generating each of the plurality of addendum parts in response to receiving a corresponding one of the plurality of flush requests at a corresponding one of the plurality of corresponding times. In various examples, a first addendum part of the plurality of addendum parts is generated from ones of the plurality of sets of buffered rows received prior to a first one of the plurality of corresponding times when a first one of the plurality of flush requests is received. In various examples, each of a plurality of additional addendum parts generated after the first addendum part is generated based on applying buffered rows received after generating a prior one of the plurality of addendum parts to the prior one of the plurality of addendum parts.

Step 3392 includes assigning, via the target storage node, a plurality of version numbers to the plurality of addendum parts. In various example the plurality of version numbers indicate a version ordering of the plurality of addendum parts based on serial generation of the plurality of addendum parts during the temporal period. Step 3394 includes sending, to each corresponding one of the plurality of addendum part operator execution modules via the target storage node, a corresponding one of the plurality of version numbers for a corresponding one of the plurality of addendum parts. Step 3396 includes sending, to a coordinator operator execution module via the each corresponding one of the plurality of addendum part operator execution modules, the corresponding one of the plurality of version numbers for the corresponding one of the plurality of addendum parts. Step 3398 includes committing, via the coordinator operator execution module, only a final addendum part of the plurality of addendum parts as the addendum part data for the one segment of the plurality of segments based on the final addendum part having a most recent version number of the plurality of version numbers received by the coordinator operator execution module.

In various examples, the target storage node further sends, to each corresponding one of the plurality of addendum part operator execution modules, corresponding metadata for the corresponding one of the plurality of addendum parts in conjunction with sending the corresponding one of the plurality of version numbers for the corresponding one of the plurality of addendum parts. In various examples, each corresponding one of the plurality of addendum part operator execution modules further sends, to the coordinator operator execution module each corresponding one of the plurality of addendum part operator execution modules, the corresponding metadata for the corresponding one of the plurality of addendum parts in conjunction with sending the corresponding one of the plurality of version numbers for the corresponding one of the plurality of addendum parts.

In various examples, each of the plurality of addendum part operator execution modules generates a corresponding set of buffered rows of the plurality of sets of buffered rows over a corresponding time window within the temporal period based on the each of the plurality of addendum part operator execution modules generating the corresponding set of buffered rows from a corresponding set of rows received by the each of a plurality of addendum part operator execution modules. In various examples, the each of the plurality of addendum part operator execution modules sends a corresponding flush request of the plurality of flush requests at an end of the corresponding time window based on receiving an end of file notification indicating an end of the corresponding set of buffered rows.

In various examples, the final addendum part of the plurality of addendum parts is generated based on applying a final subset of buffered rows received in the plurality of sets of buffered rows received after generating a penultimate one of the plurality of addendum parts to the penultimate one of the plurality of addendum parts.

In various examples, first buffered rows of the plurality of sets of buffered rows are received from the plurality of addendum part operator execution modules during a first time frame within the temporal period. In various examples, a first flush request is received from a first addendum part operator execution module of the plurality of addendum part operator execution modules at a first time of the plurality of corresponding times that is prior to all other ones of the plurality of corresponding times. In various examples, the first one of the plurality of addendum parts is generated, prior to generating all other ones of the plurality of addendum parts, from only the first buffered rows based on the first buffered rows being received prior to the first time of the plurality of corresponding times.

In various examples, a first version number assigned to the first one of the plurality of addendum parts is sent to the first addendum part operator execution module, via the target storage node, prior to generation of the all other ones of the plurality of addendum parts. In various examples, the first addendum part operator execution module sends the first version number to the coordinator operator execution module based on receiving the first version number from the first addendum part operator execution module.

In various examples, second buffered rows of the plurality of sets of buffered rows are received, during a second time frame within the temporal period that is strictly after the first time frame, from only a proper subset of the plurality of addendum part operator execution modules that does not include the first addendum part operator execution module based on the proper subset of the plurality of addendum part operator execution modules not receiving end of file notifications prior to the first time.

In various examples, the first buffered rows and the second buffered rows are mutually exclusive and collectively exhaustive with respect to the plurality of sets of buffered rows, and wherein the final addendum part is based on the first buffered rows and the second buffered rows.

In various examples, first buffered rows of the plurality of sets of buffered rows are received from only another proper subset of the plurality of addendum part operator execution modules, wherein the another proper subset of the plurality of addendum part operator execution modules includes the first addendum part operator execution modules, and wherein the another proper subset of the plurality of addendum part operator execution modules does not include at least one of the proper subset of the plurality of addendum part operator execution modules based on the at least one of the proper subset of the plurality of addendum part operator execution modules not sending any buffered rows of corresponding sets of the plurality of sets of buffered rows prior to the first time of the plurality of corresponding times.

In various examples, the most recent version number of the plurality of version numbers is strictly greater than all other version numbers of the plurality of version numbers.

In various examples, all of the plurality of addendum parts have different version numbers of the plurality of version numbers based on each version number assigned to each subsequently generated addendum part of the plurality of addendum parts being incremented from a prior of the plurality of version numbers.

In various examples, a number of addendum part operator execution modules that send corresponding buffered rows of the plurality of sets of buffered rows to the target storage node is equal to a number of addendum parts in the plurality of addendum parts based on new buffered rows of the plurality of sets of buffered rows being received between all of the plurality of corresponding times.

In various examples, a number of addendum part operator execution modules that send corresponding buffered rows of the plurality of sets of buffered rows to the target storage node is strictly greater than a number of addendum parts in the plurality of addendum parts based on no new buffered rows of the plurality of sets of buffered rows being received between at least two consecutive ones of the plurality of corresponding times.

In various examples, the number of addendum part operator execution modules that send the corresponding buffered rows of the plurality of sets of buffered rows to the target storage node is strictly greater than the number of addendum parts in the plurality of addendum parts based on the no new buffered rows of the plurality of sets of buffered rows being received between the at least two consecutive ones of the plurality of corresponding times. In various examples, the target storage node sends a same corresponding version number to two different ones of the plurality of addendum part operator execution modules in response to two different ones of the plurality of flush requests received from two different ones of the plurality of addendum part operator execution modules at two consecutive ones of the at least two consecutive ones of the plurality of corresponding times.

In various examples, the method further includes selecting, via each of the plurality of addendum part operator execution modules, a same storage node of the plurality of storage nodes as the target storage node. In various examples, the each of the plurality of addendum part operator execution modules send a corresponding set of buffered rows of the plurality of sets of buffered rows to the same storage nodes based on selecting the same storage node as the target storage node.

In various examples, the final addendum part is committed via the coordinator operator execution module based on the coordinator operator execution module having received version numbers from all of the plurality of addendum part operator execution modules upon the coordinator operator execution module receiving a final version number corresponding to the final addendum part. In various examples, the final addendum part being guaranteed to include all rows of the plurality of sets of buffered rows sent by the plurality of addendum part operator execution modules based on the coordinator operator execution module having received version numbers from all of the plurality of addendum part operator execution modules.

In various examples, executing the query transaction further includes sending each of the plurality of addendum parts to at least one other one of the plurality of storage nodes in response to generating the each of the plurality of addendum parts.

In various examples, the plurality of addendum part operator execution modules are executed via a set of nodes of the plurality of nodes, and wherein the set of nodes includes the at least one other one of the plurality of storage nodes.

In various examples, the method further includes, after committing the final addendum part via the coordinator operator execution module, executing, via the plurality of storage nodes, a first query against a dataset stored via plurality of segments. In various examples, one storage node of the plurality of storage nodes executes the first query based on based on applying the final addendum part for the one segment based on the coordinator operator execution module committing the one segment, and further based on the one segment being assigned to the one storage node for access in query execution. In various examples, the one node is the target node. In various examples, the one node is another node that is different from the target node.

In various examples, state data is mediated via the plurality of storage nodes in accordance with a consensus protocol. In various examples, committing the final addendum part is based on the coordinator operator execution module updating the state data to indicate the addendum part data for the one segment. In various examples, the final addendum part is applied in executing the first query based on the state data indicating the addendum part data for the one segment.

In various examples, executing the first query has a first ownership sequence number (OSN). In various examples, the first query is executed based on accessing the one segment in response to first data ownership information tagged with the first ownership sequence number indicating activation of the one segment. In various examples, the first query is executed further based on applying of the final addendum part for the one segment in response to the first ownership sequence number within an OS range indicated in segment part activation data for the part addendum data in the state data.

In various examples, the plurality of storage nodes are included in one of a plurality of storage clusters. In various examples, each storage cluster stores a corresponding set of segments of a plurality of sets of segments. In various examples, each segment of the plurality of sets of segments stores a corresponding plurality of rows of the dataset.

In various examples, executing the first query against a dataset via the plurality of storage nodes includes generating first partial resultant data for the first query, without coordination with other ones of the plurality of storage clusters, based on accessing plurality of segments via coordination within the plurality of storage nodes. In various examples, other ones of the plurality of storage clusters generate corresponding other partial resultant data, and wherein a plurality of partial resultant data generated that includes the first partial resultant data and the corresponding other partial resultant data is processed via an additional node to generate a resultant for the first query.

In various embodiments, any one of more of the various examples listed above are implemented in conjunction with performing some or all steps of FIG. 33C. In various embodiments, any set of the various examples listed above can be implemented in tandem, for example, in conjunction with performing some or all steps of FIG. 33C.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 33C described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 33C, for example, in conjunction with further implementing any one or more of the various examples described above.

In various embodiments, the operational instructions, when executed by the at least one processor, cause the database system to: store, via a plurality of storage nodes, a plurality of segments; and/or execute a query transaction to generate addendum part data updating one segment of the plurality of segments. In various embodiments executing the query transaction is based on: receiving, via a target storage node of the plurality of storage nodes, a plurality of sets of buffered rows from a plurality of addendum part operator execution modules over a temporal period; receiving, via the target storage node, a plurality of flush requests from the plurality of addendum part operator execution modules at a plurality of corresponding times; generating, via the target storage node, a plurality of addendum parts, where the plurality of addendum parts are generated serially within the temporal period based on generating each of the plurality of addendum parts in response to receiving a corresponding one of the plurality of flush requests at a corresponding one of the plurality of corresponding times, where a first addendum part of the plurality of addendum parts is generated from ones of the plurality of sets of buffered rows received prior to a first one of the plurality of corresponding times when a first one of the plurality of flush requests is received, and/or where each of a plurality of additional addendum parts generated after the first addendum part is generated based on applying buffered rows received after generating a prior one of the plurality of addendum parts to the prior one of the plurality of addendum parts; assigning, via the target storage node, a plurality of version numbers to the plurality of addendum parts, where the plurality of version numbers indicate a version ordering of the plurality of addendum parts based on serial generation of the plurality of addendum parts during the temporal period; sending, to each corresponding one of the plurality of addendum part operator execution modules via the target storage node, a corresponding one of the plurality of version numbers for a corresponding one of the plurality of addendum parts; sending, to a coordinator operator execution module via the each corresponding one of the plurality of addendum part operator execution modules, the corresponding one of the plurality of version numbers for the corresponding one of the plurality of addendum parts; and/or committing, via the coordinator operator execution module, only a final addendum part of the plurality of addendum parts as the addendum part data for the one segment of the plurality of segments based on the final addendum part having a most recent version number of the plurality of version numbers received by the coordinator operator execution module.

FIGS. 34A-34G illustrate embodiments of a database system 10 that implement an addendum part writer 3412 to write addendum parts 3210 that include structured row list data 3416, indicating row list 3415, to disk storage resources 3230, and that further implements an addendum part reader 3414 to read addendum parts 3210 from the disk storage resources 3230 to process the row list 3415 accordingly. Some or all features and or functionality of the addendum part writer 3412 of FIGS. 34A-34G can implement any embodiment segment update module 3220 and/or any generation of addendum parts 3210 described herein. Some or all features and or functionality of the database system 10 of FIGS. 34A-34G can implement any embodiment of database system 10 described herein.

Figure 34A:
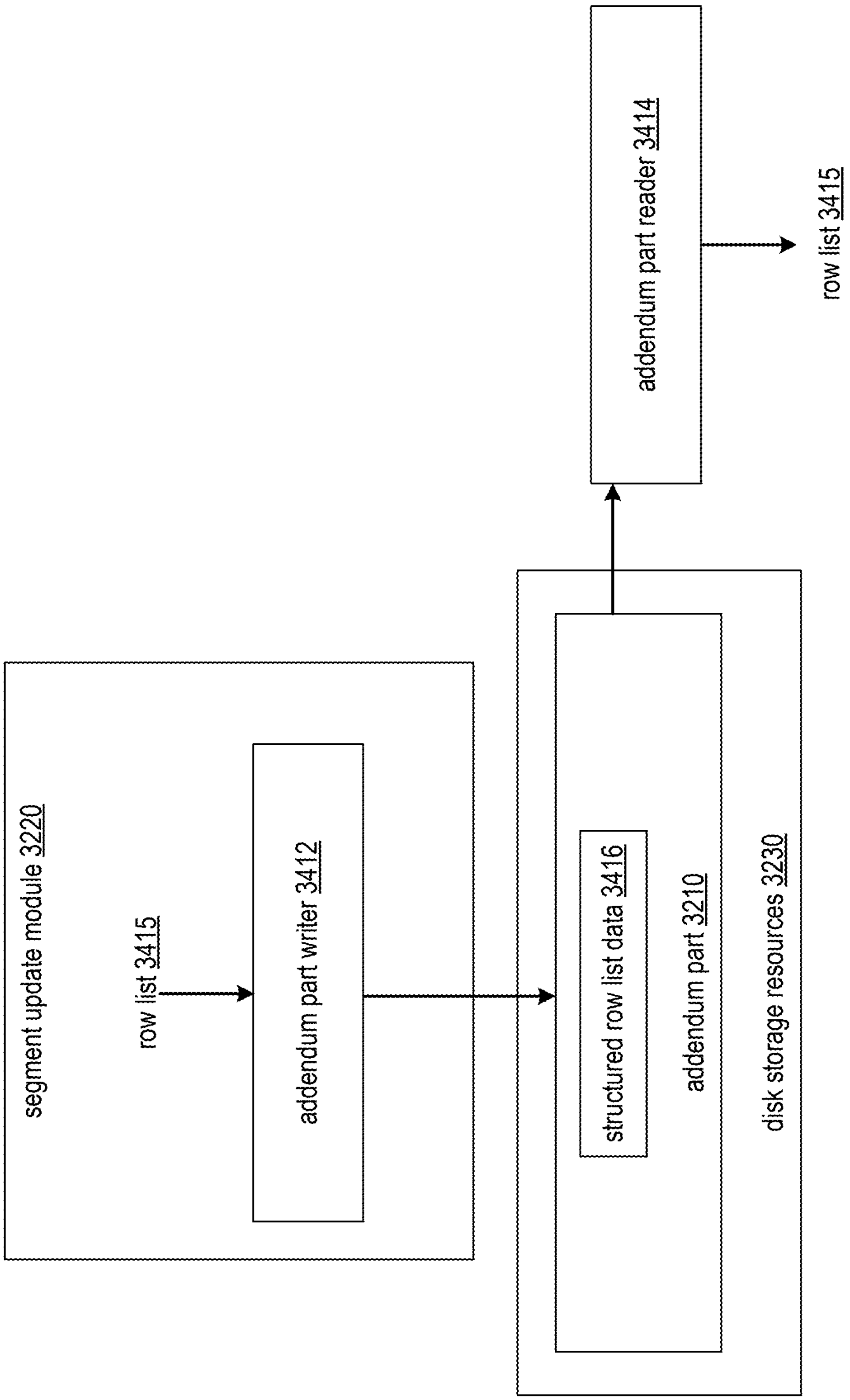
FIG. 34A is a schematic block diagram of a database system that implements an addendum part writer and an addendum part reader in accordance with various embodiments.

As illustrated in FIG. 34A, an addendum part writer 3412 can write an addendum part 3210 based on generating corresponding structured row list data 3416 from a corresponding row list 3415. The row list 3415 can indicate a set of row identifiers (e.g. row numbers) indicating corresponding rows for example, for deletion from a corresponding segment and/or corresponding page to which the addendum part corresponds. The row identifiers can be local to the corresponding segment and/or corresponding page, and/or can globally identify the corresponding rows across multiple segments or pages.

An addendum part reader 3414 can read an addendum part 3210 based on accessing the corresponding structured row list data 3416 to produce the corresponding row list 3415 for processing. For example, the addendum part reader 3414 is implemented in conjunction with one or more database processes requiring access to the addendum part 3210 (e.g. based on requiring identification of rows that have been deleted from a corresponding segment and/or corresponding page).

Figure 34B:
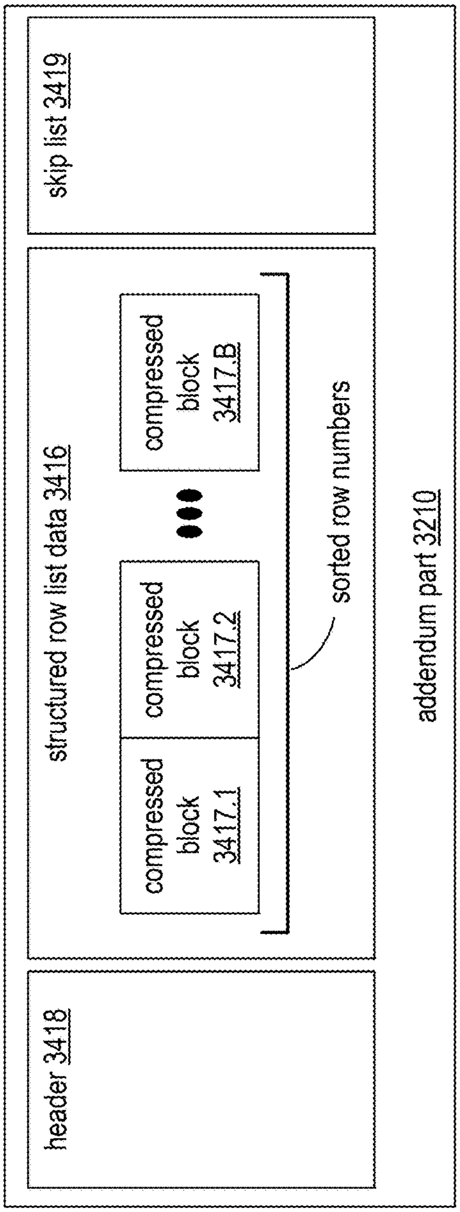
FIGS. 34B and 34C illustrate example embodiments of structuring of an addendum part in accordance with various embodiments.
Figure 34C:
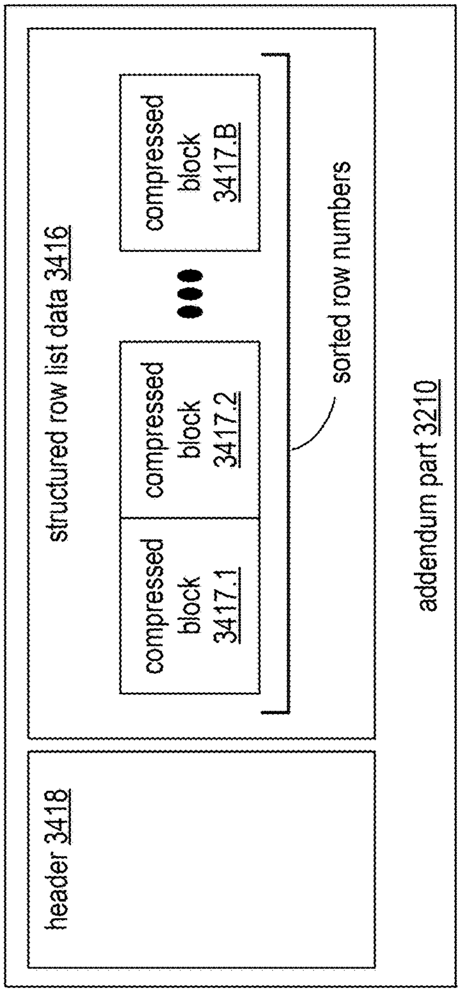

FIGS. 34B and 34C illustrates of structuring of addendum parts 3210. Some or all features and/or functionality of addendum part 3210 of 34B and/or 34C can implement any addendum part 3210 described herein.

As illustrated in FIGS. 34B and 34C, an addendum part 3210 can include structured row list data 3416 that includes a set of one or more of compressed blocks 3417.1-3417.B. The compressed blocks 3417 can each be fixed sized (e.g. 4 Kilobytes or another fixed-sized that is predetermined and/or configured). In some embodiments, each of the compressed blocks 3417 can be compressed separately. The compressed blocks 3417.1-3417.B can collectively store row list 3415 as a sorted list of row numbers.

In some embodiments, to identify row numbers that are to be excluded from the results of a query, a delete segment part (e.g. addendum part 3210). a can contain a sorted list of row numbers. This list will be split between size-configurable (e.g. 4K) blocks, for example, that have each been individually compressed using delta-delta compression. In some embodiments, the deleted rows area (e.g. the structured row list data 3416) of delete segment part can be implemented in a same or similar fashion as a variable length area implemented to stored row numbers in Inverted Secondary Index structures implementing some or all index data described herein.

As illustrated in FIGS. 34B and 34C, an addendum part 3210 can further include a header 3418. In some embodiments, the delete part can begin with a one-block header (or other predetermined fixed-sized header) containing information necessary for reading as well as the total number of deleted rows in the part for efficient count star handling. In some embodiments. For example, the header 3418 can indicate: version data; a block size of the compressed blocks; a number of deleted rows in the row list 3415; a deleted rows start block of the structured row list data 3416 (e.g. a location/offset/identifier of compressed blocks 3417.1); a Boolean value indicating whether or not the addendum part 3210 contains a skip list 3419; and/or a skip list start block of the skip list 3419, if applicable (e.g. e.g. a location/offset/identifier of skip list 3419). In some embodiments, the rest of the header block's unused bytes can be zeroed. The header 3418 can be processed via addendum read module 3414 in conjunction with reading the addendum part 3210 (e.g. to determine where/how to read structured row list data 3416 and/or skip list 3419 accordingly).

As illustrated in FIG. 34B, the addendum part 3210 can optionally further include a skip list 3419, for example, following the deleted structured row list data 3416. The skip list 3419 can be implemented as a delta coded skip list, for example, representing row block offsets for more efficient reading via addendum part reader 3414. As illustrated in FIG. 34B, the addendum part 3210 can optionally not further include a skip list 3419.

In some embodiments, the addendum part structuring of 34B corresponds to structing of addendum parts 3210 implemented for segments 2424, while the addendum part structuring of 34C corresponds to structuring of addendum parts 3210 implemented for pages 2515. For example, addendum parts 3210 for segments 2424 can be implemented to include skip lists, while addendum parts 3210 for pages 2515 can be implemented to not include skip lists.

Figure 34D:
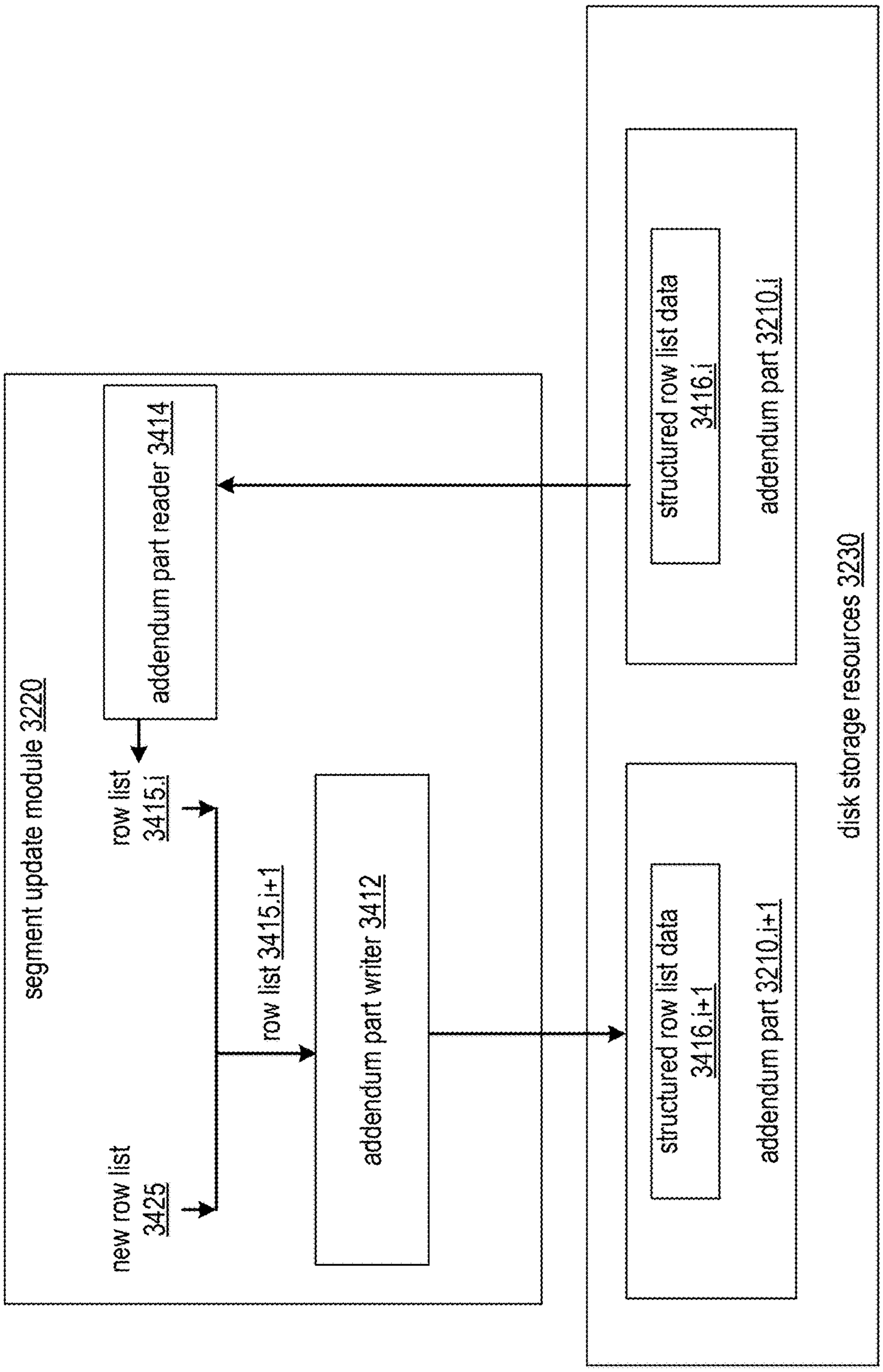
FIG. 34D is a schematic block diagram of a database system that implements an addendum part reader in conjunction with implementing a segment update module in accordance with various embodiments.

FIG. 34D illustrates an embodiment of an addendum part writer 3412 of a segment update module 3220 that creates a new addendum part 3210.*i*+1 (e.g. for a given segment or a given page) based on first reading a current addendum part 3210.*i* (e.g. for the given segment or a given page) via also implementing addendum part reader 3414.

In some embodiments, the addendum part writer 3412 is implemented based on being created, for example, by a storage protocol action (e.g. a createAddendumParts storage protocol action). In some embodiments, the addendum part writer 3412 can process a list of rows (e.g. entire rowIds, such as row ID tuples 3505 of FIG. 35B or just segment-local row numbers, such as local row numbers 3503). The addendum part writer 3412 can further process a pointer to an existing delete part. If an existing delete part exists the part can be read off disk, decompressed, and zippered with incoming rows on a block-by-block basis. A new delete part can be written containing both sets of rows combined into a single sorted list.

For example, as illustrated in FIG. 34D, segment update module 3220 can be implemented based on applying addendum part reader 3414 to read addendum part 3210.*i* to render the row list 3415.*i* of the structured row list data 3416.*i*. This can be combined with a new row list 3425, where a row list 3415.*i*+1 is determined as a set union of row list 3415.*i* and new row list 3425. The addendum part writer can generate structured row list data 3416.*i*+1 to indicate this row list 3415.*i*+1 (e.g. sort the rows once the set union is created, and compress the sorted row list into blocks.

In some embodiments, in cases where no current addendum part 3210.*i* exists (e.g. this is the first addendum part for the segment/page), the addendum part writer can generate the row list 3415 as only the new row list 3425 based on determining no other current addendum part 3210.*i* exists that indicates other rows already deleted.

In some embodiments, regardless of whether an existing delete part is present, addendum part writer 3412 can be implemented (e.g. via a tktCompressedFixedLengthColumnSlabWriter_t) utilizing with fixed element size (e.g. sizeof(rowNumber_t)) and/or non-nullable elements to write the delta-delta compressed blocks to the delete part on disk (e.g. as is done in the varlen portion of the inverted secondary index). The addendum part writer 3412 can further build the header 3418 and/or skip list 3419. For example, after inserting all of the rows, we pass the slab writer's blockRowOffsets( ) can be passed (e.g. to a dcslBuilder_t) to build the skip list. This pattern can necessitate the skip list come after the deleted rows area, as the slab writer flushes blocks to disk during insertion and we have no way of knowing the length of the skip list in advance. In some embodiments, if a skip list is present, it can be utilized during zippering, for example, to avoid decompressing blocks from the existing delete part if no new rows are to be added to that block.

Figure 34E:
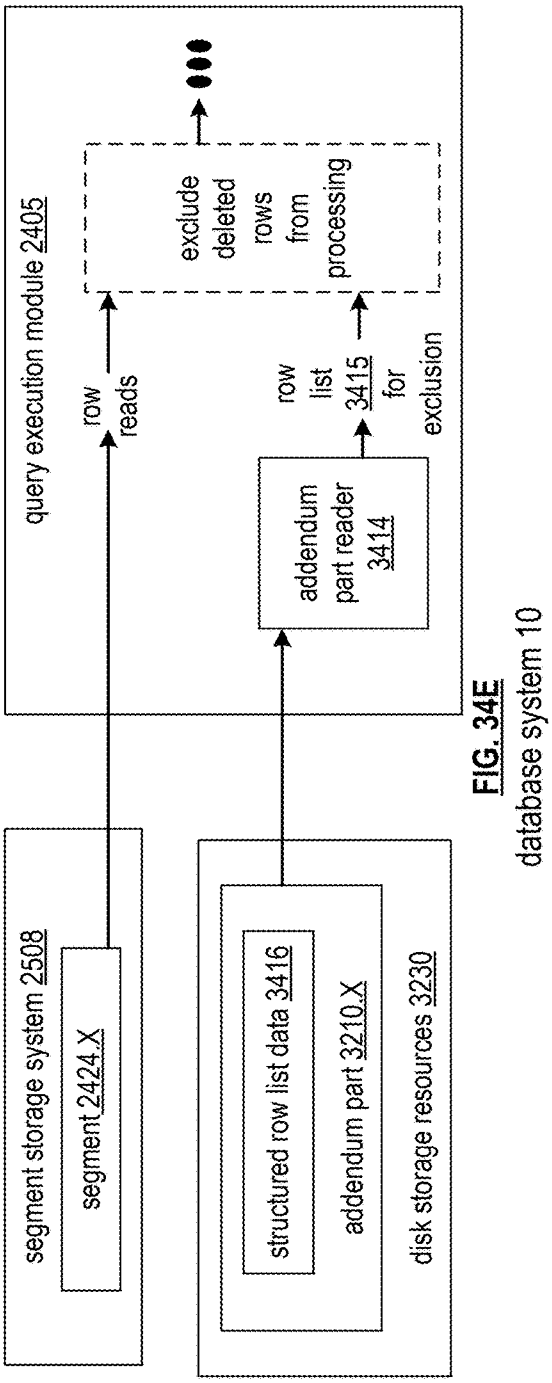
FIG. 34E is a schematic block diagram of a database system that implements an addendum part reader in conjunction with implementing a query execution module that processes a corresponding segment in accordance with various embodiments.
Figure 34F:
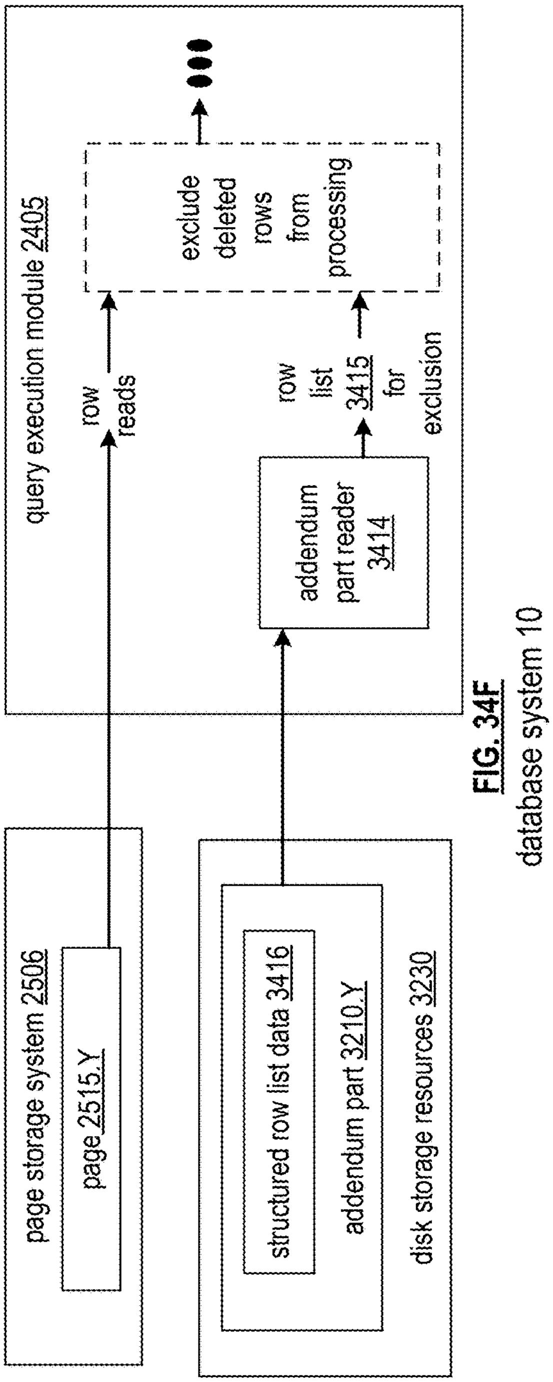
FIG. 34F is a schematic block diagram of a database system that implements an addendum part reader in conjunction with implementing a query execution module that processes a corresponding page in accordance with various embodiments.
Figure 34G:
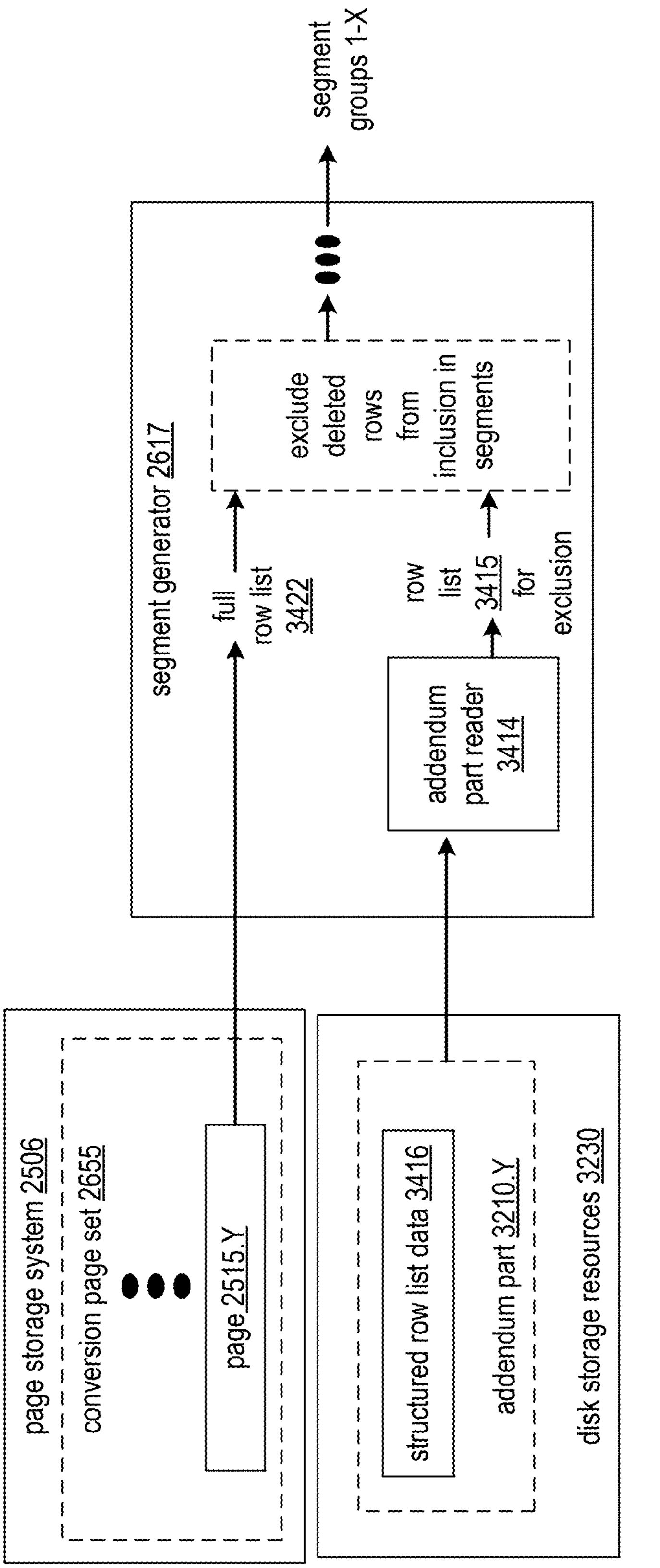
FIG. 34G is a schematic block diagram of a database system that implements an addendum part reader in conjunction with implementing a segment generator module that in accordance with various embodiments.

In some embodiments, once an addendum part 3210 is written, there are at least four situations in which the delete part is be read: (1) existing delete part is being updated with newly deleted rows (e.g. as illustrated in FIG. 34D); (2) a segment 2424 with a delete part is being queried (e.g. as illustrated in FIG. 34E); (2) a page 2515 with a delete part is being queried (e.g. as illustrated in FIG. 34F; and/or (4) a page with a delete part is being used to generate a segment (e.g. as illustrated in FIG. 34G). In some embodiments some or all of the four situations can have a different method for performing block IO of the deleted rows area, for example, depending on whether a skip list is to be used and/or how deleted rows are outputted.

As illustrated in FIG. 34E, a query execution module 2405 can be implemented in conjunction with a given query to process at least a given segment 2424.X based on also accessing addendum part 3210.X via addendum part reader 3414 to identify row list 3415 indicating the rows of segment 2424 for exclusion from the query. These rows can otherwise be excluded from processing, for example, in conjunction with implementing a corresponding IO pipeline 2835 to perform row reads and filtering of the given segment 2424.X. Other segments involved in the given query having addendum part can similarly be processed via query execution module 2405 based on applying addendum part reader 3414 to read their row lists 3415 for exclusion.

As illustrated in FIG. 34F, a query execution module 2405 can be implemented in conjunction with a given query to process at least a given page 2515.Y based on also accessing addendum part 3210.Y via addendum part reader 3414 to identify row list 3415 indicating the rows of page 2515.Y for exclusion from the query. These rows can otherwise be excluded from processing, for example, in conjunction with implementing a corresponding IO pipeline 2835 to perform row reads and filtering of the given page 2515.Y. Other pages involved in the given query having addendum part can similarly be processed via query execution module 2405 based on applying addendum part reader 3414 to read their row lists 3415 for exclusion.

In some embodiments, a given query is processed via implementing functionality of both FIG. 34E and/or FIG. 34F to read one or more pages and/or one or more segments storing rows involved in the query. In some embodiments, the reading of pages and/or segments is achieved via corresponding IO pipelines 2835 as discussed previously and/or as further discussed in conjunction with FIG. 36A.

As illustrated in FIG. 34G, a segment generator 2617 can be implemented in performing a given page conversion process to convert a conversion page set 2655 into a set of segments 2424 in segment groups 1-X process at least a given page 2515.Y of the conversion page set 2655 based on also accessing addendum part 3210.Y via addendum partreader 3414 to identify row list 3415 indicating the rows of page 2515.Y for exclusion from the set of segments. Some or all features and/or functionality of segment generator 2617 of FIG. 34G can implement one or more Some or all features and/or functionality of segment generator 2507 of FIG. 24P, segment generator 2617 of FIG. 25A and/or FIG. 26A, and/or any other embodiment of segment generator described herein.

In some embodiments, once the block IO is complete decompression can be performed (E.g. via staticColumnSlabBlockReader_t::execCursor( )), for example, in a same or similar fashion as applied in reading the inverted index structure. In some embodiments, each of the four applications can have different outputs, and the emitter can thus vary but can each optionally apply similar functionality (e.g. can each inherit integralEmitter_i).

In some embodiments, segments 2424 whose output is a row list (e.g. rowList_t) a corresponding row list emitter (e.g. rowListEmitter_t) can be applied in a same or similar fashion as applied via inverted index (E.g. for access via index element 3512. This can include directly writing decompressed row numbers to the output row list, for example, potentially taking advantage of sequential/contiguous ranges of rows present in the set of deleted rows.

In some embodiments, for reading existing delete parts during the zippering workload and page processing, a defaultFixedSizeElementEmitter_t can be implemented, for example, with a destination buffer. In some embodiments, the zippering workflow can simply involve merging with the incoming list of rows.

Figure 34H:
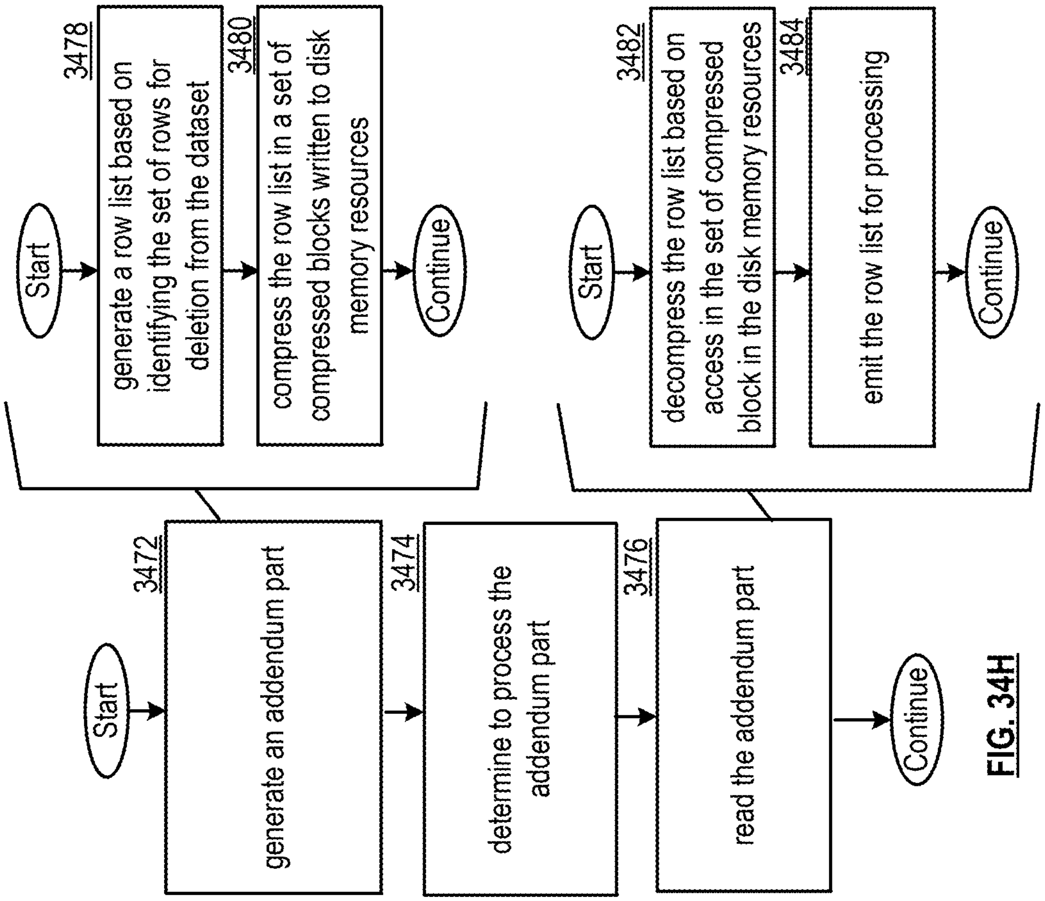
FIG. 34H is a logic diagram illustrating a method for execution in accordance with various embodiments.

FIG. 34H illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 34H. For example, a node 37 can participate in some or all steps of FIG. 34H based on participating in consensus protocols to mediate consensus data with other nodes 37. Some or all of the method of FIG. 34H can be performed by nodes executing a query in conjunction with a query execution, for example, via one or more nodes 37 implemented as nodes of a query execution module 2504 implementing a query execution plan 2405. Some or all of the steps of FIG. 34H can optionally be performed by any other processing module of the database system 10. Some or all of the steps of FIG. 34H can be performed to implement some or all of the functionality of the database system 10 as described in conjunction with FIGS. 34A-34G, for example, by implementing some or all of the functionality of addendum part writer 3412 and/or addendum part reader 3414. Some or all steps of FIG. 34H can be performed by database system 10 in accordance with other embodiments of the database system 10 and/or nodes 37 discussed herein. Some or all steps of FIG. 34H can be performed by database system 10 in accordance with performing one or more steps of FIG. 34I and/or of any other method described herein.

Step 3472 includes generating an addendum part. Step 3474 includes determining to process the addendum part. Step 3476 includes reading the addendum part.

Performing step 3472 can include performing step 3478 and/or step 3480. Step 3478 includes generating a row list based on identifying the set of rows for deletion from the dataset. Step 3480 includes compressing the row list in a set of compressed blocks written to disk memory resources.

Performing step 3476 can include performing step 3482 and/or step 3484. Step 3482 includes decompressing the row list based on access in the set of compressed block in the disk memory resources. Step 3484 includes emitting the row list for processing.

In various examples, determining to process the addendum part is based on determining to process the row list for processing in conjunction with executing one of a set of processes that includes: a query execution process; an addendum part update process, and/or a page conversion process.

In various examples, the one of the set of processes is the query execution process. In various examples, determining to process the addendum part is based on determining a query for execution against the dataset. In various examples, the row list is processed in conjunction with executing the query to exclude the set of rows from processing in generating a corresponding query resultant.

In various examples, the method further includes generating a plurality of addendum parts that each indicate a corresponding set of rows of the dataset for deletion. In various examples, the plurality of addendum parts includes the addendum part. In various examples, the method further includes reading the plurality of addendum parts based on determining the query for execution against the dataset to emit a corresponding plurality of row lists that includes the row list. In various examples, the corresponding plurality of row lists are processed in conjunction with executing the query to exclude the corresponding of set of rows of each of the plurality of addendum parts from processing in generating the corresponding query resultant.

In various examples, the method further includes storing a plurality of segments that each include a corresponding plurality of rows in accordance with a column-based format. In various examples, a first subset of the plurality of addendum parts are generated to indicate the corresponding set of rows as a subset of the corresponding plurality of rows of a corresponding one of the plurality of segments. In various examples, executing the query includes processing ones of the corresponding plurality of rows of each of the plurality of segments not excluded from processing via reading the first subset of the plurality of addendum parts.

In various examples, the method further includes storing a plurality of pages that each include a corresponding plurality of rows in accordance with a row-based format. In various examples, a second subset of the plurality of addendum parts are generated to indicate the corresponding set of rows as a subset of the corresponding plurality of rows of a corresponding one of the plurality of pages, and wherein executing the query further includes processing ones of the corresponding plurality of rows of each of the plurality of pages not excluded from processing via reading the second subset of the plurality of addendum parts.

In various examples, the first subset of the plurality of addendum parts are generated in accordance with first addendum part formatting. In various examples, the second subset of the plurality of addendum parts are generated in accordance with second addendum part formatting. In various examples, the first subset of the plurality of addendum parts are read in accordance with the first addendum part formatting. In various examples, the second subset of the plurality of addendum parts are read in accordance with the second addendum part formatting.

In various examples, the first addendum part formatting is based on inclusion of a skip list for the set of compressed blocks. In various examples, the second addendum part formatting is based on no inclusion of the skip list. In various examples, the first subset of the plurality of addendum parts are read based on processing the skip list. In various examples, the second subset of the plurality of addendum parts are read without processing any skip list.

In various examples, the one of the set of processes is the addendum part update process, wherein the determining to process the addendum part is based on determining to generate an updated addendum part to include a new set of rows. In various examples, the method further includes generating the updated addendum part to indicate an updated set of rows for deletion from the dataset based on: identifying the new set of rows for deletion; identifying the set of rows deleted from the dataset based on reading the addendum part; generating a new row list based on identifying the updated set of rows for deletion from the dataset as a set union between the set of rows and the new set of rows;

and/or compressing the new row list in a new set of compressed blocks written to the disk memory resources.

In various examples, the row list is an ordered row list sorted by row number, and wherein the new row list is a new ordered row list generated from the set union.

In various examples, the one of the set of processes is the page conversion process. In various examples, the method further includes: storing a plurality of pages, where the addendum part is an addendum part for a page of the plurality of pages; determining to generate a plurality of segments from the plurality of pages, where determining to process the addendum part is based on determining to generate the plurality of segments from the plurality of pages, and/or where the row list is processed based on excluding the set of rows for inclusion in the plurality of segments; and/or storing the plurality of segments via disk memory resources.

In various examples, the addendum part is read during a first temporal period in conjunction with executing the one of the set of processes. In various examples, the method further includes: determining to process the addendum part in conjunction with performing a second one of the set of processes during a second temporal period; further reading the addendum part to emit the sorted row list based on determining to further process the sorted row list for processing in conjunction with executing the second one of the set of processes during the second temporal period; determining to process the addendum part in conjunction with performing a third one of the set of processes during a third temporal period; and/or further reading the addendum part to emit the sorted row list based on determining to further process the sorted row list for processing in conjunction with executing the third one of the set of processes during the third temporal period.

In various examples, generating the addendum part for the dataset is further based on, after writing the set of compressed blocks to disk, further writing a skip list to the disk memory resources. In various examples, reading the addendum part for the dataset is further based on loading the skip list and applying the skip list in conjunction with executing a corresponding IO pipeline.

In various embodiments, any one of more of the various examples listed above are implemented in conjunction with performing some or all steps of FIG. 34H. In various embodiments, any set of the various examples listed above can be implemented in tandem, for example, in conjunction with performing some or all steps of FIG. 34H.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 34H described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 34H, for example, in conjunction with further implementing any one or more of the various examples described above.

In various embodiments, the operational instructions, when executed by the at least one processor, cause the database system to: generate an addendum part indicating deletion of a set of rows of a plurality of rows of a dataset based on generating a row list based on identifying the set of rows for deletion from the dataset and/or compressing the row list in a set of compressed blocks written to disk memory resources; determining to process the addendum part; and/or based on determining to process the addendum part, read the addendum part based on decompressing the row list based on access in the set of compressed block in the disk memory resources and/or emitting the row list for processing.

Figure 34I:
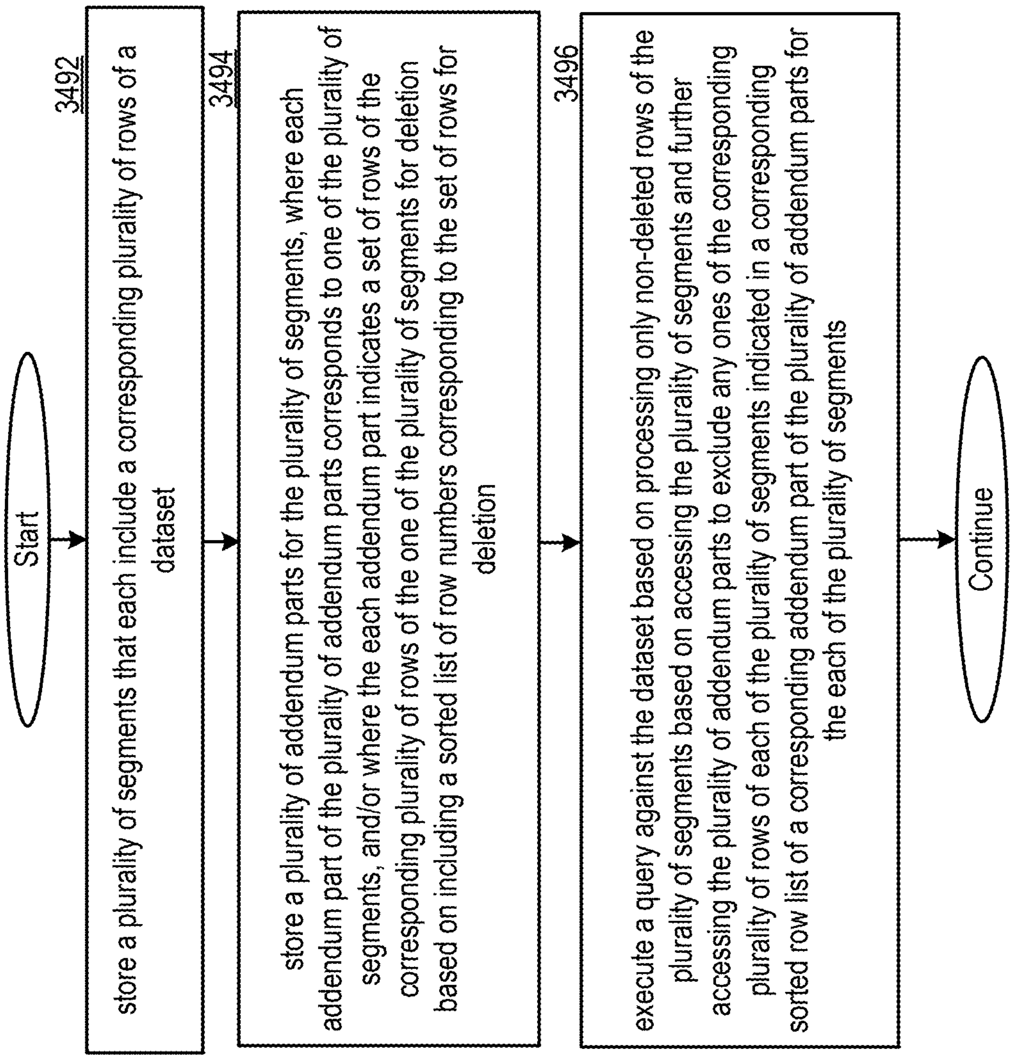
FIG. 34I is a logic diagram illustrating a method for execution in accordance with various embodiments.

FIG. 34I illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 34I. For example, a node 37 can participate in some or all steps of FIG. 34I based on participating in consensus protocols to mediate consensus data with other nodes 37. Some or all of the method of FIG. 34I can be performed by nodes executing a query in conjunction with a query execution, for example, via one or more nodes 37 implemented as nodes of a query execution module 2504 implementing a query execution plan 2405. Some or all of the steps of FIG. 34I can optionally be performed by any other processing module of the database system 10. Some or all of the steps of FIG. 34I can be performed to implement some or all of the functionality of the database system 10 as described in conjunction with FIGS. 34A-34G, for example, by implementing some or all of the functionality of addendum part writer 3412 and/or addendum part reader 3414. Some or all steps of FIG. 34I can be performed by database system 10 in accordance with other embodiments of the database system 10 and/or nodes 37 discussed herein. Some or all steps of FIG. 34I can be performed by database system 10 in accordance with performing one or more steps of FIG. 34H and/or of any other method described herein.

Step 3492 includes storing a plurality of segments that each include a corresponding plurality of rows of a dataset.

Step 3494 includes storing a plurality of addendum parts for the plurality of segments. In various examples, each addendum part of the plurality of addendum parts corresponds to one of the plurality of segments. In various examples, the each addendum part indicates a set of rows of the corresponding plurality of rows of the one of the plurality of segments for deletion based on including a sorted list of row numbers corresponding to the set of rows for deletion.

Step 3496 includes executing a query against the dataset based on processing only non-deleted rows of the plurality of segments based on accessing the plurality of segments and further accessing the plurality of addendum parts to exclude any ones of the corresponding plurality of rows of each of the plurality of segments indicated in a corresponding sorted row list of a corresponding addendum part of the plurality of addendum parts for the each of the plurality of segments.

In various examples, the plurality of segments and/or the plurality of addendum parts are stored via a plurality of storage nodes.

In various examples, at least one first one of the plurality of segments has no corresponding addendum part. In various examples, at least one second one of the plurality of segments has exactly one corresponding addendum part of the plurality of addendum parts. In various examples, In various examples, at least one third one of the plurality of segments has multiple of addendum parts of the plurality of addendum parts.

In various examples, the each addendum part includes a set of compressed fixed-sized data blocks that include the sorted list of row numbers corresponding to the set of rows for deletion.

In various examples, each data block of the set of compressed fixed-sized data blocks is individually compressed via a delta-delta compression scheme.

In various examples, the each addendum part includes the sorted list of row numbers in a first portion of the each addendum part, and wherein the each addendum part further includes a header portion.

In various examples, the header portion indicates a total number of rows numbers in sorted list of row numbers.

In various examples, the each addendum part includes the sorted list of row numbers in a first portion of the addendum part. In various examples, each of a subset of the plurality of addendum parts further includes a skip list portion.

In various examples, the skip list portion of a corresponding one of the plurality of addendum parts includes a delta coded skip list indicating at least one row block offset of the sorted list of row numbers of the corresponding one of the plurality of addendum parts, In various examples, accessing the each of the subset of addendum parts in executing the query includes reading the sorted list of row numbers of the each of the subset addendum part based on applying delta coded skip list of the each of the subset of addendum parts.

In various examples, the plurality of segments each include the corresponding plurality of rows in accordance with a column-based structure based on being a column-formatted segment structure. In various examples, the method further includes storing, via a plurality of storage nodes, a plurality of pages that each include a corresponding plurality of rows of the dataset in accordance with a row-based structure; and storing, via the plurality of storage nodes, a second plurality of addendum parts for the plurality of pages. In various examples, each addendum part of the second plurality of addendum parts corresponds to one of the plurality of pages, and/or each addendum part the second plurality of addendum parts indicates a second set of rows of the corresponding plurality of rows of the one of the plurality of pages for deletion based on including a second sorted list of row numbers corresponding to the second set of rows for deletion. In various examples, none of the second plurality of addendum parts include the skip list portion.

In various examples, executing the query against the dataset is further based on processing only non-deleted rows of the plurality of pages based on accessing the plurality of pages and further accessing the second plurality of addendum parts to exclude any ones of the corresponding plurality of rows of each of the plurality of pages indicated in a corresponding sorted row list of a corresponding addendum part of the second plurality of addendum parts for the each of the plurality of pages without applying any delta coded skip list.

In various examples, the set of rows of the corresponding plurality of rows of at least one of the plurality of segments is a non-null proper subset of the corresponding plurality of rows of at least one of the plurality of segments.

In various embodiments, any one of more of the various examples listed above are implemented in conjunction with performing some or all steps of FIG. 34I. In various embodiments, any set of the various examples listed above can be implemented in tandem, for example, in conjunction with performing some or all steps of FIG. 34I.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 34I described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 34I, for example, in conjunction with further implementing any one or more of the various examples described above.

In various embodiments, the operational instructions, when executed by the at least one processor, cause the database system to: store, via a plurality of storage nodes, a plurality of segments that each include a corresponding plurality of rows of a dataset; store, via the plurality of storage nodes, a plurality of addendum parts for the plurality of segments, wherein each addendum part of the plurality of addendum parts corresponds to one of the plurality of segments, and wherein the each addendum part indicates a set of rows of the corresponding plurality of rows of the one of the plurality of segments for deletion based on including a sorted list of row numbers corresponding to the set of rows for deletion; and/or execute a query against the dataset based on processing only non-deleted rows of the plurality of segments based on accessing the plurality of segments and further accessing the plurality of addendum parts to exclude any ones of the corresponding plurality of rows of each of the plurality of segments indicated in a corresponding sorted row list of a corresponding addendum part of the plurality of addendum parts for the each of the plurality of segments.

Figure 35A:
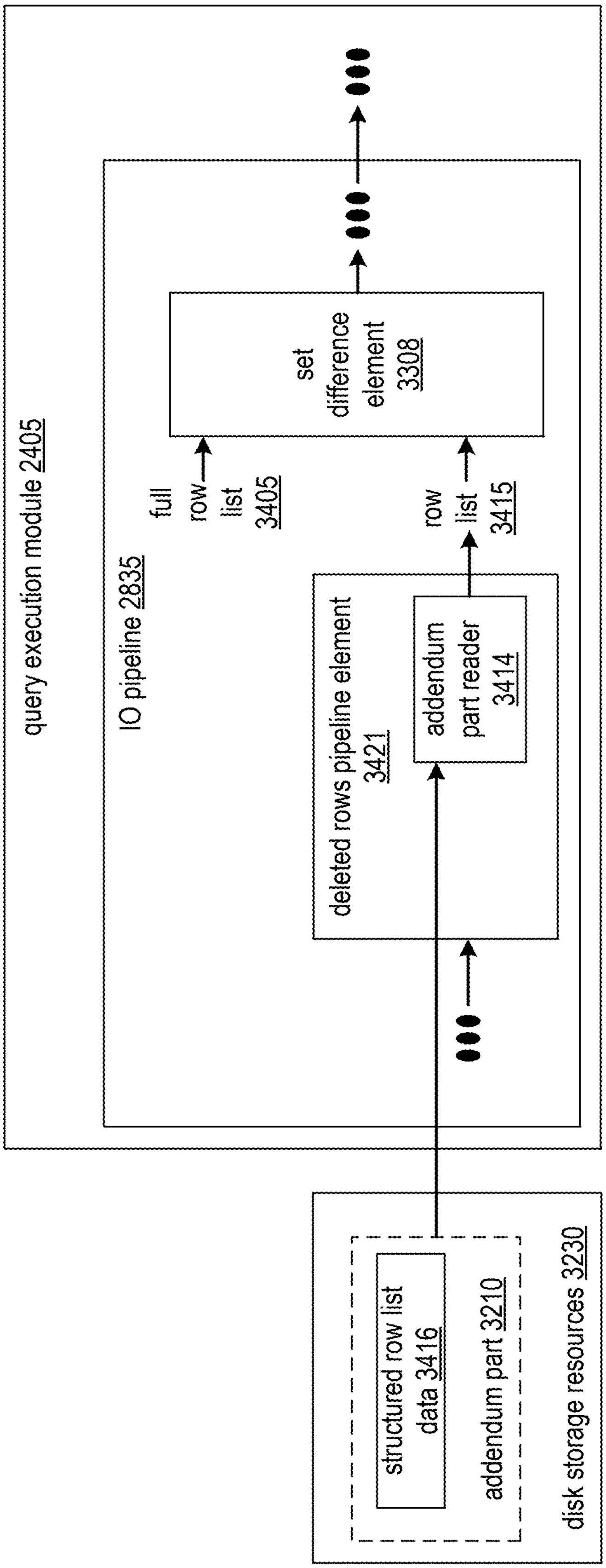
FIG. 35A is a schematic block diagram of an IO pipeline implemented by a query execution module that implements a deleted rows pipeline element.
Figure 35B:
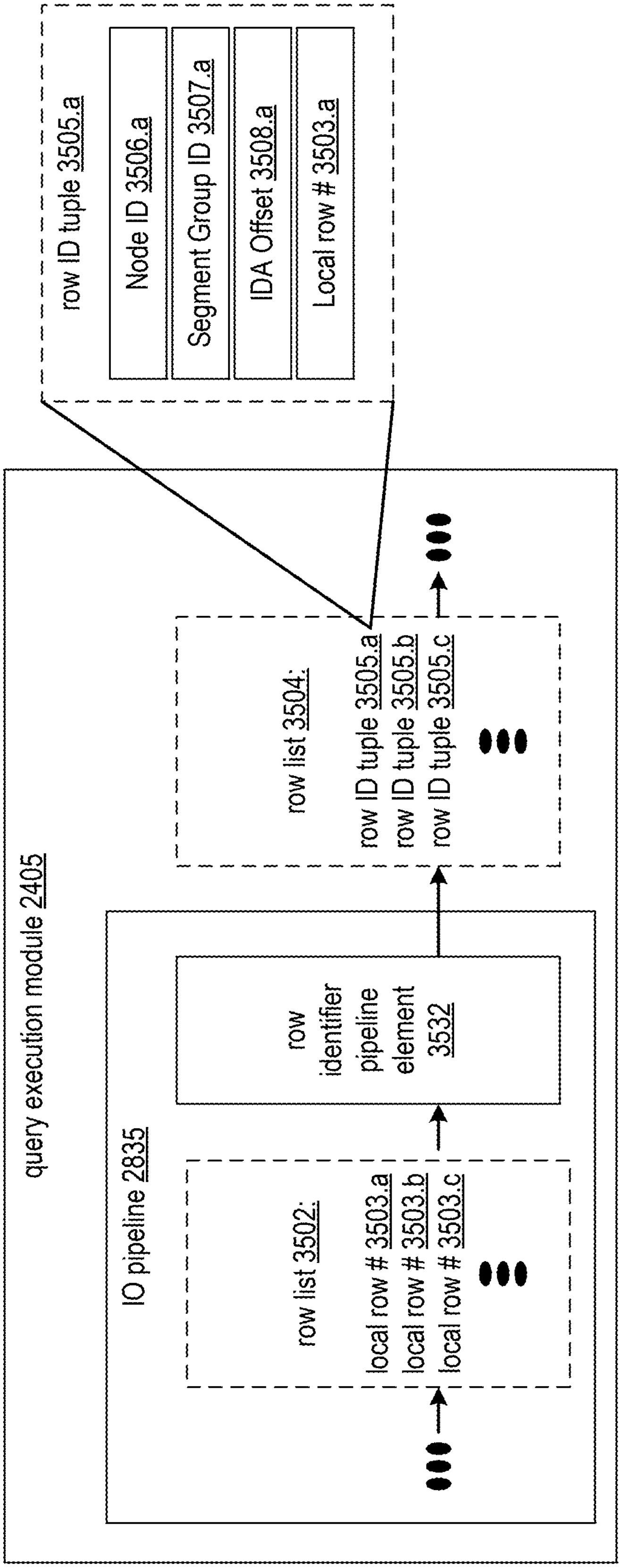
FIG. 35B is a schematic block diagram of an IO pipeline implemented by a query execution module that implements a row identifier pipeline element.

FIGS. 35A-35B illustrate embodiments of an IO pipeline 2835 operable to implement a deleted rows pipeline element 3421 and/or a row list 3504. Some or all features and/or functionality of IO pipeline 2835 of FIGS. 35A-35B can implement any embodiment of IO pipeline described herein.

FIG. 35A illustrates an embodiment of an IO pipeline 2835 that implements addendum part reader 3414 via a corresponding deleted rows pipeline element 3421 of IO pipeline 2835. The deleted rows pipeline element 3421 can be included in the arrangement of IO pipeline elements of an IO pipeline configured for accessing a corresponding segment and/or corresponding page in conjunction with execution a corresponding query as described herein, in the case where the corresponding segment and/or corresponding page has an addendum part to be read, for example, to ensure the deleted rows of the corresponding segment and/or corresponding page are excluded from processing. This can include "filtering out" the deleted rows, for example, in addition to filtering out other rows not meeting query predicates of the query, for example, via other pipeline elements such as one or more index elements 3512, one or more source elements 3514, one or more filtering elements 3516, and/or one or more down-sample elements. Some or all features and/or functionality of the addendum part reader 3414 of FIG. 35A can implement any embodiment of addendum part reader 3414 and/or other access of addendum parts 3210 described herein.

In some embodiments, deleted rows pipeline element 3421 can be implemented as a type of pipeline element (e.g. deletedRowsPipelineElement_t) operable to create a cursor over the structured row list data 3416, for example, over the compressed list of sorted row numbers indicated in the compressed blocks 3417.1-3417.B, and emits row list 3414 containing the deleted rows (e.g. listing the corresponding row numbers).

Figure 36A:
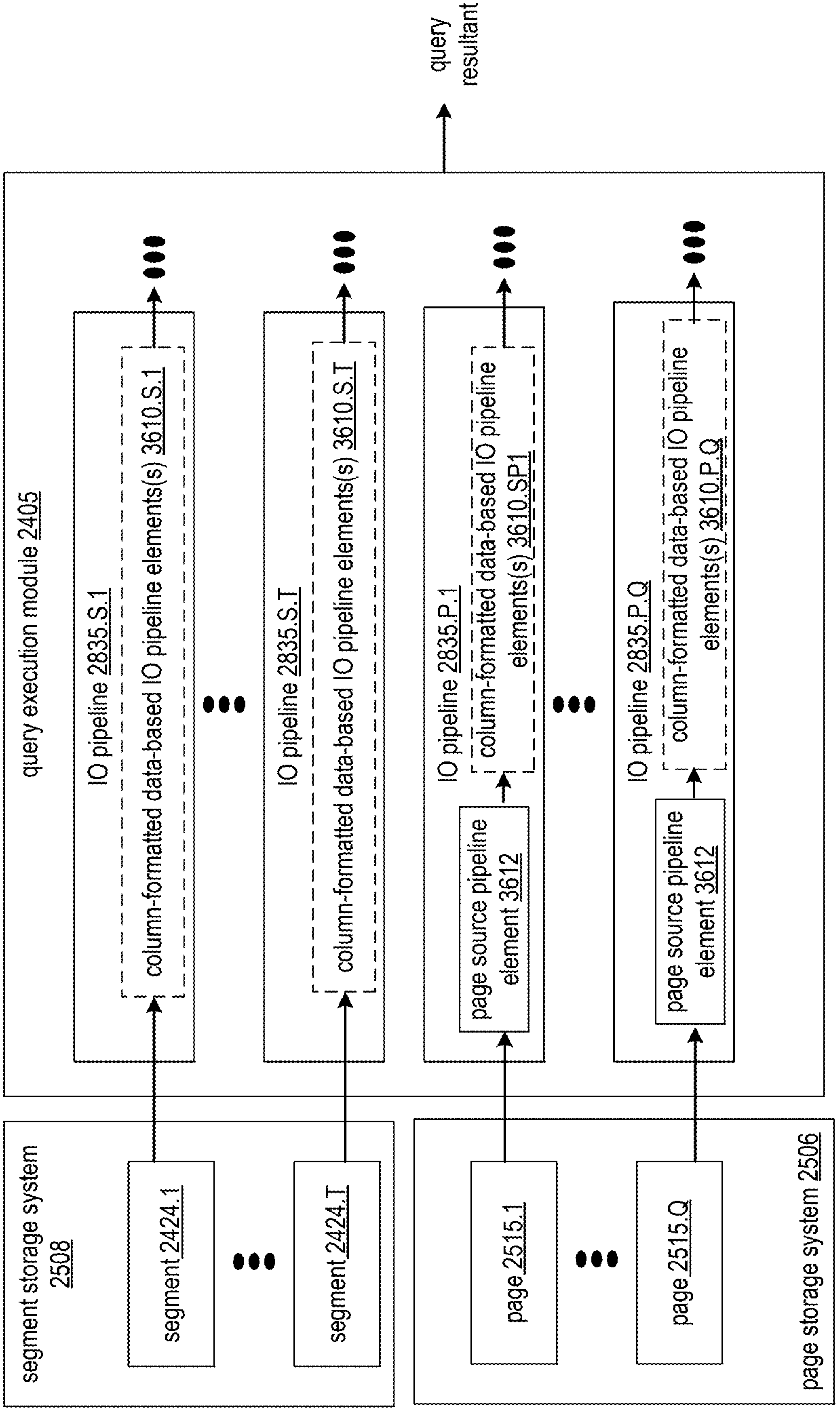
FIG. 36A is a schematic block diagram of query execution module that executes a first set of IO pipelines to access a set of segments of a segment storage system and that further executes a first set of IO pipelines to access a set of pages of a page storage system in accordance with various embodiments.

The deleted rows pipeline element 3421 be implemented via applying the construction of FIG. 36A. In particular, serially after the deleted rows pipeline element 3421, a set difference element 3308 can be implemented, for example, to emit a set difference of the full row list 3405 corresponding to all rows in the segment and the row list 3415 emitted by deleted rows pipeline element 3421 (i.e. relative complement of row list 3415 and full row list 3405. The set difference element 3308 can be implemented via some or all features and/or functionality as disclosed by U.S. Utility application Ser. No. 17/303,437.

The full row list 3405 can be determined based on accessing the segment. In some embodiments, the full row list 3405 is instead determined based on accessing metadata of the corresponding segment indicating the range of row numbers and/or simply the number of rows in the segment if number of the rows is deterministic across all segments. In some embodiments, the full row list 3405 is instead determined based on a predetermined row number range and/or number or rows applied to all segments.

In some embodiments, a single deleted rows pipeline element 3421 can be created and set as a serially first-most element, for example, in all parallel paths of the IO pipeline. For example, in such cases, the single deleted rows pipeline element 3421 receives no row list and emits the row list 3415 directly via access to the addendum part 3210. Further filtering (e.g. based on query predicates, via index elements 3512, filtering elements 3516, and/or source elements 3514, optionally in two or more parallelized paths) can be applied upon the already-filtered row list removing the deleted rows based on being implemented serially after the deleted rows pipeline element 3421 and the set difference element 3308.

In some embodiments, one or more deleted rows pipeline elements 3421 can instead be implemented after one or more other elements of the IO pipeline, for example, operable to process an incoming row list (e.g. reflecting an already-filtered set of rows based on having applied some or all query predicate-based filtering based on via index elements 3512, filtering elements 3516, and/or source elements 3514, optionally in two or more parallelized paths). Processing an incoming row list can include emitting only rows in row list 3415 already included in the incoming row list (e.g. if a deleted row was already filtered out, it need not be indicated).

In some embodiments, the deleted rows pipeline element is only placed serially before elements that do not accept incoming row lists (e.g. the index element type and/or a down-sample element type). In some embodiments, the deleted rows pipeline element placed serially before an index element 3512 operable to access an inverted index structure and/or a filtering element 3516 (e.g. is moved serially before this element from a position serially after this element in an optimization performed to optimize the corresponding IO pipeline). In some embodiments, if there is a deleted rows pipeline element 3421 serially before an index element 3414, but the deleted rows element also has another "parent" serially after the deleted rows element, the IO optionally cannot be optimized in this way, for example, because the full deleted rows list is required for the other parents (e.g. other elements serially after deleted rows pipeline elements 3421, for example, parallelized paths with the index element). In some embodiments, down-sample elements can't accept an incoming row list, and a set element can be applied to intersect the results in the case that there are other upstream parents of the delete.

This functionality of processing an incoming row list emitted by a prior pipeline element can be achieved based on accessing skip list 3419. For example, without a skip list, there is no way of knowing how many blocks from the deleted rows area to read to cover, for example, to cover a corresponding pull window in the delete element. In some embodiments, a variable length ("varlen") portion of the structured row list data 3416 is utilized to estimate the number of rows per block and/or update queued IO requests accordingly, in the case of no skip list 3419 being included (e.g. in the case of accessing addendum data 3210 of a page 2515). This can be complicated logically, and given the delete element's location as the first/near first element in the pipeline in some or all cases, some or all other elements depend on the delete element's output rowlist to begin submitting their own IO. The presence of skip list 3519 can enable placements of the deleted row list serially before other elements that don't use incoming row lists, such as index elements index elements 3512 or downsample elements. This can limit the amount of deleted rows area block IO needed need to do to blocks that may contain rows returned from the index or sampling element.

In some embodiments, to handle the loading and/or use of the delete part skip list, an implementation of a row block mapper (e.g. rowBlockMapper_i) can be implemented in a similar fashion as a pipeline row block mapper class to load compression skip lists (e.g. pipelineRowBlockMapper_t), where the skip list is loaded utilizing using block IO rather than partition IO. The deleted rows pipeline element can be implemented in a same or similar fashion as a fixed length compressed pipeline element.

In some embodiments, a fixed length table source pipeline element (e.g. fixedLengthTableSourcePipelineElement_t) can be used to build an output rowlist rather than a column view. The fixed length table source pipeline element can use the row block mapper to identify which blocks from the deleted rows area are needed in a current pull, possibly stalling on skip list block IO (similarly to partition stall in a FL element). Loaded deleted rows area blocks can be decompressed and added to an output rowlist accordingly.

As discussed previously, the addendum part 3210 can be located in a different block file than other segment parts of a corresponding segment 2424. A separate ioBatch_t can be created each block file present in the segment. A single batch can be flushed when it reaches a size specified by a read depth (e.g. vReadDepth) IO parameter. All of the batches (e.g. one for each of the block files) can be flushed in the other scenarios that trigger a batch flush (e.g. segment boundary, pipeline is stalled on block, buffer starvation, etc.). While the case where a single blockfile not scheduling many reads can be less efficient, such reads can be necessary for the pipeline to make progress. The reads can be submitted for the next cycle when the pipeline is stalled on block IO, but ideally this stall is avoided in the first place. To help avoid a stall in this case, requests from any partially-filled batches at the end of a cycle can be flushed.

FIG. 35B illustrates an embodiment of IO pipeline 2835 that includes a row identifier pipeline element 3532 serially after some or all other pipeline elements. The row identifier pipeline element 3532 can emit a row list 3504 from an incoming row list 3502 of local row numbers 3503 for each of a set of rows (e.g. row a, row b, row c in this example, optionally ordered by row number, but optionally having been filtered, for example, based on having applied query predicates and/pr removing deleted rows via prior pipeline elements). The set of rows indicated by row list 3502 can correspond to the set of rows to be emitted by the IO pipeline. However, in some embodiments, the set of rows is identified via global identifiers, such as row ID tuples 3505. The row identifier pipeline element 3532 can be operable to emit a row ID tuple for each local row number 3503 in the row list 3502 to render row list 3504. The row list 3502 and/or row list 3504 can implement some or all features and/or functionality of row list 3415 and/or any other row list/set of rows emitted by pipeline elements described herein.

The IO pipeline 2835 can be implemented to support a new rowId( ) function implemented via a row identifier element 3532 that causes IO pipeline 2835 to emit a row ID tuple 3505. The row ID tuple 3505 for a given row can indicate: the node identifier 3506 (e.g. identifying the particular node 37 storing the row in the respective segment and/or assigned to the respective segment); the segment group identifier 3507 (e.g. identifying the particular segment group that includes the segment in which the row is included); the information dispersal algorithm (IDA) offset 3508 (e.g. identifying which segment of the segment group the row is included, for example, in accordance with having applied a corresponding information dispersal algorithm to generate the segment group), and/or the local row number 3503 (e.g. the row number identifying the row in the input row list 3502). For example, the row ID tuple 3505 for a given row can be constructed as a TUPLE<uint32_t, uint64_t, uint32_t, uint32_t> which represents {node ID 3506, segment group ID 3507, IDA offset 3508, segment local row number 3503}(e.g. {node_id, segment group_id, ida_offset, segment_local_row_number}). This can include implementing row identifier element 3532 and/or a corresponding column view (e.g. columnView_t), such as a corresponding column data stream 2968, that populates the column view with a row ID tuple 3505 for every row in the corresponding row list.

In some embodiments, the row identifier element 3532 can be implemented in IO pipelines 2835 of FIG. 35A to read addendum parts 3210 (e.g. to read deleted data). In some embodiments, the row identifier element 3532 can be implemented in IO pipelines 2835 of FIG. 35A to write addendum parts 3210 (e.g. to write deleted data). In some embodiments, when processing a query (e.g. a DELETE query where new deleted rows are written), the row identifier pipeline element 3532 can be the last-most element in the pipeline. In some embodiments, the row identifier pipeline element 3532 is optionally not present in any pipeline 2835 outputting materialized column data (E.g. via source element 3514), and/or will only operate on a single incoming row list 3502 (e.g. rowList_t), for example, representing deleted rows (e.g. to be written to an addendum part 3210 via an addendum part writer 3412).

In some embodiments, a global identifier is a stored ID that follows a row throughout its lifecycle for some or all segments. In such embodiments, the addendum part header 3418 of a given segment can include a Boolean value indicating whether the addendum part 3210 contains local or global row identifiers in its structured row list data 3416.

Figure 35C:
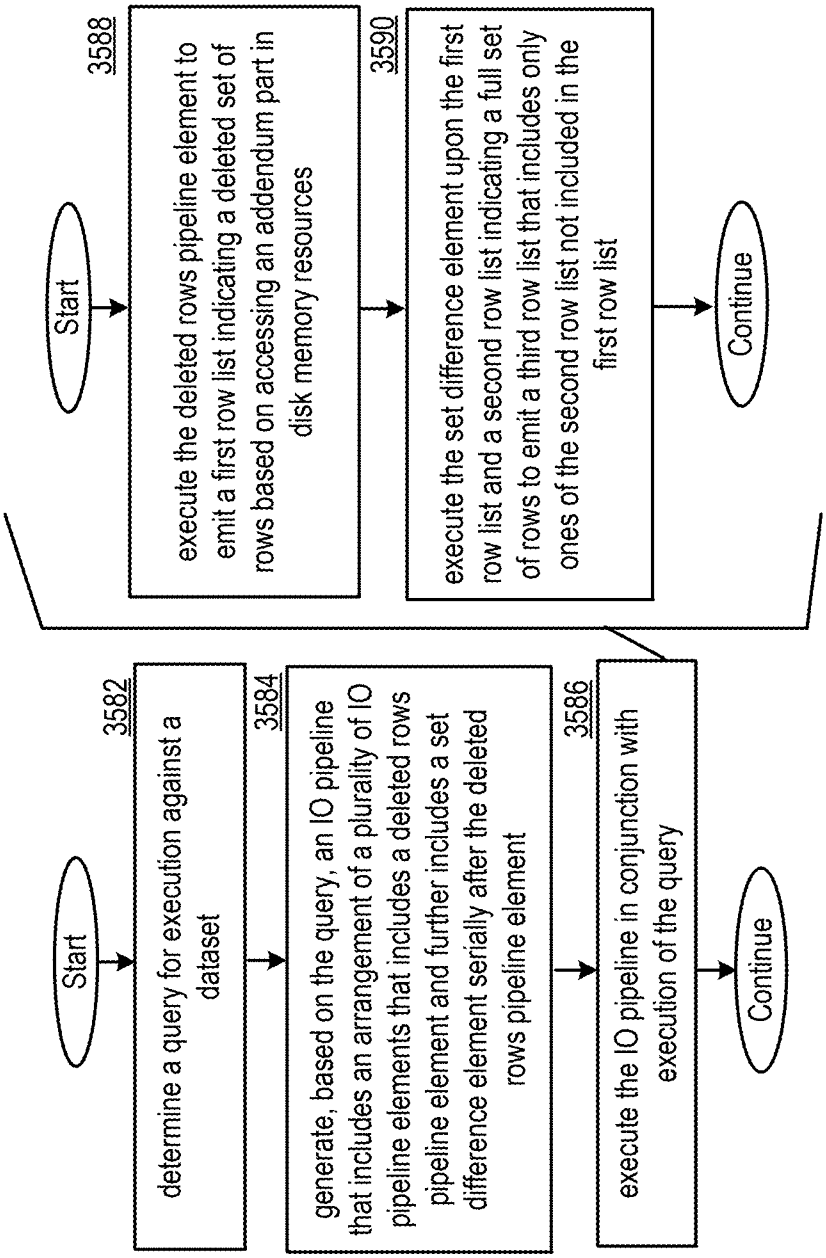
FIG. 35C is a logic diagram illustrating a method for execution in accordance with various embodiments.

FIG. 35C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 35C. For example, a node 37 can participate in some or all steps of FIG. 35C based on participating in consensus protocols to mediate consensus data with other nodes 37. Some or all of the method of FIG. 35C can be performed by nodes executing a query in conjunction with a query execution, for example, via one or more nodes 37 implemented as nodes of a query execution module 2504 implementing a query execution plan 2405. Some or all of the steps of FIG. 35C can optionally be performed by any other processing module of the database system 10. Some or all of the steps of FIG. 35C can be performed to implement some or all of the functionality of the database system 10 as described in conjunction with FIGS. 35A-35B, for example, by implementing some or all of the functionality of deleted rows pipeline element 3421 and/or row identifier of IO pipeline 2835. Some or all steps of FIG. 35C can be performed by database system 10 in accordance with other embodiments of the database system 10 and/or nodes 37 discussed herein. Some or all steps of FIG. 35C can be performed by database system 10 in accordance with performing one or more steps of FIG. 34H, FIG. 34I, any other method described herein.

Step 3582 includes determining a query for execution against a dataset. Step 3584 includes generating, based on the query, an IO pipeline that includes an arrangement of a plurality of IO pipeline elements that includes a deleted rows pipeline element and further includes a set difference element serially after the deleted rows pipeline element. Step 3586 includes executing the IO pipeline in conjunction with execution of the query.

Performing step 3586 can include performing step 3588 and/or step 3590. Step 3588 includes executing the deleted rows pipeline element to emit a first row list indicating a deleted set of rows based on accessing an addendum part in disk memory resources. Step 3588 includes executing the set difference element upon the first row list and a second row list indicating a full set of rows to emit a third row list that includes only ones of the second row list not included in the first row list.

In various examples, a query resultant for the query is generated based on processing rows included in the third row list.

In various examples, storing a first segment that includes a plurality of rows of the dataset in the disk memory resources. In various examples, the second row list corresponds to all of the plurality of rows stored by the first segment. In various examples, the addendum part corresponds to the first segment and indicates the deleted set of rows as ones of the plurality of rows for deletion from the first segment. In various examples, the IO pipeline is configured for processing the plurality of rows of the first segment in conjunction with execution of the query.

In various examples, the first segment is stored in at least one first storage location of the disk memory resources. In various examples, the addendum part for the first segment is stored in at least one second storage location of the disk memory resources separate from the first storage location.

In various examples, the IO pipeline is configured to apply at least one filtering predicate of the query. In various examples, executing the IO pipeline further includes accessing the first segment in the disk memory resources based on executing at least one additional IO pipeline element of the plurality of IO pipeline elements of the IO pipeline that includes at least one of: an index element, a source element, or a filtering element.

In various examples, the at least one additional IO pipeline element includes the index element applied serially before the deleted rows pipeline element. In various examples, the deleted rows pipeline element is configured to process an input row set emitted by the index element based on accessing a skip list included in the addendum part.

In various examples, the method further includes storing a plurality of segments that each includes a corresponding plurality of rows of the dataset in the disk memory resources. In various examples, the plurality of segments includes the first segment and further includes a second segment.

In various examples, the method further includes storing a plurality of addendum parts for the plurality of segments, wherein a first subset of the plurality of segments each have a corresponding one of the plurality of addendum parts based on having deleted rows. In various examples, a second subset of the plurality of segments have parts no addendum part based on having no deleted rows. In various examples, the first segment is included in the first subset and/or the second subset is included in the second subset.

In various examples, the method further includes generating a plurality of IO pipelines for the query based on generating, for each of the plurality of segments, a corresponding IO pipeline that includes a corresponding arrangement of a corresponding plurality of IO pipeline elements. In various examples, the IO pipeline is one of the plurality of IO pipelines generated for the first segment. In various examples, a second IO pipeline of the plurality of IO pipelines is generated for the second segment. In various examples, the second IO pipeline does not include the deleted rows pipeline element based on the second segment being included in the second subset.

In various examples, the method further includes executing the plurality of IO pipelines, where the query resultant for the query is based on a plurality of sets of rows emitted via the plurality of IO pipelines.

In various examples, the method further includes storing a first page that includes a second plurality of rows of the dataset in page storage resources. In various examples, the method further includes generating, based on the query, a second IO pipeline for the first page that includes a second arrangement of a second plurality of IO pipeline elements that includes the deleted rows pipeline element and further include the set difference element serially after the deleted rows pipeline element. In various examples, the method further includes executing the second IO pipeline in conjunction with execution of the query based on: executing the deleted rows pipeline element to emit a fourth row list indicating a second deleted set of rows based on accessing a second addendum part for the first page; and/or executing the set difference element upon the fourth row list and a fifth row list indicating a full set of rows to emit a sixth row list that includes only ones of the fifth row list not included in the fourth row list. In various examples, a query resultant for the query is further based on processing rows included in the sixth row list.

In various examples, the second plurality of rows are stored in the first page in a row-based format. In various examples, the second plurality of IO pipeline elements further includes a page source pipeline element configured to process the second plurality of rows in the row-based format as column-formatted data for processing via other ones of the second plurality of IO pipeline elements.

In various examples, the method further includes storing a plurality of pages that each includes a corresponding plurality of rows of the dataset. In various examples, the plurality of pages includes the first page and further includes a second page.

In various examples, the method further includes storing a plurality of addendum parts for the plurality of pages. In various examples, a first subset of the plurality of pages each have a corresponding one of the plurality of addendum parts based on having deleted rows. In various examples, a second subset of the plurality of pages have parts no addendum part based on having no deleted rows. In various examples, the first page is included in the first subset and/or the second page is included in the second subset.

In various examples, the method further includes generating a plurality of IO pipelines for the query based on generating, for each of a plurality of segments that includes the first segment and for each of the plurality of pages, a corresponding IO pipeline that includes a corresponding arrangement of a corresponding plurality of IO pipeline elements. In various examples, the second IO pipeline is one of the plurality of IO pipelines generated for the first page. In various examples, a third IO pipeline of the plurality of IO pipelines is generated for the second page. In various examples, the third IO pipeline does not include the deleted rows pipeline element based on the second page being included in the second subset.

In various examples, the method further includes executing the plurality of IO pipelines, where the query resultant for the query is based on a plurality of sets of rows emitted via the plurality of IO pipelines.

In various examples, the plurality of IO pipeline elements of the IO pipeline further includes further includes a row list identifier element. In various examples, executing the IO pipeline in conjunction with execution of the query is further based on executing the row list identifier element upon a corresponding input row list of local row identifiers to emit a corresponding output row list of global row identifiers.

In various examples, each global row identifier of the output row list of global row identifiers is generated from a corresponding local row identifier of the corresponding input row list of local row identifiers.

In various examples, the method further includes storing a first segment that includes a plurality of rows of the dataset in at least one memory drive of a first node. In various examples, the second row list corresponds to all of the plurality of rows stored by the first segment. In various examples, In various examples, each global row identifier includes: a node identifier for the first node; a segment group identifier corresponding to the first segment; an information dispersal algorithm (IDA) offset corresponding to the first segment; and the corresponding local row identifier.

In various examples, accessing the addendum part includes accessing a set of compressed data blocks storing an ordered list of row numbers corresponding to the deleted set of rows.

In various embodiments, any one of more of the various examples listed above are implemented in conjunction with performing some or all steps of FIG. 35C. In various embodiments, any set of the various examples listed above can be implemented in tandem, for example, in conjunction with performing some or all steps of FIG. 35C.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 35C described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 35C, for example, in conjunction with further implementing any one or more of the various examples described above.

In various embodiments, the operational instructions, when executed by the at least one processor, cause the database system to: determine a query for execution against a dataset; generate, based on the query, an IO pipeline that includes an arrangement of a plurality of IO pipeline elements that includes a deleted rows pipeline element and further includes a set difference element serially after the deleted rows pipeline element; and execute the IO pipeline in conjunction with execution of the query. In various embodiments, the IO pipeline is executed based on: executing the deleted rows pipeline element to emit a first row list indicating a deleted set of rows based on accessing an addendum part in disk memory resources; and executing the set difference element upon the first row list and a second row list indicating a full set of rows to emit a third row list that includes only ones of the second row list not included in the first row list. In various embodiments, a query resultant for the query is based on processing rows included in the third row list.

FIG. 36A illustrates an embodiment of database system 10 where a query execution module 2405 executes a given query based on performing IO (e.g. via a plurality of nodes 37 at an IO level 2416 of a query execution plan) via a first plurality of IO pipelines 2835.S.1-2835.S.T for a plurality of segments 2424.1-2424.T involved in the query (e.g. collectively storing a first plurality of rows of a dataset against which the query is executed) and further via a second plurality of IO pipelines 2835.P.1-2835.P.Q for a plurality of pages 2515.1-2515.Q involved in the query (e.g. collectively storing a second plurality of rows of a dataset against which the query is executed). Some or all features and/or functionality of the database system 10 of FIG. 36A can implement any embodiment of database system 10 described herein. Some or all features and/or functionality of some or all IO pipelines 2835 of FIG. 36A and/or the query execution module 2405 of FIG. 36A can implement any embodiment of IO pipeline 2835 and/or the query execution module 2405 described herein.

As described herein, query-able data can exist in two forms in database system 10. One form is segments 2424, which can be implemented to be stored on disk in a permanent and/or query-optimized form. The other form is pages 2515 storing data that can be eventually sent to the foundation nodes for storage by the stream loader nodes once they are ready to be converted into permanent segments, but until they are converted, the data in pages can exist and be processed for queries separately from segments 2424.

As described herein, a query can be executed via accessing each of a plurality of segments storing column-formatted data via a corresponding IO pipelines 2835. For example, an IO pipeline operator (e.g. operator 2421 and/or IO pipeline generator module 2834) can implemented to process segments 2424 based on creating and executing modular directed graph structures (e.g. IO Pipelines 2835) to handle arbitrary processing schemes as described herein. Each IO pipeline 2835 can be configured for the respective segment 2424, where different IO pipelines 2835 of a given query can have different arrangements of pipeline elements. The IO pipelines can be configured for processing the column-formatted data of segments 2424 via an arrangement of one or more column-formatted data-based IO pipeline elements 3610 (e.g. any arrangement of pipeline elements described herein, such as one or more index elements 3512, one or more source elements 3514, one or more filter elements 3516, one or more deleted rows pipeline elements 3421, one or more row identifier pipeline elements 3532, one or more set elements (e.g. set intersection, set union, set difference, etc.), and/or any other pipeline elements.

As described herein, a query can be executed further via accessing one or more pages storing row-formatted data, for example, based on the corresponding pages not yet having been converted into segments, and awaiting conversion into segments via a corresponding page conversion process via segment generator 2617. Data in pages can be inherently row-oriented, for example, since they are essentially copied directly from the original source of the data, In some embodiments, pages are loaded for queries and processed using a completely separate plan operator with its own scheduling system, event dispatch/listen pattern, disjunction filtering mechanism, and/or load-balancing calculation to leverage parallelism across all cores. This operator can be implemented differently from the IO pipeline operator implemented for processing segments.

While the construction of IO pipelines as described herein is configured for processing column-formatted data via column-formatted data-based IO pipeline elements 3610, it can be ideal to also process pages via their own IO pipelines, for example, for consistency in processing data and/or to simplify planning and/or executing IO operations.

For example, in some embodiments, adapting to changes to the way IO is processed across the whole database system 10 over time requires changing the way data from segments 2424 are processed in addition to the way data from pages 2515 are processed. For example, introduction of addendum parts 3210 to database system 10 for processing of deleted rows can be require implementing corresponding functionality via a pipeline element in IO pipelines in the pipeline IO operator (e.g. as illustrated in FIG. 35A and/or 35B). In the case where pages are processed differently, a different, albeit similar, approach would need to be implemented into the page operator separately to exclude deleted rows from page results. As the functionality of database system 10 is further updated over time, it can be ideal to implement a same mechanism for processing both pages and segments.

In some embodiments, instead of loading pages in a separate operator and handling all processing separately, the modularity of IO pipelines 2835 can be leveraged to further enable reading of data from pages using a special element type in IO pipelines, and handle all other processing with other existing pipeline elements. This way, all data passes through the same IO pipeline logic, ultimately simplifying the entire IO system.

Such an element type adapted for reading pages can be implemented as a page source pipeline element 3612. Some or all embodiments of IO pipeline 2835 described herein can be implemented to include a page source pipeline element 3612, for example, to enable the IO pipeline 2835 to process a corresponding page 2515.

In some embodiments, IO Pipelines 2835 are made up of an acyclic directed graph of "elements" (E.g. any of the pipeline elements described herein). In some embodiments, all elements have a common interface, which can allow elements to effectively take arbitrary data in and output processed data. Some elements, in the case of segments 2424, only output data by reading data from disk and presenting it to elements later in the pipeline in the form of "column-views" (e.g. corresponding row lists and/or optionally sourced values). This way, all the other elements can read the data in the column view without needing to know about which previous element created it.

To adapt this functionality of IO pipelines 2835 for page processing, the data sourced from pages can be presented via a page source pipeline element 3612. Parsing pages in an IO pipeline via the page source pipeline element 3612 can involve formatting the rows into a "column view" reader object, which are then processed by future elements in the pipeline as a column-oriented data structure. This enables processing of pages and segments as column-oriented data in executing a given query, even though the pages store row-formatted data.

Figure 36B:
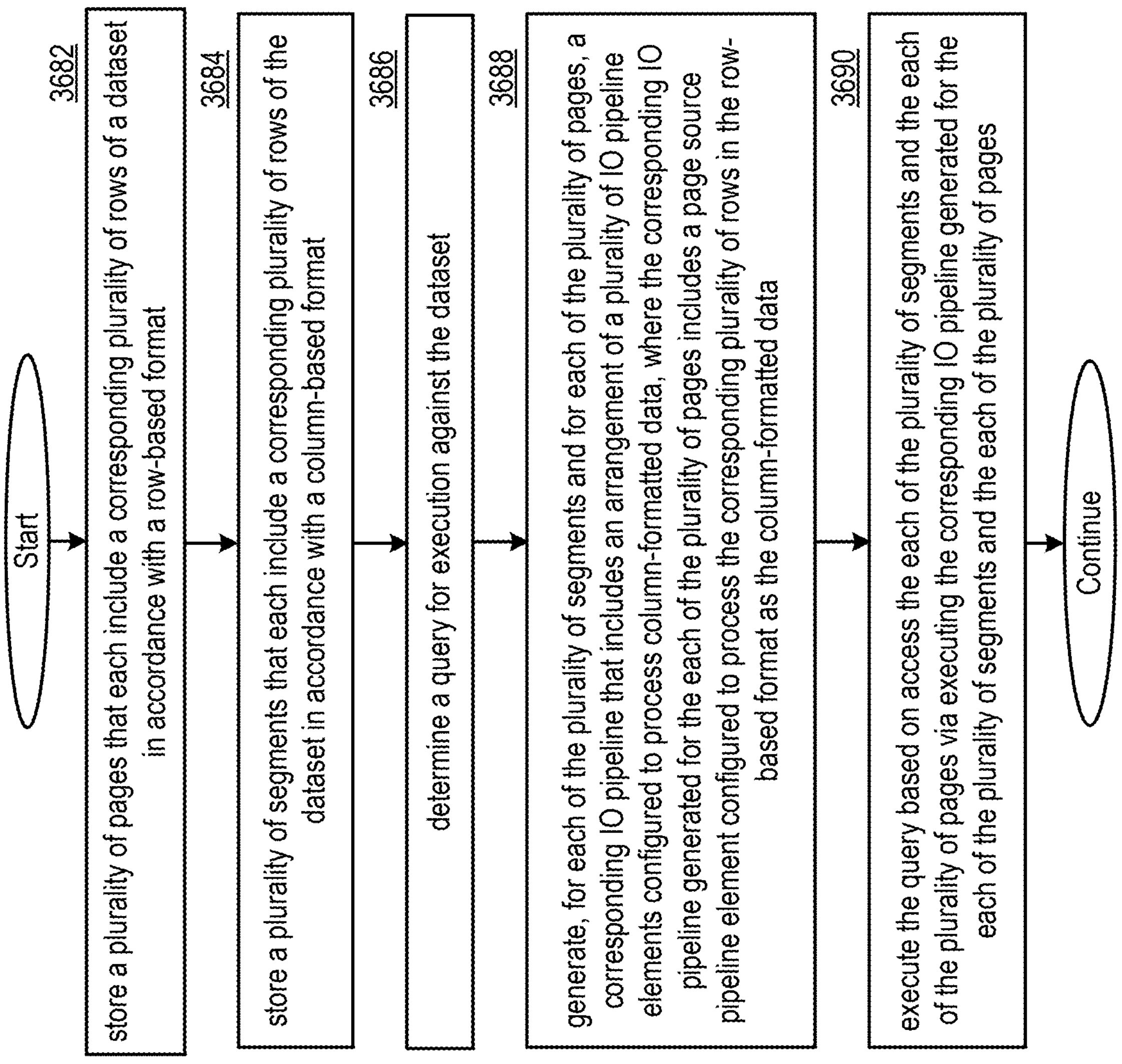
FIG. 36B is a logic diagram illustrating a method for execution in accordance with various embodiments.

FIG. 36B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 36B. For example, a node 37 can participate in some or all steps of FIG. 36B based on participating in consensus protocols to mediate consensus data with other nodes 37. Some or all of the method of FIG. 36B can be performed by nodes executing a query in conjunction with a query execution, for example, via one or more nodes 37 implemented as nodes of a query execution module 2504 implementing a query execution plan 2405. Some or all of the steps of FIG. 36B can optionally be performed by any other processing module of the database system 10. Some or all of the steps of FIG. 36B can be performed to implement some or all of the functionality of the database system 10 as described in conjunction with FIG. 36A, for example, by implementing some or all of the functionality of one or more IO pipelines 2835 of query execution module 2504, for example, where a first subset of IO pipelines 2835 are each implemented to access a corresponding segment 2424 and/or where a second subset of IO pipelines 2835 are each implemented to access a corresponding page 2515 based on implementing a page source pipeline element 3612. Some or all steps of FIG. 34I can be performed by database system 10 in accordance with other embodiments of the database system 10 and/or nodes 37 discussed herein. Some or all steps of FIG. 34I can be performed by database system 10 in accordance with performing one or more steps of FIG. 34H, FIG. 34I, and/or of any other method described herein.

Step 3682 includes storing a plurality of pages that each include a corresponding plurality of rows of a dataset in accordance with a row-based format. Step 3684 includes storing a plurality of segments that each include a corresponding plurality of rows of the dataset in accordance with a column-based format.

Step 3686 includes determining a query for execution against the dataset. Step 3688 includes generate, for each of the plurality of segments and for each of the plurality of pages, a corresponding IO pipeline that includes an arrangement of a plurality of IO pipeline elements configured to process column-formatted data, In various examples, the corresponding IO pipeline generated for the each of the plurality of pages includes a page source pipeline element configured to process the corresponding plurality of rows in the row-based format as the column-formatted data. Step 3690 includes executing the query based on access the each of the plurality of segments and the each of the plurality of pages via executing the corresponding IO pipeline generated for the each of the plurality of segments and the each of the plurality of pages.

In various examples, the method further includes storing a plurality of addendum parts. In various examples, each of a first subset of the plurality of addendum parts indicates a corresponding subset of the corresponding plurality of rows of a corresponding one of the plurality of pages to be deleted from the corresponding one of the plurality of pages. In various examples, each of a second subset of the plurality of addendum parts indicates a corresponding subset of the corresponding plurality of rows of a corresponding one of the plurality of segments to be deleted from the corresponding one of the plurality of segments.

In various examples, executing the corresponding IO pipeline generated for at least one of the plurality of pages includes processing corresponding addendum parts of the plurality of addendum parts for the at least one of the plurality of pages to exclude the corresponding subset of the corresponding plurality of rows of a corresponding one of the plurality of pages. In various examples, executing the corresponding IO pipeline generated for at least one of the plurality of segments includes processing corresponding addendum data of the plurality of addendum parts for the at least one of the plurality of segments to exclude the corresponding subset of the corresponding plurality of rows of a corresponding one of the plurality of segments.

In various examples, the first subset of the plurality of addendum parts are generated in accordance with first addendum part formatting. In various examples, the second subset of the plurality of addendum parts are generated in accordance with second addendum part formatting. In various examples, the first subset of the plurality of addendum parts are read in accordance with the first addendum part formatting. In various examples, the second subset of the plurality of addendum parts are read in accordance with the second addendum part formatting.

In various examples, the first addendum part formatting is based on inclusion of a skip list. In various examples, the second addendum part formatting is based on no inclusion of the skip list. In various examples, the first subset of the plurality of addendum parts are read based on processing the skip list. In various examples, the second subset of the plurality of addendum parts are read without processing any skip list.

In various examples, the method further includes storing a prior plurality of pages that collectively include a first set of rows of the dataset in accordance with the row-based format. In various examples, the method further includes performing a first page conversion process to generate the plurality of segments from the prior plurality of pages, wherein the query is executed prior to performing the first page conversion process based on accessing the first set of rows via the plurality of segments.

In various examples, the plurality of pages collectively include a second set of rows of the dataset in accordance with the row-based format, wherein the second set of rows and the first set of rows are mutually exclusive. In various examples, the method further includes, after executing the query: performing a second page conversion process to generate a second plurality of segments from the plurality of pages. In various examples, the second plurality of segments collectively include the second set of rows of the dataset in accordance with the column-based format.

In various examples, the method further includes storing a new plurality of pages; determining a second query for execution against the dataset; and/or generating, for each of the second plurality of segments and for each of the new plurality of pages, a second corresponding IO pipeline configured to process column-formatted data. In various examples, the corresponding IO pipeline generated for the each of the plurality of pages includes the page source pipeline element configured to process the corresponding plurality of rows in the row-based format as the column-formatted data. In various examples, the method further includes executing the second query based on access the each of the plurality of segments and the each of the plurality of pages via executing the second corresponding IO pipeline generated for the each of the second plurality of segments and the each of the new plurality of pages.

In various examples, the arrangement of the plurality of IO pipeline elements configured to process column-formatted data include at least one of: at least one index element; at least one source element; or at least one filter element.

In various examples, the corresponding IO pipeline is configured to apply a filtering predicate of the query.

In various examples, the method further includes emitting a filtered set of rows of the dataset via executing a plurality of IO pipelines based on accessing the plurality of pages and the plurality of segments. In various examples, the method further includes further processing the filtered set of rows via at least one additional operator to generate a query resultant for the query.

In various examples, the plurality of segments and the plurality of pages are stored across a plurality of nodes. In various examples, the plurality of nodes execute corresponding IO pipelines of the plurality of IO pipelines in accordance with a query execution plan. In various examples, at least one additional of the plurality of nodes executes generates the query resultant in accordance with the query execution plan.

In various embodiments, any one of more of the various examples listed above are implemented in conjunction with performing some or all steps of FIG. 36B. In various embodiments, any set of the various examples listed above can be implemented in tandem, for example, in conjunction with performing some or all steps of FIG. 36B.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 36B described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 36B, for example, in conjunction with further implementing any one or more of the various examples described above.

In various embodiments, the operational instructions, when executed by the at least one processor, cause the database system to: store a plurality of pages that each include a corresponding plurality of rows of a dataset in accordance with a row-based format; store a plurality of segments that each include a corresponding plurality of rows of the dataset in accordance with a column-based format; determine a query for execution against the dataset; generate, for each of the plurality of segments and for each of the plurality of pages, a corresponding IO pipeline that includes an arrangement of a plurality of IO pipeline elements configured to process column-formatted data, where the corresponding IO pipeline generated for the each of the plurality of pages includes a page source pipeline element configured to process the corresponding plurality of rows in the row-based format as the column-formatted data; and/or execute the query based on access the each of the plurality of segments and the each of the plurality of pages via executing the corresponding IO pipeline generated for the each of the plurality of segments and the each of the plurality of pages.

Figure 37A:
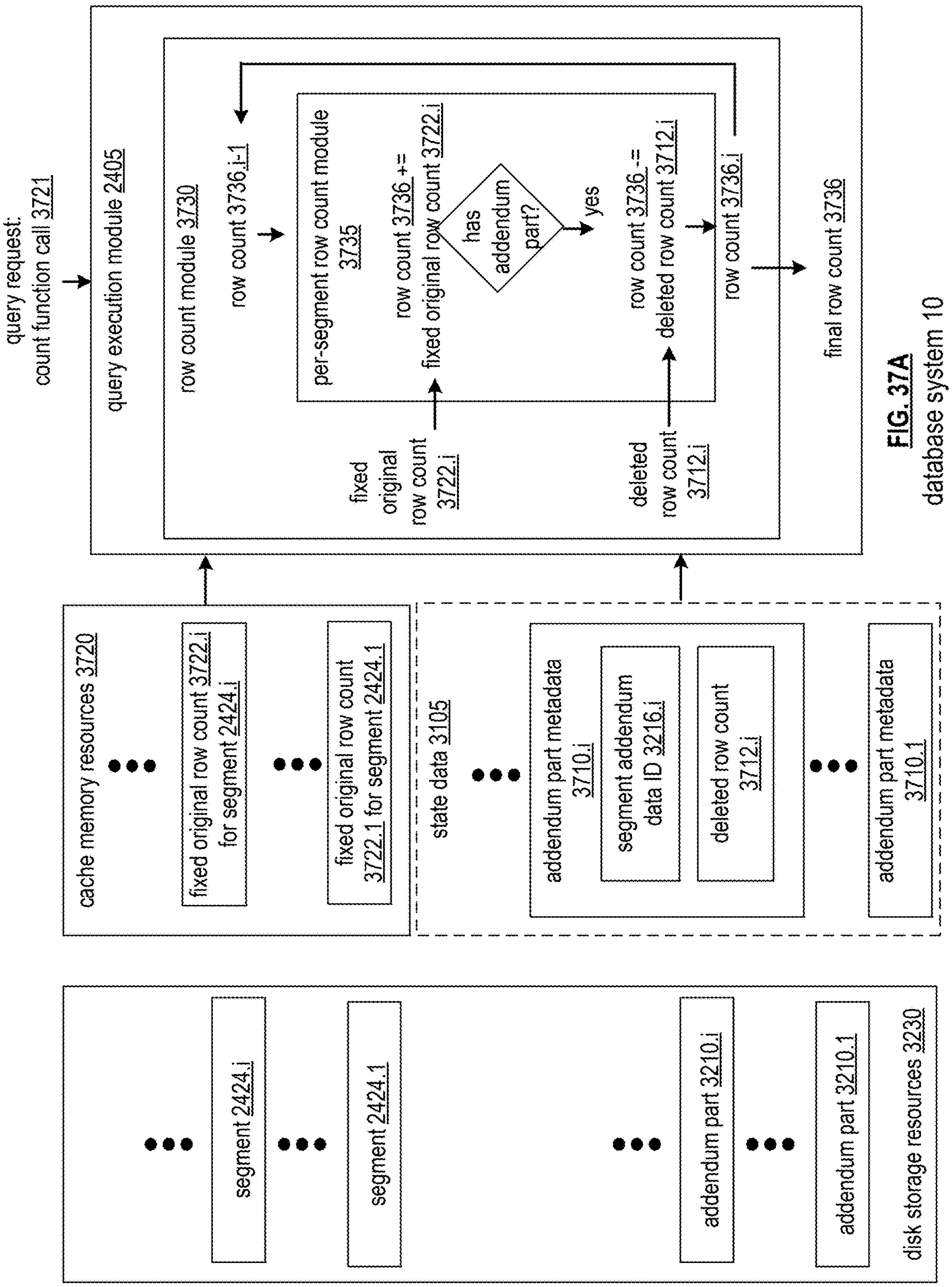
FIG. 37A is a schematic block diagram of query execution module that executes a count function call of a query based on implementing a row count module in accordance with various embodiments.

FIG. 37A illustrates an embodiment of a query execution module 2504 of a database system 10 that implements arow count module 3730 in executing a corresponding query that includes a count function call 3721. Some or all features and/or functionality of the database system 10 of FIG. 37A can implement any embodiment of database system 10 described herein.

In some embodiments, a common and simply type of query issued to database system 10 is a count query type having a count function call 3721. For example, the query includes a count(*) function (e.g. in accordance with SQL), where the function call count(*) corresponds to a function call to count a number of rows in a corresponding database table, without a GROUP BY clause (e.g. return an integer value indicating the total number of rows in the table). These simple queries yields a global row count for the specified table. For example, the query resultant of such a query can indicate value indicating the total number of rows, or this value indicating the total number of rows can further be processed and/or manipulated in generating the query resultant, depending on the query. As a particular example, a query with a count function call 3721 to count a number of rows in a relational database table "tableA" can be written to include the following, or can be similar to and/or semantically equivalent with the following:

SELECT count(*) FROM tableA

The use of such a query can span a variety of purposes, ranging from assessing the progress of a load to quickly sanity-checking the amount of data loaded on a system. The functionality presented in conjunction with FIG. 37A can improve the technology of database systems by ensuring that such queries run more efficiently while adapting for the case where rows have been deleted as indicated in an addendum part as described herein.

In some embodiments, database system 10 can implement specific measures to accelerate count(*) queries without necessitating any disk IO at query-time (e.g. without necessitating access to the segment 2424 itself in disk storage resources 3230). For example, segment objects (e.g. implementing segments 2424) can contain a rowCount( ) method that, when called, returns the row count of the segment as cached in memory. As segments 2424 are immutable, this row count will not change and thus can be always safe to use.

The use of delete addendum parts 3210 as described herein can complicate this optimization. While core segment data of segments 2424 are still immutable, the possible presence of addendum parts denoting deleted rows means that the row count of a segment in practice is contingent on the ownership sequence number (OSN) a query is executing against, as for different OSNs, delete addendum parts may or may not be included as discussed previously.

As an example, consider a segment whose lifetime begins at OSN X and had a delete part created and placed starting from OSN X+1. Consider the segment's base row count (e.g. the segment's fixed original row count 3722) to be R and the number of deleted rows (e.g. the addendum part's deleted row count 3712) to be D. A count(*) query running against OSN X should consider the segment to have R rows, whereas a query executing against OSN X+1 should consider the segment to have R-D rows. In both cases, to render query correctness. The correct row count must be computed, ideally without requiring any additional IO to be performed beyond what is required for segment and addendum part activation to render greater query efficiency. Database system 10 can be implemented to perform such functionality, where the correct row count is computed to account for addendum parts that are valid for a given queries OSN (e.g. the query's OSN falls within the OSN range 3238 indicated in the addendum part activation data 3230 for a given segment having R rows, and the D rows indicated in this addendum part for deletion are applied to render counting of R minus D rows being included in the segment).

In some embodiments, such functionality of performing efficient execution of count functions is implemented based on storage cluster consensus state data (e.g. state data 3105) containing metadata about segments within the cluster, including their row count. Additionally, information about the various addendum parts can be present in the consensus state as addendum part metadata 3710. For example, the addendum part metadata 3710 can indicate any metadata regarding the addendum parts as indicated in the state data 3105, and can implement some or all of the segment addendum part state data 3225 and/or segment part activation data 3230 discussed in conjunction with FIGS. 32A-32C.

The structure for addendum part metadata 3710 can consists of: a name field indicating a name/identifier of the addendum (e.g. as a UUID), which can be implemented via some or all features of segment addendum data ID 3216 of FIG. 32A; a part field indicate segment part information for the one or more segment parts of the segment to which the addendum part applies, which can optionally implement a set of one or more segment metadata 3217 of FIG. 32A; and/or an IDA offset field (e.g. as an integer such as a uint32) that indicates an information dispersal algorithm offset (e.g. denoting a corresponding segment in the segment group to which the addendum part applies), which can optionally implement segment metadata 3217 of FIG. 32A. This structure can optionally be implemented based on implementing a structure logically equivalent with the following:

```
{
  name: uuid,
  parts: [segmentPartInfo],
  ida_offset: uint32,
}
```

This structure of addendum part metadata 3710 (e.g. of a corresponding segment part state data 3225 of FIG. 32A) can be augmented with an additional optional field. In particular, for addendum parts implemented as delete parts. it can further contain a field indicating the number of rows that the delete part excludes. This number of deleted rows field (e.g. an integer field, such as a uint64) can be an optional field indicating a deleted row count 3712 indicating the number of rows included in the given addendum part). This structure can optionally be implemented based on implementing a structure logically equivalent with the following:

```
{
  name: uuid,
  parts: [segmentPartInfo],
  ida_offset: uint32,
  num_deleted_rows: optional<uint64>,
}
```

In some embodiments, such functionality of performing efficient execution of count functions can be implemented based on adapting a segment service component that exposes segment handles for query execution. For example, each query can be processed based on determining an OSN to run against, for example, via a 'query tree probe': in addition to determining the topology of the query tree (including any storage clusters, via functionality discussed in conjunction with FIGS. 31A-31C), it can also request that storage clusters within the query tree expose an OSN that should be used when submitting plans for execution. Such functionality can be performed in conjunction with creating and executing query plans having a given OSN via access to segments owned by nodes as indicated in corresponding data ownership information as determined via a consensus protocol as discussed previously. Such functionality can be implemented by processing resources of query execution module 2504 and/or other processing of a corresponding query for execution via database system 10.

In some embodiments, upon a query plan being submitted to a given storage cluster, the segments that are required for the plan's execution can be determined by presenting the OSN to the segment service. The segment service component can then yield the segment handles that should be consumed within the plan's execution. These segment handles also include information on any addendum parts that should also be consumed during execution (based upon the given OSN), for example, via functionality discussed in conjunction with FIGS. 32A-32C.

In some embodiments, only a single delete part is allowed to be placed within a singular OSN for a given segment, as discussed previously (e.g. as indicated by non-overlapping OSN ranges assigned to multiple historical addendum parts in addendum part activation data 3230 for addendum parts of a given segment 2424). In such embodiments, the segment handle object can contain helper methods for specifically retrieving information about (at most) one possible delete part.

In some embodiments, handles that are returned are light-weight objects which primarily contain information that is copied from the consensus state. For handles that refer to segments with addendum parts, metadata from the consensus state about the addendum parts can be included with along with the primary segment handle. This can enable access to the addendum part metadata 3710 for identified addendum parts accordingly, such as the deleted row count 3712 of the addendum part metadata 3710.

In some embodiments, the collection of segment handles can then be passed into an operator factory to compile a final VM plan (e.g. query operator execution flow of a corresponding query execution plan) that will be executed. This is where the count(*) optimization can be implemented to take place.

When the count(*) optimization is triggered in the case where addendum parts are not utilized, row counts can be summed via summing the fixed original row count 3722 (e.g. rowCount( )) of each segment 2424. This can include implementing row count module 3730 to implement a per-segment row count module 3735 to update a row count 3736 (e.g. a variable "countStarResult", which is optionally initialized to zero, and is updated based on adding the fixed original row count 3722 (e.g. accessed in cache memory resources 3720, rather than accessing the corresponding segment 2424 itself in disk storage resources 3230, due to this value being immutable) of each segment to its present value, iteratively, to ultimately render a final value of row count 3736 that is emitted and/or further processed in emitting the query resultant. This can include implementing some or all of the following logic:

```
countStarResult = 0
foreach segment:
   countStarResult += segment.rowCount( )
createCountStarOperator(countStarResult)
```

In the case of implementing addendum parts, this logic can be augmented to adapt to the presence of addendum parts indicating deleted rows accordingly based on further subtracting the deleted row count 3712 (e.g. numberOfDeletedRows( )) of any addendum parts 3210 (e.g. that exist for any of the segments having their determined valid for the given OSN). This can include implementing row count module 3730 to implement the per-segment row count module 3735 to update a row count 3736 (e.g. a variable "countStarResult", which is optionally initialized to zero, and is updated based on: first, adding the fixed original row count 3722 (e.g. accessed in cache memory resources 3720, rather than in disk memory resources via access to the corresponding segment 2424 itself, due to this value being immutable) of each given segment to its present value, iteratively; and second, if the given segment is determined to have an addendum part 3210 (e.g. an addendum part valid for the respective OSN), subtracting the deleted row count 3712 (e.g. accessed in addendum part metadata 3710 of the state data 3105, rather than via access to the addendum part 3210 itself in disk storage resources 3230), to ultimately render the final value of row count 3736 that is emitted and/or further processed in emitting the query resultant. This can include implementing some or all of the following logic:

```
countStarResult = 0
foreach segment:
   countStarResult += segment.rowCount( )
   if segment.hasDeletedRows( ):
      countStarResult -= segment.numberOfDeletedRows( )
createCountStarOperator(countStarResult)
```

In some embodiments, the hasDeletedRows and numberOfDeletedRows methods can be implemented based on accessing information directly copied from the consensus state about the delete addendum part (e.g. accessing addendum part metadata 3710 and/or other information in state data 3105). Thus, in such embodiments, no IO is required to read the delete addendum part's header off-disk to correct the computed row count, which improves query efficiency in the cases of such count queries.

In some embodiments, the functionality of row count module 3730 is implemented via a query processing module 2435 of a given node 37, where this given node generates the row count 3736 based on accessing and applying (e.g. adding) the fixed original row counts 3722 for its owned segments (e.g. as indicated in the data ownership information for the given OSN of the query being executed) and based on further accessing and applying (e.g. subtracting) the deleted row counts 3712 for any addendum parts (e.g. determined to exist and further determined to be valid for the given OSN for the query being executed) for its owned segments. Thus, the total row count can be generated based on summing a plurality of final row counts 3736 independently generated via a plurality of nodes (e.g. generated via all leaf level nodes across one or more storage clusters 2535 of a query execution plan 2405, where coordinator nodes and/or a root node sums the final row counts 3736 received from a plurality of children to ultimately render a final sum).

Figure 37B:
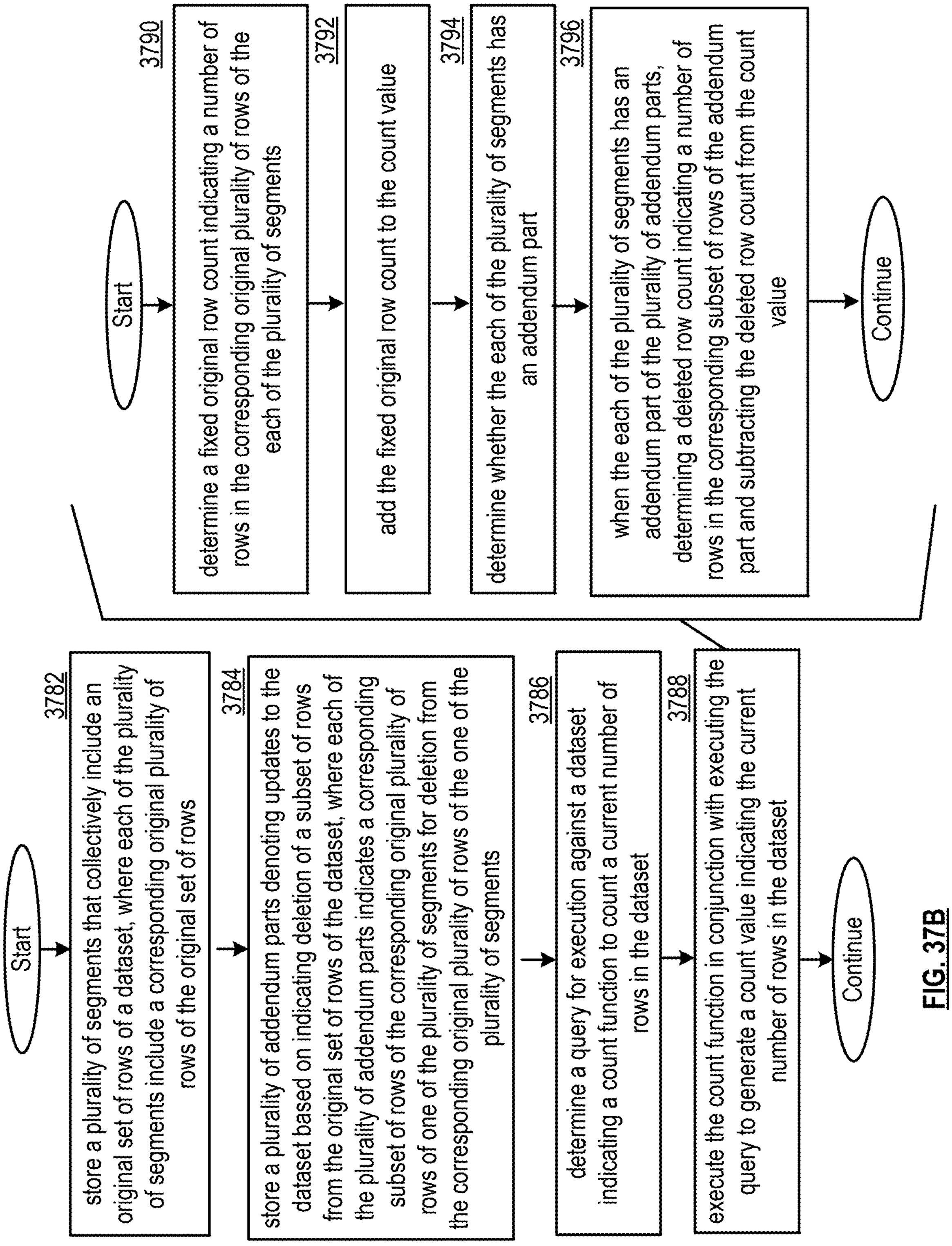
FIG. 37B is a logic diagram illustrating a method for execution in accordance with various embodiments.

FIG. 37B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 37B. For example, a node 37 can participate in some or all steps of FIG. 37B based on participating in consensus protocols to mediate consensus data with other nodes 37. Some or all of the method of FIG. 37B can be performed by nodes executing a query in conjunction with a query execution, for example, via one or more nodes 37 implemented as nodes of a query execution module 2504 implementing a query execution plan 2405. Some or all of the steps of FIG. 37B can optionally be performed by any other processing module of the database system 10. Some or all of the steps of FIG. 37B can be performed to implement some or all of the functionality of the database system 10 as described in conjunction with FIG. 37A, for example, by implementing some or all of the functionality of the row count module 3730. Some or all steps of FIG. 37B can be performed by database system 10 in accordance with other embodiments of the database system 10 and/or nodes 37 discussed herein. Some or all steps of FIG. 37B can be performed by database system 10 in accordance with performing one or more steps of any other method described herein.

Step 3782 includes storing a plurality of segments that collectively include an original set of rows of a dataset. In various examples, each of the plurality of segments include a corresponding original plurality of rows of the original set of rows. Step 3784 includes storing a plurality of addendum parts denoting updates to the dataset based on indicating deletion of a subset of rows from the original set of rows of the dataset. In various examples, each of the plurality of addendum parts indicates a corresponding subset of rows of the corresponding original plurality of rows of one of the plurality of segments for deletion from the corresponding original plurality of rows of the one of the plurality of segments. Step 3786 includes determining a query for execution against a dataset indicating a count function to count a current number of rows in the dataset. Step 3788 includes executing the count function in conjunction with executing the query to generate a count value indicating the current number of rows in the dataset.

Performing step 3788 can include performing steps 3790. 3792, 3794, and/or 3796, for example, for each of the plurality of segments to update the count value. Step 3790 includes determining a fixed original row count indicating a number of rows in the corresponding original plurality of rows of the each of the plurality of segments. Step 3792 includes adding the fixed original row count to the count value. Step 3794 includes determining whether the each of the plurality of segments has an addendum part. Step 3796 includes when the each of the plurality of segments has an addendum part of the plurality of addendum parts, determining a deleted row count indicating a number of rows in the corresponding subset of rows of the addendum part and/or subtracting the deleted row count from the count value.

In various examples, the plurality of segments and the plurality of addendum parts are stored in disk memory resources, In various examples, the fixed original row count is determined without accessing the each of the plurality of segments in the disk memory resources. In various examples, the deleted row count is determined without accessing the addendum part in the disk memory resources.

In various examples, the fixed original row count is determined based on accessing the fixed original row count in cache memory resources.

In various examples, the deleted row count is determined based on accessing the deleted row count in metadata for the addendum part maintained in state data mediated via a consensus protocol.

In various examples, the method further includes updating the state data in accordance with the consensus protocol to indicate the metadata for the addendum part based on generating the addendum part for storage.

In various examples, the plurality of segments and the plurality of addendum parts are stored via a plurality of nodes of a storage cluster, and wherein the consensus protocol is mediated via the plurality of nodes of the storage cluster.

In various examples, determining whether the each of the plurality of segments has an addendum part is based on determining an ownership sequence number (OSN) for the query and further determining that an OSN range for the addendum part includes the OSN for the query.

In various examples, at least one of the plurality of segments is determined to have no addendum part, and wherein updating the count value for the at least one of the plurality of segments include subtracting no value from the count value based on the at least one of the plurality of segments having no addendum part.

In various examples, the count value is initialized to zero prior to updating the count value.

In various examples, the count function is indicated in a SELECT statement of a query expression for the query.

In various embodiments, any one of more of the various examples listed above are implemented in conjunction with performing some or all steps of FIG. 37B. In various embodiments, any set of the various examples listed above can be implemented in tandem, for example, in conjunction with performing some or all steps of FIG. 37B.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 37B described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 37B, for example, in conjunction with further implementing any one or more of the various examples described above.

In various embodiments, the operational instructions, when executed by the at least one processor, cause the database system to: store a plurality of segments that collectively include an original set of rows of a dataset, where each of the plurality of segments include a corresponding original plurality of rows of the original set of rows; store a plurality of addendum parts denoting updates to the dataset based on indicating deletion of a subset of rows from the original set of rows of the dataset, where each of the plurality of addendum parts indicates a corresponding subset of rows of the corresponding original plurality of rows of one of the plurality of segments for deletion from the corresponding original plurality of rows of the one of the plurality of segments; determine a query for execution against a dataset indicating a count function to count a current number of rows in the dataset; and/or execute the count function in conjunction with executing the query to generate a count value indicating the current number of rows in the dataset. In various examples, the count function is executed based on, for each of the plurality of segments, updating the count value based on: determining a fixed original row count indicating a number of rows in the corresponding original plurality of rows of the each of the plurality of segments; adding the fixed original row count to the count value; and/or determining whether the each of the plurality of segments has an addendum part. In various embodiments, when the each of the plurality of segments has an addendum part of the plurality of addendum parts, updating the count value for the each of the plurality of segments is based on: determining a deleted row count indicating a number of rows in the corresponding subset of rows of the addendum part; and/or subtracting the deleted row count from the count value.

In some embodiments, some or all of the functionality implemented in conjunction with receiving incoming rows from one or more stream sources (e.g. in row data with corresponding row numbers), processing rows for storage in pages, maintaining a durability horizon, and/or implementing one or more stream loaders (e.g. via one or more nodes) as described herein is implemented via some or all features and/or functionality regarding receiving incoming rows from one or more stream sources, processing corresponding row data such as labeled row data having corresponding row numbers, processing rows for storage in pages, maintaining a durability horizon, and/or implementing one or more stream loaders as described in U.S. Utility application Ser. No. 16/985,723, U.S. Utility application Ser. No. 16/985,957, U.S. Utility application Ser. No. 16/985,930, and/or U.S. Utility application Ser. No. 17/215,527, entitled MAINTAINING ROW DURABILITY DATA IN DATABASE SYSTEMS, filed Mar. 29, 2021, issued as U.S. Pat. No. 11,675,757 on Jun. 13, 2023, which is hereby incorporated herein by reference in its entirety and made part of the present U.S. Utility Patent Application for all purposes.

In some embodiments, some or all of the functionality implemented in conjunction with generating segments, storing segments (e.g. via multiple segment parts), storing segment metadata regarding segments, reloading segments, rebuilding segments, executing queries and/or performing rebuilds across multiple different storage clusters, and/or implementing a consensus protocol as described herein, is implemented based on implementing some or all features and/or functionality of the database system 10, for example, with regards to generating segments, storing segments, loading segments, rebuilding segments, and/or implementing a consensus protocol, as disclosed by: U.S. Utility application Ser. No. 18/308,954, entitled "QUERY EXECUTION DURING STORAGE FORMATTING UPDATES", filed Apr. 28, 2023, which is hereby incorporated herein by reference in its entirety and made part of the present U.S. Utility Patent Application for all purposes; U.S. Utility application Ser. No. 18/310,262, entitled "GENERATING A SEGMENT REBUILD PLAN VIA A NODE OF A DATABASE SYSTEM", filed May 1, 2023, which is hereby incorporated herein by reference in its entirety and made part of the present U.S. Utility Patent Application for all purposes; and/or U.S. Utility application Ser. No. 18/355,497, entitled "TRANSFER OF A SET OF SEGMENTS BETWEEN STORAGE CLUSTERS OF A DATABASE SYSTEM", filed Jul. 20, 2023, which is hereby incorporated herein by reference in its entirety and made part of the present U.S. Utility Patent Application for all purposes.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A query and results sub-system of a database system, wherein the query and results sub-system comprises:

pluralities of computing nodes of a plurality of computing device clusters, wherein a computing device cluster of the plurality of computing device clusters includes a plurality of computing devices, wherein a computing device of the plurality of computing devices includes a plurality of computing nodes of the pluralities of computing nodes, wherein the plurality of computing nodes include pluralities of processing modules, wherein a first processing module of the pluralities of processing modules is operable to:

receive an initial query, wherein the initial query includes a plurality of sets of code terms, wherein the initial query is regarding a dataset temporarily stored as a plurality of pages in the database system, and wherein a first page of the plurality of pages includes a first set of row-oriented data;

identify a set of input/output (IO) code terms of the plurality of sets of code terms in accordance with an optimization protocol to produce an optimized set of IO code terms; and for at least a portion of the first page:

determine a first IO pipeline element of a first set of IO pipeline elements, wherein the first IO pipeline element is operable to format at least a portion of the first set of row-oriented data into a first set of column-oriented data;

determine remaining IO pipeline elements operable to execute the optimized set of IO code terms on the at least the portion of the first page based on first page schema related to the at least the portion of the first page; and optimize the first set of IO pipeline elements based on processing optimization conditions to produce a first IO pipeline.

2. The query and results sub-system of claim 1, wherein the first IO pipeline element comprises a page source IO element, wherein the page source IO element is operable to format the at least the portion of the first set of row-oriented data into the first set of column-oriented data by:

reading the at least the portion of the first set of row-oriented data; and outputting the at least the portion of the first set of row-oriented data as the first set of column-oriented data via a column-view function.

3. The query and results sub-system of claim 1, wherein the first processing module is operable to execute the optimization protocol by:

parsing the plurality of sets of code terms to identify:

a first set of sub-sets of code terms of the plurality of sets of code terms that involve retrieving the dataset to produce a set of IO code terms;

parsing the set of IO code terms to identify one or more of:

a second set of sub-sets of code terms of the plurality of sets of code terms that involve filtering data of the dataset; and a third set of sub-sets of code terms of the plurality of sets of code terms that involve combining data of the dataset; and when one or more of the second and third set of sub-sets of codes terms is identified:

including the one or more of: the second and third set of sub-sets of code terms in the set of IO code terms to produce the optimized set of IO code terms; and when one or more of the second and third set of sub-sets of codes terms is not identified:

categorizing the set of IO code terms as the optimized set of IO code terms.

4. The query and results sub-system of claim 1, wherein an IO pipeline element of the remaining IO pipeline elements comprises:

a source element;

a cluster key index element;

an inverted index element; or a set element.

5. The query and results sub-system of claim 1, wherein the processing optimization conditions comprise one or more of:

an IO element combining condition;

an IO element ordering condition; and an IO element reuse condition.

6. The query and results sub-system of claim 1, wherein the first processing module is further operable to:

for at least a second portion of the first page:

determine the first IO pipeline element of a second set of IO pipeline elements, wherein the first IO pipeline element is operable to format at least a second portion of the first set of row-oriented data into a second set of column-oriented data;

determine second remaining IO pipeline elements operable to execute the optimized set of IO code terms on the at least the second portion of the first page based on first page schema related to the at least the second portion of the first page; and optimize the second set of IO pipeline elements based on the processing optimization conditions to produce a second IO pipeline.

7. The query and results sub-system of claim 1, wherein the first processing module is further operable to:

for at least a portion of a second page of the plurality of pages, wherein the second page includes a second set of row-oriented data:

determine the first IO pipeline element of a second set of IO pipeline elements, wherein the first IO pipeline element is operable to format at least a portion of the second set of row-oriented data into a second set of column-oriented data;

determine second remaining IO pipeline elements operable to execute the optimized set of IO code terms on the at least the portion of the second page based on second page schema related to the at least the portion of the second page; and optimize the second set of IO pipeline elements based on the processing optimization conditions to produce a second IO pipeline.

8. The query and results sub-system of claim 1, wherein a set of code terms of the plurality of sets of code terms includes one or more code terms, wherein a code term of the one or more code terms includes one or more of:

an operational unit, wherein the operational unit includes one or more of:

a logic function;

a mathematical function; and a data manipulation function; and one or more operands, wherein an operand of the one or more operands includes a data value.

9. The query and results sub-system of claim 1 further comprises:

wherein a first portion of the dataset is temporarily stored as the plurality of pages in the database system, wherein a second portion of the dataset is stored in a long term storage format in the database system, wherein the long term storage format includes dividing the second portion of the dataset into a plurality of segments, wherein a first segment of the plurality of segments includes first column-oriented data, and wherein the first processing module is further operable to:

for the first segment:

determine a second set of IO pipeline elements operable to execute the optimized set of IO code terms on the first segment based on first segment data of the first segment; and optimize the second set of IO pipeline elements based on segment processing optimization conditions to produce a second IO pipeline.

10. A computer readable memory comprises:

a first memory section that stores operational instructions that when executed by a first processing module of pluralities of processing modules of pluralities of computing nodes of a plurality of computing device clusters of a query and results sub-system of a database system, cause the first processing module to:

receive an initial query, wherein the initial query includes a plurality of sets of code terms, wherein the initial query is regarding a dataset temporarily stored as a plurality of pages in the database system, and wherein a first page of the plurality of pages includes a first set of row-oriented data;

identify a set of input/output (IO) code terms of the plurality of sets of code terms in accordance with an optimization protocol to produce an optimized set of IO code terms; and a second memory section that stores operational instructions that when executed by the first processing module, cause the first processing module to:

for at least a portion of the first page:

determine a first IO pipeline element of a first set of IO pipeline elements, wherein the first IO pipeline element is operable to format at least a portion of the first set of row-oriented data into a first set of column-oriented data;

determine remaining IO pipeline elements operable to execute the optimized set of IO code terms on the at least the portion of the first page based on first page schema related to the at least the portion of the first page; and optimize the first set of IO pipeline elements based on processing optimization conditions to produce a first IO pipeline.

11. The computer readable memory of claim 10, wherein the first IO pipeline element comprises a page source IO element, wherein the page source IO element is operable to format the at least the portion of the first set of row-oriented data into the first set of column-oriented data by:

reading the at least the portion of the first set of row-oriented data; and outputting the at least the portion of the first set of row-oriented data as the first set of column-oriented data via a column-view function.

12. The computer readable memory of claim 10, wherein the first memory section further stores operational instructions that when executed by the first processing module, cause the first processing module to execute the optimization protocol by:

parsing the plurality of sets of code terms to identify:

a first set of sub-sets of code terms of the plurality of sets of code terms that involve retrieving the dataset to produce a set of IO code terms;

parsing the set of IO code terms to identify one or more of:

a second set of sub-sets of code terms of the plurality of sets of code terms that involve filtering data of the dataset; and a third set of sub-sets of code terms of the plurality of sets of code terms that involve combining data of the dataset; and when one or more of the second and third set of sub-sets of codes terms is identified:

including the one or more of: the second and third set of sub-sets of code terms in the set of IO code terms to produce the optimized set of IO code terms; and when one or more of the second and third set of sub-sets of codes terms is not identified:

categorizing the set of IO code terms as the optimized set of IO code terms.

13. The computer readable memory of claim 10, wherein an IO pipeline element of the remaining IO pipeline elements comprises:

a source element;

a cluster key index element;

an inverted index element; or a set element.

14. The computer readable memory of claim 1, wherein the processing optimization conditions comprise one or more of:

an IO element combining condition;

an IO element ordering condition; and an IO element reuse condition.

15. The computer readable memory of claim 10, wherein the second memory section further stores operational instructions that when executed by the first processing module, cause the first processing module to execute the optimization protocol by:

for at least a second portion of the first page:

determine the first IO pipeline element of a second set of IO pipeline elements, wherein the first IO pipeline element is operable to format at least a second portion of the first set of row-oriented data into a second set of column-oriented data;

determine second remaining IO pipeline elements operable to execute the optimized set of IO code terms on the at least the second portion of the first page based on first page schema related to the at least the second portion of the first page; and optimize the second set of IO pipeline elements based on the processing optimization conditions to produce a second IO pipeline.

16. The computer readable memory of claim 10, wherein the second memory section further stores operational instructions that when executed by the first processing module, cause the first processing module to execute the optimization protocol by:

for at least a portion of a second page of the plurality of pages, wherein the second page includes a second set of row-oriented data:

determine the first IO pipeline element of a second set of IO pipeline elements, wherein the first IO pipeline element is operable to format at least a portion of the second set of row-oriented data into a second set of column-oriented data;

determine second remaining IO pipeline elements operable to execute the optimized set of IO code terms on the at least the portion of the second page based on second page schema related to the at least the portion of the second page; and optimize the second set of IO pipeline elements based on the processing optimization conditions to produce a second IO pipeline.

17. The computer readable memory of claim 10, wherein a set of code terms of the plurality of sets of code terms includes one or more code terms, wherein a code term of the one or more code terms includes one or more of:

an operational unit, wherein the operational unit includes one or more of:

a logic function;

a mathematical function; and a data manipulation function; and one or more operands, wherein an operand of the one or more operands includes a data value.

18. The computer readable memory of claim 10 further comprises:

wherein a first portion of the dataset is temporarily stored as the plurality of pages in the database system, wherein a second portion of the dataset is stored in a long term storage format in the database system, wherein the long term storage format includes dividing the second portion of the dataset into a plurality of segments, wherein a first segment of the plurality of segments includes first column-oriented data, and wherein the second memory section further stores operational instructions that when executed by the first processing module, cause the first processing module to:

for the first segment:

determine a second set of IO pipeline elements operable to execute the optimized set of IO code terms on the first segment based on first segment data of the first segment; and optimize the second set of IO pipeline elements based on segment processing optimization conditions to produce a second IO pipeline.

* * * * *